US012465974B2

(12) United States Patent
Valls Anglés

(10) Patent No.: US 12,465,974 B2
(45) Date of Patent: Nov. 11, 2025

(54) METHOD FOR THE OBTAINING OF COST EFFECTIVE GEOMETRICALLY COMPLEX PIECES

(71) Applicant: VALLS BESITZ GMBH, Berlin (DE)

(72) Inventor: Isaac Valls Anglés, Rubí (ES)

(73) Assignee: VALLS BESITZ GMBH, Berlin (DE)

( * ) Notice: Subject to any disclaimer, the term of this patent is extended or adjusted under 35 U.S.C. 154(b) by 1239 days.

(21) Appl. No.: 17/278,967

(22) PCT Filed: Sep. 24, 2019

(86) PCT No.: PCT/EP2019/075743
§ 371 (c)(1),
(2) Date: Mar. 23, 2021

(87) PCT Pub. No.: WO2020/064756
PCT Pub. Date: Apr. 2, 2020

(65) Prior Publication Data

US 2024/0253117 A1 Aug. 1, 2024

(30) Foreign Application Priority Data

Sep. 24, 2018 (ES) ............................ ES 201830920
Mar. 1, 2019 (EP) .................................... 19382153
(Continued)

(51) Int. Cl.
*B22F 3/14* (2006.01)
*B22F 1/00* (2022.01)
(Continued)

(52) U.S. Cl.
CPC ................ *B22F 3/14* (2013.01); *B22F 1/052* (2022.01); *B22F 1/09* (2022.01); *B22F 3/004* (2013.01);
(Continued)

(58) Field of Classification Search
CPC .... B22F 3/14; B22F 1/052; B22F 1/09; B22F 3/004; B22F 3/24; B22F 2003/248;
(Continued)

(56) References Cited

U.S. PATENT DOCUMENTS 5,937,265 A 8/1999 Pratt et al.
2008/0217817 A1* 9/2008 McCullough ........... B29C 45/60 264/328.2
(Continued)

FOREIGN PATENT DOCUMENTS

EP 1 222 317 A1 7/2002
WO 2018/154124 A1 8/2018

OTHER PUBLICATIONS

ISR for International Application PCT/EP2019/075743.
Written Opinion for International Application PCT/EP2019/075743.

*Primary Examiner* — Adil A. Siddiqui
(74) *Attorney, Agent, or Firm* — LADAS & PARRY LLP

(57) ABSTRACT

A method for the production of complex geometry, and even large, highly performant metal-comprising components in a cost effective way. The method is also indicated for the construction of components with internal features and voids. The method is also beneficial for light construction. The method allows the reproduction of bio-mimetic structures and other advanced structures for topological performance optimization.

13 Claims, 2 Drawing Sheets

1- Metal component. 2- AM mould. 3- Void internal feature. 4- Elastomeric coating.
5- Extension tube. 6- punctured orifice. 7- Polymeric sealing film.

(30) Foreign Application Priority Data

| | | | |
|---|---|---|---|
| Apr. 5, 2019 | (ES) | ............................. | ES 201930311 |
| May 30, 2019 | (EP) | ..................................... | 19382437 |
| Jun. 5, 2019 | (ES) | ............................. | ES 201930509 |

(51) Int. Cl.

| | |
|---|---|
| ***B22F 1/052*** | (2022.01) |
| ***B22F 3/00*** | (2021.01) |
| ***B22F 3/24*** | (2006.01) |
| ***B23K 20/02*** | (2006.01) |
| ***B33Y 80/00*** | (2015.01) |
| ***C22C 30/02*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/20*** | (2006.01) |
| ***C22C 38/22*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/58*** | (2006.01) |

(52) U.S. Cl.

CPC ................ *B22F 3/24* (2013.01); *B23K 20/02* (2013.01); *B33Y 80/00* (2014.12); *C22C 30/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/58* (2013.01); *B22F 2003/248* (2013.01); *B22F 2201/20* (2013.01); *B22F 2301/35* (2013.01); *B22F 2304/10* (2013.01); *B22F 2998/10* (2013.01); *B22F 2999/00* (2013.01)

(58) Field of Classification Search

CPC .............. B22F 2201/20; B22F 2301/35; B22F 2304/10; B22F 2998/10; B22F 2999/00; B23K 20/02; B33Y 80/00; C22C 30/02; C22C 38/001; C22C 38/002; C22C 38/02; C22C 38/04; C22C 38/06; C22C 38/20; C22C 38/22; C22C 38/42; C22C 38/44; C22C 38/46; C22C 38/48; C22C 38/50; C22C 38/52; C22C 38/58

See application file for complete search history.

(56) References Cited

U.S. PATENT DOCUMENTS

| | | | | |
|---|---|---|---|---|
| 2011/0129380 A1* | 6/2011 | Angles | ................. | B22D 31/002 419/48 |
| 2016/0354839 A1* | 12/2016 | Schick | .................... | B32B 27/08 |

* cited by examiner

1- Metal component. 2- AM mould. 3- Void internal feature. 4- Elastomeric coating.

5- Extension tube. 6- punctured orifice. 7- Polymeric sealing film.

METHOD FOR THE OBTAINING OF COST EFFECTIVE GEOMETRICALLY COMPLEX PIECES

RELATED APPLICATION

This application is an application under 35 U.S.C. 371 of International Application No. PCT/EP2019/075743 filed on 24 Sep. 2019, which claims the benefit of:

1. ES P 201830920 filed 24 Sep. 2018
2. EP 19382153.5 filed 1 Mar. 2019
3. ES P 201930311 filed 5 Apr. 2019
4. EP 19382437.2 filed 30 May 2019
5. ES P 201930509 filed 5 June the disclosures of which are incorporated in their entirety by reference herein.

FIELD OF THE INVENTION

The present invention relates to a method for producing metal-comprising geometrically complex pieces and/or parts. The method is specially indicated for highly performant components. The method is also indicated for very large components. The method is also indicated for the construction of components with internal features and voids. The method is also beneficial for light construction. The method allows the reproduction of bio-mimetic structures and other advanced structures for topological performance optimization.

The present invention also relates to the hot stamping technology, wherein a sheet or tubular component is formed in a component (tool, die, mould, etc.), such as a hot forming die or mould. In particular, it is directed to a method of cooling a sheet or tubular component which is being formed in a hot stamping die or mould. In some applications the component may comprise cooling channels inside.

SUMMARY

Technological advancement is strongly influenced by the available materials and the designs that can be implemented to best capitalize those properties for a given application. In the history of human kind innovation, many efforts have been devoted to the development of materials with improved properties and to the development of new designs to execute production or implementation methods, as can be also recognized by the extense amount of patent applications relating to those two topics. The attainable designs are not only limited by the capacity of vision of the inventors and designers but also by the available manufacturing capabilities that must allow the implementation of the projected designs.

In recent years, with the development of advanced fabrication methodologies allowing for great design flexibility, like several additive manufacturing (AM) methods, have allowed a great advancement in the development of topologically optimized designs also in the micro-scale specially with the advancements in the studying of prominent microstructures in nature. Also departing from biomimetic structures, further optimizations have followed for even additional optimization of properties and property compromises for certain applications.

Material development, seems to lag a bit behind, specially when it comes to metals and metal comprising materials, and it is still challenging to find materials that outperform in all relevant properties the wrought materials currently used, and some further challenges have arisen like the inherent anisotropy tendency of most AM methods for metals. Besides performance, metals for AM are orders of magnitude more expensive than their wrought construction counterparts, and the existing AM methods for metals are also very cost intensive. Currently the construction of large, high performant, AM metal components is an extreme technical and economical challenge. Most existing AM technologies present excessive residual stresses and even cracks when trying to achieve large complex geometries.

The present invention helps overcome many of the challenges related to metal AM both in the sense of performance and cost, while keeping the very advantageous flexibility of design. Thus the present invention is specially indicated for the manufacturing of high performant components with complex geometries, the manufacture of large components with complex geometries, and generally any component that can benefit from great flexibility of design at low cost and high performance. The present invention is specially well suited for metallic or at least metal comprising components, but other material types can also benefit from it.

STATE OF THE ART

There are a lot of inventions relating to the obtaining of complex geometries with metals, specially since the flourishing of AM technologies. In most of these technologies it is close to impossible to obtain isotropic, crack free, complex geometry components, specially when those components are large in size. Also, most of the existing AM methods are very cost intensive and not capable of producing components with large dimensions. Some other technologies, not considered AM, for the obtaining of complex geometries, present severe difficulties for the obtaining of components with internal features without cracks.

When it comes to the cooling of moulds, dies or sheets among others, it is not uncommon the use of a spray for cooling the external part of the die in aluminum injection, where the cooling is due to the evaporation of the sprayed liquid. Sometimes, the cooling is also combined with the application of lubricants in order to improve sheet formability, and with the application of anticorrosion agents to protect the die. On the other hand, in some applications, water is directly sprayed onto the manufactured piece or sheet. There are also some systems wherein water is circulated in channels or through holes between the die and the sheet after closing the die. During this process, the water is employed to cool the die, so that the die is colder when the sheet is placed on it, but in no case the water is maintained in the die to cool the sheet.

DESCRIPTION OF DRAWINGS

FIG. 1 also shows the extension tube, punctured orifice and polymeric sealing film.

DETAILED DESCRIPTION OF THE INVENTION

Figure 1:
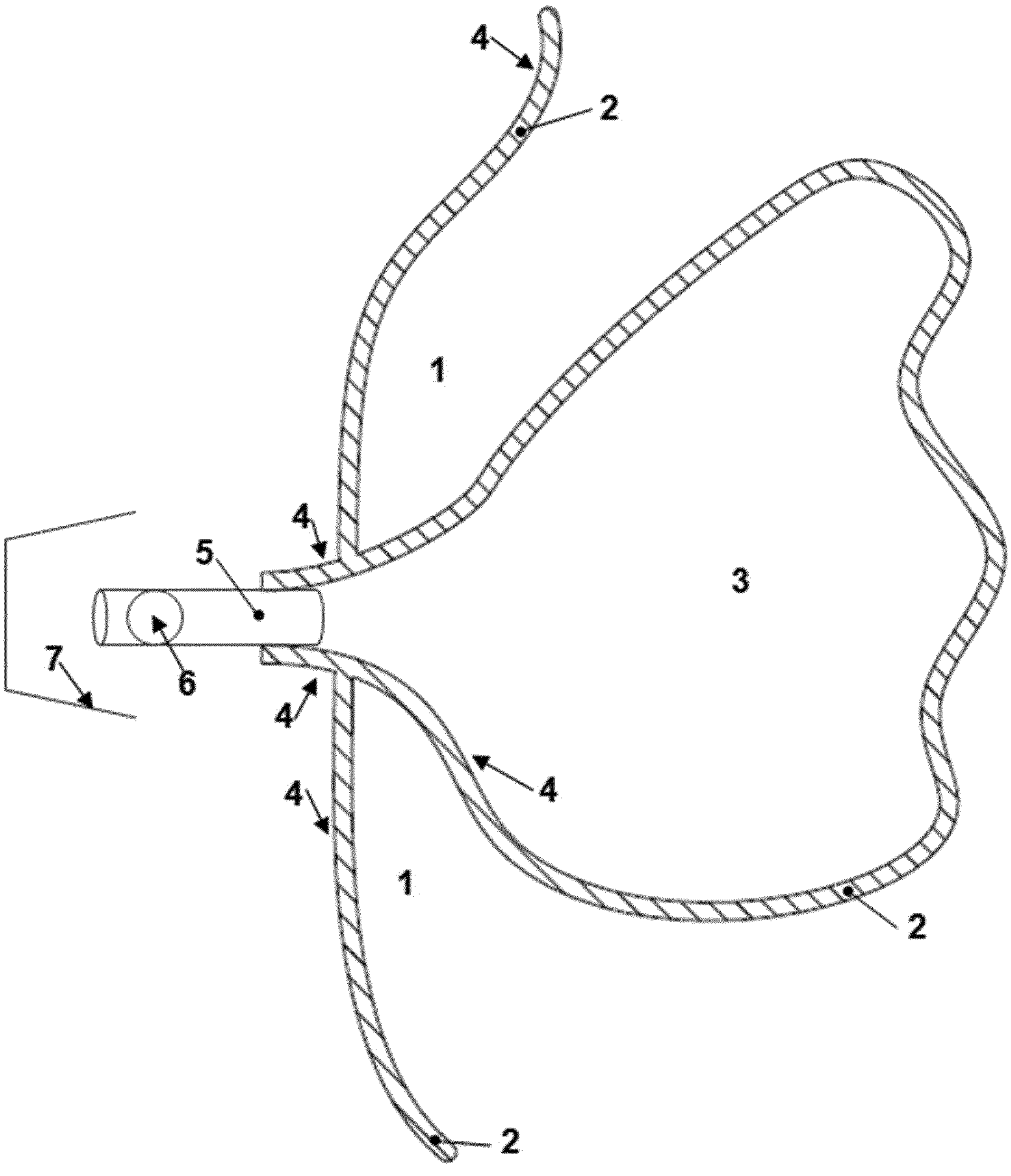
FIG. 1 shows an AM manufactured mould with void internal feature and an elastomeric coating used to manufacture a metal component.

Currently the layered manufacturing methods for metal components are anisotropic, quite slow and therefore costly and it is challenging to obtain all properties of the bulk material counterparts, although this is often compensated and exceeded with the flexibility of design. Also those methods tend to incorporate high levels of residual stresses due to the very localized energy application, which becomes very challenging when trying to manufacture large components. With smaller components of high complexity, the residual stress problem is tackled with the use of supporting structures which add cost and also have their limitations. On the other hand, plastic material AM can be quite faster and cost effective, especially when the mechanical performance of the manufactured component are not the main interest, and even more so when dimensional tolerances are not too tight. The AM technologies that can be categorized as direct energy deposition (DeD) are normally somewhat more cost effective, allow for the manufacture of larger components, but normally as a deposition to an underlying material, when constructing from scratch components of a certain thickness, the residual stresses become not-manageable and almost in all executions the spectra on materials where some resemblance to the wrought material performance can be attained, is very limited.

There are other methods to manufacture complex geometry components using metallic materials like:

- Metal injection moulding (MIM): which allows quite high dimensional accuracies, with reasonable costs, not extremely good performance but often enough acceptable. This method is constrained to very smart components.
- Hot isostatic pressing (HIP) of canned powders: which allows for the manufacturing of large components, but just for simple geometries with no internal features. The cost is reasonable but still high for most applications.
- Cold isostatic pressing (CIP) in rubber moulds: more than reasonable cost, but with poor dimensional accuracy, often problems with internal cracks for complex geometries and even more so in large components, and very difficult to attain high performance in many industrial interesting alloying systems. Internal features only possible for very simple geometries using special cores which significantly increase the cost.

The inventor has found that to obtain complex geometry components, which are high performing and need to be constructed with a material comprising a metal can be achieved with the following method:

a) Providing a mould,
b) Filling the mould with powder,
c) Sealing the mould,
d) Subjecting the mould to high pressure,
e) While keeping a high pressure level, raising the temperature of the mould,
f) While keeping a high enough temperature, releasing at least some of the to the mould applied pressure.

Some special implementations will be discussed as well. In some instances, method steps e) and f) can be avoided, provided a very precise selection is made of the powder mixture used to fill the mould in method step b) and the material used to manufacture the mould in method step a). In some special realizations, method step c) can be extremely simplified and reduced to the closing of the mould containing the powder.

Many additional method steps can be included in the method, some of which will be discussed in the proceeding paragraphs, but for the sake of limited extension of the present document, just a few will be mentioned.

The first thing that should be mentioned is that it is very surprising that the present method works and does so for complex geometry components (even including those with complex internal features), without cracks, with good dimensional accuracy and high levels of performance. Specially, when taking into account the limitations of the HIP, CIP and MIM methods.

Method step a) is very determinant for some applications. For some applications, it is very important the technology employed to manufacture the mould. In some applications the mould may be manufactured using any available technology, including any conventional technology to manufacture polymers. In an embodiment, the technology used to provide the mould is PIM (polymer injection moulding). In an embodiment, the technology used to provide the mould is an additive manufacturing technology (AM technology). In an embodiment, the technology used to provide the mould is casting, dipping, brushing or spraying of the mould material on a model fabricated through an AM technology. In an embodiment, the technology used to provide the mould provided in method step a) comprises an additive manufacturing technology. In an embodiment, the technology used to provide the mould is an additive manufacturing technology (AM technology). In an embodiment, the technology used to provide the mould comprises casting, dipping, brushing or spraying of the mould material on a model fabricated through an AM technology. In an embodiment, the technology used to provide the mould comprises casting of the mould material on a model fabricated through an AM technology. In an embodiment, the technology used to provide the mould comprises dipping of the mould material on a model fabricated through an AM technology. In an embodiment, the technology used to provide the mould comprises brushing of the mould material on a model fabricated through an AM technology. In an embodiment, the technology used to provide the mould comprises spraying of the mould material on a model fabricated through an AM technology. In another embodiment, the technology used to provide the mould is an additive manufacturing technology (AM technology). In another embodiment, the technology used to provide the mould is casting, dipping, brushing or spraying of the mould material on a model fabricated through an AM technology. In another embodiment, the technology used to provide the mould is casting of the mould material on a model fabricated through an AM technology. In another embodiment, the technology used to provide the mould is dipping of the mould material on a model fabricated through an AM technology. In another embodiment, the technology used to provide the mould is brushing of the mould material on a model fabricated through an AM technology. In another embodiment, the technology used to provide the mould is spraying of the mould material on a model fabricated through an AM technology. In another embodiment, the technology used to provide the mould is an AM technology based on material extrusion (FDM). In another embodiment, the technology used to provide the mould is an AM technology based on vat photo-polymerization (stereolithography [SLA], digital light processing [DLP], continuous digital light processing [CDLP], . . . ). In another embodiment, the technology used to provide the mould is SLA. In another embodiment, the technology used to provide the mould is DLP. In another embodiment, the technology used to provide the mould is CDLP. In another embodiment, the technology used to provide the mould is an AM technology based on material jetting (material jetting [MJ], drop on demand [DOD], . . . ). In another embodiment, the technology used to provide the mould is MJ. In another embodiment, the technology used to provide the mould is DOD. In another embodiment, the technology used to provide the mould is binder jetting [BJ]. In another embodiment, the technology used to provide the mould is an AM technology based on powder bed fusion (selective laser sintering [SLS], multi jet fusion [MJF], . . . ). In another embodiment, the technology used to provide the mould is SLS. In another embodiment, the technology used to provide the mould is MJF. In another embodiment, the technology used to provide the mould is chosen amongst vat photo-polymerization and Powder bed fusion technologies. In another embodiment, the technology used to provide the mould is like vat photo-polymerization but with a thermal curing. In another embodiment, the technology used to provide the mould is an AM technique based on a red-ox reaction. In another embodiment, the technology used to provide the mould is chosen amongst SLA, DLP, CDLP, MJ, MJF, BJ, DOD and SLS or similar concept technologies. In another embodiment, the technology used to provide the mould is chosen amongst any AM technology that does not require the usage of supports to manufacture complex geometries. In another embodiment, the technology used to provide the mould is chosen amongst MJ, BJ, MJF and SLS. In another embodiment, the technology used to provide the mould is chosen amongst MJ, MJF and SLS. In another embodiment, the technology used to provide the mould is chosen amongst MJF and SLS. In another embodiment, the technology used to provide the mould is chosen amongst any technology capable of printing a feature on the layer being built that is not in contact with the already built piece. In an embodiment, the AM system employed uses the same built material which has not been consolidated to provide support for floating features. In another embodiment, the AM system employed uses a particulate material which has not been fully consolidated to provide support for floating features. In another embodiment, the AM system employed uses a different material to the built material to provide support for floating features. In another embodiment, the AM system employed uses a different material to the built material to provide support for floating features and once the piece is built the support material can be eliminated without damaging the built piece. For some applications it does not matter which fabrication technology is used to provide the mould. For some applications, the material used to fabricate the mould is of great importance. In some applications the mould may be manufactured with a material which does not contain any polymer. In an embodiment, the material used to manufacture the mould does not contain any polymer. In another embodiment, the material used to manufacture the mould is a material with a relevant difference in the viscosity when measured at 20° C. and at 250° C. In another embodiment, the material used to manufacture the mould is a material having a different viscosity at 20° C. and at 250° C. In another embodiment, the material used to manufacture the mould is a material having a viscosity at 250° C. which is half or less times the viscosity at 20° C. In another embodiment, it is 10 times less. In another embodiment, it is 100 times less. In an embodiment, the mould provided in step a) is made of a material comprising a polymeric material. In an embodiment, the mould provided in step a) is made of a material consisting of a polymeric material. In an embodiment, the polymeric material is a polymer. In some embodiments, the polymeric material comprises at least two different polymers. Some applications benefit from the dimensional stability of thermosetting polymers. In an embodiment, the mould provided in method step a) is made of a thermosetting polymer. In another embodiment, the mould provided in method step a) is made of a phenolic resin (PF). In another embodiment, the mould provided in method step a) is made of an ureic resin (UF). In another embodiment, the mould provided in method step a) is made of a melamine resin (MF). In another embodiment, the mould provided in method step a) is made of a polyester resin (UP). In another embodiment, the mould provided in method step a) is made of an epoxy resin (EP). In another embodiment, the mould provided in method step a) is made of a thermosetting polymer and manufactured with an AM technology based on vat photo-polymerization. In another embodiment, the mould provided in method step a) comprises a thermosetting polymer. In another embodiment, the mould provided in method step a) comprises a phenolic resin (PF). In an embodiment, the mould provided in method step a) comprises an ureic resin (UF). In an embodiment, the mould provided in method step a) comprises a melamine resin (MF). In an embodiment, the mould provided in method step a) comprises a polyester resin (UP). In an embodiment, the mould provided in method step a) comprises an epoxy resin (EP). In an embodiment, the mould provided in method step a) comprises a thermosetting polymer and is manufactured with an AM technology based on vat photo-polymerization. Many applications can benefit from the re-shapeability of thermoplastic polymers. In an embodiment, the mould provided in method step a) is made of a thermoplastic polymer. In another embodiment, the mould provided in method step a) is made of a thermoplastic polymer and manufactured with an AM technology based on material jetting. In another embodiment, the mould provided in method step a) is made of a thermoplastic polymer and manufactured with an AM technology based on powder bed fusion. Some applications can benefit from the superior dimensional accuracy of amorphous polymers (both thermosetting and thermoplastic). Some applications can benefit from the superior dimensional accuracy combined with re-shapeability of amorphous thermoplastics. In an embodiment, the mould provided in method step a) is made of an amorphous polymer. In another embodiment, the mould provided in method step a) is made of an amorphous thermoplastic polymer. In another embodiment, the mould provided in method step a) is made of polystyrene (PS). In another embodiment, the mould provided in method step a) is made of a polystyrene copolymer. When not otherwise indicated in this document, the polymers encompass their copolymers. In another embodiment, the mould provided in method step a) is made of polymethyl methacrylate. In another embodiment, the mould provided in method step a) is made of a copolymer comprising acrylonitrile. In another embodiment, the mould provided in method step a) is made of a copolymer comprising styrene. In another embodiment, the mould provided in method step a) is made of acrylonitrile-butadiene-styrene (ABS). In another embodiment, the mould provided in method step a) is made of styrene-acrylonitrile (SAN). In another embodiment, the mould provided in method step a) is made of polycarbonate (PC). In another embodiment, the mould provided in method step a) is made of polyphenylene oxide (PPO). In another embodiment, the mould provided in method step a) is made of a vinylic polymer (vinyl and related polymers). In another embodiment, the mould provided in method step a) is made of polyvinyl chloride (PVC). In another embodiment, the mould provided in method step a) is made of an acrylic polymer. In another embodiment, the mould provided in method step a) is made of a polymethylmethacrylate (PMMA). In another embodiment, the mould provided in method step a) comprises a thermoplastic polymer. In an embodiment, the mould provided in method step a) comprises a thermoplastic polymer and is manufactured with an AM technology based on Material jetting. In an embodiment, the mould provided in method step a) comprises a thermoplastic polymer and is manufactured with an AM technology based on powder bed fusion. Some applications can benefit from the superior dimensional accuracy of amorphous polymers (both thermosetting and thermoplastic). Some applications can benefit from the superior dimensional accuracy combined with re-shapeability of amorphous thermoplastics. In an embodiment, the mould provided in method step a) comprises an amorphous polymer. In an embodiment, the mould provided in method step a) comprises an amorphous thermoplastic polymer. In an embodiment, the mould provided in method step a) comprises polystyrene (PS). In an embodiment, the mould provided in method step a) comprises a polystyrene copolymer. In an embodiment, the mould provided in method step a) comprises polycaprolactone (PCL). In an embodiment, the mould provided in method step a) comprises porous polycaprolactone (porous PCL). In an embodiment, the mould provided in method step a) comprises PVA (polyvinyl acetate). In an embodiment, the mould provided in method step a) comprises Kollidon VA64. In an embodiment, the mould provided in method step a) comprises Kollidon 12PF. When not otherwise indicated in this document, the polymers encompass their copolymers. In an embodiment, the mould provided in method step a) comprises a polymer comprising an aromatic group. In an embodiment, the mould provided in method step a) comprises polymethyl methacrylate. In an embodiment, the mould provided in method step a) comprises a copolymer comprising acrylonitrile. In an embodiment, the mould provided in method step a) comprises a copolymer comprising styrene. In an embodiment, the mould provided in method step a) comprises acrylonitrile-butadiene-styrene (ABS). In an embodiment, the mould provided in method step a) comprises styrene-acrylonitrile (SAN). In an embodiment, the mould provided in method step a) comprises polycarbonate (PC). In an embodiment, the mould provided in method step a) comprises polyphenylene oxide (PPO). In an embodiment, the mould provided in method step a) comprises a vinylic polymer (vinyl and related polymers). In an embodiment, the mould provided in method step a) comprises polyvinyl chloride (PVC). In an embodiment, the mould provided in method step a) comprises an acrylic polymer. In an embodiment, the mould provided in method step a) comprises a polymethylmethacrylate (PMMA). In an embodiment, the mould provided in method step a) comprises amorphous polypropylene (PP). In an embodiment, the mould provided in method step a) is made of a polycaprolactone (PCL). In an embodiment, the mould provided in method step a) is made of a porous polycaprolactone (porous PCL). In another embodiment, the mould provided in method step a) is made of a PVA (polyvinyl acetate). In another embodiment, the mould provided in method step a) is made of a Kollidon VA64. In another embodiment, the mould provided in method step a) is made of a Kollidon 12PF. Several applications can benefit from the superior elongation of some semi-crystalline thermoplastics. In another embodiment, the mould provided in method step a) is made of a semi-crystalline thermoplastic. In another embodiment, the mould provided in method step a) is made of polybutylene terephthalate (PBT). In another embodiment, the mould provided in method step a) is made of polyoxymethylene (POM). In another embodiment, the mould provided in method step a) is made of polyethylene terephthalate (PET). In another embodiment, the mould provided in method step a) comprises a semi-crystalline thermoplastic. In another embodiment, the mould provided in method step a) comprises polybutylene terephthalate (PBT). In an embodiment, the mould provided in method step a) comprises polyoxymethylene (POM). In an embodiment, the mould provided in method step a) comprises polyethylene terephthalate (PET). In an embodiment, the mould provided in method step a) comprises a thermoplastic polymer resin from the polyester family. Several applications can benefit from the more defined melting point of semi-crystalline thermoplastics. In an embodiment, the mould provided in method step a) is made of a polyolefin polymer. In an embodiment, the mould provided in method step a) is made of a polymer comprising ethylene monomers. In an embodiment, the mould provided in method step a) is made of polyethylene (PE). In another embodiment, the mould provided in method step a) is made of high density polyethylene (HDPE). In another embodiment, the mould provided in method step a) is made of low density polyethylene (LDPE). In another embodiment, the mould provided in method step a) is made of a polymer comprising propylene monomers. In another embodiment, the mould provided in method step a) is made of polypropylene (PP). In another embodiment, the mould provided in method step a) is made of a polymer comprising monomers linked by amide bonds. In another embodiment, the mould provided in method step a) is made of polyamide (PA). In another embodiment, the mould provided in method step a) is made of a PA11 family material. In another embodiment, the mould provided in method step a) is made of a PA12 family material. In another embodiment, the mould provided in method step a) is made of a PA12. In another embodiment, the mould provided in method step a) is made of a PA6. In another embodiment, the mould provided in method step a) is made of a PA6 family material. In an embodiment, the mould provided in method step a) comprises a polyolefin polymer. In an embodiment, the mould provided in method step a) comprises a polymer comprising ethylene monomers. In an embodiment, the mould provided in method step a) comprises polyethylene (PE). In an embodiment, the mould provided in method step a) comprises high density polyethylene (HDPE). In an embodiment, the mould provided in method step a) comprises low density polyethylene (LDPE). In an embodiment, the mould provided in method step a) comprises a polymer comprising propylene monomers. In an embodiment, the mould provided in method step a) comprises polypropylene (PP). In an embodiment, the mould provided in method step a) comprises a polymer comprising monomers linked by amide bonds. In an embodiment, the mould provided in method step a) comprises Polyamide (PA). In an embodiment, the mould provided in method step a) comprises aliphatic polyamide. In an embodiment, the mould provided in method step a) comprises nylon. In an embodiment, the mould provided in method step a) comprises a PA11 family material. In an embodiment, the mould provided in method step a) comprises a PA12 family material. In an embodiment, the mould provided in method step a) comprises PA12. In an embodiment, the mould provided in method step a) comprises PA6. In an embodiment, the mould provided in method step a) comprises a PA6 family material. In an embodiment, the mould provided in method step a) comprises a semi-crystalline thermoplastic polymer and is manufactured with an AM technology based on material jetting, binder jetting and/or Powder Bed Fusion. In an embodiment, the mould provided in method step a) comprises a semi-crystalline thermoplastic polymer and is manufactured with an AM technology based on SLS. In an embodiment, the mould provided in method step a) comprises a polyolefin based polymer and is manufactured with an AM technology based on SLS. In an embodiment, the mould provided in method step a) comprises a polyamide based polymer and is manufactured with an AM technology based on SLS. In an embodiment, the mould provided in method step a) comprises a PA12 type based polymer and is manufactured with an AM technology based on SLS. In an embodiment, the mould provided in method step a) comprises a PP based polymer and is manufactured with an AM technology based on SLS. In an embodiment, the mould provided in method step a) comprises a polyolefin based polymer and is manufactured with an AM technology based on MJF. In an embodiment, the mould provided in method step a) comprises a polyamide based polymer and is manufactured with an AM technology based on MJF. In an embodiment, the mould provided in method step a) comprises a PA12 type based polymer and is manufactured with an AM technology based on MJF. In an embodiment, the mould provided in method step a) comprises a PP based polymer and is manufactured with an AM technology based on MJF. In an embodiment, the mould provided in method step a) comprises a biodegradable polymer. In an embodiment, the mould provided in method step a) comprises an agro polymer (biomass from agro resources). In an embodiment, the mould provided in method step a) comprises a biodegradable polymer from microorganisms (like PHA, PHB, . . . ). In an embodiment, the mould provided in method step a) comprises a biodegradable polymer from biotechnology (like polylactic acid, polyactides, . . . ). In an embodiment, the mould provided in method step a) comprises a biodegradable polymer from petrochemical products (like polycaprolactones, PEA, aromatic polyesters, . . . ). In a set of embodiments, when in this paragraph (above and below this line) it is said that the mould in method step a) comprises a certain type of polymer, it is meant that a relevant amount of the polymeric material of the mould is made with the referred material. In a set of embodiments, when in this paragraph it is said that the mould in method step a) comprises a certain type of polymer, it is meant that a relevant amount of the polymeric material of the mould is made with the referred material or a related one. In an embodiment, a relevant amount means a 6% or more. In another embodiment, a relevant amount means a 26% or more. In another embodiment, a relevant amount means a 56% or more. In another embodiment, a relevant amount means a 76% or more. In another embodiment, a relevant amount means a 96% or more. In another embodiment, a relevant amount is the totality. In an embodiment, these percentages are by volume. In an alternative embodiment, these percentages are by weight. In some applications, besides the fact that the mould provided in method step a) comprises a semi-crystalline thermoplastic, it is important that the semi-crystalline thermoplastic is chosen to have the right melting temperature (Tm). Obviously, as happens in the rest of the document when not otherwise specified, the same applies for the configurations where the mentioned type of material (in this case a semi-crystalline thermoplastic) is the main material of the mould or the cases where the whole mould is built with such a material. In an embodiment, a semi-crystalline thermoplastic with a melting temperature below 290° C. is employed. In another embodiment, a semi-crystalline thermoplastic with a melting temperature below 190° C. is employed. In another embodiment, a semi-crystalline thermoplastic with a melting temperature below 168° C. is employed. In another embodiment, a semi-crystalline thermoplastic with a melting temperature below 144° C. is employed. In another embodiment, a semi-crystalline thermoplastic with a melting temperature below 119° C. is employed. In another embodiment, a semi-crystalline thermoplastic with a melting temperature below 98° C. is employed. For some applications, too low of a melting point is not practicable without risk of distortion. In an embodiment, a semi-crystalline thermoplastic with a melting temperature above 28° C. is employed. In another embodiment, a semi-crystalline thermoplastic with a melting temperature above 55° C. is employed. In another embodiment, a semi-crystalline thermoplastic with a melting temperature above 105° C. is employed. In another embodiment, a semi-crystalline thermoplastic with a melting temperature above 122° C. is employed. In another embodiment, a semi-crystalline thermoplastic with a melting temperature above 155° C. is employed. In another embodiment, a semi-crystalline thermoplastic with a melting temperature above 175° C. is employed. In an embodiment, the melting temperature is measured according to ISO 11357-1/-3:2016. In an embodiment, the melting temperature is measured applying a heating rate of 20° C./min. In an embodiment, the melting temperature of any polymer in the present document is measured according to ISO 11357-1/-3:2016. In an embodiment, the melting temperature of any polymer in the present document is measured applying a heating rate of 20° C./min. In an embodiment, the mould provided in method step a) is made of non-polar polymer. In some applications, besides the fact that the mould provided in method step a) comprises a semi-crystalline thermoplastic, it is important that the semi-crystalline thermoplastic is chosen to have the right crystallinity level. In an embodiment, a semi-crystalline thermoplastic with a crystallinity above 12% is employed. In another embodiment, a semi-crystalline thermoplastic with a crystallinity above 32% is employed. In another embodiment, a semi-crystalline thermoplastic with a crystallinity above 52% is employed. In another embodiment, a semi-crystalline thermoplastic with a crystallinity above 76% is employed. In another embodiment, a semi-crystalline thermoplastic with a crystallinity above 82% is employed. In another embodiment, a semi-crystalline thermoplastic with a crystallinity above 96% is employed. In an embodiment, the above disclosed values of crystallinity are measured using X-ray diffraction (XRD) technique. In an alternative embodiment, the above disclosed values of crystallinity are obtained by differential scanning calorimetry (DSC). In an embodiment, the crystallinity is measured applying a heating rate of 10° C./min. In some applications, besides the fact that the mould provided in method step a) comprises a polymer, it is important that the polymer is chosen to have the right molecular weight. In an embodiment, the material of the mould provided in method step a) comprises polymeric material and a relevant part of it has a large enough molecular weight. In an embodiment, a relevant part is 16% or more. In another embodiment, a relevant part is 36% or more. In another embodiment, a relevant part is 56% or more. In another embodiment, a relevant part is 16% or more. In another embodiment, a relevant part is 76% or more. In another embodiment, a relevant part is 86% or more. In another embodiment, a relevant part is 96% or more. In another embodiment, a relevant part is the totality. In an embodiment, these percentages are by volume. In an alternative embodiment, these percentages are by weight. In an embodiment, a large enough molecular weight is 8500 or more. In another embodiment, a large enough molecular weight is 12000 or more. In another embodiment, a large enough molecular weight is 45000 or more. In another embodiment, a large enough molecular weight is 65000 or more. In another embodiment, a large enough molecular weight is 85000 or more. In another embodiment, a large enough molecular weight is 105000 or more. In another embodiment, a large enough molecular weight is 285000 or more. Some applications, contrary to what would result intuitively do not benefit from a large molecular weight. In a set of embodiments, the molecular weight for the majority of the polymeric phase of the material of the mould provided in method step a) is kept at low enough molecular weights. In an embodiment, the majority refers to 55% or more. In another embodiment, the majority refers to 66% or more. In another embodiment, the majority refers to 78% or more. In another embodiment, the majority refers to 86% or more. In another embodiment, the majority refers to 96% or more. In another embodiment, the majority refers to the totality. In an embodiment, these percentages are by volume. In an alternative embodiment, these percentages are by weight. In an embodiment, a low enough molecular weight is 4900000 or less. In another embodiment, a low enough molecular weight is 900000 or less. In another embodiment, a low enough molecular weight is 190000 or less. In another embodiment, a low enough molecular weight is 90000 or less. In another embodiment, a low enough molecular weight is 74000 or less. In some applications, besides the fact that the mould provided in method step a) comprises a polymer, it is important that the polymer is chosen to have the right heat deflection temperature (HDT). In an embodiment, the material of the mould provided in method step a) comprises polymeric material and a relevant part (in the terms described above) of it has a low enough 1.82 MPa HDT (heat deflection temperature measured with a load of 1.82 MPa). In an embodiment, low enough means 380° C. or less. In another embodiment, low enough means 280° C. or less. In another embodiment, low enough means 190° C. or less. In another embodiment, low enough means 148° C. or less. In another embodiment, low enough means 118° C. or less. In another embodiment, low enough means 98° C. or less. In another embodiment, low enough means 58° C. or less. In another embodiment, the material of the mould provided in method step a) comprises polymeric material and a relevant part (in the terms described above) of it has a low enough 0.455 MPa HDT (heat deflection temperature measured with a load of 0.455 MPa). In an embodiment, low enough means 440° C. or less. In another embodiment, low enough means 340° C. or less. In another embodiment, low enough means 240° C. or less. In another embodiment, low enough means 190° C. or less. In another embodiment, low enough means 159° C. or less. In another embodiment, low enough means 119° C. or less. In another embodiment, low enough means 98° C. or less. For many applications, an excessively low HDT is not appropriate. In an embodiment, the material of the mould provided in method step a) comprises polymeric material and a relevant part (in the terms described above) of it has a high enough 1.82 MPa HDT. In an embodiment, high enough means 32° C. or more. In another embodiment, high enough means 52° C. or more. In another embodiment, high enough means 72° C. or more. In another embodiment, high enough means 106° C. or more. In another embodiment, high enough means 132° C. or more. In another embodiment, high enough means 152° C. or more. In another embodiment, high enough means 204° C. or more. In another embodiment, high enough means 250° C. or more. In an embodiment, the material of the mould provided in method step a) comprises polymeric material and a relevant part (in the terms described above) of it has a high enough (in the terms described above) 0.455 MPa HDT (heat deflection temperature measured with a load of 0.455 MPa). In an embodiment, HDT is determined according to ISO 75-1:2013 standard. In an alternative embodiment, the values of HDT are determined according to ASTM D648-07 standard test method. In an embodiment, the HDT is determined with a heating rate of 50° C./h. In another alternative embodiment, the HDT reported for the closest material in the UL IDES Prospector Plastic Database at 29 Jan. 2018 is used. Like with all other aspects of this invention, and when not otherwise indicated, some applications exist where the HDT of the material used to fabricate the provided mould in method step a) does not matter. In some applications, besides the fact that the mould provided in method step a) comprises a polymer, it is important that the polymer is chosen to have the right Vicat softening point. In an embodiment, the Vicat softening point is 314° C. or less. In another embodiment, the Vicat softening point is 248° C. or less. In another embodiment, the Vicat softening point is 166° C. or less. In another embodiment, the Vicat softening point is 123° C. or less. In another embodiment, the Vicat softening point is 106° C. or less. In another embodiment, the Vicat softening point is 74° C. or less. In another embodiment, the Vicat softening point is 56° C. or less. In an embodiment, the Vicat softening point is 36° C. or more. In another embodiment, the Vicat softening point is 56° C. or more. In another embodiment, the Vicat softening point is 76° C. or more. In another embodiment, the Vicat softening point is 86° C. or more. In another embodiment, the Vicat softening point is 106° C. or more. In another embodiment, the Vicat softening point is 126° C. or more. In another embodiment, the Vicat softening point is 156° C. or more. In another embodiment, the Vicat softening point is 216° C. or more. In an embodiment, the Vicat softening point is determined according to ISO 306 standard. In an embodiment, the Vicat softening point is determined with a heating rate of 50° C./h. In an embodiment, the Vicat softening point is determined with a load of 50 N. In an embodiment, the Vicat softening point is determined according to ASTM D1525 standard. In an alternative embodiment, the Vicat softening point is determined by the B50 method. In another alternative embodiment, the Vicat softening point is determined by the A120 method and 18° C. are subtracted from the value measured. In another alternative embodiment, the Vicat softening point is determined in agreement with ISO 10350-1 standard using method B50. In another alternative embodiment, the Vicat hardness reported for the closest material in the UL IDES prospector plastic database at 29 Jan. 2018 is used. In some applications, besides the fact that the mould provided in method step a) comprises a polymer, it is important that the polymer is chosen to have the right classification in the Ensinger manual for engineering plastics. In an embodiment, the latest version available 21 Jan. 2018 is used. In another embodiment, the version 10/12 E9911075A011 GB is used. In an embodiment, a polymer with the classification of high-performance plastic is used. In an embodiment, a polymer with the classification of Engineering plastic is used. In an embodiment, a polymer with the classification of Standard plastic is used. It has been found for some applications that it is especially advantageous to use for at least portions of the mould, a material with an especially low softening point. In an embodiment, a material with a melting temperature (Tm) below 190° C. is used. In another embodiment, a material with a Tm below 130° C. is used. In another embodiment, a material with a melting temperature below 98° C. is used. In another embodiment, a material with a Tm below 79° C. is used. In another embodiment, a material with a Tm below 69° C. is used. In another embodiment, a material with a Tm below 49° C. is used. In some applications a mould comprising a material with a minimum melting temperature (Tm) is preferred. In an embodiment, a material with a Tm above −20° C. is used. In another embodiment, a material with a Tm above 28° C. is used. In another embodiment, a material with a Tm above 42° C. is used. In another embodiment, a material with a Tm above 52° C. is used. In another embodiment, a material with a Tm above 62° C. is used. In an embodiment, the material is a polymer. In an embodiment, the above disclosed values of Tm are measured according to ISO 11357-1/-3:2016. In an embodiment, the above disclosed values of Tm are measured applying a heating rate of 20° C./min. In an embodiment, a material with a glass transition temperature (Tg) under 169° C. is used. In an embodiment, a material with a glass transition temperature (Tg) under 109° C. is used. In another embodiment, a material with a glass transition temperature (Tg) under 69° C. is used. In another embodiment, a material with a Tg under 49° C. is used. In another embodiment, a material with a Tg under 9° C. is used. In another embodiment, a material with a Tg under −11° C. In another embodiment, a material with a Tg under −32° C. is used. In another embodiment, a material with a Tg under −51° C. is used. In some applications a mould comprising a material with a minimum Tg is preferred. In an embodiment, a material with a Tg above −260° C. is used. In another embodiment, a material with a Tg above −230° C. is used. In another embodiment, a material with a Tg above −190° C. is used. In another embodiment, a material with a Tg above −90° C. In an embodiment, the glass transition temperature (Tg) of any polymer in the present document is measured by differential scanning calorimetry (DSC) according to ASTM D3418-12. In an embodiment, the mould provided in step a) comprises a material with a low Tg as described in the preceding paragraph and in some stage after method step c) (after sealing the filled mould) and before method step d) the sealed and filled mould is undercooled. In an embodiment, the material is a polymer. In an embodiment, the undercooling is made by holding the mould more than 10 minutes at a low temperature. In another embodiment, the undercooling is made by holding the mould more than 30 minutes at a low temperature. In another embodiment, the undercooling is made by holding the mould more than 2 hours at a low temperature. In another embodiment, the undercooling is made by holding the mould more than 10 hours at a low temperature. In an embodiment, a low temperature for the undercooling is 19° C. or less. In another embodiment, a low temperature for the undercooling is 9° C. or less. In another embodiment, a low temperature for the undercooling is −1° C. or less. In another embodiment, a low temperature for the undercooling is −11° C. or less. In another embodiment, a low temperature for the undercooling is −20° C. or less. In some applications it is more convenient to adjust the undercooling low temperature to the softening point of the material of the mould with low softening point. In an embodiment, a low temperature for the undercooling is Tg+60° C. or less. In another embodiment, a low temperature for the undercooling is Tg+50° C. or less. In another embodiment, a low temperature for the undercooling is Tg+40° C. or less. In another embodiment, a low temperature for the undercooling is Tg+20° C. or less. In another embodiment, a low temperature for the undercooling is Tg+10° C. or less. It has also been found that in some applications an excessive undercooling is also negative leading to different shortcomings in different applications (as an example, breakage of fine details of the mould during method steps d), e) and/or f). In an embodiment, the undercooling should be limited to a temperature of −273° C. maximum, In another embodiment, the undercooling should be limited to a temperature of −140° C. maximum, In another embodiment, the undercooling should be limited to a temperature of −90° C. maximum. In another embodiment, the undercooling should be limited to a temperature of −50° C. maximum. In another embodiment, the undercooling should be limited to a temperature of Tg−50° C. maximum. In another embodiment, the undercooling should be limited to a temperature of Tg−20° C. maximum. In another embodiment, the undercooling should be limited to a temperature of Tg−10° C. maximum. In another embodiment, the undercooling should be limited to a temperature of Tg maximum. In another embodiment, the undercooling should be limited to a temperature of Tg+20° C. maximum. For some applications, what is more relevant is the maximum relevant temperature achieved in method step e). In an embodiment, the maximum relevant temperature achieved in method step e) is 190° C. or less. In another embodiment, the maximum relevant temperature achieved in method step e) is 140° C. or less. In another embodiment, the maximum relevant temperature achieved in method step e) is 120° C. or less. In another embodiment, the maximum relevant temperature achieved in method step e) is 90° C. or less. In an embodiment, the maximum relevant temperature achieved in method step e) is Tm+50° C. or less. In another embodiment, the maximum relevant temperature achieved in method step e) is Tm+30° C. or less. In another embodiment, the maximum relevant temperature achieved in method step e) is Tm+10° C. In another embodiment, the maximum relevant temperature achieved in method step e) is Tm+10° C. or less. In another embodiment, the maximum relevant temperature achieved in method step e) is Tm or less. In another embodiment, the maximum relevant temperature achieved in method step e) is Tm−20° C. or less. For some applications, what is more relevant is the maximum relevant temperature achieved in method step f). In an embodiment, the maximum relevant temperature achieved in method step f) is 190° C. or less. In another embodiment, the maximum relevant temperature achieved in method step f) is 140° C. or less. In another embodiment, the maximum relevant temperature achieved in method step f) is 120° C. or less. In another embodiment, the maximum relevant temperature achieved in method step f) is 90° C. or less. In an embodiment, the maximum relevant temperature achieved in method step f) is Tm+50° C. or less. In another embodiment, the maximum relevant temperature achieved in method step f) is Tm+30° C. or less. In another embodiment, the maximum relevant temperature achieved in method step f), is Tm+10° C. In another embodiment, the maximum relevant temperature achieved in method step f) is Tm+10° C. or less. In another embodiment, the maximum relevant temperature achieved in method step f) is Tm or less. In an embodiment, the maximum relevant temperature achieved in method step f) is Tm−20° C. or less. For some applications, what is more relevant is the maximum relevant temperature achieved in method step e) and/or f). In an embodiment, the maximum relevant temperature achieved in method step e) and/or f) is 190° C. or less. In another embodiment, the maximum relevant temperature achieved in method step e) and/or f) is 140° C. or less. In another embodiment, the maximum relevant temperature achieved in method step e) and/or f) is 120° C. or less. In another embodiment, the maximum relevant temperature achieved in method step e) and/or f) is 90° C. or less. In an embodiment, the maximum relevant temperature achieved in method step e) and/or f) is Tm+50° C. or less. In another embodiment, the maximum relevant temperature achieved in method step e) and/or f) is Tm+30° C. or less. In another embodiment, the maximum relevant temperature achieved in method step e) and/or f), is Tm+10° C. In another embodiment, the maximum relevant temperature achieved in method step e) and/or f) is Tm+10° C. or less. In another embodiment, the maximum relevant temperature achieved in method step e) and/or f) is Tm or less. In another embodiment, the maximum relevant temperature achieved in method step/s e) and/or f), is Tm−20° C. or less. In an embodiment, Tm is the melting temperature of the material comprised in the mould. In an alternative embodiment, Tm is the melting temperature of a relevant part of the mould (a relevant part in the terms described elsewhere in the document). In an alternative embodiment, Tm is the melting temperature of the mould. For some applications also the minimum value for the maximum relevant temperature achieved in method step should be controlled. In some applications it has been surprisingly found that when an undercooling is used, then the maximum relevant temperature applied in method steps e) and/or f), should be somewhat lower. In an embodiment, when undercooling is employed between method steps e) and/or f), then the values for maximum relevant temperature aforementioned in this paragraph should be reduced in 10° C. In another embodiment, the values for maximum relevant temperature aforementioned in this paragraph should be reduced in 18° C. In another embodiment, the values for maximum relevant temperature aforementioned in this paragraph should be reduced in 8° C. In an embodiment, a relevant temperature refers to a temperature which is maintained more than 1 second. In another embodiment, a relevant temperature refers to a temperature which is maintained more than 20 seconds. In another embodiment, a relevant temperature refers to a temperature which is maintained more than 2 minutes. In another embodiment, a relevant temperature refers to a temperature which is maintained more than 11 minutes. In another embodiment, a relevant temperature refers to a temperature which is maintained more than 1 h and 10 minutes. In some embodiments the maximum relevant temperature applied in step e) is the maximum temperature applied in step e). In some embodiments the maximum relevant temperature applied in step f) is the maximum temperature applied in step f). In some embodiments, the above disclosed about undercooling is particularly interesting when the material used to manufacture the mould comprises PCL. In another embodiment, the above disclosed about undercooling is particularly interesting when the material used to manufacture the mould comprises porous PCL. In another embodiment, the above disclosed about undercooling is particularly interesting when the material used to manufacture the mould comprises PVA. In another embodiment, the above disclosed about undercooling is particularly interesting when the material used to manufacture the mould comprises Kollidon VA64 and even in some embodiments, the above disclosed about undercooling is particularly interesting when the material used to manufacture the mould comprises Kollidon 12PF.

Figure 3:
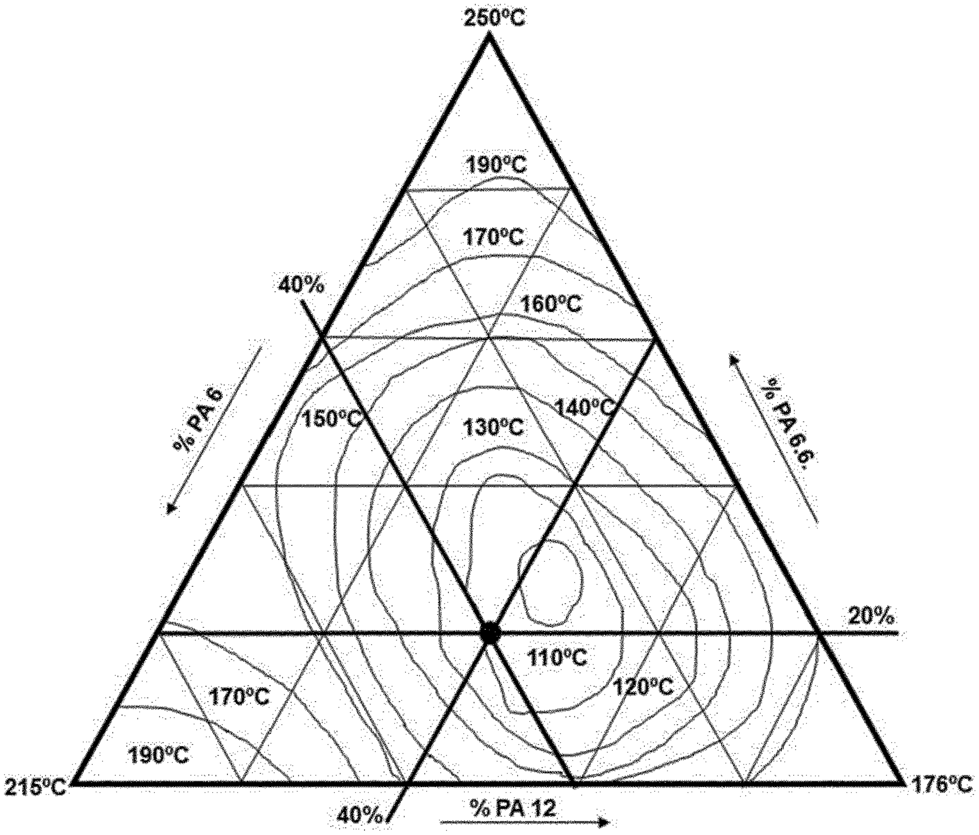
FIG. 3 shows melting temperature of a ternary copolymer.

It has been seen that in the case of using SLS technology for the obtaining of the molds it is interesting to use a novel polymeric powder based on ternary or superior order polyamides with low melting point. This could also be employed in other additive manufacturing methods based on polymer powder. In an embodiment, a powder with a ternary polyamide copolymer is employed. In an embodiment, a powder with a quaternary polyamide copolymer is employed. In an embodiment, a powder with a superior order polyamide copolymer is employed. In an embodiment, a ternary polyamide copolymer of PA12/PA66/PA6 with a melting temperature below 169° C. is employed. In an embodiment, a ternary polyamide copolymer of PA12/PA66/PA6 with a melting temperature below 159° C. is employed. In an embodiment, a ternary polyamide copolymer of PA12/PA66/PA6 with a melting temperature below 149° C. is employed. In an embodiment, a ternary polyamide copolymer of PA12/PA66/PA6 with a melting temperature below 144° C. is employed. In an embodiment, a ternary polyamide copolymer of PA12/PA66/PA6 with a melting temperature below 139° C. is employed. In an embodiment, a ternary polyamide copolymer of PA12/PA66/PA6 with a melting temperature below 129° C. is employed. In an embodiment, a ternary polyamide copolymer of PA12/PA66/PA6 with a melting temperature below 109° C. is employed. In an embodiment, a ternary polyamide copolymer of PA12/PA66/PA6 with a melting temperature above 82° C. is employed. In an embodiment, a ternary polyamide copolymer of PA12/PA66/PA6 with a melting temperature above 92° C. is employed. In an embodiment, a ternary polyamide copolymer of PA12/PA66/PA6 with a melting temperature above 102° C. is employed. In an embodiment, a ternary polyamide copolymer of PA12/PA66/PA6 with a melting temperature above 122° C. is employed. In FIG.-3 one can see how to determine the melting temperature of the PA12/PA66/PA6 ternary copolymer. In an embodiment, the polyamide copolymer has a 42% or more PA12. In an embodiment, the polyamide copolymer has a 52% or more PA12. In an embodiment, the polyamide copolymer has a 62% or more PA12. In an embodiment, the polyamide copolymer has a 66% or more PA12. In an embodiment the copolymer polyamide comprises a dark color pigment. In an embodiment the copolymer polyamide comprises a black color pigment. In an embodiment, the polyamide copolymer powder is obtained directly through precipitation. In an embodiment, the polyamide copolymer powder has a D50 of 12 microns or more. In an embodiment, the polyamide copolymer powder has a D50 of 22 microns or more. In an embodiment, the polyamide copolymer powder has a D50 of 32 microns or more. In an embodiment, the polyamide copolymer powder has a D50 of 52 microns or more. In an embodiment, the polyamide copolymer powder has a D50 of 118 microns or less. In an embodiment, the polyamide copolymer powder has a D50 of 98 microns or less. In an embodiment, the polyamide copolymer powder has a D50 of 88 microns or less. In an embodiment, the polyamide copolymer powder has a D50 of 68 microns or less.

For some applications it is interesting to have reinforcement in at least some of the polymeric material comprised in the mould provided in method step a). In an embodiment, at least one relevant part (as described above) of the polymeric material comprised in the mould provided in method step a) comprises a sufficient amount of reinforcement. In an embodiment, a sufficient amount of reinforcement is a 2.2% or more. In another embodiment, a sufficient amount of reinforcement is a 6% or more. In another embodiment, a sufficient amount of reinforcement is a 12% or more. In another embodiment, a sufficient amount of reinforcement is a 22% or more. In another embodiment, a sufficient amount of reinforcement is a 42% or more. In another embodiment, a sufficient amount of reinforcement is a 52% or more. In another embodiment, a sufficient amount of reinforcement is a 62% or more. In an embodiment, a sufficient amount of reinforcement is a 78% or less. In another embodiment, a sufficient amount of reinforcement is a 68% or less. In another embodiment, a sufficient amount of reinforcement is a 48% or less. In another embodiment, a sufficient amount of reinforcement is a 28% or less. In another embodiment, a sufficient amount of reinforcement is a 18% or less. In an embodiment, these percentages are by volume. In an alternative embodiment, these percentages are by weight. In an embodiment, the reinforcement comprises inorganic fibres. In an embodiment, the reinforcement (or one of the reinforcements when more than one is employed) present in a sufficient amount are inorganic fibres. In an embodiment, the reinforcement comprises glass fibres. In an embodiment, the reinforcement (or one of the reinforcements when more than one is employed) present in a sufficient amount are glass fibres. In an embodiment, the reinforcement comprises carbon fibres. In an embodiment, the reinforcement (or one of the reinforcements when more than one is employed) present in a sufficient amount are carbon fibres. In an embodiment, the reinforcement comprises basalt fibres. In an embodiment, the reinforcement (or one of the reinforcements when more than one is employed) present in a sufficient amount are basalt fibres. In an embodiment, the reinforcement comprises asbestos fibres. In an embodiment, the reinforcement (or one of the reinforcements when more than one is employed) present in a sufficient amount are asbestos fibres. In an embodiment, the reinforcement comprises ceramic fibres. In an embodiment, the reinforcement (or one of the reinforcements when more than one is employed) present in a sufficient amount are ceramic fibres. In an embodiment, the ceramic fibres are at least 50% oxides. In an embodiment, the ceramic fibres are at least 50% carbides. In an embodiment, the ceramic fibres are at least 50% borides. In an embodiment, the ceramic fibres are at least 50% nitrides. In an embodiment, these percentages are by volume. In an alternative embodiment, these percentages are by weight. In an embodiment, the ceramic fibers comprise silicon carbide. In an embodiment, the reinforcement comprises inorganic fillers. In an embodiment, the reinforcement (or one of the reinforcements when more than one is employed) present in a sufficient amount are inorganic fillers. In an embodiment, the reinforcement comprises mineral fillers. In an embodiment, the reinforcement (or one of the reinforcements when more than one is employed) present in a sufficient amount are mineral fillers. In an embodiment, the reinforcement comprises organic fibres. In an embodiment, the reinforcement (or one of the reinforcements when more than one is employed) present in a sufficient amount are organic fibres. In an embodiment, the reinforcement comprises natural fibres. In an embodiment, the reinforcement (or one of the reinforcements when more than one is employed) present in a sufficient amount are natural fibres. For some applications it is very detrimental to have reinforcement in any relevant part of the polymeric material comprised in the mould provided in method step a). In an embodiment, there is no reinforcement in any relevant part (as described above) of the polymeric material comprised in the mould provided in method step a). In an embodiment, all reinforcements are kept below 48%. In another embodiment, all reinforcements are kept below 28%. In another embodiment, all reinforcements are kept below 18%. In another embodiment, all reinforcements are kept below 8%. In another embodiment, all reinforcements are kept below 2%. In another embodiment, all reinforcements are kept at 0%. In an embodiment, these percentages are by volume. In an alternative embodiment, these percentages are by weight. In some applications, besides the fact that the mould provided in method step a) comprises a polymer, it is important that the polymer is chosen to have the right tensile strength at room temperature (23° C.) when characterized at the proper strain rate. In an embodiment, the mould provided in method step a) comprises a polymer with the right tensile strength at room temperature (23° C.) when characterized at the proper strain rate. In an embodiment, the right tensile strength is 2 MPa or more. In another embodiment, the right tensile strength is 6 MPa or more. In another embodiment, the right tensile strength is 12 MPa or more. In another embodiment, the right tensile strength is 26 MPa or more. In another embodiment, the right tensile strength is 52 MPa or more. In another embodiment, the right tensile strength is 82 MPa or more. In some applications, tensile strength should not be too high. In an embodiment, the right tensile strength is 288 MPa or less. In another embodiment, the right tensile strength is 248 MPa or less. In another embodiment, the right tensile strength is 188 MPa or less. In another embodiment, the right tensile strength is 148 MPa or less. In an embodiment, the proper strain rate is 2500 $s^{-1}$. In another embodiment, the proper strain rate is 500 $s^{-1}$. In another embodiment, the proper strain rate is 50 $s^{-1}$. In another embodiment, the proper strain rate is 1.0 $s^{-1}$. In another embodiment, the proper strain rate is $1\cdot10^{-2}$ $s^{-1}$. In another embodiment, the proper strain rate is $1\cdot10^{-3}$ $s^{-1}$. In some applications, with special mention to several of the applications where method steps e) and f) are skipped or greatly simplified, very surprisingly benefit from materials with intentional poor properties. In an embodiment, the right tensile strength is 99 MPa or less. In another embodiment, the right tensile strength is 69 MPa or less. In another embodiment, the right tensile strength is 49 MPa or less. In another embodiment, the right tensile strength is 29 MPa or less. In another embodiment, the right tensile strength is 19 MPa or less. In another embodiment, the right tensile strength is 9 MPa or less. In an embodiment, the above disclosed values of tensile strength are measured according to ASTM D638-14. In an alternative embodiment, the above disclosed values of tensile strength are measured according to ASTM D3039/D3039M-17. In some embodiments, the use of ASTM D3039/D3039M-17 is preferred for highly oriented and/or high tensile modulus reinforced polymers and ASTM D638-14 is preferred for unreinforced or randomly oriented or discontinuous polymers comprising low volume of reinforcements or having low tensile modulus. In an embodiment, room temperature is 23° C.

In some applications the tensile modulus of the polymer has an influence. In an embodiment, the mould provided in method step a) comprises a polymer with the right tensile modulus at room temperature (23° C.) when characterized at the proper strain rate (proper strain rate as described above). In an embodiment, the right tensile modulus is 105 MPa or more. In another embodiment, the right tensile modulus is 505 MPa or more. In another embodiment, the right tensile modulus is 1005 MPa or more. In another embodiment, the right tensile modulus is 1200 MPa or more. In another embodiment, the right tensile modulus is 1850 MPa or more. In another embodiment, the right tensile modulus is 2505 MPa or more. In some applications the tensile modulus should not be excessive. In an embodiment, the right tensile modulus is 5900 MPa or less. In another embodiment, the right tensile modulus is 3900 MPa or less. In another embodiment, the right tensile modulus is 2900 MPa or less. In another embodiment, the right tensile modulus is 2400 MPa or less. In another embodiment, the right tensile modulus is 1900 MPa or less. In another embodiment, the right tensile modulus is 900 MPa or less. In an embodiment, the above disclosed values of tensile modulus are measured according to ASTM D638-14. In an alternative embodiment, the above disclosed values of tensile modulus are measured according to ASTM D3039/D3039M-17. In some embodiments, the use of ASTM D3039/D3039M-17 is preferred for highly oriented and/or high tensile modulus reinforced polymers and ASTM D638-14 is preferred for unreinforced or randomly oriented or discontinuous polymers comprising low volume of reinforcements or having low tensile modulus. In an embodiment, room temperature is 23° C. In some applications, not requiring excessive dimensional accuracy in the internal features or not even having any, it might be interesting to have a low flexural modulus. In an embodiment, the mould provided in method step a) comprises a polymer with the right flexural modulus at room temperature (23° C.) when characterized at the proper strain rate (proper strain rate as described above). In an embodiment, the right flexural modulus is 3900 MPa or less In another embodiment, the right flexural modulus is 1900 MPa or less. In another embodiment, the right flexural modulus is 1400 MPa or less. In another embodiment, the right flexural modulus is 990 MPa or less. In another embodiment, the right flexural modulus is 490 MPa or less. In some applications, the flexural modulus should not be too low. In another embodiment, the right flexural modulus is 120 MPa or more. In another embodiment, the right flexural modulus is 320 MPa or more. In another embodiment, the right flexural modulus is 520 MPa or more. In an embodiment, the above disclosed values of flexural modulus are measured according to ASTM D790-17. In an embodiment, room temperature is 23° C. The inventor has found with great interest, that in some applications what has a significant impact in the quality of the manufactured component specially in terms of internal microcracks is the strain rate susceptibility of the material employed for the mould provided in method step a). In an embodiment, the mould provided in method step a) comprises a material which presents at least a 6% drop in the compressive true strength when measuring with a low strain rate in comparison to when measuring with a high strain rate. In another embodiment, the drop in compressive true strength is 16% or more. In another embodiment, the drop in compressive true strength is 26% or more. In another embodiment, the drop in compressive true strength is 56% or more. In another embodiment, the drop in compressive true strength is 76% or more. In an embodiment, the drop in compressive true strength is at least 2 MPa. In another embodiment, the drop in compressive true strength is at least 6 MPa. In another embodiment, the drop in compressive true strength is at least 12 MPa. In another embodiment, the drop in compressive true strength is at least 22 MPa. In another embodiment, the drop in compressive true strength is at least 52 MPa. In some applications, specially when not excessive accuracy is required in the internal features, it is interesting to employ materials with very little sensitivity to strain rate for the material in method step a). In an embodiment, the mould provided in method step a) comprises a material which presents less than an 89% drop in the compressive true strength when measuring with a low strain rate in comparison to when measuring with a high strain rate. In another embodiment, the drop is 48% or less. In another embodiment, the drop is 18% or less. In another embodiment, the drop is 9% or less. In an embodiment, compressive true strength refers to the compressive strength. In an embodiment, the compressive true strength at low and high strain rate is measured according to ASTM D695-15. In an alternative embodiment, the compressive true strength at low and high strain rate is measured according to ASTM D3410/D3410M-16. In an embodiment, the values of compressive true strength are at room temperature (23° C.). In some applications, it is the tensile modulus strain sensitivity that matters. In an embodiment, the mould provided in method step a) comprises a material which presents at least a 6% drop in the tensile modulus when measuring with a low strain rate in comparison to when measuring with a high strain rate. In another embodiment, the drop is a 12% or more. In another embodiment, the drop is a 16% or more. In another embodiment, the drop is a 22% or more. In another embodiment, the drop is a 42% or more. For applications, where the internal features accuracy is of great importance, it is often important to have a material for the mould provided in method step a) with rather high insensitivity to strain rate. In an embodiment, the mould provided in method step a) comprises a material which presents less than a 72% drop in the tensile modulus when measuring with a low strain rate in comparison to when measuring with a high strain rate. In another embodiment, the drop is a 49% or less. In another embodiment, the drop is a 19% or less. In another embodiment, the drop is a 9% or less. In an embodiment, the tensile modulus at low and high strain rate is measured according to ASTM D638-14. In an alternative embodiment, the tensile modulus at low and high strain rate is measured according to ASTM D3039/D3039M-17. In some embodiments, the use of ASTM D3039/D3039M-17 is preferred for highly oriented and/or high tensile modulus reinforced polymers and ASTM D638-14 is preferred for unreinforced or randomly oriented or discontinuous polymers comprising low volume of reinforcements or having low tensile modulus. In an embodiment, a high strain rate is 6 $s^{-1}$ or more. In another embodiment, a high strain rate is 55 $s^{-1}$ or more. In another embodiment, a high strain rate is 550 $s^{-1}$ or more. In another embodiment, a high strain rate is 1050 $s^{-1}$ or more. In another embodiment, a high strain rate is 2050 $s^{-1}$ or more. In another embodiment, a high strain rate is 2550 $s^{-1}$ or more. In an embodiment, a low strain rate is 9 $s^{-1}$ or less. In another embodiment, a low strain rate is 0.9 $s^{-1}$ or less. In another embodiment, a low strain rate is $0.9 \cdot 10^{-2}$ $s^{-1}$ or less. In another embodiment, a low strain rate is $0.9 \cdot 10^{-3}$ $s^{-1}$ or less. In another embodiment, a low strain rate is $0.9 \cdot 10^{-4}$ $s^{-1}$ or less. For some applications, very surprisingly, it is advantageous to fabricate the mould provided in method step a) in different pieces that are assembled together. In an embodiment, the mould provided in method step a) is fabricated in different pieces that are assembled together. In an embodiment, the mould provided in method step a) is fabricated by a significant amount of different pieces assembled together. In an embodiment, a significant amount is 3 or more. In another embodiment, a significant amount is 4 or more. In another embodiment, a significant amount is 6 or more. In another embodiment, a significant amount is 8 or more. In another embodiment, a significant amount is 12 or more. In another embodiment, a significant amount is 18 or more. In another embodiment, a significant amount is 22 or more. In an embodiment, at least one of the pieces that are assembled to fabricate the mould provided in method step a) is provided with a guiding mechanism that fixes the orientation with respect of at least one of the pieces to which it is assembled. In an embodiment, a significant amount (in the terms described above) of the pieces that are assembled to fabricate the mould provided in method step a) comprise a guiding mechanism that fixes the orientation with respect to at least one of the pieces to which they are assembled (the reference piece to which the orientation is fixed might be a different one for each piece considered). In an embodiment, a significant amount (in the terms described above) of the pieces that are assembled to fabricate the mould provided in method step a) comprise a guiding mechanism that fixes the orientation with respect to at least one single piece of the mould, that can be referred as reference piece (obviously, there can be more than one reference piece). In an embodiment, a significant amount (in the terms described above) of the pieces that are assembled to fabricate the mould provided in method step a) comprise a fixing mechanism that keeps them attached to at least one of the pieces to which they are assembled. In an embodiment, a significant amount (in the terms described above) of the pieces that are assembled to fabricate the mould provided in method step a) comprise a fixing mechanism that keeps them attached to at least one of the pieces to which they are assembled in a compliance anisotropic way, where the difference in compliance is significant for different loading directions of the piece once the mould is assembled. In an embodiment, a significant compliance difference is a 6% or more. In another embodiment, a significant compliance difference is a 16% or more. In another embodiment, a significant compliance difference is a 36% or more. In another embodiment, a significant compliance difference is a 56% or more. In another embodiment, a significant compliance difference is an 86% or more. In another embodiment, a significant compliance difference is a 128% or more. In another embodiment, a significant compliance difference is a 302% or more. In an embodiment, the difference in compliance is measured as the largest value measured divided by the minimum value measured and expressed in percentage, the load being applied being the same and the difference arising from the direction in which the load is applied. In an embodiment, the load used is 10 N. In another embodiment, the load used is 100 N. In another embodiment, the load used is 1000 N. In another embodiment, the load used is 10000 N. In an embodiment, the load used is the one causing a maximum stress of 1 MPa in the direction of maximum stiffness. In another embodiment, the load used is the one causing a maximum stress of 10 MPa in the direction of maximum stiffness. In another embodiment, the load used is the one causing a maximum stress of 30 MPa in the direction of maximum stiffness. In an embodiment, fixation and guidance are made with one single mechanism for a significant amount (in the terms described above) of the pieces that are assembled to fabricate the mould provided in method step a). In an embodiment, the mould provided in method step a) is fabricated by a significant amount of different pieces assembled together. In different embodiments, a significant amount is 3 or more, 4 or more, 6 or more, 8 or more, 12 or more, 18 or more and even 22 or more. In an embodiment, at least two of the pieces that are assembled to fabricate the mould provided in method step a) are manufactured with a different method. In an embodiment, at least two of the pieces that are assembled to fabricate the mould provided in method step a) are manufactured with a different method, one of them being SLS. In an embodiment, at least two of the pieces that are assembled to fabricate the mould provided in method step a) are manufactured with a different method, one of them being MJF. In an embodiment, at least three different manufacturing methods are employed to manufacture the pieces that are assembled to fabricate the mould provided in method step a). In some applications, it is very important how internal features are manufactured in the mould provided in method step a). In an embodiment, the mould provided comprises internal features which are solid and internal features which are void and which are connected to the exterior or to other void internal features which have connection to the exterior. In an embodiment, the mould provided comprises internal features which are void and which are connected to the exterior or to other void internal features which have connection to the exterior.

As has been seen in the preceding paragraphs, very often the material in method step a) is of polymeric nature, and thus soft and with little stiffness, it is therefore very surprising that the present method works and does so for complex geometry components (even including those with complex internal features), without cracks, with good dimensional accuracy. Intuitively one would expect the polymeric material to squeeze under the effect of the pressure, which is indeed what happens if the indications of the present invention are not followed strictly. Unfortunately different material systems and geometries require different sets of indications, and thus a comprehensive set of instructions is not simple to be provided, given the broad range of potential applications benefiting from the present invention.

Method step b) is very determinant for some applications. For some applications, it is very important the powder used to fill the mould provided in method step a). For some applications, it is very important the morphology of the powder used to fill the mould provided in method step a). For some applications, it is very important the nature of the powder used to fill the mould provided in method step a). For some applications, it is very important the filling density of the powder used to fill the mould provided in method step a), regardless on how this filling or apparent density is attained, while in some applications is the method employed to achieve the specified filling density what counts most. In an embodiment, the mould provided in method step a) is filled at least partially with a balanced apparent density. In an embodiment, the mould provided in method step a) is filled with a balanced apparent density. For some applications it has been found that an excessively low apparent density makes it very difficult if not impossible to obtain complex geometries free of internal defects, even more so when the geometries encompass internal features. For some applications it has been found that an excessively high apparent density makes it very difficult if not impossible to obtain complex geometry components, with special mention to those of large size. In an embodiment, a balanced apparent density is 52% or more. In another embodiment, a balanced apparent density is 62% or more. In another embodiment, a balanced apparent density is 66% or more. In another embodiment, a balanced apparent density is 72% or more. In another embodiment, a balanced apparent density is 74% or more. In another embodiment, a balanced apparent density is 76% or more. In another embodiment, a balanced apparent density is 78% or more. In another embodiment, a balanced apparent density is 81% or more. In an embodiment, a balanced apparent density is 94% or less. In another embodiment, a balanced apparent density is 89% or less. In another embodiment, a balanced apparent density is 87% or less. In another embodiment, a balanced apparent density is 84% or less. In another embodiment, a balanced apparent density is 82% or less. In another embodiment, a balanced apparent density is 79.5% or less. In an embodiment, the balanced apparent density is the apparent filling density. In an alternative embodiment, the apparent filling density is the volume percentage of the mould which is occupated by the powder. In an embodiment, the above values of apparent density are at room temperature (23° C.). In an embodiment, apparent density is measured (at 20° C. and 1 atm) according to ASTM B329-06. In some applications, it has been found that the filling apparent density has to be well-adjusted with the maximum pressure applied to the mould in method steps d), e) and/or f). In an embodiment, $APPDEN*PADMP1<\sqrt[3]{MaxPres}<APPDEN*PADMP2$, where PADM1 and PADM2 are parameters, APPDEN is the apparent filling density (in percent divided by 100) and Max-Pres is the maximum pressure applied in method steps d), e) and/or f). In an embodiment, Max-Pres is the maximum pressure in method step d). In an embodiment, Max-Pres is the maximum pressure in method step e). In an alternative embodiment, Max-Pres is the maximum pressure in method step f). In an embodiment, PADM1 is 5.0. In another embodiment, PADM1 is 5.8. In another embodiment, PADM1 is 6.0. In another embodiment, PADM1 is 6.25. In another embodiment, PADM1 is 6.6. In another embodiment, PADM1 is 7.0. In another embodiment, PADM1 is 7.2. In another embodiment, PADM1 is 7.6. In an embodiment, PADM2 is 8.0. In another embodiment, PADM2 is 8.8. In another embodiment, PADM2 is 10.0. In another embodiment, PADM2 is 10.6. In another embodiment, PADM2 is 11.4. In another embodiment, PADM2 is 12.1. In another embodiment, PADM2 is 12.6. In another embodiment, PADM2 is 13.6. In an embodiment, APPDEN is the balanced apparent density.

In some applications, it is important how the mixing of the material previous to the filling of the mould provided in method step a) is effectuated in method step b). In an embodiment, different powders are blended together in a mixer. In an embodiment, different powders are mixed for the right time in a rotating container. In an embodiment, not all powders are mixed at the same time, but some are mixed first and others added at a later point in time into the rotating container. In an embodiment, the rotating container does not have a rotation movement but a complex repetitive movement. In an embodiment, the rotating container is a powder mixer. In another embodiment, the rotating container is a turbula powder mixer (or blender). In another embodiment, the rotating container is a V-type powder mixer (or blender). In another embodiment, the rotating container is a Y-type powder mixer (or blender). In another embodiment, the rotating container is a single-cone-type powder mixer (or blender). In another embodiment, the rotating container is a double-cone-type powder mixer (or blender). In an embodiment, the rotating container has internal features that move. In an embodiment, the rotating container is still and has internal features that move. In an embodiment, the rotating container is made of steel and has internal features that move. In an embodiment, the right time refers to the total mixing time for the powder or material that has been mixed the longest time. In an embodiment, the right time refers to the total mixing time for the powder or material that has been mixed in the rotating container for the longest time. In an embodiment, the right time is 30 seconds or more. In another embodiment, the right time is 3 minutes or more. In another embodiment, the right time is 15 minutes or more. In another embodiment, the right time is 32 minutes or more. In another embodiment, the right time is 65 minutes or more. In another embodiment, the right time is 2 h or more. In another embodiment, the right time is 6 h or more. In another embodiment, the right time is 12 h or more. In another embodiment, the right time is 32 h or more. In an embodiment, the right time is 2000 h or less. In another embodiment, the right time is 200 h or less. In another embodiment, the right time is 9 h or less. In another embodiment, the right time is 2.5 h or less. In another embodiment, the right time is 74 minutes or less. In another embodiment, the right time is 54 minutes or less. In another embodiment, the right time is 28 minutes or less.

In some applications, it is important how the filling of the mould provided in method step a) is effectuated in method step b). In an embodiment, the mould provided in method step a) is vibrated during at least part of the filling with powder in method step b). In an embodiment, the filling of method step b) comprises the pouring of the powder and all the actions until the mould is sealed. In an embodiment, method step b) comprises a vibration step during the introduction of the powder in the mould provided in method step a) and/or afterwards during the actions undertaken to settle the powder correctly in the mould provided in method step a). In an embodiment, the vibration process comprises a long enough vibration step at the right acceleration. In another embodiment, the time of a vibration step is the total time vibrating within the right acceleration values, even when there might be periods at other acceleration values or even without vibration in between (which are disregarded when adding up the time). In an embodiment, a long enough vibration step means 2 seconds or more. In another embodiment, a long enough vibration step means 11 seconds or more. In an embodiment, a long enough vibration step means 31 seconds or more. In another embodiment, a long enough vibration step means 62 seconds or more. In another embodiment, a long enough vibration step means 6 minutes or more. In another embodiment, a long enough vibration step means 12 minutes or more. In another embodiment, a long enough vibration step means 26 minutes or more. In another embodiment, a long enough vibration step means 125 minutes or more. In some applications, excessive vibration time is negative towards the obtaining of defect free components. In an embodiment, a long enough vibration time should remain below 119 minutes. In another embodiment, a long enough vibration time should remain below 58 minutes. In another embodiment, a long enough vibration time should remain below 29 minutes. In an embodiment, the right acceleration is 0.006 g or more. In another embodiment, the right acceleration is 0.012 g or more. In another embodiment, the right acceleration is 0.6 g or more. In another embodiment, the right acceleration is 1.2 g or more. In another embodiment, the right acceleration is 6 g or more. In another embodiment, the right acceleration is 11 g or more. In another embodiment, the right acceleration is 60 g or more. In an embodiment, the right acceleration is 600 g or less. In another embodiment, the right acceleration is 90 g or less. In another embodiment, the right acceleration is 40 g or less. In another embodiment, the right acceleration is 19 g or less. In another embodiment, the right acceleration is 9 g or less. In another embodiment, the right acceleration is 4 g or less. In another embodiment, the right acceleration is 0.9 g or less. In another embodiment, the right acceleration is 0.09 g or less. In an embodiment, g is the gravity of earth 9.8 m/s2. In an embodiment, the vibration process comprises a long enough vibration step (in the terms described above in the case of acceleration) at the right vibration frequency. In an embodiment, the time of a vibration step is the total time vibrating within the right vibration frequency values, even when there might be periods at other vibration frequency values or even without vibration in between (which are disregarded when adding up the time). In an embodiment, the right vibration frequency is 0.1 Hz or more. In another embodiment, the right vibration frequency is 1.2 Hz or more. In another embodiment, the right vibration frequency is 12 Hz or more. In another embodiment, the right vibration frequency is 26 Hz or more. In another embodiment, the right vibration frequency is 36 Hz or more. In another embodiment, the right vibration frequency is 56 Hz or more. In another embodiment, the right vibration frequency is 102 Hz or more. In an embodiment, the right vibration frequency is 390 Hz or less. In another embodiment, the right vibration frequency is 190 Hz or less. In another embodiment, the right vibration frequency is 90 Hz or less. In another embodiment, the right vibration frequency is 69 Hz or less. In another embodiment, the right vibration frequency is 49 Hz or less. In another embodiment, the right vibration frequency is 39 Hz or less. In an embodiment, the vibration process comprises a long enough (in the terms described above in the case of acceleration) vibration step at the right amplitude. In an embodiment, the time of a vibration step is the total time vibrating within the right amplitude values, even when there might be periods at other amplitude values or even without vibration in between (which are disregarded when adding up the time). In an embodiment, the amplitude is the "peak-to-peak" amplitude. In an embodiment, the right amplitude is 0.006 mm or more. In another embodiment, the right amplitude is 0.016 mm or more. In another embodiment, the right amplitude is 0.06 mm or more. In another embodiment, the right amplitude is 0.12 mm or more. In another embodiment, the right amplitude is 0.6 mm or more. In another embodiment, the right amplitude is 6 mm or more. In another embodiment, the right amplitude is 16 mm or more. In an embodiment, the acceleration is chosen as described above, then the vibration frequency is chosen according to the grain size (D50) of the smallest powder amongst all the relevant (in the terms described elsewhere in the document) ones: LLF*D50<vibration frequency<ULF*D50 and the amplitude is fixed according to acceleration=amplitude×(frequency)^2. In an embodiment, D50 of the smallest powder amongst all the relevant powders in the mixture is the smallest D50 of the relevant powders in the mixture. In an embodiment, LLF is 0.01. In another embodiment, LLF is 0.1. In another embodiment, LLF is 0.6. In another embodiment, LLF is 1.0. In another embodiment, LLF is 6. In another embodiment, LLF is 10. In an embodiment, ULF is 19. In another embodiment, ULF is 9. In another embodiment, ULF is 7. In another embodiment, ULF is 4. In another embodiment, ULF is 2. In an embodiment, D50 refers to the particle size at which 50% of the sample's volume is comprised of smaller particles in the cumulative distribution of particle size. In an embodiment, D50 refers to the particle size at which 50% of the sample's volume is comprised of smaller particles in the cumulative distribution of particle size and is measured by laser diffraction according to ISO 13320-2009. In an alternative embodiment, D50 refers to the particle size at which 50% of the sample's mass is comprised of smaller particles in the cumulative distribution of particle size. In an alternative embodiment, D50 refers to the particle size at which 50% of the sample's mass is comprised of smaller particles in the cumulative distribution of particle size and is measured by laser diffraction according to ISO 13320-2009. In an embodiment, in the above formula the vibration frequency is in Hz. In an embodiment, in the above formula the D50 is in microns. In some applications, the inventor has found that it is very interesting to apply pressure to the powder within the mould provided in method step a) while the powder in being vibrated. In an embodiment, the right mean pressure is applied to at least some of the powder in the mould. In an embodiment, the right mean pressure is applied to the powder in the mould. In an embodiment, the right mean pressure is applied to the relevant powders (relevant powders as previously defined) in the mould. In an embodiment, the right mean pressure is applied to at least one relevant powder (relevant powders as previously defined) in the mould. In an embodiment, the mean pressure is calculated as the force applied divided by the minimum cross-section orthogonal to the direction of the application of the force. In an embodiment, the mean pressure is calculated as the force applied divided by the mean cross-section orthogonal to the direction of the application of the force. In an embodiment, the right mean pressure is 0.1 MPa or more. In another embodiment, the right mean pressure is 0.6 MPa or more. In another embodiment, the right mean pressure is 1.1 MPa or more. In another embodiment, the right mean pressure is 5.1 MPa or more. In another embodiment, the right mean pressure is 10.4 MPa or more. In another embodiment, the right mean pressure is 15 MPa or more. In another embodiment, the right mean pressure is 22 MPa or more. In another embodiment, the right mean pressure is 52 MPa or more. In an embodiment, the right mean pressure is 190 MPa or less. In another embodiment, the right mean pressure is 90 MPa or less. In another embodiment, the right mean pressure is 49 MPa or less. In another embodiment, the right mean pressure is 29 MPa or less. In another embodiment, the right mean pressure is 19 MPa or less. In another embodiment, the right mean pressure is 9 MPa or less. In an embodiment, a lid is manufactured for the application of the pressure, fitting an open surface on the mould. In an embodiment, the pressure application lid has the same shape as the lid of the mould but is extruded through a longer path (at least double the thickness). In an embodiment, the pressure application lid is fabricated with an AM technique. In an embodiment, the pressure is applied with a mechanical system. In an embodiment, the pressure is applied with a servo-mechanical system. In an embodiment, the pressure is applied with an hydraulic system. In an embodiment, the application of pressure and the application of vibration coincide in some point of time.

For some applications of the method of the present invention, the powder mixture used in method step b) is of great relevance. In an embodiment, a powder mixture (or a blend of powders) refers to a powder made by mixing two or more powders with different chemical composition, particle size distribution, particle shape, or a combination of these characteristics according to ASTM B243-16a). Some of the mixing strategies developed for the present invention are new, inventive and of great interest for other component manufacturing methods and thus can constitute an invention on their own. In an embodiment, a mixture of two or more different in chemical composition powders is used. In another embodiment, a mixture of three or more different in chemical composition powders is used. In another embodiment, a mixture of four or more different in chemical composition powders is used. In another embodiment, a mixture of five or more different in chemical composition powders is used. In some applications it might be interesting to have more than one final material in a given component. Several reasons might be the origin of this, like for example having a high thermal conductivity next to lower thermal conductivity materials on the active surfaces of a die for tailored heat extraction, or having a lower cost material away from the critical working zone, or having a very high wear resistance in the high wear areas and a more damage tolerant material in the crack prone areas of the component. This can be achieved in many ways, amongst others by filling the mould in a stratified way with different materials layers. In an embodiment, the final component has several materials. In an embodiment, a given material of the final component is the mixture of powders which has been done prior to filling the mould or part of it or also the mixture that takes place through vibration or other means within the mould. In an embodiment, a given material of the final component is addition of the mixture of powders which has been mixed together prior to filling the mould or part of it.

In an embodiment, what has been said about the material of the final component just has to apply to one of the materials of the final component. In an embodiment, what has been said about the material of the final component has to apply to all of the materials of the final component. In an embodiment, what has been said about the material of the final component just has to apply to one or more of the materials of the final component representing a significant portion of the final component. In an embodiment, a significant portion is a 2% or more. In another embodiment, a significant portion is a 6% or more. In another embodiment, a significant portion is a 16% or more. In another embodiment, a significant portion is a 26% or more. In another embodiment, a significant portion is a 36% or more. In another embodiment, a significant portion is a 56% or more. In another embodiment, a significant portion is an 86% or more. In an embodiment, these percentages are by volume. In an alternative embodiment, these percentages are by weight. In an embodiment, there are at least two powders mixed together with a significant difference in the content of at least one critical element. In an embodiment, there are at least two powders mixed together with a significant difference in the content of a critical element. In an embodiment, there are at least two powders mixed together with a significant difference in the content of at least two critical elements. In an embodiment, there are at least two powders mixed together with a significant difference in the content of at least three critical elements. In an embodiment, there are at least two powders mixed together with a significant difference in the content of at least four critical elements. In an embodiment, there are at least two powders mixed together with a significant difference in the content of at least five critical elements. In an embodiment, the two powders are mixed together in the same material. In an embodiment, chromium (% Cr) is a critical element. In an embodiment, manganese (% Mn) is a critical element. In an embodiment, nickel (% Ni) is a critical element. In an embodiment, vanadium (% V) is a critical element. In an embodiment, titanium (% Ti) is a critical element. In an embodiment, molybdenum (% Mo) is a critical element. In an embodiment, tungsten (% W) is a critical element. In an embodiment, aluminum (% Al) is a critical element. In an embodiment, zirconium (% Zr) is a critical element. In an embodiment, silicon (% Si) is a critical element. In an embodiment, tin (% Sn) is a critical element. In an embodiment, magnesium (% Mg) is a critical element. In an embodiment, copper (% Cu) is a critical element. In an embodiment, carbon (% C) is a critical element. In an embodiment, boron (% B) is a critical element. In an embodiment, nitrogen (% N) is a critical element. In an embodiment, a significant difference in the content means that the weight content of the critical element in the powder with high content is at least a 50% higher than in the powder with lower content of the critical element (for the purpose of clarity, if the powder with low content of the critical element has a 0.8% by weight of the critical element, then the powder with the higher content of the critical element has to have 1.2% by weight or more of the critical element). In an embodiment, a significant difference in the content means that the weight content of the critical element in the powder with high content is at least double as high that in the powder with lower content of the critical element. In another embodiment, a significant difference in the content means that the weight content of the critical element in the powder with high content is at least three times higher than in the powder with lower content of the critical element. In another embodiment, a significant difference in the content means that the weight content of the critical element in the powder with high content is at least four times higher than in the powder with lower content of the critical element. In another embodiment, a significant difference in the content means that the weight content of the critical element in the powder with high content is at least five times higher than in the powder with lower content of the critical element. In another embodiment, a significant difference in the content means that the weight content of the critical element in the powder with high content is at least ten times higher than in the powder with lower content of the critical element. In some applications, it is the content of the critical element in both powders that is important. In some applications, it is the content of the sum of some critical elements in both powders that is important. In an embodiment, at least one of the powders of the mixture has a high enough content of the critical element while in at least another powder within the same mixture has a low enough content. In an embodiment, a high enough content is 0.2% by weight or more. In another embodiment, a high enough content is 0.6% by weight or more. In another embodiment, a high enough content is 1.2% by weight or more. In another embodiment, a high enough content is 3.2% by weight or more. In another embodiment, a high enough content is 5.2% by weight or more. In another embodiment, a high enough content is 12% by weight or more. In another embodiment, a high enough content is 16% by weight or more. In an embodiment, a low enough content is 49% by weight or less. In another embodiment, a low enough content is 19% by weight or less. In another embodiment, a low enough content is 9% by weight or less. In another embodiment, a low enough content is 3.8% by weight or less. In another embodiment, a low enough content is 1.9% by weight or less. In another embodiment, a low enough content is 0.9% by weight or less. In another embodiment, a low enough content is 0.09% by weight or less. In an embodiment, at least one powder of the mixture has to have a high enough content (in the terms described above) of the sum of % V+% Cr+% Mo+% W+% Ta+% Zr+% Hf while at least another powder of the mixture has to have a low enough content (in the terms described above) of this sum of elements. In an embodiment, at least one powder of the mixture has to have a high enough content (in the terms described above) of the sum of % V+% Cr+% Mo while at least another powder of the mixture has to have a low enough content (in the terms described above) of this sum of elements. In an embodiment, at least one powder of the mixture has to have a high enough content (in the terms described above) of the sum of % Ni+% Cr+% Mn+% Mo while at least another powder of the mixture has to have a low enough content (in the terms described above) of this sum of elements. In an embodiment, at least one powder of the mixture has to have a high enough content (in the terms described above) of the sum of % V+% Al+% Sn while at least another powder of the mixture has to have a low enough content (in the terms described above) of this sum of elements. In an embodiment, at least one powder of the mixture has to have a high enough content (in the terms described above) of the sum of % V+% Al while at least another powder of the mixture has to have a low enough content (in the terms described above) of this sum of elements. In an embodiment, at least one powder of the mixture has to have a high enough content (in the terms described above) of the sum of % Si+% Mn+% Mg+% Zn+% Sc+% Zr while at least another powder of the mixture has to have a low enough content (in the terms described above) of this sum of elements. In an embodiment, at least one powder of the mixture has to have a sufficiently high content (in the terms described below) of the sum of % V+% Cr+% Mo+% W+% Ta+% Zr+% Hf+% Ti while at least another powder of the mixture has to have a sufficiently low content (in the terms described below) of this sum of elements when the final component is mainly iron (in the terms described below). In an embodiment, a sufficiently high content is 0.6% by weight or more. In another embodiment, a sufficiently high content is 1.2% by weight or more. In another embodiment, a sufficiently high content is 2.6% by weight or more. In another embodiment, a sufficiently high content is 4.6% by weight or more. In another embodiment, a sufficiently high content is 10.6% by weight or more. In an embodiment, a sufficiently low content is 36% by weight or less. In another embodiment, a sufficiently low content is 9% by weight or less. In another embodiment, a sufficiently low content is 4% by weight or less. In another embodiment, a sufficiently low content is 2% by weight or less. In another embodiment, a sufficiently low content is 0.9% by weight or less. In another embodiment, a sufficiently low content is 0.09% by weight or less. In an embodiment, at least one powder of the mixture has to have a sufficiently high content (in the terms described below) of the sum of % Ni+% Cr+% Mn+% Ti while at least another powder of the mixture has to have a sufficiently low content (in the terms described below) of this sum of elements when the final component is mainly iron (in the terms described below). In an embodiment, a sufficiently high content is 0.6% by weight or more. In another embodiment, a sufficiently high content is 6% by weight or more. In another embodiment, a sufficiently high content is 12.6% by weight or more. In another embodiment, a sufficiently high content is 16% by weight or more. In another embodiment, a sufficiently high content is 26% by weight or more. In an embodiment, a sufficiently low content is 66% by weight or less. In another embodiment, a sufficiently low content is 24% by weight or less. In another embodiment, a sufficiently low content is 9% by weight or less. In another embodiment, a sufficiently low content is 4% by weight or less. In another embodiment, a sufficiently low content is 0.9% by weight or less. In another embodiment, a sufficiently low content is 0.09% by weight or less. In an embodiment, at least one powder of the mixture has to have a sufficiently high content (in the terms described below) of the sum of % Al+% Sn+% Cr+% V+% Mo+% Ni+% Pd while at least another powder of the mixture has to have a sufficiently low content (in the terms described below) of this sum of elements when the final component is mainly titanium (in the terms described below). In an embodiment, a sufficiently high content is 0.6% by weight or more. In another embodiment, a sufficiently high content is 6% by weight or more. In another embodiment, a sufficiently high content is 12.6% by weight or more. In another embodiment, a sufficiently high content is 16% by weight or more. In another embodiment, a sufficiently high content is 22% by weight or more. In an embodiment, a sufficiently low content is 39% by weight or less. In another embodiment, a sufficiently low content is 19% by weight or less. In another embodiment, a sufficiently low content is 9% by weight or less. In another embodiment, a sufficiently low content is 4% by weight or less. In another embodiment, a sufficiently low content is 0.9% by weight or less. In another embodiment, a sufficiently low content is 0.09% by weight or less. In an embodiment, at least one powder of the mixture has to have a sufficiently high content (in the terms described below) of the sum of % Al+% Sn+% V while at least another powder of the mixture has to have a sufficiently low content (in the terms described below) of this sum of elements when the final component is mainly titanium (in the terms described below). In an embodiment, a sufficiently high content is 0.6% by weight or more. In another embodiment, a sufficiently high content is 6% by weight or more. In another embodiment, a sufficiently high content is 12.6% by weight or more. In another embodiment, a sufficiently high content is 16% by weight or more. In another embodiment, a sufficiently high content is 22% by weight or more. In an embodiment, a sufficiently low content is 39% by weight or less. In another embodiment, a sufficiently low content is 19% by weight or less. In another embodiment, a sufficiently low content is 9% by weight or less. In another embodiment, a sufficiently low content is 4% by weight or less. In another embodiment, a sufficiently low content is 0.9% by weight or less. In another embodiment, a sufficiently low content is 0.09% by weight or less. In an embodiment, at least one powder of the mixture has to have a sufficiently high content (in the terms described below) of the sum of % Cu+% Mn+% Mg+% Si while at least another powder of the mixture has to have a sufficiently low content (in the terms described below) of this sum of elements when the final component is mainly aluminium (in the terms described below). In an embodiment, a sufficiently high content is 0.2% by weight or more. In another embodiment, a sufficiently high content is 0.6% by weight or more. In another embodiment, a sufficiently high content is 1.2% by weight or more. In another embodiment, a sufficiently high content is 2.6% by weight or more. In another embodiment, a sufficiently high content is 5.2% by weight or more. In another embodiment, a sufficiently high content is 11% by weight or more. In an embodiment, a sufficiently low content is 19% by weight or less. In another embodiment, a sufficiently low content is 9% by weight or less. In another embodiment, a sufficiently low content is 4% by weight or less. In another embodiment, a sufficiently low content is 1.9% by weight or less. In another embodiment, a sufficiently low content is 0.9% by weight or less. In another embodiment, a sufficiently low content is 0.09% by weight or less. In an embodiment, at least one powder of the mixture has to have a sufficiently high content (in the terms described below) of the sum of % Cu+% Mn+% Mg+% Si+% Fe+% Zn while at least another powder of the mixture has to have a sufficiently low content (in the terms described below) of this sum of elements when the final component is mainly aluminium (in the terms described below). In an embodiment, a sufficiently high content is 0.2% by weight or more. In another embodiment, a sufficiently high content is 0.6% by weight or more. In another embodiment, a sufficiently high content is 1.2% by weight or more. In another embodiment, a sufficiently high content is 2.6% by weight or more. In another embodiment, a sufficiently high content is 5.2% by weight or more. In another embodiment, a sufficiently high content is 11% by weight or more. In an embodiment, a sufficiently low content is 19% by weight or less. In another embodiment, a sufficiently low content is 9% by weight or less. In another embodiment, a sufficiently low content is 4% by weight or less. In another embodiment, a sufficiently low content is 1.9% by weight or less. In another embodiment, a sufficiently low content is 0.9% by weight or less. In another embodiment, a sufficiently low content is 0.09% by weight or less. In an embodiment, at least one powder of the mixture has to have a sufficiently high content (in the terms described below) of the sum of % Cr+% Co+% Mo+% Ti while at least another powder of the mixture has to have a sufficiently low content (in the terms described below) of this sum of elements when the final component is mainly nickel (in the terms described below). In an embodiment, a sufficiently high content is 1.2% by weight or more.

In another embodiment, a sufficiently high content is 16% by weight or more. In another embodiment, a sufficiently high content is 22% by weight or more. In another embodiment, a sufficiently high content is 32% by weight or more. In another embodiment, a sufficiently high content is 36% by weight or more. In another embodiment, a sufficiently high content is 42% by weight or more. In an embodiment, a sufficiently low content is 65% by weight or less. In another embodiment, a sufficiently low content is 29% by weight or less. In another embodiment, a sufficiently low content is 14% by weight or less. In another embodiment, a sufficiently low content is 9% by weight or less. In another embodiment, a sufficiently low content is 0.9% by weight or less. In another embodiment, a sufficiently low content is 0.09% by weight or less. In an embodiment, at least one powder of the mixture has to have a sufficiently high content (in the terms described below) of the sum of % Cr+% Co while at least another powder of the mixture has to have a sufficiently low content (in the terms described below) of this sum of elements when the final component is mainly nickel (in the terms described below). In an embodiment, a sufficiently high content is 1.2% by weight or more. In another embodiment, a sufficiently high content is 16% by weight or more. In an embodiment, a sufficiently high content is 22% by weight or more. In another embodiment, a sufficiently high content is 32% by weight or more. In another embodiment, a sufficiently high content is 36% by weight or more. In another embodiment, a sufficiently high content is 42% by weight or more. In an embodiment, a sufficiently low content is 65% by weight or less. In another embodiment, a sufficiently low content is 29% by weight or less. In another embodiment, a sufficiently low content is 14% by weight or less. In another embodiment, a sufficiently low content is 9% by weight or less. In another embodiment, a sufficiently low content is 0.9% by weight or less. In another embodiment, a sufficiently low content is 0.09% by weight or less. In an alternative embodiment, the above disclosed percentages are by volume. In an embodiment, the critical element (or critical element sum) low content powder is not the largest powder. In an embodiment, for a powder to be the largest powder, it should be the powder with the highest D50. In an alternative embodiment, for a powder to be the largest powder, it should be the powder with the highest volume percentage. In another alternative embodiment, for a powder to be the largest powder, it should be the powder with the highest weight percentage. In an embodiment, at least one critical element (or critical element sum) high content powder is considerably bigger in size than at least one of the critical element (or critical element sum) low content powders. In an embodiment, at least one critical element (or critical element sum) high content powder is considerably bigger in size than all of the critical element (or critical element sum) low content powders. In an embodiment, the considerable bigger in size powder with a critical element (or critical element sum) high content is present in a relevant amount (definition of relevant amount can be found below). In an embodiment, a high content is a high enough content (as previously defined). In an alternative embodiment, a high content is a sufficiently high content (as previously defined). In an embodiment, a low content is a low enough content (as previously defined). In an alternative embodiment, a low content is a sufficiently low content (as previously defined). In an embodiment, considerably bigger in size means that the D50 is at least a 52% bigger. In another embodiment, considerably bigger in size means that the D50 is at least a 152% bigger. In another embodiment, considerably bigger in size means that the D50 is at least a 252% bigger. In another embodiment, considerably bigger in size means that the D50 is at least a 352% bigger. In another embodiment, considerably bigger in size means that the D50 is at least a 452% bigger. In another embodiment, considerably bigger in size means that the D50 is at least a 752% bigger. In an embodiment, D50 refers to the particle size at which 50% of the sample's volume is comprised of smaller particles in the cumulative distribution of particle size. In an embodiment, D50 refers to the particle size at which 50% of the sample's volume is comprised of smaller particles in the cumulative distribution of particle size and is measured by laser diffraction according to ISO 13320-2009. In an alternative embodiment, D50 refers to the particle size at which 50% of the sample's mass is comprised of smaller particles in the cumulative distribution of particle size. In an alternative embodiment, D50 refers to the particle size at which 50% of the sample's mass is comprised of smaller particles in the cumulative distribution of particle size and is measured by laser diffraction according to ISO 13320-2009. In an embodiment, in a mixture of three or more powders at least one powder has a balanced composition regarding at least one critical element. In an embodiment, in a mixture of three or more powders at least one powder has a balanced composition regarding at least two critical elements. In an embodiment, in a mixture of three or more powders at least one powder has a balanced composition regarding at least three critical elements. In an embodiment, in a mixture of three or more powders at least one powder has a balanced composition regarding at least four critical elements. In an embodiment, in a mixture of three or more powders at least one powder has a balanced composition regarding at least five critical elements. In an embodiment, in a mixture of three or more powders at least one powder has a balanced composition regarding at least one of the sums of critical elements described above. In an embodiment, a balanced composition for a critical element or critical element sum is understood as having a composition (for the critical element or critical element sum) falling in: PACE*% PpCE=f1*% P1CE+f2*% P2CE+ . . . +fx*% PxCE+ . . . fp*% PpCE where PACE is a parameter, fp is the weight fraction within the mixture of the powder with the balanced composition, % PpCE is the composition for the critical element or critical element sum of the balanced composition powder; f1, f2, . . . , fx, . . . are the weight fractions of the other powders in the mix and % P1CE, P2CE, . . . , PxCE, . . . are the corresponding composition for the critical element or critical element sum. In an embodiment, a balanced composition for a critical element or critical element sum is understood as having a composition (for the critical element or critical element sum) falling in: PACE*% PpCE=f1*% P1CE+f2*% P2CE+ . . . +fx*% PxCE+ . . . where PACE is a parameter, % PpCE is the composition for the critical element or critical element sum of the balanced composition powder; f1, f2, . . . , fx, . . . are the weight fractions of the other powders in the mix and % P1CE, P2CE, . . . , PxCE, . . . are the corresponding composition for the critical element or critical element sum. In an embodiment, PACE has an upper limit and a lower limit. In an embodiment, the upper limit for PACE is 2.9. In another an embodiment, the upper limit for PACE is 1.9. In another embodiment, the upper limit for PACE is 1.48. In another embodiment, the upper limit for PACE is 1.19. In another embodiment, the upper limit for PACE is 1.08. In an embodiment, the lower limit for PACE is 0.2. In another embodiment, the lower limit for PACE is 0.55. In another embodiment, the lower limit for PACE is 0.69. In another embodiment, the lower limit for PACE is 0.79. In another embodiment, the lower limit for PACE is 0.89. In another embodiment, the lower limit for PACE is 0.96. In an embodiment, at least one of the powders with balanced composition for a critical element or critical element sum is considerably bigger in size (in the terms described above) than at least one of the critical element (or critical element sum) low content powders. In an embodiment, at least one of the powders with balanced composition for a critical element or critical element sum is considerably bigger in size (in the terms described above) than at least one of the critical element (or critical element sum) high content powders. In an embodiment, at least one of the powders with balanced composition for a critical element or critical element sum can be considered a critical element (or critical element sum) high content powder (in the terms described above) with respect of at least another powder of the mixture. In an embodiment, at least one of the powders with balanced composition for a critical element or critical element sum can be considered a critical element (or critical element sum) high content powder (in the terms described above) and considerably bigger in size (in the terms described above) with respect of at least another powder of the mixture. In an embodiment, at least one of the powders with balanced composition for a critical element or critical element sum can be considered a critical element (or critical element sum) low content powder (in the terms described above) with respect of at least another powder of the mixture. In an embodiment, at least one of the powders with balanced composition for a critical element or critical element sum can be considered a critical element (or critical element sum) low content powder (in the terms described above) and considerably bigger in size (in the terms described above) with respect of at least another powder of the mixture. In an embodiment, the powders in the mixture are chosen so that there is a considerable difference between the hardness of the softest powder and that of the hardest in the mixture. In an embodiment, a considerable difference is 6 HV or more. In another embodiment, a considerable difference is 12 HV or more. In another embodiment, a considerable difference is 26 HV or more. In another embodiment, a considerable difference is 52 HV or more. In another embodiment, a considerable difference is 78 HV or more. In another embodiment, a considerable difference is 105 HV or more. In another embodiment, a considerable difference is 160 HV or more. In another embodiment, a considerable difference is 205 HV or more. In some applications, the difference in hardness between powders is not as important as choosing at least one powder to have a considerable lower hardness than the end component. In an embodiment, there is a considerable difference between the hardness of least one powder of the mixture used to fill the mould in step b) and the final component. In an embodiment, at least one of the initial powders of the mixture in method step b) is chosen so that there is a considerable difference (in the terms described above) between the hardness of this powder and the hardness of the final component after the complete application of the presently described method. In an embodiment, any superficial coating is removed from the end component prior to the measure of the hardness. In some applications, it has been found that it is important to choose at least one powder to have a low hardness. In an embodiment, at least one of the powders of the mixture is chosen with a low hardness. In an embodiment, at least one relevant powder of the mixture is chosen with a low hardness. In an embodiment, a moderately relevant amount of powder of the mixture is chosen with a low hardness. In an embodiment, and in the present context a low hardness is 289 HV or less. In another embodiment, and in the present context a low hardness is 189 HV or less. In another embodiment, and in the present context a low hardness is 148 HV or less. In another embodiment, and in the present context a low hardness is 119 HV or less. In another embodiment, and in the present context a low hardness is 89 HV or less. In another embodiment, and in the present context a low hardness is 49 HV or less. In an embodiment, for a powder to be relevant at least it has to be present in a 1.6% by weight or more (as in the rest of the document when not otherwise indicated percentage quantities are in weight percent). In another embodiment, for a powder to be relevant at least it has to be present in a 2.6% by weight or more. In another embodiment, for a powder to be relevant at least it has to be present in a 5.6% by weight or more. In another embodiment, for a powder to be relevant at least it has to be present in an 8.6% by weight or more. In another embodiment, for a powder to be relevant at least it has to be present in a 12% by weight or more. In another embodiment, for a powder to be relevant at least it has to be present in a 16% or more. In another embodiment, for a powder to be relevant at least it has to be present in a 21% by weight or more. In another embodiment, for an amount of powder to be moderately relevant the powder with the selected characteristic has to be relevant as has been described in the preceding lines but cannot be present in an amount exceeding 86% by weight. In an embodiment, the amount cannot exceed 59% by weight. In another embodiment, the amount cannot exceed 49% by weight. In another embodiment, the amount cannot exceed 39% by weight. In another embodiment, the amount cannot exceed 29% by weight. In another embodiment, the amount cannot exceed 19% by weight. In another embodiment, the amount cannot exceed 9%. In an embodiment, and in the present context a low hardness is 288 HV or less when the powder is mainly titanium. In an embodiment, and in the present context a low hardness is 248 HV or less when the powder is mainly titanium. In another embodiment, and in the present context a low hardness is 188 HV or less when the powder is mainly titanium. In another embodiment, and in the present context a low hardness is 148 HV or less when the powder is mainly titanium. In another embodiment, and in the present context a low hardness is 128 HV or less when the powder is mainly titanium. In another embodiment, and in the present context a low hardness is 98 HV or less when the powder is mainly titanium. In an embodiment, and in the present context a low hardness is 288 HV or less when the final component is mainly titanium. In another embodiment, and in the present context a low hardness is 248 HV or less when the final component is mainly titanium. In another embodiment, and in the present context a low hardness is 188 HV or less when the final component is mainly titanium. In another embodiment, and in the present context a low hardness is 148 HV or less when the final component is mainly titanium. In another embodiment, and in the present context a low hardness is 128 HV or less when the final component is mainly titanium. In another embodiment, and in the present context a low hardness is 98 HV or less when the final component is mainly titanium. In an embodiment, for a powder or final material to be mainly a certain element, that element has to be present in a 33% by weight or more. In an embodiment, for a powder or final material to be mainly a certain element, that element has to be present in a 52% by weight or more. In another embodiment, for a powder or final material to be mainly a certain element, that element has to be present in a 76% by weight or more. In another embodiment, for a powder or final material to be mainly a certain element, that element has to be present in an 86% by weight or more. In another embodiment, for a powder or final material to be mainly a certain element, that element has to be present in a 92% by weight or more. In another embodiment, for a powder or final material to be mainly a certain element, that element has to be present in a 96% by weight or more. In another embodiment, for a powder or final material to be mainly a certain element, that element has to be present in a 99% by weight or more. In an embodiment, and in the present context a low hardness is 288 HV or less when the powder is mainly iron. In another embodiment, and in the present context a low hardness is 248 HV or less when the powder is mainly iron. In another embodiment, and in the present context a low hardness is 188 HV or less when the powder is mainly iron. In another embodiment, and in the present context a low hardness is 148 HV or less when the powder is mainly iron. In another embodiment, and in the present context a low hardness is 98 HV or less when the powder is mainly iron. In another embodiment, and in the present context a low hardness is 48 HV or less when the powder is mainly iron. In an embodiment, what has been said regarding low hardness of a powder when the powder is mainly iron, can be extended to a powder of the cited hardness not necessarily being mainly iron but the final component being mainly iron. In an embodiment, and in the present context a low hardness is 128 HV or less when the powder is mainly aluminum. In another embodiment, and in the present context a low hardness is 98 HV or less when the powder is mainly aluminum. In another embodiment, and in the present context a low hardness is 88 HV or less when the powder is mainly aluminum. In another embodiment, and in the present context a low hardness is 68 HV or less when the powder is mainly aluminum. In another embodiment, and in the present context a low hardness is 48 HV or less when the powder is mainly aluminum. In another embodiment, and in the present context a low hardness is 28 HV or less when the powder is mainly aluminum. In an embodiment, what has been said regarding low hardness of a powder when the powder is mainly aluminum, can be extended to a powder of the cited hardness not necessarily being mainly aluminum but the final component being mainly aluminum. In an alternative embodiment, all what has been said about aluminum in the preceding lines can be extended to magnesium. In an embodiment, and in the present context a low hardness is 288 HV or less when the powder is mainly nickel. In another embodiment, and in the present context a low hardness is 248 HV or less when the powder is mainly nickel. In another embodiment, and in the present context a low hardness is 188 HV or less when the powder is mainly nickel. In another embodiment, and in the present context a low hardness is 148 HV or less when the powder is mainly nickel. In another embodiment, and in the present context a low hardness is 118 HV or less when the powder is mainly nickel. In another embodiment, and in the present context a low hardness is 98 HV or less when the powder is mainly nickel. In another embodiment, and in the present context a low hardness is 48 HV or less when the powder is mainly nickel. In an alternative embodiment, what has been said regarding low hardness of a powder when the powder is mainly nickel, can be extended to a powder of the cited hardness not necessarily being mainly nickel but the final component being mainly nickel. In an embodiment, and in the present context a low hardness is 348 HV or less when the powder is mainly cobalt. In another embodiment, and in the present context a low hardness is 288 HV or less when the powder is mainly cobalt. In another embodiment, and in the present context a low hardness is 248 HV or less when the powder is mainly cobalt. In another embodiment, and in the present context a low hardness is 188 HV or less when the powder is mainly cobalt. In another embodiment, and in the present context a low hardness is 148 HV or less when the powder is mainly cobalt. In another embodiment, and in the present context a low hardness is 98 HV or less when the powder is mainly cobalt. In another embodiment, and in the present context a low hardness is 48 HV or less when the powder is mainly cobalt. In another embodiment, what has been said regarding low hardness of a powder when the powder is mainly cobalt, can be extended to a powder of the cited hardness not necessarily being mainly cobalt but the final component being mainly cobalt. In an embodiment, and in the present context a low hardness is 348 HV or less when the powder is mainly chromium. In another embodiment, and in the present context a low hardness is 288 HV or less when the powder is mainly chromium. In another embodiment, and in the present context a low hardness is 248 HV or less when the powder is mainly chromium. In another embodiment, and in the present context a low hardness is 188 HV or less when the powder is mainly chromium. In another embodiment, and in the present context a low hardness is 148 HV or less when the powder is mainly chromium. In an embodiment, and in the present context a low hardness is 98 HV or less when the powder is mainly chromium. In another embodiment, and in the present context a low hardness is 48 HV or less when the powder is mainly chromium. In another embodiment, what has been said regarding low hardness of a powder when the powder is mainly chromium, can be extended to a powder of the cited hardness not necessarily being mainly chromium but the final component being mainly chromium. In an embodiment, and in the present context a low hardness is 288 HV or less when the powder is mainly copper. In another embodiment, and in the present context a low hardness is 248 HV or less when the powder is mainly copper. In another embodiment, and in the present context a low hardness is 188 HV or less when the powder is mainly copper. In another embodiment, and in the present context a low hardness is 148 HV or less when the powder is mainly copper. In another embodiment, and in the present context a low hardness is 98 HV or less when the powder is mainly copper. In another embodiment, and in the present context a low hardness is 48 HV or less when the powder is mainly copper. In an alternative embodiment, what has been said regarding low hardness of a powder when the powder is mainly copper, can be extended to a powder of the cited hardness not necessarily being mainly copper but the final component being mainly copper. In an embodiment, the softer powder is not the largest powder. In an embodiment, for a powder to be the largest powder, it should be the powder with the highest D50. In an alternative embodiment, for a powder to be the largest powder, it should be the powder with the highest volume percentage. In another alternative embodiment, for a powder to be the largest powder, it should be the powder with the highest weight percentage. In an embodiment, there is a considerable difference between the hardness (as described above) of the relevant powder of the mixture chosen with a low hardness (as described above) and at least one powder type which is considerable bigger in size. In an embodiment, there is a considerable difference between the hardness (as described above) of the moderately relevant amount of powder of the mixture chosen with a low hardness (as described above) and at least one powder type which is considerably bigger in size. In an embodiment, the considerable bigger in size powder with a considerable higher hardness is present in a relevant amount (the same definition of relevant applies as above for the soft powder). In an embodiment, considerably bigger in size means that the D50 is at least a 52% bigger. In another embodiment, considerably bigger in size means that the D50 is at least a 152% bigger. In another embodiment, considerably bigger in size means that the D50 is at least a 252% bigger. In another embodiment, considerably bigger in size means that the D50 is at least a 352% bigger. In another embodiment, considerably bigger in size means that the D50 is at least a 452% bigger. In another embodiment, considerably bigger in size means that the D50 is at least a 752% bigger. In an embodiment, hardness is HV10 measured according to ISO 6507-1. In an alternative embodiment, hardness is HV10 measured according to ASTM E384-17. In another alternative embodiment, hardness is HV5 measured according to ISO 6507-1. In another alternative embodiment, hardness is HV5 measured according to ASTM E384-17. In an embodiment, D50 refers to the particle size at which 50% of the sample's volume is comprised of smaller particles in the cumulative distribution of particle size. In an embodiment, D50 refers to the particle size at which 50% of the sample's volume is comprised of smaller particles in the cumulative distribution of particle size and is measured by laser diffraction according to ISO 13320-2009. In an alternative embodiment, D50 refers to the particle size at which 50% of the sample's mass is comprised of smaller particles in the cumulative distribution of particle size. In an alternative embodiment, D50 refers to the particle size at which 50% of the sample's mass is comprised of smaller particles in the cumulative distribution of particle size and is measured by laser diffraction according to ISO 13320-2009. In an embodiment, there is a considerable difference between the sphericity of at least two of the powders in the mixture. In an embodiment, a considerable difference between the sphericity of at least two of the powders in the mixture is a 5% or more. In another embodiment, it is a 12% or more. In another embodiment, it is a 22% or more. In another embodiment, it is a 52% or more. In an embodiment, at least one of the powders in the mixture has a sphericity above 90%. In another embodiment, at least one of the powders in the mixture has a sphericity above 92%. In another embodiment, at least one of the powders in the mixture has a sphericity above 95%. In another embodiment, at least one of the powders in the mixture has a sphericity above 99%. In an embodiment, at least one of the powders in the mixture has a sphericity below 89%. In another embodiment, at least one of the powders in the mixture has a sphericity below 83%. In another embodiment, at least one of the powders in the mixture has a sphericity below 79%. In another embodiment, at least one of the powders in the mixture has a sphericity below 69%. In some applications, when the sphericity of the powders is in percentage (%) a certain difference between the sphericity of at least two of the powders in the mixture is preferred. Sphericity of the powder refers to a dimensionless parameter defined as the ratio between the surface area of a sphere having the same volume as the particle and the surface area of the particle. In an embodiment, the powders are relevant powders in the mixture (as disclosed in this document). In an embodiment, the sphericity of the particles is determined by dynamic image analysis. In an embodiment, the sphericity is measured by light scattering diffraction.

Some materials tested by the inventor within the present document might constitute an invention on their own. For applications with high thermo-mechanical loading benefiting from an aggressive conformal cooling strategy with close to the working surface cooling ducts, as well as applications where corrosion resistance has to be combined with mechanical strength and/or fracture toughness, an iron based alloy with high toughness, corrosion resistance and simultaneously exceptional wear resistance, can be achieved with a material with an overall composition as follows, all percentages being indicated in weight percent:

| | | | |
|---|---|---|---|
| % Cr: 10-14; | % Ni: 5.6-12.5; | % Ti: 0.4-2.8; | % Mo: 0-4.4; |
| % B: 0-4; | % Co: 0-12; | % Mn: 0-2; | % Cu: 0-2; |
| % Al: 0-1; | % Nb: 0-0.5; | % Ce: 0-0.3; | % Si: 0-2; |
| % C, % N, % P, % S, % O each 0.09% max. | | | |
| % C + % N + % P + % S + % O: 0-0.3. | | | |
| % La + % Cs + % Nd + % Gd + % Pr + % Ac + % Th + % Tb + % Dy + % Ho + % Er + % Tm + % Yb + % Y + % Lu + % Sc + % Zr + % Hf: 0-0.4; | | | |
| % V + % Ta + % W: 0-0.8; | | | |

The rest being iron and trace elements.

In an embodiment, trace elements refers to several elements, unless context clearly indicates otherwise, including but not limited to, H, He, Xe, F, Ne, Na, Cl, Ar, K, Br, Kr, Sr, Tc, Ru, Rh, Pd, Ag, I, Ba, Re, Os, Ir, Pt, Au, Hg, Tl, Po, At, Rn, Fr, Ra, Ac, Pa, U, Np, Pu, Am, Cm, Bk, Cf, Es, Fm, Md, No, Lr, Rf, db, Sg, Bh, Hs, Li, Be, Mg, Ca, Rb, Zn, Cd, Ga, In, Ge, Sn, Pb, Bi, Sb, As, Se, Te, Th, Ds, Rg, Cn, Nh, Fl, Mc, Lv, Ts, Og, Co, Ta, Sm, Pm, Ho, Eu, and Mt. In an embodiment, trace elements comprise at least one of the elements listed above.

Trace elements may be added intentionally to attain a particular functionality to the steel, such as reducing the cost of production and/or its presence may be unintentional and related mostly to the presence of impurities in the alloying elements and scraps used for the production of the steel.

In an embodiment, all trace elements (the sum of all trace elements) are less than a 1.9% by weight. In another embodiment, all trace elements are less than a 0.9% by weight. In another embodiment, all trace elements are less than a 0.4% by weight. In another embodiment, all trace elements are less than a 0.9% by weight. In another embodiment, all trace elements are less than a 0.09% by weight. In some embodiments, each trace element individually is less than a 1.9% by weight, less than a 0.9% by weight, less than a 0.4% by weight, less than a 0.9% by weight, and even less than a 0.09% by weight.

For some applications the chromium content is very critical. Too much % Cr can lead to low fracture toughness and too low % Cr to poor corrosion resistance for some applications, the effect of % Cr on stress corrosion cracking is also pronounced but in intercorrelation with other alloying elements. In an embodiment, the % Cr is 10.6% by weight or higher. In another embodiment, the % Cr is 11.2% by weight or higher. In another embodiment, the % Cr is 11.6% by weight or higher. In another embodiment, the % Cr is 12.1% by weight or higher. In another embodiment, the % Cr is 12.6% by weight or higher. In another embodiment, the % Cr is 13.2% by weight or higher. In an embodiment, the % Cr is 13.4% by weight or lower. In another embodiment, the % Cr is 12.9% by weight or lower. In another embodiment, the % Cr is 12.4% by weight or lower. In another embodiment, the % Cr is 11.9% by weight or lower. For some applications the boron content is very critical. Too much % B can lead to low fracture toughness and too low % B to poor wear resistance for some applications, the effect of % B on high temperature yielding is also pronounced but in intercorrelation with other alloying elements. In an embodiment, the % B is 35 ppm by weight or higher. In another embodiment, the % B is 120 ppm by weight or higher. In another embodiment, the % B is 0.02% by weight or higher. In another embodiment, the % B is 0.12% by weight or higher. In another embodiment, the % B is 0.6% by weight or higher. In another embodiment, the % B is 1.2% by weight or higher. In an embodiment, the % B is 1.9% by weight or lower. In another embodiment, the % B is 0.9% by weight or lower. In another embodiment, the % B is 0.4% by weight or lower. In another embodiment, the % B is 0.09% by weight or lower. For some applications the titanium content is very critical. Too much % Ti can lead to low fracture toughness and too low % Ti to poor yield strength for some applications, the effect of % Ti on wear resistance is also pronounced but in intercorrelation with other alloying elements. In an embodiment, the % Ti is 0.7% by weight or higher. In another embodiment, the % Ti is 1.2% by weight or higher. In another embodiment, the % Ti is 1.6% by weight or higher. In another embodiment, the % Ti is 1.8% by weight or higher. In another embodiment, the % Ti is 2.1% by weight or higher. In another embodiment, the % Ti is 2.55% by weight or higher. In an embodiment, the % Ti is 2.4% by weight or lower. In another embodiment, the % Ti is 1.9% by weight or lower. In another embodiment, the % Ti is 1.4% by weight or lower. In another embodiment, the % Ti is 0.9% by weight or lower. For some applications the nickel content is very critical. Too much % Ni can lead to low yield strength and too low % Ni to poor elongation at fracture for some applications, the effect of % Ni on stress corrosion cracking is also pronounced but in intercorrelation with other alloying elements. In an embodiment, the % Ni is 6.1% by weight or higher. In another embodiment, the % Ni is 7.1% by weight or higher. In another embodiment, the % Ni is 8.6% by weight or higher. In another embodiment, the % Ni is 10.6% by weight or higher. In another embodiment, the % Ni is 11.1% by weight or higher. In another embodiment, the % Ni is 11.5% by weight or higher. In an embodiment, the % Ni is 11.9% by weight or lower. In another embodiment, the % Ni is 11.4% by weight or lower. In another embodiment, the % Ni is 10.9% by weight or lower. In another embodiment, the % Ni is 9.9% by weight or lower. For some applications the molybdenum content is very critical. Too much % Mo can lead to low fracture toughness and too low % Mo to poor yield strength for some applications, the effect of % Mo on stress corrosion cracking is also pronounced but in intercorrelation with other alloying elements. In an embodiment, the % Mo is 0.26% by weight or higher. In another embodiment, the % Mo is 0.76% by weight or higher. In another embodiment, the % Mo is 1.2% by weight or higher. In another embodiment, the % Mo is 1.6% by weight or higher. In another embodiment, the % Mo is 2.1% by weight or higher. In another embodiment, the % Mo is 3.2% by weight or higher. In an embodiment, the % Mo is 3.9% by weight or lower. In another embodiment, the % Mo is 2.9% by weight or lower. In another embodiment, the % Mo is 1.9% by weight or lower. In another embodiment, the % Mo is 0.9% by weight or lower. In another embodiment, % Mo is not intentionally present or present as a trace element only. In another embodiment, % Mo is not present. For some applications the cobalt content is very critical. Too much % Co can lead to low yield strength and too low % Co to poor corrosion resistance/fracture toughness combination for some applications, the effect of % Co on stress corrosion cracking is also pronounced but in intercorrelation with other alloying elements. In an embodiment, the % Co is 0.6% by weight or higher. In another embodiment, the % Co is 2.2% by weight or higher. In another embodiment, the % Co is 3.6% by weight or higher. In another embodiment, the % Co is 6.1% by weight or higher. In another embodiment, the % Co is 7.6% by weight or higher. In another embodiment, the % Co is 10.2% by weight or higher. In an embodiment, the % Co is 9.9% by weight or lower. In another embodiment, the % Co is 8.9% by weight or lower. In another embodiment, the % Co is 7.9% by weight or lower. In another embodiment, the % Co is 3.9% by weight or lower. In another embodiment, % Co is not intentionally present or present as a trace element only. In another embodiment, % Co is not present. For some applications manganese can be added. While a bit of % Mn can improve certain mechanical properties too much % Mn can lead to deterioration of mechanical properties. In an embodiment, the % Mn is 0.12% by weight or higher. In another embodiment, the % Mn is 0.31% by weight or higher. In another embodiment, the % Mn is 0.52% by weight or higher. In another embodiment, the % Mn is 0.61% by weight or higher. In another embodiment, the % Mn is 0.76% by weight or higher. In another embodiment, the % Mn is 1.2% by weight or higher. In an embodiment, the % Mn is 1.4% by weight or lower. In another embodiment, the % Mn is 0.9% by weight or lower. In another embodiment, the % Mn is 0.29% by weight or lower. In another embodiment, the % Mn is 0.09% by weight or lower. In another embodiment, % Mn is not intentionally present or present as a trace element only. In another embodiment, % Mn is not present. For some applications copper can be added. While a bit of % Cu can improve yield strength, too much % Cu can lead to deterioration of mechanical properties. In an embodiment, the % Cu is 0.12% by weight or higher. In another embodiment, the % Cu is 0.31% by weight or higher. In another embodiment, the % Cu is 0.52% by weight or higher. In another embodiment, the % Cu is 0.61% by weight or higher. In another embodiment, the % Cu is 0.76% by weight or higher. In another embodiment, the % Cu is 1.2% by weight or higher. In an embodiment, the % Cu is 1.4% by weight or lower. In another embodiment, the % Cu is 0.9% by weight or lower. In another embodiment, the % Cu is 0.29% by weight or lower. In another embodiment, the % Cu is 0.09% by weight or lower. In another embodiment, % Cu is not intentionally present or present as a trace element only. In another embodiment, % Cu is not present. For some applications silicon can be added. While a bit of % Si can improve certain mechanical properties too much % Si can lead to deterioration of mechanical properties. In an embodiment, the % Si is 0.12% by weight or higher. In another embodiment, the % Si is 0.31% by weight or higher. In another embodiment, the % Si is 0.52% by weight or higher. In another embodiment, the % Si is 0.61% by weight or higher. In another embodiment, the % Si is 0.76% by weight or higher. In another embodiment, the % Si is 1.2% by weight or higher. In another embodiment, the % Si is 1.4% by weight or lower. In an embodiment, the % Si is 0.9% by weight or lower. In another embodiment, the % Si is 0.29% by weight or lower. In another embodiment, the % Si is 0.09% by weight or lower. In another embodiment, % Si is not intentionally present or present as a trace element only. In another embodiment, % Si is not present. For some applications aluminum can be added. While a bit of % Al can improve the yield strength too much % Al can lead to deterioration of fracture toughness. In an embodiment, the % Al is 0.01% by weight or higher. In another embodiment, the % Al is 0.06% by weight or higher. In another embodiment, the % Al is 0.12% by weight or higher. In another embodiment, the % Al is 0.22% by weight or higher. In another embodiment, the % Al is 0.31% by weight or higher. In another embodiment, the % Al is 0.51% by weight or higher. In an embodiment, the % Al is 0.4% by weight or lower. In another embodiment, the % Al is 0.24% by weight or lower. In another embodiment, the % Al is 0.09% by weight or lower. In another embodiment, the % Al is 0.04% by weight or lower. In another embodiment, % Al is not intentionally present or present as a trace element only. In another embodiment, % Al is not present. For some applications niobium can be added. While a bit of % Nb can improve the yield strength too much % Nb can lead to deterioration of fracture toughness. In an embodiment, the % Nb is 0.01% by weight or higher. In another embodiment, the % Nb is 0.04% by weight or higher. In another embodiment, the % Nb is 0.06% by weight or higher. In another embodiment, the % Nb is 0.12% by weight or higher. In another embodiment, the % Nb is 0.22% by weight or higher. In another embodiment, the % Nb is 0.31% by weight or higher. In an embodiment, the % Nb is 0.29% by weight or lower. In another embodiment, the % Nb is 0.14% by weight or lower. In another embodiment, the % Nb is 0.09% by weight or lower. In another embodiment, the % Nb is 0.04% by weight or lower. In another embodiment, % Nb is not intentionally present or present as a trace element only. In another embodiment, % Nb is not present. For some applications cerium can be added. While a bit of % Ce can improve the toughness related properties by lowering the content of some harmful oxides, too much % Ce can lead to exactly the contrary. In an embodiment, the % Ce is 0.01% by weight or higher. In another embodiment, the % Ce is by weight 0.0006% by weight or higher. In another embodiment, the % Ce is 0.001% by weight or higher. In another embodiment, the % Ce is 0.006% by weight or higher. In another embodiment, the % Ce is 0.01% by weight or higher. In another embodiment, the % Ce is 0.12% by weight or higher. In another embodiment, the % Ce is 0.09% by weight or lower. In an embodiment, the % Ce is 0.04% by weight or lower. In another embodiment, the % Ce is 0.009% by weight or lower. In another embodiment, the % Ce is 0.004% by weight or lower. In another embodiment, the % Ce is 0.0009% by weight or lower. In another embodiment, % Ce is not intentionally present or present as a trace element only. In another embodiment, % Ce is not present. For some applications the sum % La+% Cs+% Nd+% Gd+% Pr+% Ac+% Th+% Tb+% Dy+% Ho+% Er+% Tm+% Yb+% Y+% Lu+% Sc+% Zr+% Hf can be added. While a bit of the sum of % La+% Cs+% Nd+% Gd+% Pr+% Ac+% Th+% Tb+% Dy+% Ho+% Er+% Tm+% Yb+% Y+% Lu+% Sc+% Zr+% Hf can improve the toughness related properties by lowering the content of some harmful oxides, too much the sum of % La+% Cs+% Nd+% Gd+% Pr+% Ac+% Th+% Tb+% Dy+% Ho+% Er+% Tm+% Yb+% Y+% Lu+% Sc+% Zr+% Hf can lead to exactly the contrary. In an embodiment, the sum of % La+% Cs+% Nd+% Gd+% Pr+% Ac+% Th+% Tb+% Dv+% Ho+% Er+% Tm+% Yb+% Y+% Lu+% Sc+% Zr+% Hf is 0.01% by weight or higher. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.0006% by weight or higher. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.001% or higher. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.006% by weight or higher. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.01% by weight or higher. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.12% by weight or higher. In an embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.09% by weight or lower. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.04% or lower. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.009% by weight or lower. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.004% by weight or lower. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is 0.0009% by weight or lower. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is not intentionally present or present as a trace element only. In another embodiment, the sum of % La+% Cs+% Nd+% Gd+% Pr+% Ac+% Th+% Tb+% Dy+% Ho+% Er+% Tm+% Yb+% Y+% Lu+% Sc+% Zr+% Hf is not present. For some applications the elements % C, % N, % P, % S, % O are very detrimental and should be kept as low as possible. In an embodiment, at least one of % C, % N, % P, % S, % O is 0.04% by weight or lower. In another embodiment, at least one of % C, % N, % P, % S, % O is 0.009% by weight or lower. In another embodiment, at least one of % C, % N, % P, % S, % O is 0.004% by weight or lower. In another embodiment, at least one of % C, % N, % P, % S, % O is 0.0019% by weight or lower. In another embodiment, at least one of % C, % N, % P, % S, % O is 0.0009% by weight or lower. In another embodiment, at least one of % C, % N, % P, % S, % O is 0.0004% by weight or lower. In another embodiment, at least one of % C, % N, % P, % S, % O is not intentionally present or present as a trace element only. In another embodiment, at least one of % C, % N, % P, % S, % O is not present. In an embodiment, % C is not present in the composition. In another embodiment, % C is a trace element. In an embodiment, % O is not present in the composition. In another embodiment, % O is a trace element. In an embodiment, % N is not present in the composition. In another embodiment, % N is a trace element. In an embodiment, % P is not present in the composition. In another embodiment, % P is a trace element. In an embodiment, % S is not present in the composition. In another embodiment, % S is a trace element. For some applications the elements % C, % N, % P, % S, % O are very detrimental and should be kept as low as possible. In an embodiment, each of % C, % N, % P, % S, % O is 0.04% by weight or lower. In another embodiment, each of % C, % N, % P, % S, % O is 0.009% by weight or lower. In another embodiment, each of % C, % N, % P, % S, % O is 0.004% by weight or lower. In another embodiment, each of % C, % N, % P, % S, % O is 0.0019% by weight or lower. In another embodiment, each of % C, % N, % P, % S, % O is 0.0009% by weight or lower. In another embodiment, each of % C, % N, % P, % S, % O is 0.0004% by weight or lower. In another embodiment, each of % C, % N, % P, % S, % O is not intentionally present or present as a trace element only. In another embodiment, each of % C, % N, % P, % S, % O is not present. For some applications the sum % C+% N+% P+% S+% O can be intentionally added. While a bit of the sum of % C+% N+% P+% S+% O can improve the mechanical strength related properties, too much the sum of % C+% N+% P+% S+% O can lead to massive deterioration of the fracture toughness. In an embodiment, the sum of % C+% N+% P+% S+% O is 0.01% by weight or higher. In an embodiment, the sum of % C+% N+% P+% S+% O is 0.0006% by weight or higher. In another embodiment, the sum of % C+% N+% P+% S+% O is 0.001% by weight or higher. In another embodiment, the sum of % C+% N+% P+% S+% O is 0.006% by weight or higher. In another embodiment, the sum of % C+% N+% P+% S+% O is 0.01% by weight or higher. In another embodiment, the sum of % C+% N+% P+% S+% O is 0.12% by weight or higher. In another embodiment, the sum of % C+% N+% P+% S+% O is 0.09% by weight or lower. In an embodiment, the sum of % C+% N+% P+% S+% O is 0.04% by weight or lower. In another embodiment, the sum of % C+% N+% P+% S+% O is 0.009% by weight or lower. In another embodiment, the sum of % C+% N+% P+% S+% O is 0.004% or lower. In another embodiment, the sum of % C+% N+% P+% S+% O is 0.0009% by weight or lower. In another embodiment, the sum of % C+% N+% P+% S+% O is not intentionally present or present as a trace element only. In an embodiment, the sum of % C+% N+% P+% S+% O is not present. For some applications the sum of % V+% Ta+% W can be added. While a bit of the sum of % V+% Ta+% W can improve the wear resistance related properties, too much the sum of % V+% Ta+% W can lead to deterioration of the toughness related properties. In an embodiment, the sum of % V+% Ta+% W is 0.06% by weight or higher. In another embodiment, the sum of % V+% Ta+% W is 0.12% by weight or higher. In another embodiment, the sum of % V+% Ta+% W is 0.22% by weight or higher. In another embodiment, the sum of % V+% Ta+% W is 0.32% by weight or higher. In another embodiment, the sum of % V+% Ta+% W is 0.42% by weight or higher. In another embodiment, the sum of % V+% Ta+% W is 0.52% by weight or higher. In an embodiment, the sum of % V+% Ta+% W is 0.49% by weight or lower. In another embodiment, the sum of % V+% Ta+% W is 0.24% by weight or lower. In another embodiment, the sum of % V+% Ta+% W is 0.14% by weight or lower. In another embodiment, the sum of % V+% Ta+% W is 0.09% by weight or lower. In another embodiment, the sum of % V+% Ta+% W is 0.009% by weight or lower. In another embodiment, the sum of % V+% Ta+% W is not intentionally present or present as a trace element only. In another embodiment, the sum of % V+% Ta+% W is not present. In an embodiment, % V is not present in the composition. In an embodiment, % V is a trace element. In an embodiment, % Ta is not present in the composition. In an embodiment, % Ta is a trace element. In an embodiment, % W is not present in the composition. In an embodiment, % W is a trace element.

In an embodiment, the material is solution annealed by heating to a temperature of 980° C.±TOL holding for enough time and quenching. In an embodiment, TOL are 5° C. In another embodiment, TOL are 10° C. In another embodiment, TOL are 15° C. In another embodiment, TOL are 25° C. In another embodiment, TOL are 35° C. In an embodiment, enough time is 10 minutes or more. In another embodiment, enough time is half an hour or more. In another embodiment, enough time is an hour or more. In another embodiment, enough time is two hours or more. In another embodiment, enough time is four hours or more. In an embodiment, the material is subzero treated after quenching at a low enough temperature for long enough time. In an embodiment, a low enough temperature is −25° C. or less. In another embodiment, a low enough temperature is −50° C. or less. In another embodiment, a low enough temperature is −75° C. or less. In another embodiment, a low enough temperature is −100° C. or less. In an embodiment, a long enough time is 10 minutes or more. In another embodiment, a long enough time is one hour or more. In another embodiment, a long enough time is 4 hours or more. In another embodiment, a long enough time is 8 hours or more. In another embodiment, a long enough time is 16 hours or more. In an embodiment, the material is age hardened by holding it at the right temperature for the appropriate time and then cooling. In an embodiment, the right temperature is 480° C.±TOL. In another embodiment, the right temperature is 510° C.±TOL. In another embodiment, the right temperature is 540° C.±TOL. In an embodiment, the right temperature is 565° C.±TOL. In another embodiment, the right temperature is 590° C.±TOL. In another embodiment, the right temperature is 620° C.±TOL. In an embodiment, TOL are 2° C. In an embodiment, TOL are 5° C. In another embodiment, TOL are 7° C. In another embodiment, TOL are 12° C. In an embodiment, the appropriate time is one hour or more. In another embodiment, the appropriate time is 2 hours or more. In another embodiment, the appropriate time is 4 hours or more. In another embodiment, the appropriate time is 6 hours or more. In another embodiment, the appropriate time is 8 hours or more. For some applications excessive aging time is not recommendable. In an embodiment, the appropriate time is 12 hours or less. In another embodiment, the appropriate time is 10 hours or less. In another embodiment, the appropriate time is 8 hours or less. In another embodiment, the appropriate time is 6 hours or less. In an embodiment, the material is cold worked with a 22% reduction or more previous to the aging treatment previously described. In another embodiment, the material is cold worked with a 31% reduction or more previous to the aging treatment previously described. In another embodiment, the material is cold worked with a 71% reduction or more previous to the aging treatment previously described. In an embodiment, the material is the manufactured component.

In an embodiment, the material described above is locally segregated as a result of having manufactured through a mixture of powders of different composition with carefully chosen composition and size and intentionally not having allowed enough time for full homogenization. This which would normally be considered a defect on the material has surprisingly given a higher performance material in some applications, in particular those involving counterparts with big abrasive particles. In an embodiment, there is relevant segregation in large enough areas of significant elements. In an embodiment, for segregation to be relevant when dividing the weight percentage of the rich area in the significant element through the weight percentage of the poor are in the significant element a value exceeding 1.06 is obtained. In another embodiment, the value exceeds 1.12. In another embodiment, the value exceeds 1.26. In another embodiment, the value exceeds 1.56. In another embodiment, the value exceeds 2.12. In another embodiment, a large enough area is any area exceeding 26 square microns. In an embodiment, a large enough area is any area exceeding 56 square microns. In another embodiment, a large enough area is any area exceeding 86 square microns. In another embodiment, a large enough area is any area exceeding 126 square microns. In another embodiment, a large enough area is any area exceeding 260 square microns. In an embodiment, a significant element is % Cr. In an embodiment, a significant element is % Ni. In an embodiment, a significant element is % Ti. In an embodiment, a significant element is % Co. In an embodiment, a significant element is % Mo. Obviously, some applications benefit from not having relevant segregation in the material. In an embodiment, a rich area in a significant element is an area wherein the element is at least 2.3% by weight or more. In another embodiment, a rich area in a significant element is an area wherein the element is at least 5.3% by weight or more and even 10.4% by weight or more. In an embodiment, a poor area in a significant element is an area wherein the significant element is 1.29% by weight or less. In another embodiment, a poor area in a significant element is an area wherein the significant element is 0.59% by weight or less and even 0.29% by weight or less.

In an embodiment, any material described in this document is locally segregated as a result of having manufactured through a mixture of powders of different composition with carefully chosen composition and size and intentionally not having allowed enough time for full homogenization. This which would normally be considered a defect on the material has surprisingly given a higher performance material in some applications. In an embodiment, there is relevant segregation in large enough areas of significant elements. In an embodiment, for segregation to be relevant when dividing the weight percentage of the rich area in the significant element through the weight percentage of the poor are in the significant element a value exceeding 1.06 is obtained. In another embodiment, the value exceeds 1.12. In another embodiment, the value exceeds 1.26. In another embodiment, the value exceeds 1.56. In another embodiment, the value exceeds 2.12. In an embodiment, a large enough area is any area exceeding 26 square microns. In another embodiment, a large enough area is any area exceeding 56 square microns. In another embodiment, a large enough area is any area exceeding 86 square microns. In another embodiment, a large enough area is any area exceeding 126 square microns. In another embodiment, a large enough area is any area exceeding 260 square microns. In an embodiment, a significant element is an element chosen from all the elements present in an amount of 0.3% by weight or more. In another embodiment, a significant element is an element chosen from all the elements present in an amount of 0.6% by weight or more. In another embodiment, a significant element is an element chosen from all the elements present in an amount of 1.3% by weight or more. In another embodiment, a significant element is an element chosen from all the elements present in an amount of 2.3% by weight or more. In another embodiment, a significant element is an element chosen from all the elements present in an amount of 5.3% by weight or more. In another embodiment, a significant element is an element chosen from all the elements present in an amount of 10.3% by weight or more. Obviously, some applications benefit from not having relevant segregation in the material.

As has already been mentioned several times in this document: in this entire document when the values or a range of a composition for an element start at 0 [example: % Ti: 0-3.4], or the content of the element is expressed as smaller than a certain value "<" [example: % C<0.29] in both cases the number 0 is to be expected in some embodiments. In some embodiments, it is a nominal "0" that means the element might just be present as an undesirable trace element or impurity. In some embodiments, the element might also be absent. This arises another important aspect, since many documents in the literature, unaware of the technical effect of having a particular element under a certain critical threshold, mention that element as potentially "0" or "<" but the real content is either not measured, because of the unawareness of its technical effect when present in specially low levels, or always at rather high values when measured (difference of nominal "0" and absence, or critical threshold values for doping elements having a technical effect when present at low levels).

In all the embodiments of this document, where a particular definition is employed for terminology, there is an additional embodiment, which is identical but uses the literature definition of the terminology (this is referred here and not in every terminology definition for the sake of extension).

Some powder mixtures developed by the inventor in the present invention might constitute an invention on their own. The powder mixtures can be used in the manufacturing method of the present invention or other manufacturing methods (for example: HIP, CIP, Laser Cladding, Metal AM, . . . ). Some applications require complex geometries, often large components, and are very susceptible to any kind of internal defects derived from the manufacturing. Moreover, some of those applications require a good compromise of stress corrosion cracking and yield strength, often at a given working temperature, and often also require a high wear resistance in the optimized compromise. To make matters worse, some of those applications require components with a good optical appearance even when working in very harsh environments. Some of those applications are tooling applications, requiring a tool material. To solve these technical challenges, some novel mixtures were developed. In an embodiment, a mixture of at least two powders is made with one powder (P1) comprising the following elements and limitations all percentages being indicated in weight percent: % Fe: 32-89; % Cr: 8.6-24.9; % Ni: 2.2-19.8; % Mo: 0-6.9; % Ti: 0-3.4; % Co: 0-18; % Cu: 0-6.9; % Mn: 0-1.9; % Si: 0-1.9; % Al: 0-0.8; % S<0.1; % P<0.1; % Nb: 0-0.98; % Ta: 0-0.98; % W: 0-0.9; % V: 0-0.8; % B: 0-2.9; % O<0.4; % N<0.24; % C<0.29 and another powder (P2) comprising the following elements and limitations, all percentages being indicated in weight percent: % Fe: 86-99.9999; % Cu<9; % C<1.4; % Mn<2.9; % Mo<2.9; % Ni<9; %0<0.4; % S<0.1; % P<0.1. In an embodiment, P1 has the following additional limitations, all percentages being indicated in weight percent: % Fe: 51-84; % Cr: 9.6-19.8; % Ni: 2.6-14.8; % Mo: 0-3.9; % Ti: 0-2.4; % Co: 0-11.8; % Cu: 0-4.9; % Mn: 0-0.9; % Si: 0-0.9; % Al: 0-0.49; % S<0.04; % P<0.04; % Nb: 0-0.48; % Ta: 0-0.48; % W: 0-0.4; % V: 0-0.09; % B: 0-0.9; %0<0.29; % N<0.09; % C<0.14. In an embodiment, P1 and P2 further comprise trace elements (same definition as in another section of this document applies). In an embodiment, all trace elements (the sum of all trace elements) are less than a 1.9% by weight. In another embodiment, all trace elements are less than a 0.9% by weight. In another embodiment, all trace elements are less than a 0.4% by weight. In another embodiment, all trace elements are less than a 0.9% by weight. In another embodiment, all trace elements are less than a 0.09% by weight. In different embodiments, each trace element individually is less than a 1.9% by weight, less than a 0.9% by weight, less than a 0.4% by weight, less than a 0.9% by weight, and even less than a 0.09% by weight. In an embodiment, the % Fe of P1 is 62% by weight or more. In another embodiment, the % Fe of P1 is 71% by weight or more. In an embodiment, the % Fe of P1 is 79% by weight or less. In another embodiment, the % Fe of P1 is 74% by weight or less. In another embodiment, the % Fe of P1 is 69% by weight or less. In an embodiment, the % Cr of P1 is 10.1% by weight or more. In another embodiment, the % Cr of P1 is 10.1% by weight or more. In another embodiment, the % Cr of P1 is 11.1% by weight or more. In another embodiment, the % Cr of P1 is 14.1% by weight or more. In another embodiment, the % Cr of P1 is 16.1% by weight or more. In an embodiment, the % Cr of P1 is 15.9% by weight or less. In another embodiment, the % Cr of P1 is 13.9% by weight or less. In another embodiment, the % Cr of P1 is 12.9% by weight or less. In another embodiment, the % Cr of P1 is 11.9% by weight or less. In an embodiment, the % Ni of P1 is 3.1% by weight or more. In another embodiment, the % Ni of P1 is 7.1% by weight or more. In another embodiment, the % Ni of P1 is 9.1% by weight or more. In another embodiment, the % Ni of P1 is 10.1% by weight or more. In an embodiment, the % Ni of P1 is 12.9% by weight or less. In another embodiment, the % Ni of P1 is 11.9% by weight or less. In another embodiment, the % Ni of P1 is 9.9% by weight or less. In another embodiment, the % Ni of P1 is 8.9% by weight or less. In another embodiment, the % Ni of P1 is 5.9% by weight or less. In an embodiment, the % Co of P1 is 1.2% by weight or more. In another embodiment, the % Co of P1 is 3.2% by weight or more. In another embodiment, the % Co of P1 is 6.2% by weight or more. In an embodiment, the % Co of P1 is 9.9% by weight or less. In another embodiment, the % Co of P1 is 7.9% by weight or less. In another embodiment, the % Co of P1 is 1.2% by weight or more. In an embodiment, the % Ti of P1 is 0.1% by weight or more. In another embodiment, the % Ti of P1 is 0.52% by weight or more. In another embodiment, the % Ti of P1 is 1.2% by weight or more. In another embodiment, the % Ti of P1 is 1.52% by weight or more. In another embodiment, the % Ti of P1 is 2.1% by weight or more. In an embodiment, the % Ti of P1 is 1.9 by weight or less. In another embodiment, the % Ti of P1 is 1.79 by weight or less. In another embodiment, the % Ti of P1 is 0.9 by weight or less. In an embodiment, the % Mo of P1 is 0.2% by weight or more. In another embodiment, the % Mo of P1 is 1.2% by weight or more. In another embodiment, the % Mo of P1 is 2.2% by weight or more. In another embodiment, the % Mo of P1 is 3.1% or more. In an embodiment, the % Mo of P1 is 2.9% by weight or less. In another embodiment, the % Mo of P1 is 1.9% by weight or less. In another embodiment, the % Mo of P1 is 0.4% by weight or less. In an embodiment, the % B of P1 is 42 ppm or more. In another embodiment, the % B of P1 is 112 ppm by weight or more. In another embodiment, the % B of P1 is 0.12% by weight or more. In another embodiment, the % B of P1 is 0.52% by weight or more. In an embodiment, the % B of P1 is 0.49 by weight or less. In another embodiment, the % B of P1 is 0.19% by weight or less. In another embodiment, the % B of P1 is 420 ppm by weight or less. In another embodiment, the % B of P1 is 90 ppm by weight or less. In another embodiment, the % B of P1 is 9 ppm or less. In another embodiment, the % B of P1 is 0.9 ppm by weight or less. In an embodiment, the % Cu of P1 is 1.2% by weight or more. In another embodiment, the % Cu of P1 is 2.2% by weight or more. In an embodiment, the % Cu of P1 is 0.9% or less. In another embodiment, the % Cu of P1 is 0.2% by weight or less. In another embodiment, the % Cu of P1 is 0.009 by weight or less. In an embodiment, the % Al of P1 is 0.2 by weight or more. In another embodiment, the % Al of P1 is 0.55% by weight or more. In an embodiment, the % Al of P1 is 0.09% by weight or less. In an embodiment, the % Nb of P1 is 0.16% by weight or more. In an embodiment, the % Nb of P1 is 0.14% by weight or less. In another embodiment, the % Nb of P1 is 0.09% by weight or less. In an embodiment, the % Ta of P1 is 0.16% by weight or more. In an embodiment, the % Ta of P1 is 0.14% by weight or less. In another embodiment, the % Ta of P1 is 0.09% by weight or less. In an embodiment, % Ta and % Nb can replace each other, so all that has been said for % Ta can be said for the sum: % Ta+% Nb. In an embodiment, the % Mn of P1 is 0.16% by weight or more. In an embodiment, the % Mn of P1 is 0.49% by weight or less. In another embodiment, the % Mn of P1 is 0.09% by weight or less. In an embodiment, the % Si of P1 is 0.16% by weight or more. In an embodiment, the % Si of P1 is 0.49% by weight or less. In another embodiment, the % Si of P1 is 0.09% by weight or less. In an embodiment, the % V of P1 is 0.06% by weight or more. In an embodiment, the % V of P1 is 0.49% by weight or less. In another embodiment, the % V of P1 is 0.07% by weight or less. In an embodiment, the % W of P1 is 0.06% by weight or more. In an embodiment, the % W of P1 is 0.19% by weight or less. In another embodiment, the % W of P1 is 0.09% by weight or less. In an embodiment, the % C of P1 is 0.19% by weight or less. In another embodiment, the % C of P1 is 0.09% by weight or less. In another embodiment, the % C of P1 is 0.03% by weight or less. In an embodiment, the % O of P1 is 0.18% by weight or less. In another embodiment, the % O of P1 is 0.09% by weight or less. In an embodiment, the % S of P1 is 0.009% by weight or less. In an embodiment, the % P of P1 is 0.009% by weight or less. In an embodiment, the % N of P1 is 0.29% by weight or less. In another embodiment, the % N of P1 is 0.09% by weight or less. In another embodiment, the % N of P1 is 0.009% by weight or less. In an embodiment, the % Sn of P1 is 0.04% by weight or less. In another embodiment, the % Sn of P1 is 0.009% by weight or less. In another embodiment, the % Sn of P1 is 0.0009% by weight or less. In an embodiment, the % Sb of P1 is 0.009 by weight or less. In another embodiment, the % Sb of P1 is 0.004% by weight or less. In another embodiment, the % Sb of P1 is 0.0009% by weight or less. In an embodiment, the % As of P1 is 0.04% by weight or less. In another embodiment, the % As of P1 is 0.009% by weight or less. In another embodiment, the % As of P1 is 0.0009% by weight or less. It has been found that some elements considered rather detrimental, can surprisingly positively contribute to the obtaining of sound components specially when they have complex geometries and/or are large in size. In an embodiment, the content of at least one element amongst % C, % O, % N, % S and % P of P2 is 0.001% by weight or more. In an embodiment, the content of at least two elements amongst % C, % O, % N, % S and % P of P2 is 0.0006% by weight or more. In an embodiment, the content of at least two elements amongst % C, % N, % S and % P of P2 is 0.0014% by weight or more. In another embodiment, the content of at least three elements amongst % C, % O, % N, % S and % P of P2 is 0.00014% by weight or more. It has been found that some elements considered rather detrimental, can surprisingly positively contribute to the strength related properties. In an embodiment, the content of at least one element amongst % Sn, % Sb and % As of P2 is 0.001% by weight or more. In an embodiment, the content of at least two elements amongst % Sn, % Sb and % As of P2 is 0.0001% by weight or more. In another embodiment, the content of at least two elements amongst % C, % N, % S and % P of P2 is 0.0024% by weight or more. In an embodiment, besides the limitations already expressed P1 only has trace elements (same definition as in another section of this document applies). In an embodiment, P2 has the following additional limitations, all percentages being indicated in weight percent: % Fe: 92-99.9999; % Cu<1.9; % C<0.09; % Mn<0.8; % Mo<0.4; % Ni<1.9; %0<0.29; % S<0.009; % P<0.009. In an embodiment, the % Fe of P2 is 96.2% by weight or more. In another embodiment, the % Fe of P2 is 99.2% by weight or more. In another embodiment, the % Fe of P2 is 99.6% by weight or more. In an embodiment, the % Cu of P2 is 0.9% by weight or less. In another embodiment, the % Cu of P2 is 0.09% by weight or less. In an embodiment, the % Mo of P2 is 0.49% by weight or less. In another embodiment, the % Mo of P2 is 0.09% by weight or less. In an embodiment, the % Mn of P2 is 0.39% by weight or less. In another embodiment, the % Mn of P2 is 0.14% by weight or less. In another embodiment, the % Mn of P2 is 0.09% by weight or less. In an embodiment, the % Ni of P2 is 0.9% by weight or less. In another embodiment, the % Ni of P2 is 0.09% by weight or less. In an embodiment, the % Cr of P2 is 0.8% by weight or less. In another embodiment, the % Cr of P2 is 0.09% by weight or less. In an embodiment, the % C of P2 is 0.49% by weight or less. In another embodiment, the % C of P2 is 0.09% by weight or less. In another embodiment, the % C of P2 is 0.03% by weight or less. In an embodiment, the % O of P2 is 0.18% by weight or less. In another embodiment, the % O of P2 is 0.09% by weight or less. In an embodiment, the % S of P2 is 0.009% by weight or less. In an embodiment, the % P of P2 is 0.009% by weight or less. In an embodiment, the % N of P2 is 0.29% by weight or less. In another embodiment, the % N of P2 is 0.09% by weight or less. In another embodiment, the % N of P2 is 0.009% by weight or less. In an embodiment, the % Sn of P2 is 0.04% by weight or less. In another embodiment, the % Sn of P2 is 0.009% by weight or less. In another embodiment, the % Sn of P2 is 0.0009% by weight or less. In an embodiment, the % Sb of P2 is 0.009% by weight or less. In another embodiment, the % Sb of P2 is 0.004% by weight or less. In another embodiment, the % Sb of P2 is 0.0009% by weight or less. In an embodiment, the % As of P2 is 0.04% by weight or less. In another embodiment, the % As of P2 is 0.009% by weight or less. In another embodiment, the % As of P2 is 0.0009% by weight or less. It has been found that some elements considered rather detrimental, can surprisingly positively affect the strength related mechanical properties without massively deteriorating any other relevant property. In an embodiment, the content of at least one element amongst % Mn, % Ni, % O, % Cu and % Cr of P2 is 0.01% by weight or more. In an embodiment, the content of at least two elements amongst % Mn, % Ni, % O, % Cu and % Cr of P2 is 0.003% by weight or more. In another embodiment, the content of at least two elements amongst % Mn, % Ni, % O, % Cu and % Cr of P2 is 0.01% by weight or more. In an embodiment, the content of at least four elements amongst % Mn, % Ni, % O, % Cu, % Mo and % Cr of P2 is 0.01% by weight or more. It has been found that some elements considered rather detrimental, can surprisingly positively contribute to the obtaining of sound components specially when they have complex geometries and/or are large in size. In an embodiment, the content of at least one element amongst % C, % N, % S and % P of P2 is 0.001% by weight or more. In an embodiment, the content of at least two elements amongst % C, % N, % S and % P of P2 is 0.0006% by weight or more. In another embodiment, the content of at least two elements amongst % C, % N, % S and % P of P2 is 0.0014% by weight or more. In an embodiment, the content of at least three elements amongst % C, % N, % S and % P of P2 is 0.00014% by weight or more. It has been found that some elements considered rather detrimental, can surprisingly positively contribute to the strength related properties. In an embodiment, the content of at least one element amongst % Sn, % Sb and % As of P2 is 0.001% by weight or more. In an embodiment, the content of at least two elements amongst % Sn, % Sb and % As of P2 is 0.0001% by weight or more. In an embodiment, the content of at least two elements amongst % C, % N, % S and % P of P2 is 0.0024% by weight or more. In an embodiment, besides the already described limitations, P2 has only trace elements (same definition as in another section of this document applies). In an embodiment, in the preceding mixture, at least one more powder is present (P3). In an embodiment, in the preceding mixture, at least one more powder is present (P4). In an embodiment, in the preceding mixture, at least one more powder is present (P5). In an embodiment, P3, P4 and/or P5 have substantially more % Cr than P1. In an embodiment, P3, P4 and/or P5 have substantially more % Ni than P1. In an embodiment, P3, P4 and/or P5 have substantially more % Mo than P1. In an embodiment, P3, P4 and/or P5 have substantially more % Ti than P1. In an embodiment, P3, P4 and/or P5 have substantially more % Co than P1. In an embodiment, P3, P4 and/or P5 have substantially more % Cu than P1. In an embodiment, P3, P4 and/or P5 have substantially more % Ta than P1. In an embodiment, P3, P4 and/or P5 have substantially more % Nb than P1. In an embodiment, P3, P4 and/or P5 have substantially more % O than P1. In an embodiment, P3, P4 and/or P5 have substantially more % N than P1. In an embodiment, P1 has substantially more % O than at least one of P3, P4 and/or P5. In an embodiment, P1 has substantially more % N than at least one of P3, P4 and/or P5. In an embodiment, P3, P4 and/or P5 have substantially more % S than P1. In an embodiment, P3, P4 and/or P5 have substantially more % P than P1. In an embodiment, P1 has substantially more % S than at least one of P3, P4 and/or P5. In an embodiment, P1 has substantially more % P than at least one of P3, P4 and/or P5. In an embodiment, at least one of the powders of the mixture comprises % Y, % Sc, and/or % REE. In an embodiment, at least one of the powders of the mixture comprises % Y. In an embodiment, at least one of the powders of the mixture comprises % Sc. In an embodiment, at least one of the powders of the mixture comprises % REE. In an embodiment, the powder mixture comprises % Y. In an embodiment the % Y is above 0.012% by weight. In another embodiment the % Y is above 0.052. In another embodiment, the % Y is above 0.12. In another embodiment the % Y is above 0.22. In another embodiment the % Y is above 0.42. In another embodiment the % Y is above 0.82. In another embodiment, the % Y is below 1.4. In another embodiment, the % Y is below 0.96. In another embodiment, the % Y is below 0.74. In another embodiment, the % Y is below 0.48. In an embodiment, the powder mixture comprises % Sc. In an embodiment, the % Sc is above 0.012% by weight. In another embodiment, the % Sc is above 0.052 In another embodiment, the % Sc is above 0.12. In another embodiment, the % Sc is above 0.22. In another embodiment, the % Sc is above 0.42. In another embodiment, the % Sc is above 0.82. In another embodiment, the % Sc is below 1.4. In another embodiment the % Sc is below 0.96. In another embodiment, the % Sc is below 0.74. In another embodiment, the % Sc is below 0.48. In an embodiment, the powder mixture comprises % Sc+% Y. In an embodiment the % Sc+% Y is above 0.012% by weight. In another embodiment, the % Sc+% Y is above 0.052. In another embodiment, the % Sc+% Y is above 0.12. In another embodiment, the % Sc+% Y is above 0.22. In another embodiment, the % Sc+% Y is above 0.42. In another embodiment, the % Sc+% Y is above 0.82. In another embodiment, the % Sc+% Y is below 1.4. In another embodiment, the % Sc+% Y is below 0.96. In another embodiment, the % Sc+% Y is below 0.74. In another embodiment, the % Sc+% Y is below 0.48. In an embodiment, the powder mixture comprises % REE. In an embodiment the % REE is above 0.012% by weight. In another embodiment, the % REE is above 0.052. In another embodiment the % REE is above 0.12. In another embodiment, the % REE is above 0.0.22. In another embodiment the % REE is above 0.42. In another embodiment, the % REE is above 0.82. In another embodiment the % REE is below 1.4. In another embodiment, the %% REE is below 0.96. In another embodiment the % REE is below 0.74. In another embodiment, the % REE is below 0.48. In an embodiment, the powder mixture comprises % Sc+% Y+% REE. In an embodiment the % Sc+% Y+% REE is above 0.012% by weight. In another embodiment, the % Sc+% Y+% REE is above 0.052. In another embodiment, the % Sc+% Y+% REE is above 0.12. In another embodiment, the % Sc+% Y+% REE is above 0.22. In another embodiment, the % Sc+% Y+% REE is above 0.42. In another embodiment, the % Sc+% Y+% REE is above 0.82. In another embodiment, the % Sc+% Y+% REE is below 1.4. In another embodiment, the % Sc+% Y+% REE is below 0.96. In another embodiment, the % Sc+% Y+% REE is below 0.74. In another embodiment, the % Sc+% Y+% REE is below 0.48. In an embodiment, the powder mixture comprises % O. In another embodiment, the % O of the mixture is above 8 ppm. In another embodiment the % O is above 22 ppm. In another embodiment, the % O of the mixture is above 110 ppm. In another embodiment the % O is above 210 ppm. In another embodiment the % O of the mixture is above 510 ppm. In another embodiment, the % O of the mixture is above 1010 ppm. In another embodiment, the % O of the mixture is below 2990 ppm. In another embodiment, the % O is below 1900 ppm. In another embodiment, the % O of the mixture is below 900 ppm. In another embodiment, the % O of the mixture is below 490 ppm. In some applications it has been found that the relation between % O and the sum of % Y+% Sc or alternatively % Y or alternatively % Y+% Sc+% REE has to be controlled for optimum mechanical properties of the final component (in this case percentages are atomic percentages). In an embodiment, KYO1*atm % O<atm % Y<KYO2*atm % O has to be met wherein atm % O means atomic percentage of oxygen (% O) and atm % Y means atomic percentage of yttrium (% Y). In an embodiment, KYO1*atm % O<atm % Y+atm % Sc<KYO2*atm % O. In an embodiment, KYO1*atm % O<atm % Y+atm % Sc+atm % REE<KYO2*atm % O. In another embodiment, KYO1 is 0.01. In another embodiment, KYO1 is 0.1. In another embodiment, KYO1 is 0.2. In another embodiment, KYO1 is 0.4. In another embodiment, KYO1 is 0.6. In another embodiment, KYO1 is 0.7. In another embodiment, KYO2 is 0.5. In another embodiment, KYO2 is 0.66. In another embodiment, KYO2 is 0.75. In another embodiment, KYO2 is 0.85. In another embodiment, KYO2 is 1. In another embodiment, KYO2 is 5. The inventor has found that the above disclosed for % Y, % Sc and/or % O can also be applied in the cases wherein there is one single pre-alloyed powder (P1 as a single powder). The inventor has found that the presence of at least one powder comprising % Y, % Sc and/or % REE in the mixture may be particularly interesting for powders comprising a % Fe content above 90% by weight. The inventor has found that in some applications to preserve the effect of the addition of % Y, % Sc and/or % REE the levels of % P, % S and/or % Ni+% Cu should be controlled. In an embodiment, the % P is 0.001% by weight or higher. In another embodiment, the % P is 0.01% by weight or higher. In another embodiment, the % P is 0.09% or higher. In some applications the maximum content should be controlled. In an embodiment, the % P is 0.2% by weight or lower. In another embodiment, the % P is 0.14% by weight or lower. In an embodiment, the % S is 0.0001% by weight or higher. In another embodiment, the % S is 0.009% by weight or higher. In another embodiment, the % S is 0.01% by weight or higher. In some applications the maximum content should be controlled. In an embodiment, the % S is 0.05% by weight or lower. In another embodiment, the % S is 0.03% by weight or lower. In an embodiment, the % Cu+% Ni is 0.01% by weight or higher. In another embodiment, the % Cu+% Ni is 0.09% by weight or higher. In another embodiment, the % Cu+% Ni is 0.26% by weight or higher. In some applications the maximum content should be controlled. In an embodiment, the % Cu+% Ni is 0.7% by weight or lower. In another embodiment, the % Cu+% Ni is 0.44% by weight or lower. The inventor has found that in some applications to facilitate the mixture, more powders can be used, provided that the final theorical composition of the powder mixture is the same that the sum of all the powders (P1 to P5). In some applications it has been seen to be advantageous to split the alloying of one of the powders in 2 or more powders, in some instances there may be more than 5 powders, but the addition of the alloying of at least one of those powders would correspond to one of the powders described above P1-P5. In an embodiment, the theorical composition of the powder mixture (the sum of the compositions of all the powders contained in the powder mixture) has the following elements and limitations, all percentages being indicated in weight percent: % C: 0.25-0.8; Mn: 0-1.15; % Si: 0-0.35; Cr: 0.1 max; % Mo: 1.5-6.5; % V: 0-0.6; % W: 0-4; Ni: 0-4; % Co: 0-3; balance Fe and trace elements. In an embodiment, the % C is above 0.31% by weight. In another embodiment, the % C is above 0.36% by weight. In an embodiment, the % C is below 0.69% by weight. In another embodiment, the % C is below 0.48% by weight. In an embodiment, the % Mn is above 0.16% by weight. In another embodiment, the % Mn is above 0.21% by weight. In an embodiment, the % Mn is below 1.18% by weight. In another embodiment, the % Mn is below 0.94% by weight. In an embodiment, the % Si is above 0.01% by weight. In another embodiment, the % Si is above 0.12% by weight. In an embodiment, the % Si is below 0.52% by weight. In another embodiment, the % Si is below 0.27% by weight. In an embodiment, the % Cr is above 0.0016% by weight. In another embodiment, the % Cr is above 0.0021% by weight. In an embodiment, the % Cr is below 0.09% by weight. In another embodiment, the % Cr is below 0.04% by weight. In an embodiment, the % Mo is above 1.86% by weight. In another embodiment, the % Mo is above 2.1% by weight. In an embodiment, the % Mo is below 4.9% by weight. In another embodiment, the % Mo is below 3.4% by weight. In an embodiment, the % V is above 0.12% by weight. In another embodiment, the % V is above 0.21% by weight. In an embodiment, the % V is below 0.48% by weight. In another embodiment, the % V is below 0.23% by weight. In an embodiment, the % W is above 0.28% by weight. In another embodiment, the % W is above 0.66% by weight. In an embodiment, the % W is below 3.4% by weight. In another embodiment, the % W is below 2.9% by weight. In an embodiment, the % Ni is above 0.32% by weight. In another embodiment, the % Ni is above 0.56% by weight. In an embodiment, the % Ni is below 3.9% by weight. In another embodiment, the % Ni is below 3.4% by weight. In an embodiment, the % Co is above 0.08% by weight. In another embodiment, the % Co is above 0.16% by weight. In an embodiment, the % Co is below 2.4% by weight. In another embodiment, the % Co is below 1.9% by weight. In another embodiment, the theorical composition of the powder mixture (the sum of the compositions of all the powders contained in the powder mixture) has the following elements and limitations, all percentages being indicated in weight percent: % C: 0.25-0.55; % Mn: 0.10-1.2; % Si: 0.10-1.20; % Cr: 2.5-5.50; % Mo: 1.00-3.30;

% V: 0.30-1.20; balance Fe and trace elements. In an embodiment, the % C is above 0.31% by weight. In another embodiment, the % C is above 0.36% by weight. In an embodiment, the % C is below 0.49% by weight. In another embodiment, the % C is below 0.28% by weight. In an embodiment, the % Mn is above 0.16% by weight. In another embodiment, the % Mn is above 0.26% by weight. In an embodiment, the % Mn is below 0.96% by weight. In another embodiment, the % Mn is below 0.46% by weight. In an embodiment, the % Si is above 0.16% by weight. In another embodiment, the % Si is above 0.22% by weight. In an embodiment, the % Si is below 0.94% by weight. In another embodiment, the % Si is below 0.48% by weight. In an embodiment, the % Cr is above 2.86% by weight. In another embodiment, the % Cr is above 3.16% by weight. In an embodiment, the % Cr is below 4.9% by weight. In another embodiment, the % Cr is below 3.4% by weight. In an embodiment, the % Mo is above 1.16% by weight. In another embodiment, the % Mo is above 1.66% by weight. In an embodiment, the % Mo is below 2.9% by weight. In another embodiment, the % Mo is below 2.4% by weight. In an embodiment, the % V is above 0.42% by weight. In another embodiment, the % V is above 0.61% by weight. In an embodiment, the % V is below 0.98% by weight. In another embodiment, the % V is below 0.64% by weight. In another embodiment, the theorical composition of the powder mixture (the sum of the compositions of all the powders contained in the powder mixture) has the following elements and limitations, all percentages being indicated in weight percent: % C: 0.15-2.35; % Mn: 0.10-2.5; % Si: 0.10-1.0; % Cr: 0.2-17.50; % Mo: 0-1.4; % V: 0-1; % W: 0-2.2; % Ni: 0-4.3; balance Fe and trace elements. In an embodiment, the % C is above 0.21% by weight. In another embodiment, the % C is above 0.42% by weight. In an embodiment, the % C is below 1.94% by weight. In another embodiment, the % C is below 1.48% by weight. In an embodiment, the % Mn is above 0.18% by weight. In another embodiment, the % Mn is above 0.26% by weight. In an embodiment, the % Mn is below 1.96% by weight. In another embodiment, the % Mn is below 1.46% by weight. In an embodiment, the % Si is above 0.16% by weight. In another embodiment, the % Si is above 0.22% by weight. In an embodiment, the % Si is below 0.94% by weight. In another embodiment, the % Si is below 0.48% by weight. In an embodiment, the % Cr is above 0.56% by weight. In another embodiment, the % Cr is above 1.12% by weight. In an embodiment, the % Cr is below 9.8% by weight. In another embodiment, the % Cr is below 6.4% by weight. In an embodiment, the % Mo is above 0.17% by weight. In another embodiment, the % Mo is above 0.56% by weight. In an embodiment, the % Mo is below 0.9% by weight. In another embodiment, the % Mo is below 0.68% by weight. In an embodiment, the % V is above 0.12% by weight. In another embodiment, the % V is above 0.21% by weight. In an embodiment, the % V is below 0.94% by weight. In another embodiment, the % V is below 0.59% by weight. In an embodiment, the % W is above 0.18% by weight. In another embodiment, the % W is above 0.56% by weight. In an embodiment, the % W is below 1.92% by weight. In another embodiment, the % W is below 1.44% by weight. In an embodiment, the % Ni is above 0.02% by weight. In another embodiment, the % Ni is above 0.26% by weight. In an embodiment, the % Ni is below 3.9% by weight. In another embodiment, the % Ni is below 3.4% by weight. In another embodiment, the theorical composition of the powder mixture (the sum of the compositions of all the powders contained in the powder mixture) has the following elements and limitations, all percentages being indicated in weight percent: % C: 0-0.4; % Mn: 0.1-1; % Si: 0-0.8; % Cr: 0-5.25; % Mo: 0-1.0; % V: 0-0.25; % Ni: 0-4.25; % Al: 0-1.25; balance Fe and trace elements. In an embodiment, the % C is above 0.08% by weight. In another embodiment, the % C is above 0.12% by weight. In an embodiment, the % C is below 0.34% by weight. In another embodiment, the % C is below 0.29% by weight. In an embodiment, the % Mn is above 0.18% by weight. In another embodiment, the % Mn is above 0.26% by weight. In an embodiment, the % Mn is below 0.96% by weight. In another embodiment, the % Mn is below 0.46% by weight. In an embodiment, the % Si is above 0.006% by weight. In another embodiment, the % Si is above 0.02% by weight. In an embodiment, the % Si is below 0.64% by weight. In another embodiment, the % Si is below 0.44% by weight. In an embodiment, the % Cr is above 0.16% by weight. In another embodiment, the % Cr is above 0.62% by weight. In an embodiment, the % Cr is below 4.96% by weight. In another embodiment, the % Cr is below 3.94% by weight. In an embodiment, the % Mo is above 0.07% by weight. In another embodiment, the % Mo is above 0.16% by weight. In an embodiment, the % Mo is below 0.84% by weight. In another embodiment, the % Mo is below 0.64% by weight. In an embodiment, the % V is above 0.02% by weight. In another embodiment, the % V is above 0.09% by weight. In an embodiment, the % V is below 0.14% by weight. In another embodiment, the % V is below 0.09% by weight. In an embodiment, the % Ni is above 0.12% by weight. In another embodiment, the % Ni is above 0.16% by weight. In an embodiment, the % Ni is below 3.9% by weight. In another embodiment, the % Ni is below 3.4% by weight. In an embodiment, the % Al is above 0.02% by weight. In another embodiment, the % Al is above 0.16% by weight. In an embodiment, the % Al is below 0.94% by weight. In another embodiment, the % Al is below 0.46% by weight. In another embodiment, the theorical composition of the powder mixture (the sum of the compositions of all the powders contained in the powder mixture) has the following elements and limitations, all percentages being indicated in weight percent: % C: 0.77-1.40; % Si: 0-0.70; % Cr: 3.5-4.5; % Mo: 3.2-10; % V: 0.9-3.60; % W: 0-18.70; % Co: 0-10.50; balance Fe and trace elements. In an embodiment, the % C is above 0.91% by weight. In another embodiment, the % C is above 1.06% by weight. In an embodiment, the % C is below 1.24% by weight. In another embodiment, the % C is below 0.94% by weight. In an embodiment, the % Si is above 0.06% by weight. In another embodiment, the % Si is above 0.12% by weight. In an embodiment, the % Si is below 0.44% by weight. In another embodiment, the % Si is below 0.34% by weight. In an embodiment, the % Cr is above 3.86% by weight. In another embodiment, the % Cr is above 4.06% by weight. In an embodiment, the % Cr is below 4.34% by weight. In another embodiment, the % Cr is below 4.24% by weight. In an embodiment, the % Mo is above 3.6% by weight. In another embodiment, the % Mo is above 4.2% by weight. In an embodiment, the % Mo is below 8.4% by weight. In another embodiment, the % Mo is below 7.8% by weight. In an embodiment, the % V is above 1.08% by weight. In another embodiment, the % V is above 1.21% by weight. In an embodiment, the % V is below 2.94% by weight. In another embodiment, the % V is below 2.44% by weight. In an embodiment, the % W is above 0.31% by weight. In another embodiment, the % W is above 0.56% by weight. In an embodiment, the % W is below 14.4% by weight. In another embodiment, the % W is below 9.4% by weight. In an embodiment, the % Co is above 0.01% by weight. In another embodiment, the % Co is above 0.16% by weight. In an embodiment, the % Co is below 8.44% by weight. In another embodiment, the % Co is below 6.4% by weight. In another embodiment, the theorical composition of the powder mixture (the sum of the compositions of all the powders contained in the powder mixture) has the following elements and limitations, all percentages being indicated in weight percent: % C: 0.03 max; % Mn: 0.1 max; % Si: 0.1 max; % Mo: 3.0-5.2; % Ni: 18-19; % Co: 0-12.5; % Ti: 0-2; balance Fe and trace elements. In an embodiment, the % C is above 0.0001% by weight. In another embodiment, the % C is above 0.0003% by weight. In an embodiment, the % C is below 0.01% by weight. In another embodiment, the % C is below 0.001% by weight. In an embodiment, the % Mn is above 0.00001% by weight. In another embodiment, the % Mn is above 0.0003% by weight. In an embodiment, the % Mn is below 0.01% by weight. In another embodiment, the % Mn is below 0.008% by weight. In an embodiment, the % Si is above 0.00002% by weight. In another embodiment, the % Si is above 0.0004% by weight. In an embodiment, the % Si is below 0.011% by weight. In another embodiment, the % Si is below 0.004% by weight. In an embodiment, the % Mo is above 3.52% by weight. In another embodiment, the % Mo is above 4.12% by weight. In an embodiment, the % Mo is below 4.94% by weight. In another embodiment, the % Mo is below 4.44% by weight. In an embodiment, the % Ni is above 18.26% by weight. In another embodiment, the % Ni is above 18.56% by weight. In an embodiment, the % Ni is below 18.87% by weight. In another embodiment, the % Ni is below 18.73% by weight. In an embodiment, the % Co is above 0.01% by weight. In another embodiment, the % Co is above 0.26% by weight. In an embodiment, the % Co is below 9.44% by weight. In another embodiment, the % Co is below 7.4% by weight. In an embodiment, the % Ti is above 0.08% by weight. In another embodiment, the % Ti is above 0.12% by weight. In an embodiment, the % Ti is below 1.84% by weight. In another embodiment, the % Ti is below 1.44% by weight. In another embodiment, the theorical composition of the powder mixture (the sum of the compositions of all the powders contained in the powder mixture) has the following elements and limitations, all percentages being indicated in weight percent: % C: 1.5-1.85; % Mn: 0.15-0.5; % Si: 0.15-0.45; % Cr: 3.5-5.0; % Mo: 0-6.75; % V:4.5-5.25; % W: 11.5-13.00; % Co: 0-5.25; balance Fe and trace elements. In an embodiment, the % C is above 1.56% by weight. In another embodiment, the % C is above 1.66% by weight. In an embodiment, the % C is below 1.78% by weight. In another embodiment, the % C is below 1.74% by weight. In an embodiment, the % Mn is above 0.21% by weight. In another embodiment, the % Mn is above 0.26% by weight. In an embodiment, the % Mn is below 0.41% by weight. In another embodiment, the % Mn is below 0.29% by weight. In an embodiment, the % Si is above 0.18% by weight. In another embodiment, the % Si is above 0.21% by weight. In an embodiment, the % Si is below 0.39% by weight. In another embodiment, the % Si is below 0.34% by weight. In an embodiment, the % Cr is above 3.66% by weight. In another embodiment, the % Cr is above 3.86% by weight. In an embodiment, the % Cr is below 4.92% by weight. In another embodiment, the % Cr is below 3.92% by weight. In an embodiment, the % V is above 4.62% by weight. In another embodiment, the % V is above 4.86% by weight. In an embodiment, the % V is below 5.18% by weight. In another embodiment, the % V is below 4.94% by weight. In an embodiment, the % W is above 11.61% by weight. In another embodiment, the % W is above 11.86% by weight. In an embodiment, the % W is below 12.94% by weight. In another embodiment, the % W is below 12.48% by weight. In an embodiment, the % Co is above 0.1% by weight. In another embodiment, the % Co is above 0.26% by weight. In an embodiment, the % Co is below 4.44% by weight. In another embodiment, the % Co is below 3.4% by weight. In another embodiment, the theorical composition of the powder mixture (the sum of the compositions of all the powders contained in the powder mixture) has the following elements and limitations, all percentages being indicated in weight percent: % C: 0-0.6; % Mn: 0-1.5; % Si: 0-1; % Cr: 11.5-17.5; % Mo: 0-1.5; % V:0-0.2; % Ni: 0-6.0; balance Fe and trace elements. In an embodiment, the % C is above 0.02% by weight. In another embodiment, the % C is above 0.12% by weight. In an embodiment, the % C is below 0.48% by weight. In another embodiment, the % C is below 0.44% by weight. In an embodiment, the % Mn is above 0.01% by weight. In another embodiment, the % Mn is above 0.16% by weight. In an embodiment, the % Mn is below 1.22% by weight. In another embodiment, the % Mn is below 0.93% by weight. In an embodiment, the % Si is above 0.08% by weight. In another embodiment, the % Si is above 0.11% by weight. In an embodiment, the % Si is below 0.89% by weight. In another embodiment, the % Si is below 0.46% by weight. In an embodiment, the % Cr is above 11.86% by weight. In another embodiment, the % Cr is above 12.56% by weight. In an embodiment, the % Cr is below 16.94% by weight. In another embodiment, the % Cr is below 14.96% by weight. In an embodiment, the % Mo is above 0.09% by weight. In another embodiment, the % Mo is above 0.28% by weight. In an embodiment, the % Mo is below 1.22% by weight. In another embodiment, the % Mo is below 0.94% by weight. In an embodiment, the % V is above 0.0018% by weight. In another embodiment, the % V is above 0.009% by weight. In an embodiment, the % V is below 0.14% by weight. In another embodiment, the % V is below 0.09% by weight. In an embodiment, the % Ni is above 0.09% by weight. In another embodiment, the % Ni is above 0.16% by weight. In an embodiment, the % Ni is below 4.48% by weight. In another embodiment, the % Ni is below 3.92% by weight. In another embodiment, the theorical composition of the powder mixture (the sum of the compositions of all the powders contained in the powder mixture) has the following elements and limitations, all percentages being indicated in weight percent: C: 0.015 max; Mn: 0.5-1.25; Si: 0.2-1; Cr: 11-18; Mo: 0-3.25; Ni: 3.0-9.5; Ti: 0-1.40; Al: 0-1.5; Cu: 0-5; balance Fe and trace elements. In an embodiment, the % C is above 0.002% by weight. In another embodiment, the % C is above 0.0036% by weight. In an embodiment, the % C is below 0.001% by weight. In another embodiment, the % C is below 0.003% by weight. In an embodiment, the % Mn is above 0.61% by weight. In another embodiment, the % Mn is above 0.77% by weight. In an embodiment, the % Mn is below 1.18% by weight. In another embodiment, the % Mn is below 0.96% by weight. In an embodiment, the % Si is above 0.28% by weight. In another embodiment, the % Si is above 0.31% by weight. In an embodiment, the % Si is below 0.89% by weight. In another embodiment, the % Si is below 0.46% by weight. In an embodiment, the % Cr is above 11.58% by weight. In another embodiment, the % Cr is above 12.62% by weight. In an embodiment, the % Cr is below 16.92% by weight. In another embodiment, the % Cr is below 14.92% by weight. In an embodiment, the % Mo is above 0.19% by weight. In another embodiment, the % Mo is above 0.28% by weight. In an embodiment, the % Mo is below 2.82% by weight. In another embodiment, the % Mo is below 1.88% by weight. In an embodiment, the % Ni is above 3.64% by weight. In another embodiment, the % Ni is above 5.62% by weight. In an embodiment, the % Ni is below 8.82% by weight. In another embodiment, the % Ni is below 8.21% by weight. In an embodiment, the % Ti is above 0.08% by weight. In another embodiment, the % Ti is above 0.12% by weight. In an embodiment, the % Ti is below 1.34% by weight. In another embodiment, the % Ti is below 1.22% by weight. In an embodiment, the % Al is above 0.06% by weight. In another embodiment, the % Al is above 0.14% by weight. In an embodiment, the % Al is below 1.24% by weight. In another embodiment, the % Al is below 1.12% by weight. In an embodiment, the % Cu is above 0.09% by weight. In another embodiment, the % Cu is above 0.12% by weight. In an embodiment, the % Cu is below 4.38% by weight. In another embodiment, the % Cu is below 3.82% by weight. In an embodiment, the theorical composition of the powder mixture (the sum of the compositions of all the powders contained in the powder mixture) has the following elements and limitations, all percentages being indicated in weight percent: % Mg: 0.006-10.6; % Si: 0.006-23; % Ti: 0.002-0.35; % Cr: 0.01-0.40; % Mn-0.002-1.8; % Fe: 0.006-1.5; % Ni: 0-3.0; % Cu: 0.006-10.7; % Zn: 0.006-7.8; % Sn: 0-7; % Zr: 0-0.5; balance aluminium (% Al) and trace elements. In an embodiment, the % Mg is above 0.009% by weight. In another embodiment, the % Mg is above 1.62% by weight. In an embodiment, the % Mg is below 8.38% by weight. In another embodiment, the % Mg is below 4.82% by weight. In an embodiment, the % Si is above 0.02% by weight. In another embodiment, the % Si is above 1.64% by weight. In an embodiment, the % Si is below 19.8% by weight. In another embodiment, the % Si is below 9.8% by weight. In an embodiment, the % Ti is above 0.008% by weight. In another embodiment, the % Ti is above 0.12% by weight. In an embodiment, the % Ti is below 0.29% by weight. In another embodiment, the % Ti is below 0.24% by weight. In an embodiment, the % Cr is above 0.03% by weight. In another embodiment, the % Cr is above 0.12% by weight. In an embodiment, the % Cr is below 0.34% by weight. In another embodiment, the % Cr is below 0.23% by weight. In an embodiment, the % Mn is above 0.01% by weight. In another embodiment, the % Mn is above 0.21% by weight. In an embodiment, the % Mn is below 1.38% by weight. In another embodiment, the % Mn is below 0.96% by weight. In an embodiment, the % Fe is above 0.01% by weight. In another embodiment, the % Fe is above 0.57% by weight. In an embodiment, the % Fe is below 1.38% by weight. In another embodiment, the % Fe is below 0.96% by weight. In an embodiment, the % Ni is above 0.01% by weight. In another embodiment, the % Ni is above 0.41% by weight. In an embodiment, the % Ni is below 2.46% by weight. In another embodiment, the % Ni is below 1.92% by weight. In an embodiment, the % Cu is above 0.08% by weight. In another embodiment, the % Cu is above 0.16% by weight. In an embodiment, the % Cu is below 8.38% by weight. In another embodiment, the % Cu is below 4.82% by weight. In an embodiment, the % Zn is above 0.09% by weight. In another embodiment, the % Zn is above 0.16% by weight. In an embodiment, the % Zn is below 6.38% by weight. In another embodiment, the % Zn is below 3.82% by weight. In an embodiment, the % Sn is above 0.001% by weight. In another embodiment, the % Sn is above 0.12% by weight. In an embodiment, the % Sn is below 4.38% by weight. In another embodiment, the % Sn is below 3.42% by weight. In an embodiment, the % Zr is above 0.009% by weight. In another embodiment, the % Zr is above 0.06% by weight. In an embodiment, the % Zr is below 0.38% by weight. In another embodiment, the % Zr is below 0.24% by weight. In an embodiment, the theorical composition of the powder mixture (the sum of the compositions of all the powders contained in the powder mixture) has the following elements and limitations, all percentages being indicated in weight percent: Zn: 0-40; Ni: 0-31; Al: 0-13; Sn: 0-10; Fe: 0-5.5; Si: 0-4; Pb: 0-4; Mn: 0-3; Co: 0-2.7; Be: 0-2.75; Cr: 0-1; balance copper (% Cu) and trace elements. In an embodiment, the % Zn is above 0.29% by weight. In another embodiment, the % Zn is above 1.26% by weight. In an embodiment, the % Zn is below 26.38% by weight. In another embodiment, the % Zn is below 13.42% by weight. In an embodiment, the % Ni is above 0.1% by weight. In another embodiment, the % Ni is above 2.61% by weight. In an embodiment, the % Ni is below 24.46% by weight. In another embodiment, the % Ni is below 16.92% by weight. In an embodiment, the % Al is above 0.6% by weight. In another embodiment, the % Al is above 2.14% by weight. In an embodiment, the % Al is below 8.24% by weight. In another embodiment, the % Al is below 5.12% by weight. In an embodiment, the % Sn is above 0.01% by weight. In another embodiment, the % Sn is above 0.32% by weight. In an embodiment, the % Sn is below 6.38% by weight. In another embodiment, the % Sn is below 4.42% by weight. In an embodiment, the % Fe is above 0.1% by weight. In another embodiment, the % Fe is above 0.67% by weight. In an embodiment, the % Fe is below 3.38% by weight. In another embodiment, the % Fe is below 2.96% by weight. In an embodiment, the % Si is above 0.2% by weight. In another embodiment, the % Si is above 0.64% by weight. In an embodiment, the % Si is below 2.8% by weight. In another embodiment, the % Si is below 1.8% by weight. In an embodiment, the % Pb is above 0.002% by weight. In another embodiment, the % Pb is above 0.4% by weight. In an embodiment, the % Pb is below 2.8% by weight. In another embodiment, the % Pb is below 1.4% by weight. In an embodiment, the % Mn is above 0.001% by weight. In another embodiment, the % Mn is above 0.26% by weight. In an embodiment, the % Mn is below 2.38% by weight. In another embodiment, the % Mn is below 0.94% by weight. In an embodiment, the % Co is above 0.0001% by weight. In another embodiment, the % Co is above 0.16% by weight. In an embodiment, the % Co is below 2.18% by weight. In another embodiment, the % Co is below 0.84% by weight. In an embodiment, the % Be is above 0.0006% by weight. In another embodiment, the % Be is above 0.12% by weight. In an embodiment, the % Be is below 1.84% by weight. In another embodiment, the % Be is below 0.44% by weight. In an embodiment, the % Cr is above 0.003% by weight. In another embodiment, the % Cr is above 0.22% by weight. In an embodiment, the % Cr is below 0.44% by weight. In another embodiment, the % Cr is below 0.19% by weight. In an embodiment, the theorical composition of the powder mixture (the sum of the compositions of all the powders contained in the powder mixture) has the following elements and limitations, all percentages being indicated in weight percent: % Be: 0.15-3.0; % Co: 0-3; % Ni: 0-2.2; % Pb: 0-0.6; % Fe: 0-0.25; % Si: 0-0.35; % Sn: 0-0.25, % Zr 0-0.5; balance copper (% Cu) and trace elements. In an embodiment, the % Be is above 0.21% by weight. In another embodiment, the % Be is above 0.52% by weight. In an embodiment, the % Be is below 2.44% by weight. In another embodiment, the % Be is below 1.44% by weight. In an embodiment, the % Co is above 0.001% by weight. In another embodiment, the % Co is above 0.12% by weight. In an embodiment, the % Co is below 2.18% by weight. In another embodiment, the % Co is below 0.84% by weight. In an embodiment, the % Ni is above 0.001% by weight. In another embodiment, the % Ni is above 0.61% by weight. In an embodiment, the % Ni is below 1.46% by weight. In another embodiment, the % Ni is below 0.92% by weight. In an embodiment, the % Pb is above 0.009% by weight. In another embodiment, the % Pb is above 0.26% by weight. In an embodiment, the % Pb is below 0.48% by weight. In another embodiment, the % Pb is below 0.29% by weight. In an embodiment, the % Fe is above 0.001% by weight. In another embodiment, the % Fe is above 0.09% by weight. In an embodiment, the % Fe is below 0.19% by weight. In another embodiment, the % Fe is below 0.14% by weight. In an embodiment, the % Si is above 0.002% by weight. In another embodiment, the % Si is above 0.04% by weight. In an embodiment, the % Si is below 0.24% by weight. In another embodiment, the % Si is below 0.09% by weight. In an embodiment, the % Sn is above 0.001% by weight. In another embodiment, the % Sn is above 0.03% by weight. In an embodiment, the % Sn is below 0.23% by weight. In another embodiment, the % Sn is below 0.08% by weight. In an embodiment, the % Zr is above 0.009% by weight. In another embodiment, the % Zr is above 0.08% by weight. In an embodiment, the % Zr is below 0.38% by weight. In another embodiment, the % Zr is below 0.19% by weight. In an embodiment, the theorical composition of the powder mixture (the sum of the compositions of all the powders contained in the powder mixture) has the following elements and limitations, all percentages being indicated in weight percent: % Cr: 9-33; % W: 0-26; % Mo: 0-29; % C: 0-3.5; % Fe: 0-9; % Ni: 0-35; % Si: 0-3.9; Mn: 0-2.5; % B: 0-1; % V: 0-4.2; % Nb/% Ta: 0-5.5, balance cobalt (% Co) and trace elements. In an embodiment, the % Cr is above 12.6% by weight. In another embodiment, the % Cr is above 16.6% by weight. In an embodiment, the % Cr is below 24.8% by weight. In another embodiment, the % Cr is below 14.9% by weight. In an embodiment, the % W is above 2.64% by weight. In another embodiment, the % W is above 8.6% by weight. In an embodiment, the % W is below 19.8% by weight. In another embodiment, the % W is below 12.9% by weight. In an embodiment, the % Mo is above 3.16% by weight. In another embodiment, the % Mo is above 10.6% by weight. In an embodiment, the % Mo is below 19.8% by weight. In another embodiment, the % Mo is below 13.9% by weight. In an embodiment, the % C is above 0.001% by weight. In another embodiment, the % C is above 0.02% by weight. In an embodiment, the % C is below 1.88% by weight. In another embodiment, the % C is below 0.88% by weight. In an embodiment, the % Fe is above 0.1% by weight. In another embodiment, the % Fe is above 0.59% by weight. In an embodiment, the % Fe is below 6.8% by weight. In another embodiment, the % Fe is below 4.42% by weight. In an embodiment, the % Ni is above 0.01% by weight. In another embodiment, the % Ni is above 1.26% by weight. In an embodiment, the % Ni is below 18.8% by weight. In another embodiment, the % Ni is below 9.8% by weight. In an embodiment, the % Si is above 0.02% by weight. In another embodiment, the % Si is above 0.09% by weight. In an embodiment, the % Si is below 1.94% by weight. In another embodiment, the % Si is below 0.94% by weight. In an embodiment, the % Mn is above 0.0001% by weight. In another embodiment, the % Mn is above 0.16% by weight. In an embodiment, the % Mn is below 2.18% by weight. In another embodiment, the % Mn is below 0.88% by weight. In an embodiment, the % B is above 0.0001% by weight. In another embodiment, the % B is above 0.006% by weight. In an embodiment, the % B is below 0.42% by weight. In another embodiment, the % B is below 0.18% by weight. In an embodiment, the % V is above 0.01% by weight. In another embodiment, the % V is above 0.26% by weight. In an embodiment, the % V is below 2.42% by weight. In another embodiment, the % V is below 1.48% by weight. In an embodiment, the % Nb/% Ta is above 0.01% by weight. In another embodiment, the % Nb/% Ta is above 0.26% by weight. In an embodiment, the % Nb/% Ta is below 1.42% by weight. In another embodiment, the % Nb/% Ta is below 0.88% by weight. In an embodiment, the theorical composition of the powder mixture (the sum of the compositions of all the powders contained in the powder mixture) has the following elements and limitations, all percentages being indicated in weight percent: % Fe: 0-42; % Cu: 0-34; % Cr: 0-31; % Mo: 0-24; % Co: 0-18; % W: 0-14; % Nb: 0-5.5; % Mn: 0-5.25; % Al: 0-5; Ti: 0-3; % Zn: 0-1; % Si: 0-1; % C:0-0.3; % S:0.01 max; balance nickel (% Ni) and trace elements. In an embodiment, the % Fe is above 1.64% by weight. In another embodiment, the % Fe is above 4.58% by weight. In an embodiment, the % Fe is below 26.8% by weight. In another embodiment, the % Fe is below 14.42% by weight. In an embodiment, the % Cu is above 1.14% by weight. In another embodiment, the % Cu is above 2.58% by weight. In an embodiment, the % Cu is below 16.8% by weight. In another embodiment, the % Cu is below 9.42% by weight. In an embodiment, the % Cr is above 0.64% by weight. In another embodiment, the % Cr is above 3.58% by weight. In an embodiment, the % Cr is below 14.8% by weight. In another embodiment, the % Cr is below 6.42% by weight. In an embodiment, the % Mo is above 1.12% by weight. In another embodiment, the % Mo is above 4.58% by weight. In an embodiment, the % Mo is below 12.8% by weight. In another embodiment, the % Mo is below 4.42% by weight. In an embodiment, the % Co is above 0.12% by weight. In another embodiment, the % Co is above 1.58% by weight. In an embodiment, the % Co is below 9.8% by weight. In another embodiment, the % Co is below 3.42% by weight. In an embodiment, the % W is above 0.22% by weight. In another embodiment, the % W is above 1.58% by weight. In an embodiment, the % W is below 9.8% by weight. In another embodiment, the % W is below 4.42% by weight. In an embodiment, the % Nb is above 0.002% by weight. In another embodiment, the % Nb is above 0.58% by weight. In an embodiment, the % Nb is below 3.8% by weight. In another embodiment, the % Nb is below 1.42% by weight. In an embodiment, the % Al is above 0.002% by weight. In another embodiment, the % Al is above 0.28% by weight. In an embodiment, the % Al is below 3.4% by weight. In another embodiment, the % Al is below 1.42% by weight. In an embodiment, the % Ti is above 0.006% by weight. In another embodiment, the % Ti is above 0.18% by weight. In an embodiment, the % Ti is below 3.8% by weight. In another embodiment, the % Ti is below 1.22% by weight. In an embodiment, the % Zn is above 0.009% by weight. In another embodiment, the % Zn is above 0.08% by weight. In an embodiment, the % Zn is below 0.68% by weight. In another embodiment, the % Zn is below 0.19% by weight. In an embodiment, the % Si is above 0.09% by weight. In another embodiment, the % Si is above 0.14% by weight. In an embodiment, the % Si is below 0.48% by weight. In another embodiment, the % Si is below 0.19% by weight. In an embodiment, the % C is above 0.02% by weight. In another embodiment, the % C is above 0.09% by weight. In an embodiment, the % C is below 0.19% by weight. In another embodiment, the % C is below 0.12% by weight. In an embodiment, the % S is above 0.0002% by weight. In another embodiment, the % S is above 0.0004% by weight. In an embodiment, the % S is below 0.009% by weight. In another embodiment, the % S is below 0.0009% by weight. In an embodiment, the theorical composition of the powder mixture (the sum of the compositions of all the powders contained in the powder mixture) has the following elements and limitations, all percentages being indicated in weight percent: % V:0-14.5; % Mo: 0-13; % Cr: 0-12; % Sn: 0-11.5; % Al: 0-8; % Mn: 0-8; % Zr: 0-7.5; % Cu: 0-3; % Nb: 0-2.5; % Fe: 0-2.5; % Ta: 0-1.5; % Si: 0-0.5; % C:0.1 max; % N:0.05 max; % O: 0.2 max; H:0.03 max; balance titanium (% Ti) and trace elements. In an embodiment, the % V is above 0.02% by weight. In another embodiment, the % V is above 0.68% by weight. In an embodiment, the % V is below 9.8% by weight. In another embodiment, the % V is below 4.42% by weight. In an embodiment, the % Mo is above 0.36% by weight. In another embodiment, the % Mo is above 2.68% by weight. In an embodiment, the % Mo is below 8.8% by weight. In another embodiment, the % Mo is below 6.42% by weight. In an embodiment, the % Cr is above 0.16% by weight. In another embodiment, the % Cr is above 3.68% by weight. In an embodiment, the % Cr is below 9.8% by weight. In another embodiment, the % Cr is below 4.42% by weight. In an embodiment, the % Sn is above 0.06% by weight. In another embodiment, the % Sn is above 0.62% by weight. In an embodiment, the % Sn is below 6.8% by weight. In another embodiment, the % Sn is below 2.42% by weight. In an embodiment, the % Al is above 0.006% by weight. In another embodiment, the % Al is above 0.42% by weight. In an embodiment, the % Al is below 4.8% by weight. In another embodiment, the % Al is below 2.42% by weight. In an embodiment, the % Mn is above 0.02% by weight. In another embodiment, the % Mn is above 0.12% by weight. In an embodiment, the % Mn is below 6.8% by weight. In another embodiment, the % Mn is below 4.42% by weight. In an embodiment, the % Zr is above 0.008% by weight. In another embodiment, the % Zr is above 0.02% by weight. In an embodiment, the % Zr is below 4.8% by weight. In another embodiment, the % Zr is below 2.42% by weight. In an embodiment, the % Cu is above 0.0008% by weight. In another embodiment, the % Cu is above 0.06% by weight. In an embodiment, the % Cu is below 1.8% by weight. In another embodiment, the % Cu is below 0.42% by weight. In an embodiment, the % Nb is above 0.0009% by weight. In another embodiment, the % Nb is above 0.02% by weight. In an embodiment, the % Nb is below 0.64% by weight. In another embodiment, the % Nb is below 0.42% by weight. In an embodiment, the % Fe is above 0.009% by weight. In another embodiment, the % Fe is above 0.04% by weight. In an embodiment, the % Fe is below 1.64% by weight. In another embodiment, the % Fe is below 0.92% by weight. In an embodiment, the % Ta is above 0.0007% by weight. In another embodiment, the % Ta is above 0.002% by weight. In an embodiment, the % Ta is below 0.44% by weight. In another embodiment, the % Ta is below 0.19% by weight. In an embodiment, the % Si is above 0.0001% by weight. In another embodiment, the % Si is above 0.02% by weight. In an embodiment, the % Si is below 0.34% by weight. In another embodiment, the % Si is below 0.09% by weight. In an embodiment, the % C is above 0.00001% by weight. In another embodiment, the % C is above 0.002% by weight. In an embodiment, the % C is below 0.03% by weight. In another embodiment, the % C is below 0.09% by weight. In an embodiment, the % N is above 0.000001% by weight. In another embodiment, the % N is above 0.0002% by weight. In an embodiment, the % N is below 0.003% by weight. In another embodiment, the % N is below 0.008% by weight. In an embodiment, the % O is above 0.00002% by weight. In another embodiment, the % O is above 0.001% by weight. In an embodiment, the % O is below 0.04% by weight. In another embodiment, the % O is below 0.09% by weight. In an embodiment, the % H is above 0.000001% by weight. In another embodiment, the % H is above 0.0002% by weight. In an embodiment, the % H is below 0.003% by weight. In another embodiment, the % H is below 0.008% by weight. In an embodiment, the theorical composition of the powder mixture (the sum of the compositions of all the powders contained in the powder mixture) has the following elements and limitations, all percentages being indicated in weight percent: % Al: 0-10, % Zn: 0-6; % Y:0-5.2; % Cu: 0-3; % Ag: 0-2.5, % Th: 0-3.3; Si: 0-1.1; % Mn: 0-0.75; balance magnesium (% Mg) and trace elements. In an embodiment, the % Al is above 0.2% by weight. In another embodiment, the % Al is above 1.68% by weight. In an embodiment, the % Al is below 7.8% by weight. In another embodiment, the % Al is below 4.42% by weight. In an embodiment, the % Zn is above 0.04% by weight. In another embodiment, the % Zn is above 0.16% by weight. In an embodiment, the % Zn is below 4.8% by weight. In another embodiment, the % Zn is below 2.34% by weight. In an embodiment, the % Y is above 0.26% by weight. In another embodiment, the % Y is above 0.56% by weight. In an embodiment, the % Y is below 3.8% by weight. In another embodiment, the % Y is below 2.44% by weight. In an embodiment, the % Cu is above 0.06% by weight. In another embodiment, the % Cu is above 0.12% by weight. In an embodiment, the % Cu is below 1.8% by weight. In another embodiment, the % Cu is below 1.44% by weight. In an embodiment, the % Ag is above 0.008% by weight. In another embodiment, the % Ag is above 0.0.09% by weight. In an embodiment, the % Ag is below 0.8% by weight. In another embodiment, the % Ag is below 0.44% by weight. In an embodiment, the % Th is above 0.006% by weight. In another embodiment, the % Th is above 0.02% by weight. In an embodiment, the % Th is below 0.84% by weight. In another embodiment, the % Th is below 0.44% by weight. In an embodiment, the % Si is above 0.06% by weight. In another embodiment, the % Si is above 0.2% by weight. In an embodiment, the % Si is below 0.44% by weight. In another embodiment, the % Si is below 0.24% by weight. In an embodiment, the % Mn is above 0.004% by weight. In another embodiment, the % Mn is above 0.02% by weight. In an embodiment, the % Mn is below 0.44% by weight. In another embodiment, the % Mn is below 0.14% by weight. It has been seen that for some applications it is interesting to use the present application for materials where the metal is not the majoritarian element in volume percentage. Some applications requiring very high wear resistance can benefit from mixtures of powders with high concentrations of very abrasion resistant particles. In an embodiment the powder mixture of the present invention comprises a high content of abrasion resistant particles. In an embodiment the high abrasion resistant particles comprise carbides. In an embodiment the high abrasion resistant particles comprise nitrides. In an embodiment the high abrasion resistant particles comprise oxides. In an embodiment the high abrasion resistant particles comprise tungsten carbide. In an embodiment the high abrasion resistant particles comprise tantalum carbide. In an embodiment the high abrasion resistant particles comprise molybdenum carbide. In an embodiment the high abrasion resistant particles comprise niobium carbide. In an embodiment the high abrasion resistant particles comprise chromium carbide. In an embodiment the high abrasion resistant particles comprise vanadium carbide.). In an embodiment the high abrasion resistant particles comprise titanium nitride. In an embodiment the high abrasion resistant particles comprise silicon carbide. In an embodiment the high abrasion resistant particles comprise boron carbide. In an embodiment the high abrasion resistant particles comprise diamond. In an embodiment the high abrasion resistant particles comprise aluminum oxide. In an embodiment, a high concentration of very abrasion resistant particles is 62% by volume or more. In an embodiment, a high concentration of very abrasion resistant particles is 72% by volume or more. In an embodiment, a high concentration of very abrasion resistant particles is 82% by volume or more. In an embodiment, a high concentration of very abrasion resistant particles is 93% by volume or more. In an embodiment, a high concentration of very abrasion resistant particles is 98% by volume or less. In an embodiment, a high concentration of very abrasion resistant particles is 94% by volume or less. In an embodiment, a high concentration of very abrasion resistant particles is 88% by volume or less. In an embodiment, a high concentration of very abrasion resistant particles is 78% by volume or less. In an embodiment the remainder is one of the metallic alloys described in the present document. In an embodiment the remainder is a low alloyed metal. In an embodiment, a low alloyed metal is a metal with a large content of a main element. In an embodiment, a large content of a main element is 72% by weight or more. In an embodiment, a large content of a main element is 72% by weight or more. In an embodiment, a large content of a main element is 82% by weight or more. In an embodiment, a large content of a main element is 92% by weight or more. In an embodiment, a large content of a main element is 96% by weight or more. In an embodiment, the main element is cobalt (% Co). In an embodiment, the main element is nickel (% Ni). In an embodiment, the main element is molybdenum (% Mo). In an embodiment, the main element is iron (% Fe). In an embodiment, the main element is copper (% Cu). In an embodiment, the abrasion resistant particles have a D50 of 15 microns or less. In an embodiment, the abrasion resistant particles have a D50 of 9 microns or less. In an embodiment, the abrasion resistant particles have a D50 of 4.8 microns or less. In an embodiment, the abrasion resistant particles have a D50 of 1.8 microns or less. In an embodiment, the abrasion resistant particles have a D50 of 0.01 microns or more. In an embodiment, the abrasion resistant particles have a D50 of 0.1 microns or more. In an embodiment, the abrasion resistant particles have a D50 of 0.5 microns or more. In an embodiment, the abrasion resistant particles have a D50 of 1.2 microns or more. In an embodiment, the abrasion resistant particles have a D50 of 3.2 microns or more. In an embodiment, the composition of P1 is split into 2 or more powders (the weighted—through weight fraction—sum of the compositions of all these additional powders coincide with the composition of P1). In an embodiment, P1 is substituted by the 2 or more additional powders with same overall composition. In an embodiment P1 and the additional powders with the same overall composition are employed. In an embodiment, the composition of P2 is split into 2 or more powders (the weighted—through weight fraction—sum of the compositions of all these additional powders coincide with the composition of P2). In an embodiment, P2 is substituted by the 2 or more additional powders with same overall composition. In an embodiment P2 and the additional powders with the same overall composition are employed. In an embodiment, the composition of P3 is split into 2 or more powders (the weighted—through weight fraction—sum of the compositions of all these additional powders coincide with the composition of P3). In an embodiment, P3 is substituted by the 2 or more additional powders with same overall composition. In an embodiment P3 and the additional powders with the same overall composition are employed. In an embodiment, the composition of P4 is split into 2 or more powders (the weighted—through weight fraction—sum of the compositions of all these additional powders coincide with the composition of P4). In an embodiment, P4 is substituted by the 2 or more additional powders with same overall composition. In an embodiment P4 and the additional powders with the same overall composition are employed. In an embodiment, the composition of P5 is split into 2 or more powders (the weighted—through weight fraction—sum of the compositions of all these additional powders coincide with the composition of P1). In an embodiment, P5 is substituted by the 2 or more additional powders with same overall composition. In an embodiment P5 and the additional powders with the same overall composition are employed. In an embodiment, the additional powder is a ferroalloy. In another embodiment, the additional powder is an alloy comprising two elements. In another embodiment, the additional powder is an alloy comprising three elements. In another embodiment, the additional powder is an alloy comprising at least four elements. In some applications the technology employed to obtain the powders may be relevant. In an embodiment, the powders are obtained by gas atomization. In another embodiment, the powders are obtained by water atomization. In another embodiment, the powders are obtained by mechanical attrition. In another embodiment, the powders are obtained by oxide-reduction. In another embodiment, the powders are obtained by carbonyl decomposition. In an embodiment, there is a considerable difference between the sphericity of at least two of the powders in the mixture. In an embodiment, at least one of the powders in the mixture has a sphericity above 90%. In another embodiment, at least one of the powders in the mixture has a sphericity above 92%. In another embodiment, at least one of the powders in the mixture has a sphericity above 95%. In another embodiment, at least one of the powders in the mixture has a sphericity above 99%. In an embodiment, at least one of the powders in the mixture has a sphericity below 89%. In another embodiment, at least one of the powders in the mixture has a sphericity below 83%. In another embodiment, at least one of the powders in the mixture has a sphericity below 79%. In another embodiment, at least one of the powders in the mixture has a sphericity below 69%. In some applications, when the sphericity of the powders is in percentage (%) a certain difference between the sphericity of at least two of the powders in the mixture is preferred. In an embodiment, there is a difference in the sphericity of at least two of the powders of the mixture which is a 5% or more. In another embodiment, it is a 12% or more. In another embodiment, it is a 22% or more. In another embodiment, it is a 52% or more. Sphericity of the powder refers to a dimensionless parameter defined as the ratio between the surface area of a sphere having the same volume as the particle and the surface area of the particle. In an embodiment, the powders are relevant powders in the mixture (as disclosed in this document). In an embodiment, the sphericity of the particles is determined by dynamic image analysis. In an embodiment, the sphericity is measured by light scattering diffraction. In an embodiment, anywhere within this paragraph, substantially more means that when dividing the weight content of the element in one of the powders with higher claimed content of the element (for example P3) through the weight content of the element in the powder with claimed lower content (for example P1) a result of 1.06 or more is obtained. In another embodiment, the result obtained is 1.12 or more. In another embodiment, the result obtained is 1.16 or more. In another embodiment, the result obtained is 1.22 or more. In another embodiment, the result obtained is 1.32 or more. In another embodiment, the result obtained is 1.42 or more. In another embodiment, the result obtained is 1.52 or more. In alternative embodiments, substantially more is 1.06 times or more content, 1.12 times or more content, 1.16 times or more content, 1.22 times or more content, 1.32 times or more content, 1.42 times or more content and even 1.52 times or more content. In an embodiment, in any of the mixtures described in this paragraph P1 is considerably bigger in size than P2. In an embodiment, in any of the mixtures described in this paragraph P1 is considerably bigger in size than P3. In an embodiment, in any of the mixtures described in this paragraph P1 is considerably bigger in size than P3 and P4. In an embodiment, in any of the mixtures described in this paragraph P1 is considerably bigger in size than P3, P4 and P5. In an embodiment, considerably bigger in size means that the D50 is at least a 52% bigger. In another embodiment, considerably bigger in size means that the D50 is at least a 152% bigger. In another embodiment, considerably bigger in size means that the D50 is at least a 252% bigger. In another embodiment, considerably bigger in size means that the D50 is at least a 352% bigger. In another embodiment, considerably bigger in size means that the D50 is at least a 452% bigger. In another embodiment, considerably bigger in size means that the D50 is at least a 752% bigger. In an embodiment, P1 has a compensated size. In an embodiment, a compensated size for P1 means it has a D50 of 16 microns or bigger. In another embodiment, a compensated size for P1 means it has a D50 of 46 microns or bigger. In another embodiment, a compensated size for P1 means it has a D50 of 86 microns or bigger. In another embodiment, a compensated size for P1 means it has a D50 of 160 microns or bigger. In another embodiment, a compensated size for P1 means it has a D50 of 220 microns or bigger. In another embodiment, a compensated size for P1 means it has a D50 of 320 microns or bigger. In an embodiment, a compensated size for P1 means it has a D50 of 990 microns or smaller. In another embodiment, a compensated size for P1 means it has a D50 of 790 microns or smaller. In another embodiment, a compensated size for P1 means it has a D50 of 590 microns or smaller. In another embodiment, a compensated size for P1 means it has a D50 of 490 microns or smaller. In another embodiment, a compensated size for P1 means it has a D50 of 390 microns or smaller. In another embodiment, a compensated size for P1 means it has a D50 of 290 microns or smaller. In another embodiment, a compensated size for P1 means it has a D50 of 190 microns or smaller. For some applications, as for example when the composition differences between different powders is very large, it is preferable to work with smaller P1 sizes. In an embodiment, a compensated size for P1 means it has a D50 of 1.2 microns or bigger. In another embodiment, a compensated size for P1 means it has a D50 of 3.2 microns or bigger. In another embodiment, a compensated size for P1 means it has a D50 of 6 microns or bigger. In another embodiment, a compensated size for P1 means it has a D50 of 12 microns or bigger. In another embodiment, a compensated size for P1 means it has a D50 of 26 microns or bigger. In another embodiment, a compensated size for P1 means it has a D50 of 36 microns or bigger. In another embodiment, a compensated size for P1 means it has a D50 of 290 microns or smaller. In an embodiment, a compensated size for P1 means it has a D50 of 148 microns or smaller. In an embodiment, a compensated size for P1 means it has a D50 of 69 microns or smaller. In another embodiment, a compensated size for P1 means it has a D50 of 49 microns or smaller. In another embodiment, a compensated size for P1 means it has a D50 of 39 microns or smaller. In another embodiment, a compensated size for P1 means it has a D50 of 29 microns or smaller. In another embodiment, a compensated size for P1 means it has a D50 of 19 microns or smaller. In another embodiment, a compensated size for P1 means it has a D50 of 9 microns or smaller. In an embodiment, P2 has a compensated size. In an embodiment, P3 has a compensated size. In an embodiment, a compensated size for P2 and/or P3 means it has a D50 of 1.2 microns or bigger. In another embodiment, a compensated size for P2 and/or P3 means it has a D50 of 3.2 microns or bigger. In another embodiment, a compensated size for P2 and/or P3 means it has a D50 of 6 microns or bigger. In another embodiment, a compensated size for P2 and/or P3 means it has a D50 of 12 microns or bigger. In another embodiment, a compensated size for P2 and/or P3 means it has a D50 of 26 microns or bigger. In another embodiment, a compensated size for P2 and/or P3 means it has a D50 of 36 microns or bigger. In another embodiment, a compensated size for P2 and/or P3 means it has a D50 of 290 microns or smaller. In an embodiment, a compensated size for P2 and/or P3 means it has a D50 of 90 microns or smaller. In another embodiment, a compensated size for P2 and/or P3 means it has a D50 of 69 microns or smaller. In another embodiment, a compensated size for P2 and/or P3 means it has a D50 of 59 microns or smaller. In another embodiment, a compensated size for P2 and/or P3 means it has a D50 of 39 microns or smaller. In another embodiment, a compensated size for P2 and/or P3 means it has a D50 of 19 microns or smaller. In another embodiment, a compensated size for P2 and/or P3 means it has a D50 of 9 microns or smaller. In an embodiment, the above disclosed values of D50 refers to the particle size at which 50% of the sample's volume is comprised of smaller particles in the cumulative distribution of particle size. In an embodiment, the above disclosed values of D50 refers to the particle size at which 50% of the sample's volume is comprised of smaller particles in the cumulative distribution of particle size and is measured by laser diffraction according to ISO 13320-2009. In an alternative embodiment, the above disclosed values of D50 refers to the particle size at which 50% of the sample's mass is comprised of smaller particles in the cumulative distribution of particle size. In an alternative embodiment, the above disclosed values of D50 refers to the particle size at which 50% of the sample's mass is comprised of smaller particles in the cumulative distribution of particle size and is measured by laser diffraction according to ISO 13320-2009.

In some applications, it is interesting to add some abrasion resistant particles to the powder mixtures. That can apply also to the materials developed in this document and the novel powder mixtures described. In an embodiment, abrasion resistant particles are blended in the powder mixture prior to the filling of the mould (provided in method step a) in method step b). In an embodiment, a moderate amount of fine abrasion resistant particles is blended in the powder mixture prior to the filling of the mould. In an embodiment, a moderate amount is a 0.012% in volume or more. In another embodiment, a moderate amount is a 0.12% in volume or more. In another embodiment, a moderate amount is a 0.62% in volume or more. In another embodiment, a moderate amount is a 1.2% in volume or more. In another embodiment, a moderate amount is a 3.2% in volume or more. In another embodiment, a moderate amount is a 6% in volume or more. In another embodiment, a moderate amount is a 11% in volume or more. In an embodiment, a moderate amount is a 19% in volume or less. In another embodiment, a moderate amount is a 14% in volume or less. In another embodiment, a moderate amount is a 16% in volume or less. In another embodiment, a moderate amount is a 9% in volume or less. In another embodiment, a moderate amount is a 4% in volume or less. In another embodiment, a moderate amount is a 0.9% in volume or less. In an embodiment, fine abrasion resistant mean D50 of 49 microns or less. In another embodiment, fine abrasion resistant mean D50 of 19 microns or less. In another embodiment, fine abrasion resistant mean D50 of 9 microns or less. In another embodiment, fine abrasion resistant mean D50 of 4 microns or less. In another embodiment, fine abrasion resistant mean D50 of 1.9 microns or less. In another embodiment, fine abrasion resistant mean D50 of 0.9 microns or less. In another embodiment, fine abrasion resistant mean D50 of 0.4 microns or less. In an embodiment, the above disclosed values of D50 refers to the particle size at which 50% of the sample's volume is comprised of smaller particles in the cumulative distribution of particle size. In an embodiment, the above disclosed values of D50 refers to the particle size at which 50% of the sample's volume is comprised of smaller particles in the cumulative distribution of particle size and is measured by laser diffraction according to ISO 13320-2009. In an alternative embodiment, the above disclosed values of D50 refers to the particle size at which 50% of the sample's mass is comprised of smaller particles in the cumulative distribution of particle size. In an alternative embodiment, the above disclosed values of D50 refers to the particle size at which 50% of the sample's mass is comprised of smaller particles in the cumulative distribution of particle size and is measured by laser diffraction according to ISO 13320-2009. In an embodiment, fine abrasion resistant mean all particles go through a mesh U.S. MESH 70. In another embodiment, fine abrasion resistant mean all particles go through a mesh U.S. MESH 170. In another embodiment, fine abrasion resistant mean all particles go through a mesh U.S. MESH 325. In another embodiment, fine abrasion resistant mean all particles go through a mesh U.S. MESH 550. In another embodiment, fine abrasion resistant mean all particles go through a mesh U.S. MESH 1750. In another embodiment, fine abrasion resistant mean all particles go through a mesh U.S. MESH 12000. In an embodiment, abrasion resistant particles are oxides. In an embodiment, abrasion resistant particles are carbides. In another embodiment, abrasion resistant particles are nitrides. In another embodiment, abrasion resistant particles are borides. In an embodiment, the abrasion resistant particles comprise a transition metal. In an embodiment, the abrasion resistant particles comprise a transition metal of the III B group. In an embodiment, the abrasion resistant particles comprise a transition metal of the IV B group. In an embodiment, the abrasion resistant particles comprise titanium. In an embodiment, the abrasion resistant particles comprise zirconium. In an embodiment, the abrasion resistant particles comprise a transition metal of the V B group. In an embodiment, the abrasion resistant particles comprise vanadium. In an embodiment, the abrasion resistant particles comprise niobium. In an embodiment, the abrasion resistant particles comprise a transition metal of the VI B group. In an embodiment, the abrasion resistant particles comprise chromium. In an embodiment, the abrasion resistant particles comprise molybdenum. In an embodiment, the abrasion resistant particles comprise tungsten. In an embodiment, the abrasion resistant particles comprise a transition metal of the VIII group. In an embodiment, the abrasion resistant particles comprise iron. In some applications, the sealing of the mould in method step c) is very important. In some applications it is very important to seal the mould in a way that no fluids can penetrate into the mould, even when high pressures are applied. In an embodiment, the filled mould from method steps a) and b) is sealed in a leak free way from any contact with any fluid outside the sealed mould. In an embodiment, the filled mould from method steps a) and b) is sealed in a leak free way from any contact with any liquid outside the sealed mould. In an embodiment, the filled mould from method steps a) and b) is sealed in a leak free way from any contact with any fluid outside the sealed mould, even when high pressures are applied. In an embodiment, and in this context, high pressures are 6 MPa or more. In another embodiment, high pressures are 56 MPa or more. In another embodiment, high pressures are 76 MPa or more. In another embodiment, high pressures are 106 MPa or more. In another embodiment, high pressures are 166 MPa or more. In an embodiment, the filled mould from method steps a) and b) is sealed in a leak free way from any contact with any fluid outside the sealed mould, even when very high pressures are applied. In an embodiment, and in this context, very high pressures are 206 MPa or more. In another embodiment, very high pressures are 266 MPa or more. In another embodiment, very high pressures are 306 MPa or more. In another embodiment, very high pressures are 506 MPa or more. In another embodiment, very high pressures are 606 MPa or more. In another embodiment, very high pressures are 706 MPa or moreIn an embodiment, the filled mould from method steps a) and b) is sealed in a water-tight way. In another embodiment, the filled mould from method steps a) and b) is sealed in a vapor-tight way. In another embodiment, the filled mould from method steps a) and b) is sealed in an oil-tight way. In another embodiment, the filled mould from method steps a) and b) is sealed in a gas-tight way. In another embodiment, the filled mould from method steps a) and b) is sealed in a absolutely-tight way. In another embodiment, the filled mould from method steps a) and b) is sealed in a bacteria-tight way. In another embodiment, the filled mould from method steps a) and b) is sealed in a pox-virus-tight way. In another embodiment, the filled mould from method steps a) and b) is sealed in a bacteriophages-virus-tight way. In another embodiment, the filled mould from method steps a) and b) is sealed in a RNA-virus-tight way. In an embodiment, the definition of tightness is according to Cat. No. 199 79_VA.02 from Leybold GmbH. In an embodiment, leak rates and/or vacuum tightness is determined according to DIN-EN 1330-8. In an alternative embodiment, leak rates and/or vacuum tightness is determined according to DIN-EN 13185. In another alternative embodiment, leak rates and/or vacuum tightness is determined according to DIN-EN 1779. In an embodiment, the filled mould from method steps a) and b) is sealed in a vacuum tight way with a low leak rate. In an embodiment, a low leak rate is 0.9 mbar·l/s or less. In another embodiment, a low leak rate is 0.08 mbar·l/s or less. In another embodiment, a low leak rate is 0.008 mbar·l/s or less. In another embodiment, a low leak rate is 0.0008 mbar·l/s or less. In another embodiment, a low leak rate is 0.00009 mbar·l/s or less. In another embodiment, a low leak rate is 0.000009 mbar·l/s or less. In an embodiment, the above disclosed leak rates and/or vacuum tightness values are determined according to DIN-EN 1330-8. In an alternative embodiment, the above disclosed leak rates and/or vacuum tightness values are determined according to DIN-EN 13185:2001. In another alternative embodiment, the above disclosed leak rates and/or vacuum tightness values are determined according to DIN-EN 1779:2011. Very surprisingly, the inventor has found that for some applications and excessive vacuum tightness is counterproductive, and negatively affects the final mechanical properties attainable. In an embodiment, a low leak rate is $1.2\cdot10^{-9}$ mbar·l/s or more. In another embodiment, a low leak rate is $1.2\cdot10^{-7}$ mbar·l/s or more. In another embodiment, a low leak rate is $1.2\cdot10^{-6}$ mbar·l/s or more. In another embodiment, a low leak rate is $1.2\cdot10^{-5}$ mbar·l/s or more. In another embodiment, a low leak rate is $1.2\cdot10^{-4}$ mbar·l/s or more. In an embodiment, the low leak rate described in this document refers to the leaking quantity of substance (for example air when the environment is air, or water when the environment is water, oil, . . . ). In an embodiment, when the substance is a liquid, the leak rates described in mbar·l/s are multiplied by 5.27 and then expressed in mg/s. In an embodiment, the leak rates described in this document refer to helium standard leak rate as per definition in DIN EN 1330-8. In alternative embodiments, the leak rates and/or vacuum tightness values are measured according to DIN-EN 13185:2001. In another alternative embodiment, the leak rates and/or vacuum tightness values are measured according to DIN-EN 1779:2011. In an embodiment, the values provided for leak rates described in mbar·l/s should read mbar·l/s He Std. In an embodiment, an organic coating is applied to at least part of the filled mould in method step c). In an embodiment, the coating comprises a polymer. In an embodiment, the coating comprises an elastomer. In an embodiment, the coating comprises a rubbery material. In an embodiment, the coating comprises a rubber. In an embodiment, the coating comprises a latex derivative. In an embodiment, the coating comprises latex. In an embodiment, the coating comprises a natural rubber. In an embodiment, the coating comprises a synthetic elastomer. In an embodiment, the coating comprises a silicone derivative. In an embodiment, the coating comprises a silicone. In an embodiment, the coating comprises a fluoroelastomer. In an embodiment, the coating comprises a M-Class rubber material according to ASTM D-1418 definition. In an embodiment, the coating comprises an ethylene-propylene containing elastomer material. In an embodiment, the coating comprises a terpolymer containing ethylene elastomer material. In an embodiment, the coating comprises a terpolymer containing propylene elastomer material. In an embodiment, the coating comprises an ethylene-propylene-diene monomer rubber (EPDM) material. In an embodiment, the coating comprises a FKM material according to ASTM definition (ASTM D1418-17). In an embodiment, the coating comprises a perfluoroelastomer (FFKM). In an embodiment, the coating comprises an EPDM derivative. In an embodiment, the coating comprises a FKM derivative. In an embodiment, the coating comprises a FFKM derivative. In some applications the working temperature of the coating is important. In an embodiment, the coating has a high enough maximum working temperature. In an embodiment, the maximum working temperature is the degradation temperature of the material. In an embodiment, the maximum working temperature is the temperature where the material has lost a 0.05% of weight. In an embodiment, the maximum working temperature is the temperature where the material stops presenting a low leak rate in the terms described above. In an embodiment, the maximum working temperature is according to the literature definition. In an embodiment, a high enough maximum working temperature is 52° C. or more. In another embodiment, a high enough maximum working temperature is 82° C. or more. In another embodiment, a high enough maximum working temperature is 102° C. or more. In another embodiment, a high enough maximum working temperature is 152° C. or more. In another embodiment, a high enough maximum working temperature is 202° C. or more. In another embodiment, a high enough maximum working temperature is 252° C. or more. In another embodiment, a high enough maximum working temperature is 302° C. or more. In an embodiment, the coating comprises continuous layers. In an embodiment, the coating is composed of several layers. In an embodiment, the coating is composed of several layers of different materials. In an embodiment, the coating covers the whole mould provided in method step a) and filled in method step b). In an embodiment, the coating is applied as a liquid that dries out or cures. In an embodiment, the coating is applied as a paste that dries out or cures. In an embodiment, at least part of the coating is applied through dipping of the filled mould into the coating material. In an embodiment, at least part of the coating is applied through brushing of the filled mould with the coating material. In an embodiment, at least part of the coating is applied through spraying of the filled mould with the coating material. In an embodiment, at least part of the internal features of the mould which are not filled with powder and have voids (are not completely solid with the mould material) are coated. In an embodiment, all of the internal features of the mould which are not filled with powder and have voids (are not completely solid with the mould material) are coated. In an embodiment, at least part of the internal features which are connected to the exterior are coated. In an embodiment, all of the internal features which are connected to the exterior are coated. In an embodiment, when coating internal features which are connected to the exterior, special care is taken to make sure that those internal features remain connected to the exterior after the coating so that pressure can be applied on the walls of the interconnected internal features on the opposite side of the powder. In an embodiment, the coating is just a pre-fabricated container that is placed over the filled mould. In an embodiment, the coating is just a pre-fabricated container comprising an elastomeric material that is placed over the filled mould. In an embodiment, the coating is just a vacuum bag that is placed over the filled mould. In an embodiment, a system to make vacuum in the filled mould using the coating as a vacuum container is provided. In an embodiment, a system to make vacuum in the filled mould using the coating as a vacuum container followed by its sealing to retain a vacuum in the mould is provided. In an embodiment, the coating is used as a vacuum container and a vacuum of 790 mbars or higher is made. In another embodiment, the coating is used as a vacuum container and a vacuum of 490 mbars or higher is made. In another embodiment, the coating is used as a vacuum container and a vacuum of 90 mbars or higher is made. In another embodiment, the coating is used as a vacuum container and a vacuum of 40 mbars or higher is made. In another embodiment, the coating is used as a vacuum container and a vacuum of 9 mbars or higher is made. In some applications, it is advantageous to have a controlled high vacuum level in the mould in the following method steps. In an embodiment, a controlled high vacuum is applied to the filled in method step b) mould provided in method step a) using the coating as a vacuum tight container. In an embodiment, a controlled high vacuum level is 0.9 mbars or less. In another embodiment, a controlled high vacuum level is 0.09 mbars or less. In another embodiment, a controlled high vacuum level is 0.04 mbars or less. In another embodiment, a controlled high vacuum level is 0.009 mbars or less. In another embodiment, a controlled high vacuum level is 0.0009 mbars or less. In another embodiment, a controlled high vacuum level is 0.00009 mbars or less. In an embodiment, a controlled high vacuum level is $10^{-10}$ mbars or more. In another embodiment, a controlled high vacuum level is $10^{-8}$ mbars or more. In another embodiment, a controlled high vacuum level is $10^{-6}$ mbars or more. In another embodiment, a controlled high vacuum level is $10^{-4}$ mbars or more. In an embodiment, a polymeric fastener is used to seal the coating and keep at least some of the applied vacuum in the filled mould when method step d) is applied. In an embodiment, a metallic fastener is used to seal the coating and keep at least some of the applied vacuum in the filled mould when method step d) is applied. In an embodiment, some of the applied vacuum is 190 mbars or higher vacuum. In another embodiment, some of the applied vacuum is 9 mbars or higher vacuum. In another embodiment, some of the applied vacuum is 0.9 mbars or higher vacuum. In another embodiment, some of the applied vacuum is 0.09 mbars or higher vacuum. In another embodiment, some of the applied vacuum is 0.009 mbars or higher vacuum. In another embodiment, some of the applied vacuum is 0.0009 mbars or higher vacuum. In an embodiment, the vacuum is retained in the mould provided in method step a) and filled in method step b) only in the areas filled with powder. In an embodiment, the vacuum is retained in the mould provided in method step a) and filled in method step b) only in the areas connected to the areas filled with powder, and thus the void areas of the internal features are excluded.

In some applications it is interesting to seal the filled mould directly or even the filled mould with the coating or even the filled mould with the coating where vacuum has been performed and then the coating sealed, with a polymeric material film with a low permeability to gases and vapours. In an embodiment, a low permeability to gases and vapours is 190000 ml/($m^2$≈24 h·MPa) or less—ml stands for milliliters—. In another embodiment, a low permeability to gases and vapours is 79000 ml/($m^2$·24 h·MPa) or less. In another embodiment, a low permeability to gases and vapours is 49000 ml/($m^2$·24 h·MPa) or less. In another embodiment, a low permeability to gases and vapours is 19000 ml/($m^2$·24 h·MPa) or less. In another embodiment, a low permeability to gases and vapours is 9000 ml/($m^2$·24 h·MPa) or less. In some applications, it is interesting to have an extra low permeability to gases. In some applications it is interesting to seal the filled mould directly or even the filled mould with the coating or even the filled mould with the coating where vacuum has been performed and then the coating sealed, with a polymeric material film with a very low permeability to gases and vapours. In an embodiment, a very low permeability to gases and vapours is 1900 ml/($m^2$·24 h·MPa) or less. In another embodiment, a very low permeability to gases and vapours is 990 m/($m^2$·24 h·MPa) or less. In another embodiment, a very low permeability to gases and vapours is 490 ml/($m^2$·24 h·MPa) or less. In another embodiment, a very low permeability to gases and vapours is 290 ml/($m^2$·24 h·MPa) or less. In another embodiment, a very low permeability to gases and vapours is 94 ml/($m^2$·24 h·MPa) or less. In an embodiment, the permeability to vapors is measured in g/($m^2$·24*h*) and then multiplied by 1000 and expressed in ml/($m^2$·24 h·MPa) to evaluate if it fits the low permeability and/or very low permeability to gases and vapours defined in the preceding lines. Surprisingly enough, some applications do not benefit from excessive low permeability of the film. In an embodiment, the permeability to gases and vapours of the film is 0.012 ml/($m^2$·24 h·MPa) or more. In another embodiment, the permeability to gases and vapours of the film is 0.12 ml/($m^2$·24 h·MPa) or more. In another embodiment, the permeability to gases and vapours of the film is 1.2 ml/($m^2$·24 h·MPa) or more. In another embodiment, the permeability to gases and vapours of the film is 12 ml/($m^2$·24 h·MPa) or more. In another embodiment, the permeability to gases and vapours of the film is 56 ml/($m^2$·24 h·MPa) or more. In another embodiment, the permeability to gases and vapours of the film is 220 ml/($m^2$·24 h·MPa) or more. In an embodiment, the low permeability and/or very low permeability to gases and vapours refers to carbon dioxide. In another embodiment, the low permeability and/or very low permeability to gases and vapours refers to oxygen. In another embodiment, the low permeability and/or very low permeability to gases and vapours refers to hydrogen. In another embodiment, the low permeability and/or very low permeability to gases and vapours refers to nitrogen. In another embodiment, the low permeability and/or very low permeability to gases and vapours refers to helium. In another embodiment, the low permeability and/or very low permeability to gases and vapours refers to water vapor. In different embodiments, the low permeability and/or very low permeability to gases and vapours refers to carbon dioxide, to oxygen, to hydrogen, to nitrogen, to helium and/or to water vapor. In an embodiment, permeability to gases is measured according to ASTM D-1434 (1988). In an alternative embodiment, the above disclosed values of permeability to gases are measured according to ASTM D-3985-17 for oxygen. In an embodiment, permeability to gases is measured at 75° F. In another alternative embodiment, the above disclosed values of permeability to vapours are measured according to ASTM E-96/E96M-16. In an embodiment, the above disclosed values of permeability to gases and vapours of the film are at 75° F. In an embodiment, the polymeric material film with a low permeability and/or very low permeability to gases and vapours comprises a polyester. In an embodiment, the polymeric material film with a low permeability and/or very low permeability to gases and vapours comprises MYLAR. In an embodiment, the polymeric material film with a low permeability and/or very low permeability to gases and vapours comprises a polyimide. In an embodiment, the polymeric material film with a low permeability and/or very low permeability to gases and vapours comprises KAPTON. In an embodiment, the polymeric material film with a low permeability and/or very low permeability to gases and vapours comprises a polyvinyl fluoride. In an embodiment, the polymeric material film with a low permeability and/or very low permeability to gases and vapours comprises TEDLAR. In an embodiment, the polymeric material film with a low permeability and/or very low permeability to gases and vapours comprises a polyethylene. In an embodiment, the polymeric material film with a low permeability and/or very low permeability to gases and vapours comprises a high density polyethylene (HDPE). In some applications the right thickness of the film is important. In an embodiment, a film with the right thickness is employed. In an embodiment, the right film thickness is 2 microns or more. In another embodiment, the right film thickness is 22 microns or more. In another embodiment, the right film thickness is 52 microns or more. In another embodiment, the right film thickness is 102 microns or more. In another embodiment, the right film thickness is 202 microns or more. In another embodiment, the right film thickness is 402 microns or more. In an embodiment, the right film thickness is 9 mm or less. In another embodiment, the right film thickness is 4 mm or less. In another embodiment, the right film thickness is 0.9 mm or less. In another embodiment, the right film thickness is 0.4 mm or less. In another embodiment, the right film thickness is 0.09 mm or less. In some applications the strength of the film is important. In an embodiment, the film is chosen with a ultimate tensile strength of 6 MPa or more. In another embodiment, the film is chosen with a ultimate tensile strength of 26 MPa or more. In another embodiment, the film is chosen with a ultimate tensile strength of 56 MPa or more. In another embodiment, the film is chosen with a ultimate tensile strength of 106 MPa or more. In another embodiment, the film is chosen with a ultimate tensile strength of 156 MPa or more. In another embodiment, the film is chosen with a ultimate tensile strength of 206 MPa or more. In an embodiment, Ultimate tensile strength of the film is determined according to ASTM D-882-18. In an embodiment, the above disclosed values of ultimate tensile strength are at 75° F. In some applications the strength at 5% elongation of the film should not be excessive. In an embodiment, the film is chosen with a strength at 5% elongation of 1900 MPa or less. In another embodiment, the film is chosen with a strength at 5% elongation of 490 MPa or less. In another embodiment, the film is chosen with a strength at 5% elongation of 290 MPa or less. In another embodiment, the film is chosen with a strength at 5% elongation of 190 MPa or less. In another embodiment, the film is chosen with a strength at 5% elongation of 140 MPa or less. In another embodiment, the film is chosen with a strength at 5% elongation of 98 MPa or less. In an embodiment, strength at 5% elongation of the film is determined according to ASTM D-882-18. In an embodiment, the above disclosed values of strength at 5% elongation of the film are at 75° F. In some applications the maximum working temperature of the film is of importance. In an embodiment, the film has a high enough maximum working temperature. In an embodiment, the maximum working temperature is the degradation temperature of the material. In an embodiment, the maximum working temperature is the temperature where the material has lost a 0.05% of weight. In an embodiment, the mass loss can be measured according to ASTM E1131-08. In an alternative embodiment, the mass loss can be measured by thermogravimetry. In different embodiments, degradation temperature can alternatively refer to the temperature corresponding to a mass loss of the material of 10% by weight, 20% by weight, 25% by weight, 45% by weight, 65% by weight, and even over 65% by weight obtained following test conditions of ASTM E1131-08. In an embodiment, the maximum working temperature is the temperature where the materials permeability to oxygen increases a 6%. In another embodiment, the maximum working temperature is the temperature where the materials permeability to oxygen increases a 26%. In another embodiment, the maximum working temperature is the temperature where the materials permeability to oxygen doubles (increases a 100%). In an embodiment, the maximum working temperature is the temperature where the materials ultimate tensile strength is an 80% of the value at 75° F. In another embodiment, the maximum working temperature is the temperature where the materials ultimate tensile strength is a 50% of the value at 75° F. In another embodiment, the maximum working temperature is the temperature where the materials ultimate tensile strength is a 30% of the value at 75° F. In an embodiment, a high enough maximum working temperature is 52° C. or more. In another embodiment, a high enough maximum working temperature is 82° C. or more. In another embodiment, a high enough maximum working temperature is 102° C. or more. In another embodiment, a high enough maximum working temperature is 152° C. or more. In another embodiment, a high enough maximum working temperature is 202° C. or more. In another embodiment, a high enough maximum working temperature is 252° C. or more. In another embodiment, a high enough maximum working temperature is 302° C. or more.

In an embodiment, the low permeability and/or very low permeability to gases and vapours film is sealed into a bag with one opening before usage. In an embodiment, the low permeability and/or very low permeability to gases and vapours film is sealed in a conformal shape to the filled mould. In an embodiment, the low permeability and/or very low permeability to gases and vapours film is sealed with an adhesive. In an embodiment, the low permeability and/or very low permeability to gases and vapours film is thermosealed. In an embodiment, the low permeability and/or very low permeability to gases and vapours film is evacuated previous to the final sealing.

In an embodiment, the film is used as a vacuum container and a vacuum of 890 mbars or higher is made. In another embodiment, the film is used as a vacuum container and a vacuum of 790 mbars or higher is made. In another embodiment, the film is used as a vacuum container and a vacuum of 490 mbars or higher is made. In another embodiment, the film is used as a vacuum container and a vacuum of 140 mbars or higher is made. In another embodiment, the film is used as a vacuum container and a vacuum of 90 mbars or higher is made. In some applications, it is advantageous to have a controlled high vacuum level in the mould in the following method steps. In an embodiment, a controlled high vacuum is applied to the filled in method step b) mould provided in method step a) using the film as a vacuum tight container. In an embodiment, a controlled high vacuum is applied to the filled in method step b) mould provided in method step a) which has been vacuum sealed using the coating as a vacuum tight container is evacuated as a package using the film as a vacuum tight container. In an embodiment, a controlled high vacuum level is 40 mbars or less. In another embodiment, a controlled high vacuum level is 4 mbars or less. In another embodiment, a controlled high vacuum level is 0.9 mbars or less. In another embodiment, a controlled high vacuum level is 0.4 mbars or less. In another embodiment, a controlled high vacuum level is 0.09 mbars or less. In another embodiment, a controlled high vacuum level is 0.0009 mbars or less. In an embodiment, a controlled high vacuum level is $10^{-8}$ mbars or more. In another embodiment, a controlled high vacuum level is $10^{-6}$ mbars or more. In another embodiment, a controlled high vacuum level is $10^{-3}$ mbars or more. In another embodiment, a controlled high vacuum level is $10^{-2}$ mbars or more. In an embodiment, the film is sealed after realizing the vacuum. In an embodiment, the film is thermally sealed after realizing the vacuum. In an embodiment, the film is sealed with a glue after realizing the vacuum. In some applications, it is not convenient that the vacuumized low permeability and/or very low permeability to gases and vapours film acts an impediment for pressure applied in at least one of method steps d), e) and/or f) to reach the void internal features of the mould provided in method step b). In an embodiment, the vacuum sealing of the low permeability and/or very low permeability to gases and vapours film does not difficult pressure applied in at least one of method steps d), e) and/or f) to reach the void internal features of the mould provided in method step a). In an embodiment, the vacuum sealing of the low permeability and/or very low permeability to gases and vapours film does not impede the pressure applied in at least one of method steps d), e) and/or f) to reach the void internal features of the mould provided in method step a). In an embodiment, the mould void internal features are connected to the exterior as explained in another section of this document. In an embodiment, the connections to the exterior are extended. In an embodiment, the connections to the exterior are extended with a polymeric material. In an embodiment, the connections to the exterior are extended in a vacuum tight way. In an embodiment, the connections to the exterior are extended in a vacuum tight way with the help of a glue. In an embodiment, the connections to the exterior are extended in a vacuum tight way with the help of an epoxy comprising glue. In an embodiment, the film is sealed around the connection to the exterior and/or its extension. In an embodiment, the film is vacuumized and sealed around the connection to the exterior and/or its extension. In an embodiment, the film and the connection to the exterior and/or its extension are bond together. In an embodiment, the film and the connection to the exterior and/or its extension are bond together in a vacuum tight way. In an embodiment, the film and the connection to the exterior and/or its extension are bond together with a glue. In an embodiment, the film and the connection to the exterior and/or its extension are bond together with an epoxy comprising glue. In an embodiment, a hole is performed allowing pressure to flow through the connection to the exterior and/or its extension of the void internal features of the mould provided in method step b) while not disturbing the vacuum in the film. In an embodiment, a hole is performed allowing pressure to flow through the connection to the exterior and/or its extension of the void internal features of the mould provided in method step b) while not disturbing the vacuum in the coating. In an embodiment, the hole is made shortly before method step d) is initiated. In an embodiment, shortly is less than 10 seconds. In another embodiment, shortly is less than a minute. In another embodiment, shortly is less than 9 minutes. In another embodiment, shortly is less than 24 minutes. In another embodiment, shortly is less than an hour. In another embodiment, shortly is less than a week. In another embodiment, shortly is less than a month.

In an embodiment, at least one of the steps described above for method step c) is repeated more than once. In an embodiment, more than one sealing with a polymeric material film with a low permeability to gases and vapours is performed.

In some special realizations, method step c) can be extremely simplified and reduced to the closing of the mould containing the powder. In an embodiment, method step c) consists in the closing of the mould provided in method step a) and filled in method step b) with a lid. In an embodiment, method step c) does not require the application of vacuum. In an embodiment, in method step c) a coating is applied as described and is not exposed to vacuum. In an embodiment, in method step c) the mould is wrapped with a material comprising a polymer.

In some applications, method step d) is very critical. In some applications, it is important which means are used to apply the pressure, some are sensitive at the rate of pressure application and some at the maximum pressure level attained. The inventor was surprised at the far reaching consequences of some of those variables for some applications. On the other hand, some applications are rather insensitive as how pressure is applied and even the pressure level attained. In an embodiment, pressure is applied to the mould provided in method step a) filled in b) and sealed in c) through a particle fluidized bed. In an embodiment, pressure is applied through a fluid. In an embodiment, pressure is applied through a fluid comprising water. In an embodiment, pressure is applied through a fluid comprising an organic material. In an embodiment, pressure is applied through a fluid comprising oil. In an embodiment, pressure is applied through a fluid comprising a vegetable oil. In an embodiment, pressure is applied through a fluid comprising a mineral oil. In an embodiment, pressure is applied through a liquid. In an embodiment, pressure is applied through a gas. In an embodiment, pressure is applied through a fluid comprising a liquid. In an embodiment, pressure is applied through a fluid comprising a gas. In an embodiment, pressure is applied through a fluid comprising argon. In an embodiment, pressure is applied through a fluid comprising nitrogen. In an embodiment, pressure is applied through a fluid comprising helium. In an embodiment, pressure is applied through pressurized air. In an embodiment, pressure is applied through a gas comprising an organic material. In an embodiment, pressure is applied through a gas comprising an organic material in gaseous form. In an embodiment, pressure is applied through a fluid comprising hydrogen. In an embodiment, when the fluid comprises argon, nitrogen, helium and/or hydrogen, they are in gaseous form. In an embodiment, when the fluid comprises argon, nitrogen, helium and/or hydrogen, they are in elemental form. In an embodiment, the right amount of maximum pressure is applied to the filled and sealed mould. In an embodiment, the right amount of maximum pressure is applied for a relevant time to the filled and sealed mould. In an embodiment, the right amount of maximum pressure is 12 MPa or more. In another embodiment, the right amount of maximum pressure is 105 MPa or more. In another embodiment, the right amount of maximum pressure is 155 MPa or more. In another embodiment, the right amount of maximum pressure is 170 MPa or more. In another embodiment, the right amount of maximum pressure is 185 MPa or more. In another embodiment, the right amount of maximum pressure is 205 MPa or more. In another embodiment, the right amount of maximum pressure is 260 MPa or more. In another embodiment, the right amount of maximum pressure is 302 MPa or more. As explained in another paragraph in this document, higher pressures are normally required when skipping steps e) and f), but also when not skipping them, for some applications it is interesting to use even higher pressures to attain higher apparent density. In an embodiment, the right amount of maximum pressure is 410 MPa or more. In another embodiment, the right amount of maximum pressure is 510 MPa or more. In another embodiment, the right amount of maximum pressure is 601 MPa or more. In another embodiment, the right amount of maximum pressure is 655 MPa or more. In another embodiment, the right amount of maximum pressure is 820 MPa or more. Surprisingly enough, in some applications an excessive amount of pressure in method step d) leads to internal defects, even more so for complex and large geometries. In an embodiment, the right amount of maximum pressure is 1900 MPa or less. In another embodiment, the right amount of maximum pressure is 900 MPa or less. In another embodiment, the right amount of maximum pressure is 690 MPa or less. In another embodiment, the right amount of maximum pressure is 490 MPa or less. In another embodiment, the right amount of maximum pressure is 390 MPa or less. In another embodiment, the right amount of maximum pressure is 290 MPa or less. In different embodiments, the relevant time is at least 1 second, at least 4 seconds, at least 12 seconds, at least 19 seconds, at least 56 seconds, at least 4 min and even at least 6 minutes. It is very surprising that such low levels of pressure, lead to sound final components for some of the powder mixtures of the present invention. In some applications, the way the pressure is applied has an incidence in the soundness of the components obtained. In an embodiment, the pressure is applied in a stepwise manner. In an embodiment, the first step is done within the first 20% of the right amount of maximum pressure. In another embodiment, the first step is done within the first 15% of the right amount of maximum pressure. In another embodiment, the first step is done within the first 10% of the right amount of maximum pressure. In another embodiment, the first step is done within the first 5% of the right amount of maximum pressure. In an embodiment, the first step holding time is at least 2 seconds. In another embodiment, the first step holding time is at least 5 seconds. In another embodiment, the first step holding time is at least 15 seconds. In another embodiment, the first step holding time is at least 55 seconds. In another embodiment, the first step holding time is at least 5 minutes. In an embodiment, during the first step holding time there is a variation on the applied pressure of ±5% or less. In an embodiment, during the first step holding time there is a variation on the applied pressure of ±15% or less. In another embodiment, during the first step holding time there is a variation on the applied pressure of ±55% or less. In another embodiment, during the first step holding time there is a variation on the applied pressure of ±75% or less. In an embodiment, there are at least two steps. In another embodiment, there are at least 3 steps. In an embodiment, the pressure is applied in a stairwise manner. Some applications suffer when the pressure is applied too rapidly. In an embodiment, in step d) pressure is applied at a low enough rate. In an embodiment, pressure is applied at a low enough rate at least within the initial stretch. In an embodiment, a low enough rate is 980 MPa/s or less. In another embodiment, a low enough rate is 98 MPa/s or less. In another embodiment, a low enough rate is 9.8 MPa/s or less. In another embodiment, a low enough rate is 0.98 MPa/s or less. In another embodiment, a low enough rate is 0.098 MPa/s or less. In another embodiment, a low enough rate is 0.009 MPa/s or less. Some applications requiring a low rate cannot accept an excessively low rate. In an embodiment, a low enough rate is higher than 0.9 MPa/h. In another embodiment, a low enough rate is higher than 9 MPa/h. In another embodiment, a low enough rate is higher than 90 MPa/h. In another embodiment, a low enough rate is higher than 900 MPa/h. In another embodiment, a low enough rate is higher than 9000 MPa/h. In an embodiment, the initial stretch is the first 5% of the right amount of maximum pressure. In another embodiment, the initial stretch is the first 10% of the right amount of maximum pressure. In another embodiment, the initial stretch is the first 25% of the right amount of maximum pressure. In another embodiment, the initial stretch is the first 55% of the right amount of maximum pressure. In another embodiment, the initial stretch is the first 100% of the right amount of maximum pressure. In an embodiment, the initial stretch is the first 5 MPa. In another embodiment, the initial stretch is the first 10 MPa. In another embodiment, the initial stretch is the first 15 MPa. In another embodiment, the initial stretch is the first 25 MPa. In another embodiment, the initial stretch is the first 55 MPa. And some applications in fact benefit from a fast pressure rate application, specially in the first stretch. In an embodiment, pressure is applied at a high enough rate at least within the initial stretch (in the same sense as described above). In an embodiment, a high enough rate is 0.09 MPa/s or more. In another embodiment, a high enough rate is 0.9 MPa/s or more. In another embodiment, a high enough rate is 9 MPa/s or more. In another embodiment, a high enough rate is 9 MPa/s or more. In another embodiment, a high enough rate is 90 MPa/s or more. In some applications, it might be interesting to introduce the sealed and filled mould in the pressure application device, when the fluid used to apply the pressure is hot. In an embodiment, the sealed and filled mould is introduced in the pressure application device, when the fluid used to apply the pressure is hot. In an embodiment, the sealed and filled mould is introduced in the pressure application device, when the fluid used to apply the pressure is hot, but making sure at least part of the pressure is applied before the powder in the mould becomes hot. In an embodiment, the sealed and filled mould is introduced in the pressure application device, when the fluid used to apply the pressure is hot, but making sure the pressure is applied in method step d) before the powder in the mould becomes hot. In an embodiment, the pressure application device is any device capable to raising the applied pressure to the right amount of maximum pressure with the appropriate rate and capable of attaining the desired temperature in method step e). In an embodiment, the pressure application device is any device capable to raising the applied pressure to the right amount of maximum pressure. In an embodiment, the pressure application device is a CIP. In another embodiment, the pressure application device is a WIP—Warm Isostatic Pressure—. In another embodiment, the pressure application device is a HIP. In an embodiment, the fluid being hot means it has a temperature of 35° C. or more. In another embodiment, the fluid being hot means it has a temperature of 45° C. or more. In another embodiment, the fluid being hot means it has a temperature of 55° C. or more. In another embodiment, the fluid being hot means it has a temperature of 75° C. or more. In another embodiment, the fluid being hot means it has a temperature of 105° C. or more. In another embodiment, the fluid being hot means it has a temperature of 155° C. or more. In an embodiment, the powder not becoming hot means it has a mean temperature of 145° C. or less. In another embodiment, the powder not becoming hot means it has a mean temperature of 95° C. or less. In another embodiment, the powder not becoming hot means it has a mean temperature of 45° C. or less. In another embodiment, the powder not becoming hot means it has a mean temperature of 35° C. or less. In an embodiment, the powder becoming hot means it has a mean temperature of more than 35° C. In another embodiment, the powder becoming hot means it has a mean temperature of more than 45° C. In another embodiment, the powder becoming hot means it has a mean temperature of more than 95° C. In another embodiment, the powder becoming hot means it has a mean temperature of more than 145° C.

In some applications it has been found that the filling apparent density has to be well-adjusted with the maximum pressure applied to the mould in method step d) and the mean temperature of the powder. In an embodiment, the following rule applies at some point within method step d):

When MPID<LLMPI then: MAD+RFT1*MTI<LADT1 or MAD−RFP1*MPID<LPT1;

When LLMPI≤MPID<HLMPI then: MAD+RFT2*MTI<LADT2 or MAD−RFP2*MPID<LPT2;

When HLMPI≤MPID then: MAD+RFT3*MTI<LADT3 or MAD+RFP3*MPID<LPT3;

Where: LLMPI, HLMPI, RFT1, LADT1, RFP1, LPT1, RFT2, LADT2, RFP2, LPT2, RFT3, LADT3, RFP3 and LPT3 are parameters; $MPID=\sqrt[3]{MaxPresD}-5.84803548$, and Max-PresD is the maximum pressure applied in method step d); MAD=1/(AD)3 where AD is the mean apparent filling density of the powder in the mould; $MTI=\sqrt[3]{TP}-6.83990379$ and TP is the mean absolute temperature of the powder. In an embodiment, LLMPI is −1.367. In another embodiment, LLMPI is −1.206. In another embodiment, LLMPI is −0.916. In another embodiment, LLMPI is −0.476. In another embodiment, LLMPI is −0.308. In an embodiment, HLMPI is 0.366. In another embodiment, HLMPI is 0.831. In another embodiment, HLMPI is 1.458. In another embodiment, HLMPI is 2.035. In another embodiment, HLMPI is 2.539. In another embodiment, HLMPI is 2.988. In an embodiment, RFT1 is 0.3. In another embodiment, RFT1 is 0.8. In another embodiment, RFT1 is 1.0. In another embodiment, RFT1 is 2.3. In another embodiment, RFT1 is 4.3. In an embodiment, LADT1 is 6.0. In another embodiment, LADT1 is 3.5. In another embodiment, LADT1 is 3.0. In another embodiment, LADT1 is 2.8. In another embodiment, LADT1 is 2.5. In another embodiment, LADT1 is 2.0. In another embodiment, LADT1 is 1.5. In an embodiment, RFP1 is 0.2. In another embodiment, RFP1 is 0.9. In another embodiment, RFP1 is 1.6. In another embodiment, RFP1 is 2.2. In another embodiment, RFP1 is 3.0. In an embodiment, LPT1 is 8.0. In another embodiment, LPT1 is 5.0. In another embodiment, LPT1 is 4.0. In another embodiment, LPT1 is 3.0. In another embodiment, LPT1 is 2.5. In another embodiment, LPT1 is 2.0. In an embodiment, RFT2 is 0.3. In another embodiment, RFT2 is 0.8. In another embodiment, RFT2 is 1.0. In another embodiment, RFT2 is 2.3. In another embodiment, RFT2 is 3.3. In another embodiment, RFT2 is 4.5. In another embodiment, RFT2 is 6.3. In an embodiment, LADT2 is 5.5. In another embodiment, LADT2 is 3.5. In another embodiment, LADT2 is 3.25. In another embodiment, LADT2 is 3.0. In another embodiment, LADT2 is 2.8. In another embodiment, LADT2 is 2.5. In an-other embodiment, LADT2 is 2.0. In another embodiment, LADT2 is 1.5. In another embodiment, LADT2 is 1.0. In an embodiment, RFP2 is 0.2. In another embodiment, RFP2 is 1.0. In another embodiment, RFP2 is 1.6. In another embodiment, RFP2 is 2.2. In another embodiment, RFP2 is 3.0. In another embodiment, RFP2 is 5.0. In another embodiment, RFP2 is 7.0. In an embodiment, LPT2 is 7.4. In another embodiment, LPT2 is 7.0. In another embodiment, LPT2 is 5.0. In another embodiment, LPT2 is 4.1. In another embodiment, LPT2 is 3.5. In another embodiment, LPT2 is 2.0. In another embodiment, LPT2 is 1.0. In another embodiment, LPT2 is 0.0. In an embodiment, RFT3 is 0.3. In another embodiment, RFT3 is 0.8. In another embodiment, RFT3 is 1.0. In another embodiment, RFT3 is 2.3. In another embodiment, RFT3 is 4.3. In an embodiment, LADT3 is 6.0. In another embodiment, LADT3 is 3.5. In another embodiment, LADT3 is 3.0. In another embodiment, LADT3 is 2.8. In another embodiment, LADT3 is 2.5. In another embodiment, LADT3 is 2.0. In another embodiment, LADT3 is 1.5. In an embodiment, RFP3 is 0.4. In another embodiment, RFP3 is 1.1. In another embodiment, RFP3 is 2.0. In another embodiment, RFP3 is 3.2. In another embodiment, RFP3 is 4.5. In an embodiment, LPT3 is 20.0. In another embodiment, LPT3 is 16.5. In another embodiment, LPT3 is 14.0. In another embodiment, LPT3 is 10.0. In another embodiment, LPT3 is 7.2. In another embodiment, LPT3 is 6.0. In another embodiment, LPT3 is 5.2. In another embodiment, LPT3 is 3.0. In an embodiment, AD is the apparent filling density of the powder in the mould. In another embodiment, AD is the balanced apparent density. In an embodiment, TP is the mean temperature of the powder in step d). In another embodiment, TP is the maximum temperature of the powder in step d).

In an embodiment, in the preceding rule the following values of MPID are not permitted: HLMPI≤MPID. In an embodiment, in the preceding rules the following values of MPID are not permitted: MPID<LLMPI. In an embodiment, in the preceding rules the following values of MPID are not permitted: HLMPI≤MPID<LLMPI.

The inventor has found that method step d) is surprisingly capital for many applications. In fact, it is very counter-intuitive. One would expect to work much better a sequence where the pressure is applied after the temperature of the mould has been raised, so shifting method steps e) and d) but the inventor has found that doing so leads to components with internal defects, amongst many other reasons due to the flowing of the mould into the component itself, which can be on a first instance corrected by introducing a protective intermediate layer, at least for some simple geometries, but only prevents a few of the internal defects and no sound components can be attained. For some applications, and specially when the components are small, this lack of soundness is sometimes not detrimental but of course for most applications pursued in the present invention it is unacceptably detrimental.

In some applications, method step e) is very important and the values of the relevant parameters have to be controlled properly. In an embodiment, the temperature of the mould is raised while keeping the right pressure level. In an embodiment, the temperature of the mould is raised by heating up the fluid that exerts the pressure. In an embodiment, the temperature is raised at least through radiation. In an embodiment, the temperature is raised at least through convection. In an embodiment, the temperature is raised at least through conduction. In an embodiment, the temperature of the mould refers to the mean temperature of the mould provided in method step a). In an embodiment, the temperature of the mould refers to the mean temperature of the powder contained in the mould provided in method step a) and filled in method step b). In an embodiment, the temperature of the mould refers to the mean temperature of the fluid exerting pressure on the mould. In an embodiment, the temperature of the mould refers to the mean temperature of the fluid exerting pressure on the mould and within 5 mm of the mould or mould sealing. In an embodiment, the temperature of the mould refers to the mean temperature of the fluid exerting pressure on the mould and within 25 mm of the mould or mould sealing. In an embodiment, the temperature of the mould refers to the temperature in the gravity center of the filled mould. In an embodiment, the temperature of the mould refers to the temperature in the geometrical center of the filled mould (in method step b). In an embodiment, the temperature of the mould is raised to 320K or more. In another embodiment, the temperature of the mould is raised to 350K or more. In another embodiment, the temperature of the mould is raised to 380K or more. In another embodiment, the temperature of the mould is raised to 400K or more. In another embodiment, the temperature of the mould is raised to 430K or more. In an embodiment, the temperature of the mould is raised to 480K or more. In some applications it is important to assure the temperature of the mould is not excessive. In an embodiment, the temperature of the mould in method step e) is kept below 690K. In another embodiment, the temperature of the mould in method step e) is kept below 660K. In another embodiment, the temperature of the mould in method step e) is kept below 560K. In another embodiment, the temperature of the mould in method step e) is kept below 510K. In another embodiment, the temperature of the mould in method step e) is kept below 470K. In another embodiment, the temperature of the mould in method step e) is kept below 420K. In some applications, it is important to relate the temperature at which the mould is raised in method step e) to the material employed for the manufacture of the mould provided in method step a). In an embodiment, the temperature of the mould is raised to 0.6*1.82 MPa HDT (description as per elsewhere in the document) of the mould material, or more. In an embodiment, the temperature of the mould is raised to 1.2*1.82 MPa HDT of the mould material, or more. In another embodiment, the temperature of the mould is raised to 1.6*1.82 MPa HDT of the mould material, or more. In an embodiment, the temperature of the mould is raised to 0.6*0.455 MPa HDT (description as per elsewhere in the document) of the mould material, or more. In another embodiment, the temperature of the mould is raised to 1.4*0.455 MPa HDT of the mould material, or more. In another embodiment, the temperature of the mould is raised to 2.2*0.455 MPa HDT of the mould material, or more. In an embodiment, in this aspect of the invention the calculations with HDT are done with temperatures expressed in Celsius degrees. In an embodiment, in this aspect of the invention the calculations with HDT are done with temperatures expressed in kelvin degrees. In an embodiment, for mould materials with more than one phase with different HDT, the lowest value of any relevant part (in the terms described elsewhere in the document) is taken. In an embodiment, for mould materials with more than one phase with different HDT, the highest value of any relevant part (in the terms described elsewhere in the document) is taken. In an embodiment, for mould materials with more than one phase with different HDT, the mean value of all relevant parts (in the terms described elsewhere in the document) is taken. In this document, when not otherwise indicated, mean value refers to the weighted arithmetic mean, where the weights are the volume fractions. In an embodiment, for mould materials with more than one phase with different HDT, the mean value of all the parts constituting the majority (in the terms described elsewhere in the document) of the polymeric phase of the mould with lowest HDT is taken. In an embodiment, for mould materials with more than one phase with different HDT, the mean value of all the parts constituting the majority (in the terms described elsewhere in the document) of the polymeric phase of the mould with highest HDT is taken. In an embodiment, HDT is determined according to ISO 75-1:2013 standard. In an alternative embodiment, the values of HDT are determined according to ASTM D648-07 standard test method. In an embodiment, the HDT is determined with a heating rate of 50° C./h. In another alternative embodiment, the HDT reported for the closest material in the UL IDES Prospector Plastic Database at 29 Jan. 2018 is used. In an alternative embodiment, HDT is replaced with the melting temperature for crystalline or semi-crystalline polymers. In an embodiment, the temperature of the mould is kept below 0.73*Tm of the relevant powder with the lowest melting point in method step e). In this context, Tm is the absolute melting temperature in kelvin. In another embodiment, the temperature of the mould is kept below 0.48*Tm of the relevant powder with the lowest melting point in method step e). In another embodiment, the temperature of the mould is kept below 0.38*Tm of the relevant powder with the lowest melting point in method step e). In another embodiment, the temperature of the mould is kept below 0.24*Tm of the relevant powder with the lowest melting point in method step e). In an embodiment, the temperature of the mould is kept below 0.68*Tm of the relevant powder with the highest melting point in method step e). In another embodiment, the temperature of the mould is kept below 0.48*Tm of the relevant powder with the highest melting point in method step e). In another embodiment, the temperature of the mould is kept below 0.42*Tm of the relevant powder with the highest melting point in method step e). In another embodiment, the temperature of the mould is kept below 0.34*Tm of the relevant powder with the highest melting point in method step e). In another embodiment, the temperature of the mould is kept below 0.24*Tm of the relevant powder with the highest melting point in method step e). In an embodiment, the melting temperature of the powder material in this document is measured according to ASTM E794-06 (2012). In alternative embodiments, the melting temperature can be measured employing thermogravimetry or any other characterization technique in a very simple way also by DSC, or by DTA, or even by DTA with STA. In an embodiment, the concept of relevant powder described in method step b) is employed here. In an embodiment, for the powder to be a relevant powder it has to be present in a 2% by weight or more (taking into account all the metallic powder filling the mould). In an embodiment, for the powder to be a relevant powder it has to be present in a 5.5% by weight or more (taking into account all the metallic powder filling the mould). In another embodiment, for the powder to be a relevant powder it has to be present in a 10.5% by weight or more. In another embodiment, for the powder to be a relevant powder it has to be present in a 15.5% by weight or more. In another embodiment, for the powder to be a relevant powder it has to be present in a 25.5% by weight or more. In another embodiment, for the powder to be a relevant powder it has to be present in a 55.5% by weight or more. In an embodiment, there is only one relevant powder, being the one with the highest weight percent. In an embodiment, a relevant powder refers to any P1 type powder as described in method step b). In an embodiment, a relevant powder refers to any P2 type powder as described in method step b). In an embodiment, a relevant powder refers to any P3, P4 or P5 type powder as described in method step b). In an embodiment, a relevant powder refers to any P3 type powder as described in method step b). In an embodiment, a relevant powder refers to any P4 type powder as described in method step b). In an embodiment, a relevant powder refers to any P5 type powder as described in method step b). In an embodiment, a relevant powder refers to the hardest powder as described in method step b). In an embodiment, a relevant powder refers the softest powder as described in method step b). In an embodiment, a relevant powder refers to any powder with low hardness as described in method step b). In an embodiment, a relevant powder refers to any powder with high hardness as described in method step b). In step e) the temperature of the mould is raised while keeping the right pressure level. In an embodiment, the right pressure level refers to the minimum pressure applied to the mould within method step e). In an embodiment, the right pressure level refers to the maximum pressure applied to the mould within method step e). In an embodiment, the right pressure level refers to any pressure applied to the mould within method step e). In an embodiment, the right pressure level refers to the mean pressure (time weighted) applied to the mould within method step e). In an embodiment, the right pressure level is 0.5 MPa or more. In another embodiment, the right pressure level is 5.5 MPa or more. In another embodiment, the right pressure level is 10.5 MPa or more. In another embodiment, the right pressure level is 21 MPa or more. In another embodiment, the right pressure level is 105 MPa or more. In another embodiment, the right pressure level is 160 MPa or more. In another embodiment, the right pressure level is 215 MPa or more. In some applications, it has been found that an excessive pressure in this step leads to undesirable distortions. In an embodiment, the right pressure level is 1300 MPa or less. In another embodiment, the right pressure level is 990 MPa or less. In another embodiment, the right pressure level is 860 MPa or less. In another embodiment, the right pressure level is 790 MPa or less. In another embodiment, the right pressure level is 490 MPa or less. In another embodiment, the right pressure level is 390 MPa or less. In another embodiment, the right pressure level is 290 MPa or less. In an embodiment, the right pressure level is 190 MPa or less. In another embodiment, the right pressure level is 90 MPa or less. In another embodiment, the right pressure level is 39 MPa or less. In some applications it is interesting that a certain relation is kept between the maximum temperature of the mould and the right pressure level within method step e). In an embodiment, the right pressure level is kept between MSELP*[maximum temperature of the mould in method step d) expressed in ° C.] and MSEHP*[maximum temperature of the mould in method step d) expressed in ° C.]. In an embodiment, MSELP is 0.005. In another embodiment, MSELP is 0.02. In another embodiment, MSELP is 0.1. In another embodiment, MSELP is 0.25. In another embodiment, MSELP is 0.5. In an embodiment, MSEHP is 0.6. In another embodiment, MSEHP is 1.0. In another embodiment, MSEHP is 2.0. In another embodiment, MSEHP is 4.0. In another embodiment, MSEHP is 7.0.

It is very surprising that the present invention works for the obtaining of intricate geometries and even more so when they comprise internal features for the reasons already exposed. Obviously the process window is rather small and often geometry dependent, For complex geometries it has been found that often it is helpful for the obtaining of crack free components to apply a complex strategy when it comes to the achieving of the pressure and temperature levels indicated for steps d) and e) of the general method. It has been found that the way the pressure and temperature are applied, besides the actual levels, have a surprisingly strong influence both on the accuracy attainable in the final component and the lack of defects for some geometries. One such strategy consists on applying the pressure and temperature on a staircase fashion, where the levels are related to some intrinsic properties of at least one of the polymeric materials employed for the mould. In an embodiment, the following steps are used:

- Step A1: raising the pressure at a high enough level while keeping the temperature low enough.
- Step B1: raising the temperature to a certain level and keeping it in that level for a given time.
- Step C1: raising the pressure to a certain level and keeping it at that level for a given time
- Step D1 (optional): repeat step B1, C1 or both one or more times at different levels of pressure and temperature.
- Step E1 (optional): make sure pressure and temperature are at the level defined for general method step d) before proceeding with general method step e).

In an embodiment, the high enough pressure level in step A1 is 55 bar or more. In another embodiment, the high enough pressure level in step A1 is 105 bar or more. In another embodiment, the high enough pressure level in step A1 is 155 bar or more. In another embodiment, the high enough pressure level in step A1 is 455 bar or more. In another embodiment, the high enough pressure level in step A1 is 655 bar or more. In some applications the high pressure level should be limited. In an embodiment, the high enough pressure level in step A1 is 6400 bar or less. In another embodiment, the high enough pressure level in step A1 is 1600 bar or less. In another embodiment, the high enough pressure level in step A1 is 1200 bar or less. In another embodiment, the high enough pressure level in step A1 is 840 bar or less. In another embodiment, the high enough pressure level in step A1 is 2900 bar or less. In another embodiment, the high enough pressure level in step A1 is 1900 bar or less. In another embodiment, the high enough pressure level in step A1 is 990 bar or less. In an embodiment, the low enough temperature level in step A1 is the critical temperature of the polymer of the mould or less. In an embodiment, the low enough temperature level in step A1 is an 84% of the critical temperature of the polymer of the mould or less. In another embodiment, the low enough temperature level in step A1 is a 75% of the critical temperature of the polymer of the mould or less. In an embodiment, the critical temperature of the polymer refers to the 1.82 MPa Heat Deflection Temperature (HDT). In another embodiment, the critical temperature of the polymer refers to the 0.455 MPa Heat Deflection Temperature (HDT). In another embodiment, the critical temperature of the polymer is the Tg of the polymer (when the polymer has one) of the mould or less. In another embodiment, the critical temperature of the polymer is the Vicat temperature of the polymer of the mould or less. In an embodiment, the polymer of the mould—when more than one is present—is the one which has a higher volume fraction. In an embodiment, the polymer of the mould—when more than one is present—is the one which has a higher weight fraction. In an embodiment, the polymer of the mould—when more than one is present—is the weighted mean, using volume fraction as weight factors. In an embodiment, the upper level for the temperature in step B1 is 2.4 times the critical temperature (same definition as per step A1). In another embodiment, the upper level for the temperature in step B1 is 1.4 times the critical temperature. In another embodiment, the upper level for the temperature in step B1 is the critical temperature. In another embodiment, the upper level for the temperature in step B1 is 0.8 times the critical temperature. In another embodiment, the lower level for the temperature in step B1 is 0.2 times the critical temperature. In an embodiment, the lower level for the temperature in step B1 is 0.4 times the critical temperature. In another embodiment, the lower level for the temperature in step B1 is 0.8 times the critical temperature. In an embodiment, the lower level for the temperature in step B1 is the critical temperature. In an embodiment, the time for which the temperature is kept at the desired level in step B1 is 3 minutes or more. In another embodiment, it is 16 minutes or more. In another embodiment, it is 32 minutes or more. In another embodiment, it is 65 minutes or more. In another embodiment, it is 160 minutes or more. In an embodiment, the time for which the temperature is kept at the desired level in step B1 is lower than 27 hours. In an embodiment, the time for which the temperature is kept at the desired level in step B1 is lower than 9 hours. In another embodiment, the time for which the temperature is kept at the desired level in step B1 is lower than 6 hours. In an embodiment, the upper level of pressure for step C1 is 6400 bar. In another embodiment, the upper level of pressure for step C1 is 2900 bar. In another embodiment, the upper level of pressure for step C1 is 2400 bar. In another embodiment, the upper level of pressure for step C1 is 1900 bar. In another embodiment, the upper level of pressure for step C1 is 990 bar. In an embodiment, the lower level of pressure for step C1 is 310 bar or more. In another embodiment, the lower level of pressure for step C1 is 610 bar or more. In another embodiment, the lower level of pressure for step C1 is 1100 bar or more. In another embodiment, the lower level of pressure for step C1 is 1600 bar or more. In another embodiment, the lower level of pressure for step C1 is 2100 bar or more. In an embodiment, the time for which the pressure is kept at the desired level in step B1 is 3 minutes or more. In another embodiment, it is 16 minutes or more. In another embodiment, it is 32 minutes or more. In another embodiment, it is 65 minutes or more. In another embodiment, it is 160 minutes or more. In an embodiment, the time for which the pressure is kept at the desired level in step B1 is 26 hours or less. In another embodiment, it is 12 hours or less. In another embodiment, it is 8 hours or less. In another embodiment, it is 5 hours or less. In another embodiment, it is 2 hours or more. In an embodiment, the upper level of pressure for step C1 is 6400 bar. For some applications it has been found that is more recommendable to work with temperature values to define the steps in the staircase and not relate them to the intrinsic properties of the polymers used for the construction of the mould. In an embodiment, the low enough temperature level in step A1 is 190° C. or less. In another embodiment, the low enough temperature level in step A1 is 140° C. or less. In another embodiment, the low enough temperature level in step Al is 90° C. or less. In another embodiment, the low enough temperature level in step A1 is 40° C. or less. In an embodiment, the upper level for the temperature in step B1 is 190° C. In another embodiment, the upper level for the temperature in step B1 is 159° C. In another embodiment, the upper level for the temperature in step B1 is 139° C. In another embodiment, the upper level for the temperature in step B1 is 119° C. In another embodiment, the lower level for the temperature in step B1 is 35° C. In another embodiment, the lower level for the temperature in step B1 is 45° C. In another embodiment, the lower level for the temperature in step B1 is 64° C. In another embodiment, the lower level for the temperature in step B1 is 84° C. In another embodiment, the lower level for the temperature in step B1 is 104° C.

In some applications, method step f) is very important to avoid internal defects in the manufactured components. In an embodiment, in method step f) while keeping a high enough temperature, at least some of the to the mould applied pressure is released. In an embodiment, the temperature of the mould has the same meaning as in the method step e). In an embodiment, a high enough temperature means 320K or more in method step f). In another embodiment, a high enough temperature means 350K or more. In another embodiment, a high enough temperature means 380K or more. In another embodiment, a high enough temperature means 400K or more. In another embodiment, a high enough temperature means 430K or more. In another embodiment, a high enough temperature means 500K or more. In some applications it is important to assure the temperature of the mould is not excessive. In an embodiment, the temperature of the mould in method step f) is kept below 690K. In another embodiment, the temperature of the mould in method step f) is kept below 660K. In another embodiment, the temperature of the mould in method step f) is kept below 560K. In another embodiment, the temperature of the mould in method step f) is kept below 510K. In another embodiment, the temperature of the mould in method step f) is kept below 470 K. In another embodiment, the temperature of the mould in method step f) is kept below 420K. In some applications, it is important to relate the temperature at which the mould is kept in method step f) to the material employed for the manufacture of the mould provided in method step a). In an embodiment, the temperature of the mould is kept at 0.58*1.82 MPa HDT (description as per elsewhere in the document) of the mould material or more. In an embodiment, the temperature of the mould is kept at 1.15*1.82 MPa HDT of the mould material or more. In another embodiment, the temperature of the mould is kept at 1.55*1.82 MPa HDT of the mould material or more. In an embodiment, the temperature of the mould is kept at 0.6*0.455 MPa HDT (description as per elsewhere in the document) of the mould material or more. In another embodiment, the temperature of the mould is kept at 1.4*0.455 MPa HDT of the mould material, or more. In another embodiment, the temperature of the mould is kept at 2.2*0.455 MPa HDT of the mould material or more. In an embodiment, in this aspect of the invention the calculations with HDT are done with temperatures expressed in Celsius degrees. In an embodiment, in this aspect of the invention the calculations with HDT are done with temperatures expressed in kelvin degrees. In an embodiment, for mould materials with more than one phase with different HDT, the lowest value of any relevant part (in the terms described elsewhere in the document) is taken. In an embodiment, for mould materials with more than one phase with different HDT, the highest value of any relevant part (in the terms described elsewhere in the document) is taken. In an embodiment, for mould materials with more than one phase with different HDT, the mean value of all relevant parts (in the terms described elsewhere in the document) is taken. In this aspect, mean value refers to the weighted arithmetic mean, where the weights are the volume fractions. In an embodiment, for mould materials with more than one phase with different HDT, the mean value of all the parts constituting the majority (in the terms described elsewhere in the document) of the polymeric phase of the mould with lowest HDT is taken. In an embodiment, for mould materials with more than one phase with different HDT, the mean value of all the parts constituting the majority (in the terms described elsewhere in the document) of the polymeric phase of the mould with highest HDT is taken. In an embodiment, HDT is determined according to ISO 75-1:2013 standard. In an alternative embodiment, the values of HDT are determined according to ASTM D648-07 standard test method. In an embodiment, the HDT is determined with a heating rate of 50° C./h. In another alternative embodiment, the HDT reported for the closest material in the UL IDES Prospector Plastic Database at 29 Jan. 2018 is used. In an alternative embodiment, HDT is replaced with the melting temperature for crystalline or semi-crystalline polymers. In an embodiment, the temperature of the mould is kept below 0.73*Tm of the relevant powder with the lowest melting point in method step f). In this context, Tm is the absolute melting temperature in kelvin. In an embodiment, the temperature of the mould is kept below 0.48*Tm of the relevant powder with the lowest melting point. In an embodiment, the temperature of the mould is kept below 0.38*Tm of the relevant powder with the lowest melting point. In an embodiment, the temperature of the mould is kept below 0.24*Tm of the relevant powder with the lowest melting point. In an embodiment, the temperature of the mould is kept below 0.68*Tm of the relevant powder with the highest melting point in method step f). In an embodiment, the temperature of the mould is kept below 0.48*Tm of the relevant powder with the highest melting point. In an embodiment, the temperature of the mould is kept below 0.42*Tm of the relevant powder with the highest melting point. In an embodiment, the temperature of the mould is kept below 0.34*Tm of the relevant powder with the highest melting point. In an embodiment, the temperature of the mould is kept below 0.24*Tm of the relevant powder with the highest melting point. In an embodiment, the concept of relevant powder described in method step b) is employed here. In an embodiment, for the powder to be a relevant powder it has to be present in a 2% by weight or more (taking into account all the metallic powder filling the mould). In another embodiment, for the powder to be a relevant powder it has to be present in a 5.5% by weight or more (taking into account all the metallic powder filling the mould). In another embodiment, for the powder to be a relevant powder it has to be present in a 10.5% by weight or more. In another embodiment, for the powder to be a relevant powder it has to be present in a 15.5% by weight or more. In another embodiment, for the powder to be a relevant powder it has to be present in a 25.5% by weight or more. In another embodiment, for the powder to be a relevant powder it has to be present in a 55.5% by weight or more. In an embodiment, there is only one relevant powder, being the one with the highest weight percent. In an embodiment, a relevant powder refers to any P1 type powder as described in method step b). In an embodiment, a relevant powder refers to any P2 type powder as described in method step b). In an embodiment, a relevant powder refers to any P3, P4 or P5 type powder as described in method step b). In an embodiment, a relevant powder refers to any P3 type powder as described in method step b). In an embodiment, a relevant powder refers to any P4 type powder as described in method step b). In an embodiment, a relevant powder refers to any P5 type powder as described in method step b). In an embodiment, a relevant powder refers to the hardest powder as described in method step b). In an embodiment, a relevant powder refers the softest powder as described in method step b). In an embodiment, a relevant powder refers to any powder with low hardness as described in method step b). In an embodiment, a relevant powder refers to any powder with high hardness as described in method step b). In an embodiment, releasing at least some of the to the mould applied pressure in method step f) means the pressure is lowered at least a 5% with respect to the highest value achieved in method step d). In another embodiment, the pressure is lowered at least a 10% with respect to the highest value achieved in method step d). In another embodiment, the pressure is lowered at least a 20% with respect to the highest value achieved in method step d). In another embodiment, the pressure is lowered at least a 40% with respect to the highest value achieved in method step d). In another embodiment, the pressure is lowered at least a 60% with respect to the highest value achieved in method step d). In another embodiment, the pressure is lowered at least an 80% with respect to the highest value achieved in method step d). In an embodiment, the percentage lowering of the pressure described in the previous lines refers not only to method step d), but to any of method steps d), e) or f) and thus the highest pressure achieved in any of them. In an embodiment, the pressure is lowered at least 0.6 MPa with respect to the highest value achieved in method step d). In another embodiment, the pressure is lowered at least 0.6 MPa with respect to the highest value achieved in method step d). In another embodiment, the pressure is lowered at least 2 MPa with respect to the highest value achieved in method step d). In another embodiment, the pressure is lowered at least 10 MPa with respect to the highest value achieved in method step d). In another embodiment, the pressure is lowered at least 60 MPa with respect to the highest value achieved in method step d). In some applications, the pressure level achieved in method step f) is more important than the percentage reduction. In an embodiment, method step f) should read: while keeping a high enough temperature releasing at least some of to the mould applied pressure as to attain a pressure level below 390 MPa. In another embodiment, the attained pressure level should be below 90 MPa. In another embodiment, the attained pressure level should be below 19 MPa. In another embodiment, the attained pressure level should be below 9 MPa. In another embodiment, the attained pressure level should be below 4 MPa. In another embodiment, the attained pressure level should be below 0.4 MPa. In another embodiment, the attained pressure level should be below 0.2 MPa. In an embodiment, all pressure is removed within method step f). Some applications are quite sensitive, specially when it comes to internal defects of components, to the rates employed to release the pressure in method step f). In an embodiment, pressure is released at a low enough rate at least within the final stretch. In an embodiment, a low enough rate is 980 MPa/s or less. In another embodiment, a low enough rate is 98 MPa/s or less. In another embodiment, a low enough rate is 9.8 MPa/s or less. In another embodiment, a low enough rate is 0.98 MPa/s or less. In another embodiment, a low enough rate is 0.098 MPa/s or less. In another embodiment, a low enough rate is 0.009 MPa/s or less. Some applications requiring a low rate cannot accept an excessively low rate. In an embodiment, a low enough rate is higher than 0.9 MPa/h. In another embodiment, a low enough rate is higher than 9 MPa/h. In another embodiment, a low enough rate is higher than 90 MPa/h. In another embodiment, a low enough rate is higher than 900 MPa/h. In another embodiment, a low enough rate is higher than 9000 MPa/h. In an embodiment, the final stretch relates to the final 2% [taking as initial point the highest pressure applied to the mould in any of method steps d) e) or f) and as final point the minimum pressure applied to the mould in method step f)]. In an embodiment, the final stretch relates to the final 8%. In another embodiment, the final stretch relates to the final 12%. In another embodiment, the final stretch relates to the final 18%. In another embodiment, the final stretch relates to the final 48%. In an embodiment, the final stretch relates to the final 0.1 MPa [before reaching the minimum pressure applied to the mould in method step f)]. In another embodiment, the final stretch relates to the final 0.4 MPa. In another embodiment, the final stretch relates to the final 0.9 MPa. In another embodiment, the final stretch relates to the final 1.9 MPa. In another embodiment, the final stretch relates to the final 9 MPa.

In an embodiment, all pressures indicated in this document (only pressures defined as positive pressures and not vacuum levels) are expressed as PRESS+0.1 MPa, where PRESS is the absolute pressure level. In an embodiment, all vacuum levels described in this document are expressed in absolute pressure values.

In an embodiment, after method step f) the pressure applied to the mould is completely released if it was not already done so in method step f). In an embodiment, after method step f) the pressure applied to the mould is completely released with the same caution regarding pressure release rates as described above for method step f). In an embodiment, after method step f) the pressure applied to the mould is completely released with the same fashion regarding pressure release steps as described above for method step f). In an embodiment, after method step f) the temperature of the mould is let drop to close to ambient values if it was not already done do in method step f). In an embodiment, after method step f) the temperature of the mould is let drop to below 98° C. if it was not already done do in method step f). In another embodiment, after method step f) the temperature of the mould is let drop to below 48° C. if it was not already done do in method step f). In another embodiment, after method step f) the temperature of the mould is let drop to below 38° C. if it was not already done do in method step f). In an embodiment, after method step f) the temperature of the mould is let drop to a value convenient for carrying out method step g) if it was not already done do in method step f).

One should be surprised at the length of the process required for the present invention for steps d)-f) which is much higher than that involved in other high-pressure moderate temperature (below 0.5*Tm and very often below 0.3*Tm) existing processes. In an embodiment, the total time of steps d)-f) is higher than 22 minutes. In another embodiment, the total time of steps d)-f) is higher than 190 minutes. In another embodiment, the total time of steps d)-f) is higher than 410 minutes. In an embodiment, the total time of steps d)-f) is lower than 47 hours. In another embodiment, the total time of steps d)-f) is lower than 12 hours. In another embodiment, the total time of steps d)-f) is lower than 7 hours. Another singular overall characteristic of the process employed in steps d)-f) is the large variations in temperature of the pressurized fluid taking place within the process. There are no WIP or CIP reported where significant variations in the temperature of the pressurized fluid take place during the process, a same WIP equipment can do two different jobs in the same day one job with a pressurized fluid temperature of 120° C. and the other job with a pressurized fluid temperature of 90° C. but the variation of temperature of the pressurized fluid within each one of those jobs is negligible. In an embodiment, for steps d)-f) the pressurized fluid maximum temperature gradient within the process is 25° C. or more. In another embodiment, for steps d)-f) the pressurized fluid maximum temperature gradient within the process is 55° C. or more. In another embodiment, for steps d)-f) the pressurized fluid maximum temperature gradient within the process is 105° C. or more. In an embodiment, for steps d)-f) the pressurized fluid maximum temperature gradient within the process is 245° C. or less. In another embodiment, for steps d)-f) the pressurized fluid maximum temperature gradient within the process is 195° C. or less. In another embodiment, for steps d)-f) the pressurized fluid maximum temperature gradient within the process is 145° C. or less.

In some instances, method steps e) and f) can be avoided, provided a very precise selection is made of the powder mixture used to fill the mould in method step b) and the material used to manufacture the mould in method step a). In some instances also special care has to be taken how the pressure is released, specially for the pressure releasing rate, after method step d) when method steps e) and f) are skipped. In some instances also special care has to be taken to make sure void internal features from the mould provided in method step a) receive the pressure applied to the mould in method step d) when method steps e) and f) are skipped. In an embodiment, method steps e) and f) are not present. In an embodiment, method steps e) and f) are limited to a release to at least some of the pressure applied to the mould in method step d). In an embodiment, method steps e) and f) are not present as described provided at least some of the conditions described in this paragraph are met. Several efforts have been employed in the past years to improve the properties of the materials obtained through additive manufacturing. The inventor has found, that surprisingly in the aspect of the invention discussed in the present paragraph it is convenient to deliberately choose very poor performing materials or deliberately aim at poor mechanical properties and even voids and constructive defects when manufacturing the mould provided in method step a). In fact, when a high performant material is employed for the mould provided in method step a), for the aspect of the invention discussed in this paragraph, then even more care has to be taken to assure void internal features from the mould provided in method step a) receive the pressure applied to the mould in method step d), special care has to be taken how the pressure is released, proper filling rates have to be employed in method step b) and/or special powder mixtures employed. In an embodiment, the method of the present invention comprises an additional step as disclosed below. In an embodiment, when method steps e) and f) are skipped, at least one of the following has to take place:

I. The mould provided in method step a) has a low tensile strength.

II. The mould provided in method step a) has a high elastic modulus.

III. The mould provided in method step a) has a significant drop in tensile strength when the strain rate is lowered.

IV. The filling in method step b) is made with a high filling density.

V. The void internal features of the mould are allowed to have the applied pressure to the mould.

VI. The mixture in method step b) has to have a large content of P2 type powder.

VII. Pressure is released as described for method step f).

The meaning and associated numerical values for the above described features are described elsewhere in this document. In different embodiments, a low tensile strength is 99 MPa or less, 49 MPa or less, 34 MPa or less, 29 MPa or less, 19 MPa or less, 14 MPa or less and even 9 MPa or less. In different embodiments, a high elastic modulus is more than 1.06 GPa, more than 1.12 GPa, more than 1.28 GPa, more than 1.46 GPa, more than 1.77 GPa, and even more than 2.08 GPa. In some applications the high elastic modulus should be limited. In different embodiments, a high elastic modulus is less than 6 GPa, less than 4 GPa, less than 3.2 GPa, less than 2.9 GPa, and even less than 1.9 GPa. In an embodiment, the values of low tensile strength are measured with the proper strain rate. In different embodiments, the proper strain rate is 2500 $s^{-1}$, 500 $s^{-1}$, 50 $s^{-1}$, 1.0 $s^{-1}$, $1\cdot10^{-2}$ $s^{-1}$ and even $1\cdot10^{-3}$ $s^{-1}$. In an embodiment, the above disclosed values of tensile strength are at room temperature (23° C.). In an embodiment, Point (II) is replaced by: The mould provided in method step a) has a low elastic modulus. In different embodiments, a low elastic modulus is 0.96 GPa or less, 0.79 GPa or less, 0.74 GPa or less, 0.68 GPa or less, 0.48 GPa or less and even 0.24 GPa or less. In an embodiment, the above disclosed values of elastic modulus are at room temperature (23° C.). In different embodiments, a significant drop in the tensile strength is a 6% or more, a 12% or more, 16% or more, 22% or more and even 42% or more. In different embodiments, the significant drop in tensile strength is produced when the strain rate is lowered at least a 0.1%, at least a 1.1%, at least a 3.2%, at least a 18%, at least a 26% and even at least a 41%. In different embodiments, the strain rate that is lowered is 2500 $s^{-1}$, 500 $s^{-1}$, 50 $s^{-1}$, 1.0 $s^{-1}$, $1\cdot10^{-2}$ $s^{-1}$ and even $1\cdot10^{-3}$ $s^{-1}$. In different embodiments, a large content of a powder P2 is 1.2% by weight or more, 16% by weight or more, 22% by weight or more, 32% by weight or more, 36% by weight or more and even 42% by weight or more. In an embodiment, only 1, II, III, V and VII are taken into account. In another embodiment, only I, III, IV and V are taken into account. In an embodiment, V is not taken into account. In an embodiment, VI is not taken into account. In an embodiment, IV is not taken into account. In an embodiment, III is not taken into account. In an embodiment, II is not taken into account. In an embodiment, I is not taken into account. In an embodiment, VII is not taken into account. In an embodiment, at least two of the points have to take place. In another embodiment, at least three of the points have to take place. In another embodiment, at least four of the points have to take place.

In an embodiment, the method of the present invention comprises an additional step:

g) removing at least part of the sealing.

For some applications the additional method step g) can be quite important.

In an embodiment, the method of the present invention comprises an additional step:

h) removing at least part of the mould.

In an embodiment, the method of the present invention comprises an additional step:

i) applying some incomplete consolidation.

In an embodiment, the method of the present invention comprises an additional step:

j) joint different parts to make a bigger component.

For several applications the addition of method step j) is very interesting, in particular for the manufacturing of large and very large components. In an embodiment, at least two parts comprising a metal are joined to manufacture a larger component. In another embodiment, at least three parts comprising a metal are joined to manufacture a larger component. In another embodiment, at least two parts from which at least one has been manufactured according to the present invention are joined to manufacture a larger component. In an embodiment, at least three parts from which at least one has been manufactured ac-cording to the present invention are joined to manufacture a larger component. In an embodiment, at least three parts from which at least two has been manufactured according to the present invention are joined to manufacture a larger component. In an embodiment, at least two parts manufactured according to the present invention are joined together to manufacture a larger component. In an embodiment, at least three parts manufactured according to the present invention are joined together to manufacture a larger component. In an embodiment, at least five parts manufactured according to the present invention are joined together to manufacture a larger component. In an embodiment, the joining of the parts is made through welding. In an embodiment, the joining of the parts comprises plasma-arc heating. In an embodiment, the joining of the parts comprises electric-arc heating. In an embodiment, the joining of the parts comprises laser heating. In an embodiment, the joining of the parts comprises electron beam heating. In an embodiment, the joining of the parts comprises oxy-fuel heating. In an embodiment, the joining of the parts comprises resistance heating. In an embodiment, the joining of the parts comprises induction heating. In an embodiment, the joining of the parts comprises ultrasound heating. Some applications cannot afford a welding line with different properties. In such case a possible solution is to make a thin welding whose only purpose is to keep the parts together on the joining surfaces for them to diffusion weld in the following additional method step k). In an embodiment, a joining is performed with a high temperature glue. In an embodiment, the parts to be joined together have a guiding mechanism to position with the right reference against each other. In an embodiment, the required diagonal for the final component with all the joined parts is 520 mm or more. In an embodiment, the required diagonal is the diagonal of the rectangular cross section orthogonal to the length of the smallest rectangular cuboid that contains all the joined parts. In an embodiment, the required diagonal is the diameter of the cylinder with smallest radius that contains all the joined parts. In an embodiment, the required diagonal is the diameter of the cylinder with smallest volume that contains all the joined parts. In an embodiment, the required diagonal for the final component with all the joined parts is 620 mm or more. In another embodiment, the required diagonal for the final component with all the joined parts is 720 mm or more. In another embodiment, the required diagonal for the final component with all the joined parts is 1020 mm or more. In another embodiment, the required diagonal for the final component with all the joined parts is 2120 mm or more. In another embodiment, the required diagonal for the final component with all the joined parts is 4120 mm or more. In an embodiment, at least some of the surfaces of the different parts coming together are removed from oxides prior to joining. In an embodiment, at least some of the surfaces of the different parts coming together are removed from organic products prior to joining. In an embodiment, at least some of the surfaces of the different parts coming together are removed from dust prior to joining. In different embodiments, some of the surfaces is at least one of the surfaces, at least two of the surfaces, at least three of the surfaces, at least four of the surfaces, at least five of the surfaces and even at least eight of the surfaces. In an embodiment, at least part of the surfaces of the different parts coming together are removed from dust prior to joining. In an embodiment, the weld recess is designed to assure the joining pulls the faces of the parts joined against each other. In an embodiment, the weld recess is designed to assure the weld (or joining) pulls the faces of the parts joined against each other strongly enough. In an embodiment, strongly enough means that the nominal compressive stress in the surfaces of the different parts that have come together—assembled together—(surfaces of two different parts of the final component in contact to each other after the welding) is 0.01 MPa or more. In an embodiment, strongly enough means 0.12 MPa or more. In another embodiment, strongly enough means 1.2 MPa or more. In another embodiment, strongly enough means 2.6 MPa or more. In another embodiment, strongly enough means 5.12 MPa or more. In an embodiment, the above values are the compressive strength values measured according to ASTM E9-09-2018. In an embodiment, the above disclosed values are at room temperature (23° C.). In an embodiment, the joining is made in a vacuum environment. In an embodiment, a vacuum environment means 900 mbar or less absolute pressure. In another embodiment, a vacuum environment means 400 mbar or less. In another embodiment, a vacuum environment means 90 mbar or less. In another embodiment, a vacuum environment means 9 mbar or less. In an embodiment, a vacuum environment means 0.9 mbar or less. In another embodiment, a vacuum environment means 0.09 mbar or less. In an embodiment, the joining is made in an oxygen free environment. In an embodiment, an oxygen free environment means 9% or less. In another embodiment, an oxygen free environment means 4% or less. In another embodiment, an oxygen free environment means 0.9% or less. In another embodiment, an oxygen free environment means 0.9% or less. In another embodiment, an oxygen free environment means 90 ppm or less. In another embodiment, an oxygen free environment means 9 ppm or less. In an embodiment, the above disclosed oxygen percentages are by volume. In an alternative embodiment, the above disclosed oxygen percentages are by weight. In an embodiment, the joining is done all around the periphery of the faces touching each other of at least two of the components coming together in a gas tight way. In an embodiment, a gas tight way means that when the joined component is introduced in a fluid and a high pressure is applied, this fluid cannot flow in the spaces and/or micro-cavities between the two facing each other and joined through all the periphery surfaces of each of the two components assembled together. In an embodiment, a high pressure are 52 MPa or more. In another embodiment, a high pressure are 152 MPa or more. In another embodiment, a high pressure are 202 MPa or more. In another embodiment, a high pressure are 252 MPa or more. In another embodiment, a high pressure are 555 MPa or more. In an embodiment, at least in some areas, the critical depth of weld is small enough. In an embodiment, the critical depth of weld is small enough in at least 6% of the welding line in the periphery of two faces coming together. In another embodiment, the critical depth of weld is small enough in at least 16% of the welding line in the periphery of two faces coming together. In another embodiment, the critical depth of weld is small enough in at least 26% of the welding line in the periphery of two faces coming together. In another embodiment, the critical depth of weld is small enough in at least 56% of the welding line in the periphery of two faces coming together. In another embodiment, the critical depth of weld is small enough in at least 76% of the welding line in the periphery of two faces coming together. In an embodiment, the critical depth of weld refers to the mean value of depth of weld in the length considered. In another embodiment, the critical depth of weld refers to the weighted—through length—mean value of depth of weld in the length considered. In another embodiment, the critical depth of weld refers to the maximum value of depth of weld in the length considered. In another embodiment, the critical depth of weld refers to the minimum value of depth of weld in the length considered. In another embodiment, the critical depth of the weld refers to the extension in depth of the molten zone of the weld. In another embodiment, the critical depth of the weld refers to the extension in depth of the molten zone of the weld evaluated in the cross-section. In another embodiment, the critical depth of the weld refers to the extension in depth of the heat affected zone (HAZ) of the weld. In another embodiment, the critical depth of the weld refers to the extension in depth of the HAZ of the weld evaluated in the cross-section. In an embodiment, the HAZ only incorporates austenized material. In another embodiment, the HAZ only incorporates partially austenized material. In another embodiment, the HAZ only incorporates fully austenized material. In another embodiment, the HAZ incorporates austenized, annealed and tempered—by means of the welding action—material. In another embodiment, the HAZ only incorporates microstructurally altered material—by means of the welding action—. In an embodiment, small enough critical depth of weld is 19 mm or less. In another embodiment, small enough critical depth of weld is 14 mm or less. In another embodiment, small enough critical depth of weld is 9 mm or less. In another embodiment, small enough critical depth of weld is 3.8 mm or less. In another embodiment, small enough critical depth of weld is 1.8 mm or less. In another embodiment, small enough critical depth of weld is 0.9 mm or less. In another embodiment, small enough critical depth of weld is 0.4 mm or less. In some applications, the power density of the heat source plays a role. In an embodiment, the power density is kept below 900 $W/mm^3$. In an embodiment, the power density is kept below 390 $W/mm^3$. In another embodiment, the power density is kept below 90 $W/mm^3$. In another embodiment, the power density is kept below 9 $W/mm^3$. In another embodiment, the power density is kept below 0.9 $W/mm^3$. In an embodiment, the faces touching each other of at least two of the components assembled together undergo diffusion welding in method step k). In an embodiment, the faces touching each other of at least two of the components assembled together undergo diffusion welding in method step k) and the joining line is removed at least partially. In an embodiment, the faces touching each other of at least two of the components assembled together undergo diffusion welding in method step k) and the joining line is removed at least partially (in terms of the length of the joining line) but completely (in terms of critical depth of weld) from the functional surface of the final component in method step m).

In an embodiment, the method of the present invention comprises an additional step:

k) applying a high temperature, high pressure treatment.

In some applications method step k) is very important because it can have a strong contribution in the final properties of the component manufactured, specially on the mechanical and thermo-electrical properties. Also method k) can be important in some applications requiring seamless and very high performant large components resulting from the joining of smaller components, at least some of which are manufactured with the method of the present invention, and joined together according to method step j). Sometimes, the component up to method step j) have internal porosities and sometimes they are detrimental, in method step k) they can be reduced or even eliminated.

It has been found that in some occasions, the components manufactured decrease their density during the sintering process. This is very prejudicial for some applications, because it leads to a drop of very important properties to those applications. In some cases, this drop of density can be associated to the formation of cavities within the component during the sintering process. Many factors seem to influence this behavior, amongst them the sizes of the original powders at the moment when sintering takes place. In some applications where at least two powder types with different chemical nature have been used, and where the final component is severely loaded, efforts have to be undertaken to avoid the loss of density trough sintering. For some applications it has been found that a strategy based on proper powder size selection can be advantageous. In an embodiment, all significantly alloyed relevant powders have a mean particle size which is small enough. In an embodiment, all significantly alloyed relevant powders have a D90 which is small enough. In another embodiment, all significantly alloyed relevant powders have a mean particle size which is noticeably smaller than that of the predominant powder. In another embodiment, all significantly alloyed relevant powders have a D90 which is noticeably smaller than that of the predominant powder. In an embodiment, at least one of the significantly alloyed relevant powders has a mean particle size which is small enough. In another embodiment, at least one of the significantly alloyed relevant powders has a D90 which is small enough. In another embodiment, at least one of the significantly alloyed relevant powders has a mean particle size which is noticeably smaller than that of the predominant powder. In another embodiment, at least one of the significantly alloyed relevant powders has a D90 which is noticeably smaller than that of the predominant powder. In this context, for a powder to be significantly alloyed the amount of alloying elements has to be high enough. In an embodiment, for a powder to be significantly alloyed, the sum of all alloying elements should be 6% or more. In another embodiment, for a powder to be significantly alloyed, the sum of all alloying elements should be 12% or more. In another embodiment, for a powder to be significantly alloyed, the sum of all alloying elements should be 22% by weight or more. In another embodiment, for a powder to be significantly alloyed, the sum of all alloying elements should be 46% by weight or more. In another embodiment, for a powder to be significantly alloyed, the sum of all alloying elements should be 66% by weight or more. In an embodiment, the alloying elements also include the elements where are present but not intentionally added, thus all present alloying elements. In an embodiment, the alloying elements only include those present and intentionally added, thus excluding unavoidable impurities. In an embodiment, the base which is excluded when counting the alloying is the majoritarian element. In some applications, excessive alloying of the significantly alloyed powders is disadvantageous. In an embodiment, for the significantly alloyed powder, the sum of all alloying elements should be 94% by weight or less. In another embodiment, for the significantly alloyed powder, the sum of all alloying elements should be 89% by weight or less. In another embodiment, for the significantly alloyed powder, the sum of all alloying elements should be 84% by weight or less. In another embodiment, for the significantly alloyed powder, the sum of all alloying elements should be 64% by weight or less. In this context a powder is relevant, when present in a high enough amount, thus powders with a very low volume fraction are disregarded as not relevant. In an embodiment, a powder is considered relevant when the volume fraction of this powder is 1.2% or more. In another embodiment, a powder is considered relevant when the volume fraction of this powder is 4.2% or more. In another embodiment, a powder is considered relevant when the volume fraction of this powder is 6% or more. In another embodiment, a powder is considered relevant when the volume fraction of this powder is 12% or more. In another embodiment, a powder is considered relevant when the volume fraction of this powder is 22% or more. In this context small enough refers to the size. In an embodiment, a powder is considered small enough when it is smaller than 89 microns. In another embodiment, a powder is considered small enough when it is smaller than 49 microns. In another embodiment, a powder is considered small enough when it is smaller than 19 microns. In another embodiment, a powder is considered small enough when it is smaller than 14 microns. In another embodiment, a powder is considered small enough when it is smaller than 9 microns. In some applications a powder is considered small enough when the size is above a certain value. In an embodiment, a powder is considered small enough when it is higher than 0.9 microns. In another embodiment, a powder is considered small enough when it is higher than 2 microns. In another embodiment, a powder is considered small enough when it is higher than 6 microns. In another embodiment, a powder is considered small enough when it is higher than 8 microns. In the context of the present paragraph, noticeably smaller refers to the difference in sizes between the addressed powders. In an embodiment, noticeably smaller means a 12% or more smaller in size. In another embodiment, noticeably smaller means a 20% or more smaller in size. In another embodiment, noticeably smaller means a 40% or more smaller in size. In another embodiment, noticeably smaller means an 80% or more smaller in size. In some applications noticeably smaller means below a certain value. In an embodiment, noticeably smaller means a 240% or less smaller in size. In another embodiment, noticeably smaller means a 180% or less smaller in size. In another embodiment, noticeably smaller means a 110% or less smaller in size. In another embodiment, noticeably smaller means an 90% or less smaller in size. In some applications, the size difference needs to be greater and it is more practical to refer to it in times. In an embodiment, noticeably smaller means a 1 to 2.1 or more relation in sizes. In another embodiment, noticeably smaller means a 1 to 3.2 or more relation in sizes. In another embodiment, noticeably smaller means a 1 to 5.2 or more relation in sizes. In another embodiment, noticeably smaller means a 1 to 7.1 or more relation in sizes. In this context the predominant powder is the one which is present in a larger amount. In an embodiment, the predominant powder is the powder present in a higher volume fraction. In an embodiment, the predominant powder is the powder present in a higher volume fraction, where powders are grouped in types according to their composition. In an embodiment, the predominant powder is the powder present in a higher weight fraction.

For some applications it has been found that a good strategy to avoid density loss during the sintering process, can be based on the sintering strategy itself. For some applications, it has been found that the negative effect can be significantly reduced if at least a part of the sintering process is done under pressure. One would expect that best density would be provided with the highest sintering temperatures as long as there is no phase transformation. Also, in the case of partial melting, the sintering can be further aided to achieve even higher densities for some applications. It has been found that sintering under pressure can help in some applications to achieve very high densities even the maximum theoretical density. But very surprisingly it has been found that for several applications, when pressure is applied, the temperature process window to attain very high densities is rather small and surprisingly involving lower temperatures that would be expected. In an embodiment, the sintering to high densities can be achieved through a process comprising the following steps:

Step 1i: Raising the temperature while keeping a low pressure.

Step 2i: Keeping the temperature at a high level while keeping the pressure at a low level for a long enough time period.

Step 3i: Raising the pressure to a high level.

Step 4i: Keeping a high pressure and high temperature for a long enough time period.

In an embodiment, all steps are done in the same furnace/pressure vessel. In an embodiment, all steps are done in a HIP (Hot Isostatic Pressure) equipment. In an embodiment, at least two pieces of equipment are employed to execute all steps 1i-4i. In an embodiment, at least two furnace/pressure vessels are involved to execute steps 1i-4i. In an embodiment, the pressure in step 1i is 900 bar or less. In another embodiment, the pressure in step 1i is 90 bar or less. In another embodiment, the pressure in step 1i is 9 bar or less. In another embodiment, the pressure in step 1i is 1.9 bar or less. In another embodiment, the pressure in step 1i is 0.9 bar or less. In some applications the pressure in step 1i should be maintained above a certain value. In an embodiment, the pressure in step 1i is 0.0009 bar or more. In another embodiment, the pressure in step 1i is 0.009 bar or more. In another embodiment, the pressure in step 1i is 0.09 bar or more. In an embodiment, the temperature in step 1i is raised to 0.36*Tm or more, where Tm is the melting temperature as described in this document. In another embodiment, the temperature in step 1i is raised to 0.46*Tm or more. In another embodiment, the temperature in step 1i is raised to 0.54*Tm or more. In another embodiment, the temperature in step 1i is raised to 0.66*Tm or more. In another embodiment, the temperature in step 1i is raised to 0.72*Tm or more. In another embodiment, the temperature in step 1i is raised to 0.76*Tm or more. As said, it has been surprisingly found that for some applications it is advantageous to keep temperature in step 1i rather low. In an embodiment, the temperature in step 1i is raised to 0.89*Tm or less. In another embodiment, the temperature in step 1i is raised to 0.79*Tm or less. In another embodiment, the temperature in step 1i is raised to 0.74*Tm or less. In another embodiment, the temperature in step 1i is raised to 0.69*Tm or less. In another embodiment, the temperature in step 1i is raised to 0.64*Tm or less. In an embodiment, Tm refers to the melting temperature of the powder with the lowest melting temperature. In another embodiment, Tm refers to the melting temperature of the pow-der with the highest melting temperature. In another embodiment, Tm refers to the weighed-trough volume fraction—mean of the melting temperatures of all the metallic powders. In an embodiment, the pressure levels in step 2i are the same as those in step 1i. In an embodiment, the same limits for pressure described above for step 1i apply for step 2i although the actual pressure value might be different in steps 1i and 2i. In an embodiment, the temperature levels in step 2i are the same as those in step 1i. In an embodiment, the same limits for temperature described above for step 1i apply for step 2i although the actual temperature value might be different in steps 1i and 2i. In an embodiment, a long enough time period in step 2i is 6 minutes or more. In another embodiment, a long enough time period in step 2i is 12 minutes or more. In another embodiment, a long enough time period in step 2i is 32 minutes or more. In another embodiment, a long enough time period in step 2i is 62 minutes or more. In another embodiment, a long enough time period in step 2i is 122 minutes or more. In another embodiment, a long enough time period in step 2i is 240 minutes or more. Another interesting and surprising observation has been that for some applications a too long time in step 2i leads to lower density. In an embodiment, the long enough period of time in step 2i is less than 590 minutes. In another embodiment, the long enough period of time in step 2i is less than 390 minutes. In another embodiment, the long enough period of time in step 2i is less than 290 minutes. In another embodiment, the long enough period of time in step 2i is less than 240 minutes. In another embodiment, the long enough period of time in step 2i is less than 110 minutes. In another embodiment, the long enough period of time in step 2i is less than 40 minutes. In an embodiment, the high level of pressure in step 3i is 210 bar or more. In an embodiment, the high level of pressure in step 3i is 510 bar or more. In an embodiment, the high level of pressure in step 3i is 810 bar or more. In an embodiment, the high level of pressure in step 3i is 1010 bar or more. In an embodiment, the high level of pressure in step 3i is 1520 bar or more. In an embodiment, the high level of pressure in step 3i is 2220 bar or more. In an embodiment, the high level of pressure in step 3i is 6400 bar or less. In an embodiment, the high level of pressure in step 3i is 2900 bar or less. In an embodiment, the high level of pressure in step 3i is 1900 bar or less. In an embodiment, the pressure levels in step 4i are the same as those in step 3i. In an embodiment, the same limits for pressure described above for step 3i apply for step 4i although the actual pressure value might be different in steps 3i and 4i. In an embodiment, the temperature in step 4i is raised to 0.76*Tm or more. In another embodiment, the temperature in step 4i is raised to 0.82*Tm or more. In another embodiment, the temperature in step 4i is raised to 0.86*Tm or more. In another embodiment, the temperature in step 4i is raised to 0.91*Tm or more. In another embodiment, the temperature in step 4i is raised to 0.96*Tm or more. In another embodiment, the temperature in step 4i is raised to 1.05*Tm or more. In an embodiment, a long enough time period in step 4i is 16 minutes or more. In another embodiment, a long enough time period in step 4i is 66 minutes or more. In another embodiment, a long enough time period in step 4i is 125 minutes or more. In another embodiment, a long enough time period in step 4i is 178 minutes or more. In another embodiment, a long enough time period in step 4i is 250 minutes or more. In another embodiment, a long enough time period in step 4i is 510 minutes or more. In an embodiment, the long enough period of time in step 4i is less than 590 minutes. In another embodiment, the long enough period of time in step 4i is less than 390 minutes. In another embodiment, the long enough period of time in step 4i is less than 290 minutes. In another embodiment, the long enough period of time in step 4i is less than 240 minutes. In another embodiment, the long enough period of time in step 4i is less than 110 minutes. In another embodiment, the long enough period of time in step 4i is less than 40 minutes. In an embodiment, additionally to steps 1i-4i also a debinding step is incorporated. It has been found that some applications benefit from the present strategy when a carbonyl powder is employed in the right amount. In an embodiment, the metal powder mixture employed comprises a carbonyl powder. In an embodiment, the metal powder mixture employed comprises a carbonyl iron powder. In an embodiment, the metal powder mixture employed comprises a carbonyl nickel powder. In an embodiment, the metal powder mixture employed comprises a carbonyl titanium powder. In an embodiment, the metal powder mixture employed comprises a carbonyl cobalt powder. In an embodiment, the carbonyl powder is a high purity powder of the mentioned metal element resulting from the decomposition of the carbonyl. In an embodiment, the carbonyl powder is a high purity powder of the mentioned metal element resulting from the decomposition of the purified carbonyl (as example: highly pure carbonyl iron resulting from the chemical decomposition of purified iron pentacarbonyl). In an embodiment, the carbonyl powder is present in an amount exceeding 6% by weight of all metal or metal alloy powders. In another embodiment, the carbonyl powder is present in an amount exceeding 16% of all metal or metal alloy powders. In another embodiment, the carbonyl powder is present in an amount exceeding 21% by weight of all metal or metal alloy powders. In another embodiment, the carbonyl powder is present in an amount exceeding 36% by weight of all metal or metal alloy powders. In another embodiment, the carbonyl powder is present in an amount exceeding 52% by weight of all metal or metal alloy powders. In another embodiment, the carbonyl powder is present in an amount exceeding 66% by weight of all metal or metal alloy powders. In some applications an excessive carbonyl content is not desirable. In an embodiment, carbonyl powder is present in an amount of 79% by weight or less. In another embodiment, carbonyl powder is present in an amount of 69% by weight or less. In another embodiment, carbonyl powder is present in an amount of 49% by weight or less. In an embodiment, carbonyl powder is present in an amount of 39% or less. In another embodiment, carbonyl powder is present in an amount of 29% by weight or less. This aspect of the invention is applicable not only to the novel AM methods described in this document, but also to other AM methods presenting also novelty and inventive step, and thus could stand as a standalone patent. In an embodiment, the treatments described in this paragraph are applied to a component comprising an AM step. In an embodiment, the treatments described in this paragraph are applied to a component whose manufacturing comprises a metal AM step. In an embodiment, the treatments described in this paragraph are applied to a component whose manufacturing comprises a metal AM step where the temperatures involved in the binding of the powder to manufacture the component during the AM step are below 0.49*Tm. In an embodiment, the treatments include also the addition of carbonyl metal powder. In an embodiment, the following method is used to attain very high densities and performance in an economic way for a low temperature metal AM method:

Step 1ii: Providing a powder comprising a carbonyl metal powder.

Step 2ii: Manufacturing an object through the additive manufacturing of metal powder with a method where temperatures below 0.49*Tm of the metal powder are employed.

Step 3ii: proceeding with at least the 4 steps of the method described above in this paragraph.

The step 2ii of the method disclosed above involves the use of additive manufacturing of metal powder using temperatures below 0.49*Tm of the metal powder. In some applications, during the additive manufacturing process the binding can be made through processes which are not related to temperature, such as using a glue, or radiation among others. The inventor has found that the use of powder mixtures wherein at least one of the powders comprises % Y, % Sc, and/or REE may be interesting to apply with the method disclosed above. In an embodiment, at least one of the powders of the mixture comprises % Y. In an embodiment, at least one of the powders of the mixture comprises % Sc. In an embodiment, at least one of the powders of the mixture comprises % REE. In an embodiment, at least one powder comprises % Y, % Sc and/or REE and a % Fe content above 90% by weight.

In an embodiment, the method of the present invention comprises an additional step:

l) heat treating

In an embodiment, the method of the present invention comprises an additional step:

m) performing some kind of subtractive machining

In an embodiment, the method of the present invention comprises an additional step:

n) performing a surface conditioning

For several applications the addition of method step n) is very interesting, in fact the inventor was inclined to make a thorough research in this area due to the influence on the beneficial impact for some applications. This has led to novel contributions that extend even beyond the scope of the main invention and thus can constitute an invention on their own. Some other applications do better without method step n) and like all the preceding cases that is the reason why it has been incorporated as an additional, non mandatory for all applications, method step. In an embodiment, the surface conditioning of method step n) comprises a chemical modification of at least some of the surface of the manufactured component. In an embodiment, at least part of the surface of the component manufactured in the preceding method steps is altered in a way that the chemical composition changes. In an embodiment, the change in composition is achieved by reaction to an atmosphere. In another embodiment, the change in composition is achieved by carburation. In another embodiment, the change in composition is achieved by nitriding. In another embodiment, the change in composition is achieved by oxidation. In another embodiment, the change in composition is achieved by borurizing. In another embodiment, the change in composition is achieved by sulfonizing. In an embodiment, the change in composition affects % C. In an embodiment, the change in composition affects % N. In an embodiment, the change in composition affects % B. In an embodiment, the change in composition affects % O. In an embodiment, the change in composition affects % S. In another embodiment, the change in composition affects at least two of % B, % C, % N, % S and % O. In another embodiment, the change in composition affects at least three of % B, % C, % N, % S and % O. In another embodiment, the change in composition affects at least one of % C, % N, % B, % O and/or % S. In another embodiment, the change in composition is achieved by implanting of atoms. In another embodiment, the change in composition is achieved through ion bombardment. In another embodiment, the change in composition is achieved by deposition of a layer. In another embodiment, the change in composition is achieved by growth of a layer. In another embodiment, the change in composition is achieved by CVD (chemical vapour deposition). In another embodiment, the change in composition is achieved by growth of a layer through hard plating. In another embodiment, the change in composition is achieved by hard-chroming. In another embodiment, the change in composition is achieved by electro-plating. In another embodiment, the change in composition is achieved by hard-chroming. In another embodiment, the change in composition is achieved by electrolytic deposition. In another embodiment, the change in composition is achieved by PVD (physical vapour deposition). In another embodiment, the change in composition is achieved by a dense coating. In another embodiment, the change in composition is achieved by high power Impulse magnetron sputtering (HIPIMS). In another embodiment, the change in composition is achieved by high energy arc plasma acceleration deposition. In another embodiment, the change in composition is achieved by a thick coating. In another embodiment, the change in composition is achieved by deposition of a layer through acceleration of particles against the surface. In another embodiment, the change in composition is achieved by thermal spraying. In another embodiment, the change in composition is achieved by cold spray. In another embodiment, the change in composition is achieved by deposition of a layer through a chemical reaction of a paint. In another embodiment, the change in composition is achieved by deposition of a layer through a chemical reaction of a spray. In another embodiment, the change in composition is achieved by drying of an applied paint or spray. In another embodiment, the change in composition is achieved through a sol-gel reaction. In an embodiment, the superficial layer causing the change in composition is of ceramic nature. In another embodiment, the superficial layer causing the change in composition comprises a ceramic material. In an embodiment, the superficial layer causing the change in composition comprises an oxide. In an embodiment, the superficial layer causing the change in composition comprises a carbide. In an embodiment, the superficial layer causing the change in composition comprises a nitride. In an embodiment, the superficial layer causing the change in composition comprises a boride. In an embodiment, the superficial layer causing the change in composition is of intermetallic nature. In an embodiment, the superficial layer causing the change in composition comprises an intermetallic material. In an embodiment, the superficial layer causing the change in composition comprises a higher % Ti than any of the underlying materials. In an embodiment, the superficial layer causing the change in composition comprises a higher % Cr than any of the underlying materials. In an embodiment, the superficial layer causing the change in composition comprises a higher % Al than any of the underlying materials. In an embodiment, the superficial layer causing the change in composition comprises a higher % Si than any of the underlying materials. In an embodiment, the superficial layer causing the change in composition comprises a higher % Ba than any of the underlying materials. In an embodiment, the superficial layer causing the change in composition comprises a higher % Sr than any of the underlying materials. In an embodiment, the superficial layer causing the change in composition comprises a higher % Ni than any of the underlying materials. In an embodiment, the superficial layer causing the change in composition comprises a higher % V than any of the underlying materials. In an embodiment, when referring to underlying materials it is restricted to any material in direct contact with the layer. In an-other embodiment, an underlying material is all the materials comprised in the manufactured component. In an embodiment, the superficial layer causing the change in composition is a coating. In an embodiment, oxide coatings are employed, like aluminum, zirconium, lanthanum, calcium, and other white oxides. In an embodiment, dark oxides are employed, like for example titanium. In an embodiment, a coating comprising oxygen and at least one of the following elements: % Cr, % Al, % Si, % Ti, % Y, % La, % Ca, % Zr, % Hf, % Ba, % Sr is employed. In an embodiment, a coating comprising oxygen and at least two of the following elements: % Cr, % Al, % Si, % Ti, % Y, % La, % Ca, % Zr, % Hf, % Ba, % Sr is employed. In an embodiment, nitride coatings are employed. In another embodiment, boride coatings are employed. In an embodiment, a coating comprising nitrogen and at least one of the following elements: % Cr, % Al, % Si, % Ti, % V is employed. In an embodiment, a coating comprising nitrogen and at least two of the following elements: % Cr, % Al, % Si, % Ti, % V is employed. In an embodiment, a coating comprising carbon and at least one of the following elements: % Cr, % Al, % Si, % Ti, % V is employed. In an embodiment, a coating comprising carbon and at least two of the following elements: % Cr, % Al, % Si, % Ti, % V is employed. In an embodiment, a coating comprising boron and at least one of the following elements: % Cr, % Al, % Si, % Ti, % V is employed. In an embodiment, a coating comprising boron and at least two of the following elements: % Cr, % Al, % Si, % Ti, % V is employed. In an embodiment, the coating is based on titanates such as barium or strontium titanates. In an embodiment, at least a part of the working surface is coated with barium titanate. In an embodiment, at least a part of the working surface is coated with strontium titanate. In an embodiment, at least a part of the working surface is coated with a barium-strontium titanate (a mixture of barium and strontium stoichiometric or quasi-stoichiometric titanate). In an embodiment, a morphologically similar coating is employed. In an embodiment, a functionally similar coating material is employed. In an embodiment, a functionally similar material is one where at least two of the following properties of the coating: the elastic modulus, the fracture toughness, the wettability angle of the cast alloy on the coating applied to the chosen tool material where the tool material is kept at 150° C. and the casted alloy 50° C. above its melting temperature, the contact angle hysteresis of the cast alloy on the coating applied to the chosen tool material where the tool material is kept at 150° C. and the casted alloy 50° C. above its melting temperature and electrical resistivity, in different embodiments, are kept within a range of +/−45% of the values obtained for barium titanate, within a range of +/−28%, within a range of +/−18%, within a range of +/−8%, and even within a range of +/−4%. In an embodiment, it is at least three of the properties. In another embodiment, it is all four properties. In an embodiment, properties are kept similar to strontium titanate instead of barium titanate. In an embodiment, the surface conditioning of method step n) comprises a physical modification of at least some of the surface of the manufactured component. In an embodiment, the surface conditioning comprises a change in the surface roughness. In an embodiment, the surface conditioning comprises a change in the surface roughness to an intended level. In an embodiment, the surface conditioning comprises a mechanical operation on the surface. In an embodiment, the surface conditioning comprises a polishing operation. In an embodiment, the surface conditioning comprises a lapping operation. In an embodiment, the surface conditioning comprises an electro-polishing operation. In an embodiment, the surface conditioning comprises a mechanical operation on the surface which also leaves residual stresses on the surface. In an embodiment, at least some of the residual stresses are compressive. In an embodiment, the surface conditioning comprises a shot-penning operation. In an embodiment, the surface conditioning comprises a ball-blasting operation. In an embodiment, the surface conditioning comprises a tumbling operation. One of the aspects where the inventor found more novel aspects in method step n) that can constitute stand alone inventions is the one related to surface texture tailoring. In an embodiment, the surface conditioning of method step n) comprises a texturing operation on the surface. In an embodiment, the surface conditioning of method step n) comprises a tailored texturing operation on the surface. In an embodiment, the surface conditioning of method step n) comprises a texturing operation on the surface providing at least two different texturing patterns in different areas of the surface. In an embodiment, the surface conditioning comprises an etching operation. In an embodiment, the surface conditioning comprises a chemical etching operation. In an embodiment, the surface conditioning comprises a beam etching operation. In an embodiment, the surface conditioning comprises an electron-beam etching operation. In an embodiment, the surface conditioning comprises a laser-beam etching operation. In an embodiment, the texturing is done through laser engraving. In an embodiment, the texturing is done through electron-beam engraving. In an embodiment, the surface conditioning of method step n) comprises both a physical and a chemical modification of at least some of the surface of the manufactured component. In an embodiment, the surface conditioning of method step n) comprises a coating and a texturing operation on it. In an embodiment, the texturing is made on a chemically modified surface. In an embodiment, the texturing is made on an applied coating. In an embodiment, the engraving is made on an applied coating. In an embodiment, the etching is made on an applied coating.

Any embodiment disclosed in this document may be combined with any other embodiment in any combination, provided that they are not mutually exclusive. Some embodiment combinations are as follows:

[1] A method for producing metal-comprising components comprising the steeps of: a) providing a mould; b) filling the mould with powder; c) sealing the mould; d) subjecting the mould to high pressure, e) while keeping a high pressure level, raising the temperature of the mould; f) while keeping a high enough temperature, releasing at least some of the to the mould applied pressure. [2]A method comprising the steeps of: a) providing a mould; b) filling the mould with powder; c) sealing the mould; d) subjecting the mould to high pressure. [3] The method according to any of [1] to [2] wherein in step c) the mould is closed instead sealed. [4] The method according to any of [1] to [3] wherein the technology used to provide the mould in step a) is PIM. [5] The method according to any of [1] to [3] wherein the technology used to provide the mould in step a) is an AM technology. [6] The method according to any of [1] to [3] wherein the technology used to provide the mould in step a) is casting, dipping, brushing or spraying of the mould material on a model fabricated through an AM technology. [7] The method according to any of [4] to [5] wherein the AM technology is chosen amongst SLA, DLP, CDLP, MJ, MJF, BJ, DOD and SLS. [8] The method according to any of [4] to [5] wherein the AM technology is chosen amongst SLA, DLP, CDLP, MJ, MJF and SLS. [9] The method according to any of [1] to [8] wherein the mould provided in step a) is made of a material having different viscosity at 20° C. and 250° C. [10] The method according to any of [1] to [9] wherein the mould provided in step a) is made of a thermosetting polymer. [11] The method according to any of [1] to [10] wherein the mould provided in step a) is made of a thermoplastic polymer. [12] The method according to any of [1] to [11] wherein the mould provided in step a) comprises a thermosetting polymer. [13] The method according to any of [1] to [12] wherein the mould provided in step a) comprises a thermoplastic polymer. [14] The method according to any of [1] to [13] wherein the mould provided in step a) comprises an amorphous polymer. [15] The method according to any of [1] to [14] wherein the mould provided in step a) comprises PS. [16] The method according to any of [1] to [15] wherein the mould provided in step a) comprises PCL. [17] The method according to any of [1] to [16] wherein the mould provided in step a) comprises PA. [18] The method according to any of [1] to [17] wherein the mould provided in step a) comprises HDPE and/or LDHE. [19] The method according to any of [1] to [18] wherein the mould provided in step a) comprises PP. [20] The method according to any of [1] to [19] wherein the mould provided in step a) comprises a polyolefin. [21] The method according to any of [1] to [20] wherein the mould provided in step a) comprises a polyamide. [22] The method according to any of [1] to [21] wherein the mould provided in step a) comprises a polyolefin and/or a polyamide. [23] The method according to any of [10] to [22] wherein the polymers encompass their copolymers. [24] The method according to any of [1] to [23] wherein the mould provided in step a) comprises a semi-crystalline thermoplastic polymer. [25] The method according to [24] wherein the Tm of the semi-crystalline thermoplastic polymer is below 290° C. [26] The method according to [25] wherein the Tm of the semi-crystalline thermoplastic polymer is above 28° C. [27] The method according to any of [24] to [26] wherein the crystallinity of the polymer is above 12%. [28] The method according to any of [1] to [22] wherein the mould provided in step a) comprises a polymeric material wherein a relevant part of the polymeric material is kept at a large enough molecular weight of 8500 or more and the majority of 55% by volume of less of the polymeric phase is kept at a low enough molecular weight of 4900000 or less. [29] The method according to any of [1] to [28] wherein the mould provided in step a) comprises a polymer with a HDT measured with a load of 1.82 MPa of 380° C. or less. [30] The method according to any of [1] to [28] wherein the mould provided in step a) comprises a polymer with a HDT measured with a load of 1.82 MPa of 280° C. or less. [31] The method according to any of [1] to [28] wherein the mould provided in step a) comprises a polymer with a HDT measured with a load of 1.82 MPa of 190° C. or less. [32] The method according to any of [1] to [28] wherein the mould provided in step a) comprises a polymer with a HDT measured with a load of 1.82 MPa of 148° C. or less. [33] The method according to any of [1] to [28] wherein the mould provided in step a) comprises a polymer with a HDT measured with a load of 1.82 MPa of 118° C. or less. [34] The method according to any of [1] to [28] wherein the mould provided in step a) comprises a polymer with a HDT measured with a load of 1.82 MPa of 98° C. or less. [35] The method according to any of [1] to [28] wherein the mould provided in step a) comprises a polymer with a HDT measured with a load of 1.82 MPa of 58° C. or less. [36] The method according to any of [1] to [28] wherein the mould provided in step a) comprises a polymer with a HDT measured with a load of 1.82 MPa of 32° C. or more. [37] The method according to any of [1] to [28] wherein the mould provided in step a) comprises a polymer with a HDT measured with a load of 1.82 MPa of 52° C. or more. [38] The method according to any of [1] to [28] wherein the mould provided in step a) comprises a polymer with a HDT measured with a load of 1.82 MPa of 72° C. or more. [39] The method according to any of [1] to [28] wherein the mould provided in step a) comprises a polymer with a HDT measured with a load of 1.82 MPa of 106° C. or more. [40] The method according to any of [1] to [28] wherein the mould provided in step a) comprises a polymer with a HDT measured with a load of 1.82 MPa of 132° C. or more. [41] The method according to any of [1] to [28] wherein the mould provided in step a) comprises a polymer with a HDT measured with a load of 1.82 MPa of 152° C. or more. [42] The method according to any of [1] to [28] wherein the mould provided in step a) comprises a polymer with a HDT measured with a load of 1.82 MPa of 204° C. or more. [43] The method according to any of [1] to [28] wherein the mould provided in step a) comprises a polymer with a HDT measured with a load of 1.82 MPa of 250° C. or more. [44] The method according to any of [1] to [28] wherein the mould provided in step a) comprises a polymeric material, wherein a relevant part of the polymeric material has a HDT measured with a load of 1.82 MPa of 380° C. or less. [45] The method according to any of [1] to [28] wherein the mould provided in step a) comprises a polymeric material, wherein a relevant part of the polymeric material has a HDT measured with a load of 1.82 MPa of 280° C. or less. [46] The method according to any of [1] to [28] wherein the mould provided in step a) comprises a polymeric material, wherein a relevant part of the polymeric material has a HDT measured with a load of 1.82 MPa of 190° C. or less. [47] The method according to any of [1] to [28] wherein the mould provided in step a) comprises a polymeric material, wherein a relevant part of the polymeric material has a HDT measured with a load of 1.82 MPa of 148° C. or less. [48] The method according to any of [1] to [28] wherein the mould provided in step a) comprises a polymeric material, wherein a relevant part of the polymeric material has a HDT measured with a load of 1.82 MPa of 118° C. or less. [49] The method according to any of [1] to [28] wherein the mould provided in step a) comprises a polymeric material wherein a relevant part of the polymeric material has a HDT measured with a load of 1.82 MPa of 98° C. or less. [50] The method according to any of [1] to [28] wherein the mould provided in step a) comprises a polymeric material, wherein a relevant part of the polymeric material has a HDT measured with a load of 1.82 MPa of 58° C. or less. [51] The method according to any of [1] to [28] wherein the mould provided in step a) comprises a polymeric material, wherein a relevant part of the polymeric material has a HDT measured with a load of 1.82 MPa of 32° C. or more. [52] The method according to any of [1] to [28] wherein the mould provided in step a) comprises a polymeric material, wherein a relevant part of the polymeric material has a HDT measured with a load of 1.82 MPa of 52° C. or more. [53] The method according to any of [1] to [28] wherein the mould provided in step a) comprises a polymeric material, wherein a relevant part of the polymeric material has a HDT measured with a load of 1.82 MPa of 72° C. or more. [54] The method according to any of [1] to [28] wherein the mould provided in step a) comprises a polymeric material, wherein a relevant part of the polymeric material has a HDT measured with a load of 1.82 MPa of 106° C. or more. [55] The method according to any of [1] to [28] wherein the mould provided in step a) comprises a polymeric material, wherein a relevant part of the polymeric material has a HDT measured with a load of 1.82 MPa of 132° C. or more. [56] The method according to any of [1] to [28] wherein the mould provided in step a) comprises a polymeric material, wherein a relevant part of the polymeric material has a HDT measured with a load of 1.82 MPa of 152° C. or more. [57] The method according to any of [1] to [28] wherein the mould provided in step a) comprises a polymer with a HDT measured with a load of 0.455 MPa of 440° C. or less. [58] The method according to any of [1] to [28] wherein the mould provided in step a) comprises a polymer with a HDT measured with a load of 0.455 MPa of 340° C. or less. [59] The method according to any of [1] to [28] wherein the mould provided in step a) comprises a polymer with a HDT measured with a load of 0.455 MPa of 240° C. or less. [60] The method according to any of [1] to [28] wherein the mould provided in step a) comprises a polymer with a HDT measured with a load of 0.455 MPa of 190° C. or less. [61] The method according to any of [1] to [28] wherein the mould provided in step a) comprises a polymer with a HDT measured with a load of 0.455 MPa of 159° C. or less. [62] The method according to any of [1] to [28] wherein the mould provided in step a) comprises a polymer with a HDT measured with a load of 0.455 MPa of 119° C. or less. [63] The method according to any of [1] to [28] wherein the mould provided in step a) comprises a polymer with a HDT measured with a load of 0.455 MPa of 98° C. or less. [64] The method according to any of [1] to [28] wherein the mould provided in step a) comprises a polymer with a HDT measured with a load of 0.455 MPa of 32° C. or more. [65] The method according to any of [1] to [28] wherein the mould provided in step a) comprises a polymer with a HDT measured with a load of 0.455 MPa of 52° C. or more. [66] The method according to any of [1] to [28] wherein the mould provided in step a) comprises a polymer with a HDT measured with a load of 0.455 MPa of 72° C. or more. [67] The method according to any of [1] to [28] wherein the mould provided in step a) comprises a polymer with a HDT measured with a load of 0.455 MPa of 106° C. or more. [68] The method according to any of [1] to [28] wherein the mould provided in step a) comprises a polymer with a HDT measured with a load of 0.455 MPa of 132° C. or more. [69] The method according to any of [1] to [28] wherein the mould provided in step a) comprises a polymer with a HDT measured with a load of 0.455 MPa of 152° C. or more. [70] The method according to any of [1] to [28] wherein the mould provided in step a) comprises a polymer with a HDT measured with a load of 0.455 MPa of 204° C. or more. [71] The method according to any of [1] to [28] wherein the mould provided in step a) comprises a polymer with a HDT measured with a load of 0.455 MPa of 250° C. or more. [72] The method according to any of [1] to [28] wherein the mould provided in step a) comprises a polymeric material, wherein a relevant part of the polymeric material has a HDT measured with a load of 0.455 MPa of 440° C. or less. [73] The method according to any of [1] to [28] wherein the mould provided in step a) comprises a polymeric material, wherein a relevant part of the polymeric material has a HDT measured with a load of 0.455 MPa of 340° C. or less. [74] The method according to any of [1] to [28] wherein the mould provided in step a) comprises a polymeric material, wherein a relevant part of the polymeric material has a HDT measured with a load of 0.455 MPa of 240° C. or less. [75] The method according to any of [1] to [28] wherein the mould provided in step a) comprises a polymeric material, wherein a relevant part of the polymeric material has a HDT measured with a load of 0.455 MPa of 190° C. or less. [76] The method according to any of [1] to [28] wherein the mould provided in step a) comprises a polymeric material, wherein a relevant part of the polymeric material has a HDT measured with a load of 0.455 MPa of 159° C. or less. [77] The method according to any of [1] to [28] wherein the mould provided in step a) comprises a polymeric material wherein a relevant part of the polymeric material has a HDT measured with a load of 0.455 MPa of 119° C. or less. [78] The method according to any of [1] to [28] wherein the mould provided in step a) comprises a polymeric material, wherein a relevant part of the polymeric material has a HDT measured with a load of 0.455 MPa of 98° C. or less. [79] The method according to any of [1] to [28] wherein the mould provided in step a) comprises a polymeric material, wherein a relevant part of the polymeric material has a HDT measured with a load of 0.455 MPa of 32° C. or more. [80]The method according to any of [1] to [28] wherein the mould provided in step a) comprises a polymeric material, wherein a relevant part of the polymeric material has a HDT measured with a load of 0.455 MPa of 52° C. or more. [81] The method according to any of [1] to [28] wherein the mould provided in step a) comprises a polymeric material, wherein a relevant part of the polymeric material has a HDT measured with a load of 0.455 MPa of 72° C. or more. [82] The method according to any of [1] to [28] wherein the mould provided in step a) comprises a polymeric material, wherein a relevant part of the polymeric material has a HDT measured with a load of 0.455 MPa of 106° C. or more. [83] The method according to any of [1] to [28] wherein the mould provided in step a) comprises a polymeric material, wherein a relevant part of the polymeric material has a HDT measured with a load of 0.455 MPa of 132° C. or more. [84] The method according to any of [1] to [28] wherein the mould provided in step a) comprises a polymeric material, wherein a relevant part of the polymeric material has a HDT measured with a load of 0.455 MPa of 152° C. or more. [85] The method according to any of [1] to [28] wherein the mould provided in step a) comprises a polyolefin and/or a polyamide with a HDT measured with a load of 1.82 MPa of 380° C. or less. [86] The method according to any of [1] to [28] wherein the mould provided in step a) comprises a polyolefin and/or a polyamide with a HDT measured with a load of 1.82 MPa of 32° C. or more. [87] The method according to any of [1] to [86] wherein the mould provided in step a) comprises a material with a Tm below 190° C. [88] The method according to any of [1] to [86] wherein the mould provided in step a) comprises a material with a Tm below 130° C. [89] The method according to any of [1] to [86] wherein the mould provided in step a) comprises a material with a Tm below 98° C. [90] The method according to any of [1] to [86] wherein the mould provided in step a) comprises a material with a Tm below 79° C. [91] The method according to any of [1] to [86] wherein the mould provided in step a) comprises a material with a Tm below 69° C. [92] The method according to any of [1] to [86] wherein the mould provided in step a) comprises a material with a Tm below 49° C. [93] The method according to any of [1] to [86] wherein the mould provided in step a) comprises a material with a Tm above −20° C. [94] The method according to any of [1] to [86 wherein the mould provided in step a) comprises a material with a Tm above 28° C. [95] The method according to any of [1] to [86] wherein the mould provided in step a) comprises a material with a Tm above 42° C. [96] The method according to any of [1] to [86] wherein the mould provided in step a) comprises a material with a Tm above 52° C. [97] The method according to any of [1] to [86] wherein the mould provided in step a) comprises a material with a Tm above 62° C. [98] The method according to any of [87] to [97] wherein Tm is measured according to ISO 11357-1/-3:2016. [99] The method according to any of [87] to [98] wherein Tm is measured applying a heating rate of 20° C./min. [100] The method according to any of [1] to [99] wherein the mould provided in step a) comprises a material with a Tg under 169° C. [101] The method according to any of [1] to [99] wherein the mould provided in step a) comprises a material with a Tg under 69° C. [102] The method according to any of [1] to [101] wherein the mould provided in step a) comprises a material with a Tg above −260° C. [103] The method according to any of [1] to [102], wherein after step c) and before step d) the mould is undercooled to a low temperature. [104] The method according to [103] wherein low temperature is 9° C. or less. [105] The method according to [103] wherein low temperature is −1° C. or less. [106] The method according to [103] wherein low temperature is −11° C. or less. [107] The method according to [103] wherein low temperature is −20° C. or less. [108] The method according to [103] wherein low temperature is Tg+60° C. [109] The method according to [103] wherein low temperature is Tg+50° C. [110] The method according to [103] wherein low temperature is Tg+40° C. [111] The method according to [103] wherein low temperature is Tg+20° C. [112] The method according to [103] wherein low temperature is Tg+10° C. [113] The method according to any of [103] to [112] wherein undercooling is made by holding the mould more than 10 min at low temperature. [114] The method according to any of [103] to [112] wherein undercooling is made by holding the mould more than 30 min at low temperature. [115] The method according to any of [103] to [112] wherein undercooling is made by holding the mould more than 2 h at low temperature. [116] The method according to any of [103] to [112] wherein undercooling is made by holding the mould more than 10 h at low temperature. [117] The method according to any of [103] to [112] wherein undercooling is made by holding the mould less than 100 h at low temperature. [118] The method according to any of [103] to [112] wherein undercooling is made by holding the mould less than 40 h at low temperature. [119] The method according to any of [103] to [118] wherein undercooling is limited to a temperature of −273° C. maximum. [120] The method according to any of [103] to [118] where undercooling is limited to a temperature of −140° C. maximum. [121] The method according to any of [103] to [118] where undercooling is limited to a temperature of −90° C. maximum. [122] The method according to any of [103] to [118] where undercooling is limited to a temperature of −50° C. maximum. [123] The method according to any of [103] to [118] where undercooling is limited to a temperature of Tg−50° C. maximum. [124] The method according to any of [103] to [118] where undercooling is limited to a temperature of Tg−20° C. maximum. [125] The method according to any of [103] to [118] where undercooling is limited to a temperature of Tg−10° C. maximum. [126] The method according to any of [103] to [118] where undercooling is limited to a temperature of Tg maximum. [127] The method according to any of [103] to [118] where undercooling is limited to a temperature of Tg+20° C. maximum. [128] The method according to any of [100] to [127] wherein Tg is measured according to ASTM D3418-12. [129] The method according to any of [1] to [128] wherein the maximum relevant temperature achieved in step e) and/or f) is 190° C. or less. [130] The method according to any of [1] to [128] wherein the maximum relevant temperature achieved in step e) and/or f) is 140° C. or less. [131] The method according to any of [1] to [128] wherein the maximum relevant temperature achieved in step e) and/or f) is 120° C. or less. [132] The method according to any of [1] to [128] wherein the maximum relevant temperature achieved in step e) and/or f) is 90° C. or less. [133] The method according to any of [1] to [128] wherein the maximum relevant temperature achieved in step e) and/or f) is Tm+50° C. or less. [133] The method according to any of [1] to [128] wherein the maximum relevant temperature achieved in step e) and/or f) is Tm+30° C. or less. [134] The method according to any of [1] to [128] wherein the maximum relevant temperature achieved in step e) and/or f) is Tm+10° C. or less. [135] The method according to any of [1] to [128] wherein the maximum relevant temperature achieved in step e) and/or f) is Tm−20° C. or less. [135] The method according to any of [129] to [134] wherein a relevant temperature is a temperature that is maintained more than 1 second. [136] The method according to any of [129] to [134] wherein a relevant temperature is a temperature that is maintained more than 20 seconds. [137] The method according to any of [129] to [134] wherein a relevant temperature is a temperature that is maintained more than 20 seconds. [138] The method according to any of [129] to [134] wherein a relevant temperature is a temperature that is maintained more than 2 minutes. [139] The method according to any of [129] to [134] wherein a relevant temperature is a temperature that is maintained more than 11 minutes. [140] The method according to any of [129] to [134] wherein a relevant temperature is a temperature that is maintained more than 1 h and 10 minutes. [141] The method according to any of [129] to [134] wherein a relevant temperature is a temperature that is maintained less than 4 hours. [142] The method according to any of [129] to [134] wherein a relevant temperature is a temperature that is maintained less than 1 h and 50 minutes. [143] The method according to any of [1] to [142] wherein the mould provided in step a) comprises a polymer with a Vicat softening point of 314° C. or less. [144] The method according to any of [1] to [142] wherein the mould provided in step a) comprises a polymer with a Vicat softening point of 36° C. or more. [145] The method according to any of [143] to [144] wherein the Vicat softening point is measured according to ISO 306:2015 standard. [146] The method according to any of [143] to [145] wherein the Vicat softening point is measured with a heating rate of 50° C./h. [147] The method according to any of [143] to [145] wherein the Vicat softening point is measured with a load of 50N. [148] The method according to any of [143] to [145] wherein the Vicat softening point is measured according to ASTM D1525-00 standard. [149] The method according to any of [143] to [145] wherein the Vicat softening point is measured by the B50 method. [150] The method according to any of [143] to [145] wherein the Vicat softening point is measured by the A120 method and 18° C. are subtracted from the value measured. [151] The method according to any of [143] to [145] wherein the Vicat softening point is measured according to ISO 10350-1 standard using method B50. [152] The method according to any of [143] to [145] wherein the Vicat softening point is the Vicat hardness reported for the closest material in the UL IDES Prospector Plastic Database at 29 Jan. 2018. [153] The method according to any of [1] to [152] wherein the mould material provided in step a) comprises a polymeric material and at least a relevant part of the polymeric material comprises a sufficient amount of reinforcement. [154] The method according to any of [1] to [152] wherein the mould material provided in step a) comprises a sufficient amount of reinforcement. [155] The method according to any of [153] to [154] wherein a sufficient amount of reinforcement is 2.2% by volume or more. [156] The method according to any of [153] to [154] wherein a sufficient amount of reinforcement part is 78% by volume or less. [157] The method according to any of [153] to [154] wherein a sufficient amount of reinforcement part is 28% by volume or less. [158] The method according to any of [153] to [157] wherein the reinforcement comprises inorganic fibres. [159] The method according to any of [153] to [157] wherein the reinforcement comprise glass fibres. [160] The method according to any of [153] to [157] wherein the reinforcement comprise carbon fibres. [161] The method according to any of [153] to [157] wherein the reinforcement comprise basalt fibres. [162] The method according to any of [153] to [157] wherein the reinforcement comprise asbestos fibres. [163] The method according to any of [153] to [157] wherein the reinforcement comprise ceramic fibres. [164] The method according to any of [1] to [163] wherein the mould provided in step a) comprises a polymer with a right tensile strength at room temperature when characterized at the proper strain rate. [165] The method according to [164] wherein the right tensile strength at room temperature is 2 MPa or more. [166] The method according to [164] wherein the right tensile strength is 6 MPa or more. [167] The method according to [164] wherein the right tensile strength is 12 MPa or more. [168] The method according to [164]] wherein the right tensile strength is 26 MPa or more. [169] The method according to [164] wherein the right tensile strength is 52 MPa or more. [170] The method according to [164] wherein the right tensile strength is 82 MPa or more. [171] The method according to [164] wherein the right tensile strength at room temperature is 288 MPa or less. [172] The method according to [164] wherein the right tensile strength is 188 MPa or less. [173] The method according to [164] wherein the right tensile strength is 148 MPa or less. [174] The method according to [164] wherein the right tensile strength is 99 MPa or less. [175] The method according to [164] wherein the right tensile strength is 69 MPa or less. [176] The method according to [164] wherein the right tensile strength is 49 MPa or less. [177] The method according to [164] wherein the right tensile strength is 29 MPa or less. [178] The method according to [164] wherein the right tensile strength is 19 MPa or less. [178] The method according to [179] wherein the right tensile strength is 9 MPa or less. [179] The method according to any of [1] to [178] wherein the mould provided in step a) comprises a polymer with a right tensile modulus at room temperature when characterized at the proper strain rate. [180] The method according to [179] wherein the right tensile modulus is 105 MPa or more. [181] The method according to [179] wherein the right tensile modulus is 505 MPa or more. [182] The method according to [179] wherein the right tensile modulus is 1005 MPa or more. [183] The method according to [179] wherein the right tensile modulus is 1200 MPa or more. [184] The method according to [179] wherein the right tensile modulus is 1850 MPa or more. [185] The method according to [179] wherein the right tensile modulus is 2505 MPa or more. [186] The method according to [179] wherein the right tensile modulus is 5900 MPa or less. [187] The method according to [179] wherein the right tensile modulus is 3900 MPa or less. [188] The method according to [179] wherein the right tensile modulus is 2900 MPa or less. [189] The method according to [179] wherein the right tensile modulus is 2400 MPa or less. [190] The method according to [179] wherein the right tensile modulus is 1900 MPa or less. [191] The method according to [179] wherein the right tensile modulus is 900 MPa or less. [192] The method according to any of [1] to [191] wherein the mould provided in step a) comprises a polymer with a right flexural modulus at room temperature when characterized at the proper strain rate. [193] The method according to [192] wherein the right flexural modulus is 3900 MPa or less. [194] The method according to [192] wherein the right flexural modulus is 120 MPa or more. [195] The method according to any of [1] to [194] wherein the apparent density of the filled mould in step b) is 52% or more. [196] The method according to any of [1] to [194] wherein the apparent density of the filled mould in step b) is 62% or more. [197] The method according to any of [1] to [194] wherein the apparent density of the filled mould in step b) is 66% or more. [198] The method according to any of [1] to [194] wherein the apparent density of the filled mould in step b) is 72% or more. [199] The method according to any of [1] to [194] wherein the apparent density of the filled mould in step b) is 74% or more. [200] The method according to any of [1] to [194] wherein the apparent density of the filled mould in step b) is 76% or more. [201] The method according to any of [1] to [194] wherein the apparent density of the filled mould in step b) is 78% or more. [202] The method according to any of [1] to [194] wherein the apparent density of the filled mould in step b) is 81% or more. [203] The method according to any of [1] to [194] wherein the apparent density of the filled mould in step b) is 94% or less. [204] The method according to any of [1] to [194] wherein the apparent density of the filled mould in step b) is 89% or less. [205] The method according to any of [1] to [194] wherein the apparent density of the filled mould in step b) is 87% or less. [206] The method according to any of [1] to [194] wherein the apparent density of the filled mould in step b) is 84% or less. [207] The method according to any of [1] to [194] wherein the apparent density of the filled mould in step b) is 82% or less. [208] The method according to any of [1] to [194] wherein the apparent density of the filled mould in step b) is 79.5% or less. [209] The method according to any of [1] to [208] wherein: $APPDEN*PADMP1<\sqrt[3]{MaxPres}<APPDEN*PADMP2$. [210] The method according to [209] wherein APPDEN is the apparent filling density in percentage divided by 100. [211] The method according to [209] wherein Max-Pres is the maximum pressure applied in step d). [212] The method according to [209] wherein Max-Pres is the maximum pressure applied in step e). [213] The method according to [209] wherein Max-Pres is the maximum pressure applied in step f). [214] The method according to [209] wherein Max-Pres is the maximum pressure applied in steps d), e) and/or f). [215] The method according to [209] to [214]

wherein where PADM1 and PADM2 are parameters. [216] The method according to [209] wherein PADM1 is 5.0. [217] The method according to [209] wherein PADM1 is 5.8. [218] The method according to [209] wherein PADM2 is 8.0. [219] The method according to [209] wherein PADM2 is 8.8. [220] The method according to any of [1] to [219] wherein the mould is filled in step b) with a powder mixture. [221] The method according to any of [1] to [220] wherein the powder mixture comprises at least two powders with a significant difference in the content of at least one critical element. [222] The method according to [221] wherein a critical element is: % Cr, % Mn, % Ni, % V, % Ti, % Mo, % W, % Al, % Zr, % Si, % Sn, % Mg, % Cu, % C, % B and/or % N. [223] The method according to any of [221] to [222] wherein a significant difference in the content is a weight content of the critical element in the powder with high content at least 50% higher than in the powder with lower content. [224] The method according to any of [220] to [223] wherein at least one powder of the mixture has a high enough content of the sum of % V+% Cr+% Mo+% W+% Ta+% Zr+% Hf while at least another powder of the mixture has a low enough content of this sum of elements. [225] The method according to any of [220] to [224] wherein at least one powder of the mixture has a high enough content of the sum of % V+% Cr+% Mo while at least another powder of the mixture has a low enough content of this sum of elements. [226] The method according to any of [220] to [225] wherein at least one powder of the mixture has a high enough content of the sum of % Ni+% Cr+% Mn+% Mo while at least another powder of the mixture has a low enough content of this sum of elements. [227] The method according to any of [220] to [226] wherein at least one powder of the mixture has a high enough content of the sum of % V+% Al+% Sn while at least another powder of the mixture has a low enough content of this sum of elements. [228] The method according to any of [220] to [227] wherein at least one powder of the mixture has a high enough content of the sum of % V+% Al while at least another powder of the mixture has a low enough content of this sum of elements. [229] The method according to any of [220] to [228] wherein at least one powder of the mixture has a high enough content of the sum of % Si+% Mn+% Mg+% Zn+% Sc+% Zr while at least another powder of the mixture has a low enough content of this sum of elements. [230] The method according to any of [223] to [229] wherein a high enough content is 0.2% by weight or more. [231] The method according to any of [223] to [229] wherein a high enough content is 0.6% by weight or more. [232] The method according to any of [223] to [229] wherein a high enough content is 1.2% by weight or more. [233] The method according to any of [223] to [229] wherein a high enough content is 3.2% by weight or more. [234] The method according to any of [223] to [229] wherein a high enough content is 5.2% by weight or more. [235] The method according to any of [223] to [229] wherein a high enough content is 12% by weight or more. [236] The method according to any of [223] to [229] wherein a high enough content is 16% by weight or more. [237] The method according to any of [223] to [229] wherein a low enough content is 49% by weight or less. [238] The method according to any of [223] to [229] wherein a low enough content is 19% by weight or less. [239] The method according to any of [223] to [229] wherein a low enough content is 9% by weight or less. [240] The method according to any of [223] to [229] wherein a low enough content is 3.8% by weight or less. [241] The method according to any of [223] to [229] wherein a low enough content is 1.9% by weight or less. [242] The method according to any of [223] to [229] wherein a low enough content is 0.9% by weight or less. [243] The method according to any of [223] to [229] wherein a low enough content is 0.09% by weight or less. [244] The method according to any of [220] to [243] wherein at least one powder of the mixture has a sufficiently high content of the sum of % V+% Cr+% Mo+% W+% Ta+% Zr+% Hf+% Ti while at least another powder of the mixture has a sufficiently low content of this sum of elements and wherein the final component is mainly of iron. [245] The method according to [244] wherein a sufficiently high content is 0.6% by weight or more. [246] The method according to [244] wherein a sufficiently low content is 36% by weight or less. [247] The method according to any of [220] to [246] wherein at least one powder of the mixture has a sufficiently high content of the sum of % Ni+% Cr+% Mn+% Ti while at least another powder of the mixture has a sufficiently low content of this sum of elements, and wherein the final component is mainly of iron. [248] The method according to [247] wherein a sufficiently high content is 0.6% by weight or more. [249] The method according to [247] wherein a sufficiently low content is 66% by weight or less. [250] The method according to any of [220] to [249] wherein at least one powder of the mixture has a sufficiently high content of the sum of % Al+% Sn+% Cr+% V+% Mo+% Ni+% Pd while at least another powder of the mixture has a sufficiently low content of this sum of elements and wherein the final component is mainly of titanium [251] The method according to [250] wherein a sufficiently high content is 0.6% by weight or more. [252] The method according to [250] wherein a sufficiently high content is 6% by weight or more. [253] The method according to [250] wherein a sufficiently high content is 12.6% by weight or more. [254] The method according to [250] wherein a sufficiently high content is 16% by weight or more. [255] The method according to [250] wherein a sufficiently high content is 22% by weight or more. [256] The method according to [250] wherein a sufficiently low content is 39% by weight or less. [257] The method according to [250] wherein a sufficiently low content is 19% by weight or less. [258] The method according to [250] wherein a sufficiently low content is 9% by weight or less. [259] The method according to [250] wherein a sufficiently low content is 4% by weight or less. [260] The method according to [250] wherein a sufficiently low content is 0.9% by weight or less. [261] The method according to [250] wherein a sufficiently low content is 0.09% by weight or less. [262] The method according to any of [220] to [261] wherein at least one powder of the mixture has a sufficiently high content of the sum of % Al+% Sn+% V while at least another powder of the mixture has a sufficiently low content of this sum of elements and wherein the final component is mainly of titanium. [263] The method according to [262] wherein a sufficiently high content is 0.6% by weight or more. [264] The method according to [262] wherein a sufficiently high content is 6% by weight or more. [265] The method according to [262] wherein a sufficiently high content is 12.6% by weight or more. [266] The method according to [262] wherein a sufficiently high content is 16% by weight or more. [267] The method according to [262] wherein a sufficiently high content is 22% by weight or more. [268] The method according to [262] wherein a sufficiently low content is 39% by weight or less. [269] The method according to [262] wherein a sufficiently low content is 19% by weight or less. [270] The method according to [262] wherein a sufficiently low content is 9% by weight or less. [271] The method according to [262]

wherein a sufficiently low content is 4% by weight or less. [272] The method according to [262] wherein a sufficiently low content is 0.9% by weight or less. [273] The method according to [262] wherein a sufficiently low content is 0.09% by weight or less. [274] The method according to any of [220] to [273] wherein at least one powder of the mixture has a sufficiently high content of the sum of % Cu+% Mn+% Mg+% Si while at least another powder of the mixture has a sufficiently low content of this sum of elements and wherein the final component is mainly of aluminium. [275] The method according to [274] wherein a sufficiently high content is 0.2% by weight or more. [276] The method according to [274] wherein a sufficiently high content is 0.6% by weight or more. [277] The method according to [274] wherein a sufficiently high content is 1.2% by weight or more. [278] The method according to [274] wherein a sufficiently high content is 2.6% by weight or more. [279] The method according to [274] wherein a sufficiently high content is 5.2% by weight or more. [280] The method according to [274] wherein a sufficiently high content is 11% by weight or more. [281] The method according to [274] wherein a sufficiently low content is 19% by weight or less. [282] The method according to [274] wherein a sufficiently low content is 9% by weight or less. [283] The method according to [274] wherein a sufficiently low content is 4% by weight or less. [284] The method according to [274] wherein a sufficiently low content is 1.9% by weight or less. [285] The method according to [274] wherein a sufficiently low content is 0.9% by weight or less. [286] The method according to [274] wherein a sufficiently low content is 0.09% by weight or less. [287] The method according to any of [220] to [286] wherein at least one powder of the mixture has a sufficiently high content of the sum of % Cu+% Mn+% Mg+% Si+% Fe+% Zn while at least another powder of the mixture has a sufficiently low content of this sum of elements and wherein the final component is mainly of aluminium. [288] The method according to [287] wherein a sufficiently high content is 0.2% by weight or more. [289] The method according to [287] wherein a sufficiently high content is 0.6% by weight or more. [290] The method according to [287] wherein a sufficiently high content is 1.2% by weight or more. [291] The method according to [287] wherein a sufficiently high content is 2.6% by weight or more. [292] The method according to [287] wherein a sufficiently high content is 5.2% by weight or more. [293] The method according to [287] wherein a sufficiently high content is 11% by weight or more. [294] The method according to [287] wherein a sufficiently low content is 19% by weight or less. [295] The method according to [287] wherein a sufficiently low content is 9% by weight or less. [296] The method according to [287] wherein a sufficiently low content is 4% by weight or less. [297] The method according to [287] wherein a sufficiently low content is 1.9% by weight or less. [298] The method according to [287] wherein a sufficiently low content is 0.9% by weight or less. [299] The method according to [287] wherein a sufficiently low content is 0.09% by weight or less. [300] The method according to any of [220] to [299] wherein at least one powder of the mixture has a sufficiently high content of the sum of % Cr+% Co+% Mo+% Ti while at least another powder of the mixture has a sufficiently low content of this sum of elements and wherein the final component is mainly of nickel. [301] The method according to [300] wherein a sufficiently high content is 1.2% by weight or more. [302] The method according to [300] wherein a sufficiently high content is 16% by weight or more. [303] The method according to [300] wherein a sufficiently high content is 22% by weight or more. [304] The method according to [300] wherein a sufficiently high content is 32% by weight or more. [305] The method according to [300] wherein a sufficiently high content is 36% by weight or more. [306] The method according to [300] wherein a sufficiently high content is 42% by weight or more. [307] The method according to [300] wherein a sufficiently low content is 65% by weight or less. [308] The method according to [300] wherein a sufficiently low content is 29% by weight or less. [309] The method according to [300] wherein a sufficiently low content is 14% by weight or less. [310] The method according to [300] wherein a sufficiently low content is 9% by weight or less. [311] The method according to [300] wherein a sufficiently low content is 0.9% by weight or less. [312] The method according to [300] wherein a sufficiently low content is 0.09% by weight or less. [313] The method according to any of [220] to [402] wherein at least one powder of the mixture has a sufficiently high content of the sum of % Cr+% Co while at least another powder of the mixture has a sufficiently low content of this sum of elements and wherein the final component is mainly of nickel. [314] The method according to [313] wherein a sufficiently high content is 1.2% by weight or more. [315] The method according to [313] wherein a sufficiently high content is 16% by weight or more. [316] The method according to [313] wherein a sufficiently high content is 22% by weight or more. [317] The method according to [313] wherein a sufficiently high content is 32% by weight or more. [318] The method according to [313] wherein a sufficiently high content is 36% by weight or more. [319] The method according to [313] wherein a sufficiently high content is 42% by weight or more. [320] The method according to [313] wherein a sufficiently low content is 65% by weight or less. [321] The method according to [313] wherein a sufficiently low content is 29% by weight or less. [322] The method according to [313] wherein a sufficiently low content is 14% by weight or less. [323] The method according to [313] wherein a sufficiently low content is 9% by weight or less. [324] The method according to [313] wherein a sufficiently low content is 0.9% by weight or less. [325] The method according to [313] wherein a sufficiently low content is 0.09% by weight or less. [326] The method according to any of [244] to [415] wherein mainly is a 33% by weight or more. [327] The method according to any of [244] to [415] wherein mainly is a 52% by weight or more. [328] The method according to any of [244] to [415] wherein mainly is a 76% by weight or more. [329] The method according to any of [244] to [415] wherein mainly is a 86% by weight or more. [330] The method according to any of [244] to [415] wherein mainly is a 92% by weight or more. [331] The method according to any of [244] to [415] wherein mainly is a 96% by weight or more. [332] The method according to any of [244] to [415] wherein mainly is a 99% by weight or more. [333] The method according to any of [221] to [332] wherein the powder with low content of the critical element is not the largest powder. [334] The method according to any of [221] to [333] wherein the powder with a low content of the sum of critical elements is not the largest powder. [335] The method according to any of [221] to [334] wherein at least one of the powders is considerably bigger in size than at least one of the powders with a high enough content of a critical element. [336] The method according to any of [221] to [335] wherein manganese (% Mn) is a critical element. [337] The method according to any of [221] to [335] wherein nickel (% Ni) is a critical element. [338] The method according to any of [221] to [335] wherein vanadium (% V) is a critical element. [339] The method according to any of [221] to [335] wherein titanium (% Ti) is a critical element. [340] The method according to any of [221] to [335] wherein molybdenum (% Mo) is a critical element. [341] The method according to any of any of [221] to [335] wherein tungsten (% W) is a critical element. [342] The method according to any of [221] to [335] wherein aluminum (% Al) is a critical element. [343] The method according to any of [221] to [335] wherein zirconium (% Zr) is a critical element. [344] The method according to any of [221] to [335] wherein silicon (% Si) is a critical element. [345] The method according to any of [221] to [335] wherein tin (% Sn) is a critical element. [346] The method according to any of [221] to [335] wherein magnesium (% Mg) is a critical element. [347] The method according to any of [221] to [335] wherein copper (% Cu) is a critical element. [348] The method according to any of [221] to [335] wherein carbon (% C) is a critical element. [349] The method according to any of [221] to [335] wherein boron (% B) is a critical element. [350] The method according to any of [221] to [335] wherein nitrogen (% N) is a critical element. [351] The method according to any of [335] to [350] wherein a powder is considerably bigger in size than other powder when the D50 is at least a 52% bigger. [352] The method according to any of [335] to [350] wherein a powder is considerably bigger in size than other powder when the D50 is at least a 152% bigger. [353] The method according to any of [335] to [350] wherein a powder is considerably bigger in size than other powder when the D50 is at least a 252% bigger. [354] The method according to any of [335] to [350] wherein a powder is considerably bigger in size than other powder when the D50 is at least a 352% bigger. [355] The method according to any of [335] to [350] wherein a powder is considerably bigger in size than other powder when the D50 is at least a 452% bigger. [356] The method according to any of [335] to [350] wherein a powder is considerably bigger in size than other powder when the D50 is at least a 752% bigger. [357] The method according to any of [335] to [350] wherein a powder is considerably bigger in size than other powder when the D50 is at least a 352% bigger 358] The method according to any of [335] to [350] wherein a powder is considerably bigger in size than other powder when the D50 is at least a 452% bigger. [359] The method according to any of [335] to [350] wherein a powder is considerably bigger in size than other powder when the D50 is at least a 552% bigger. [360] The method according to any of [220] to [359] wherein there is a considerable difference of hardness between the softest powder and the hardest powder in the powder mixture. [361] The method according to any of [220] to [360] wherein the powder mixture comprises at least two powders with a considerable difference of hardness. [362] The method according to [361] wherein a considerable difference of hardness is 6 HV or more. [363] The method according to [361] wherein a considerable difference is 12 HV or more. [364] The method according to [361] wherein a considerable difference is 26 HV or more. [365] The method according to [361] wherein a considerable difference is 52 HV or more. [366] The method according to [361] wherein a considerable difference is 78 HV or more. [367] The method according to [361] wherein a considerable difference is 105 HV or more. [368] The method according to [361] wherein a considerable difference is 160 HV or more. [369] The method according to [361] wherein a considerable difference is 205 HV or more. [370] The method according to any of [220] to [369] wherein the powder mixture comprises at least a relevant powder with low hardness. [371] The method according to [370] wherein low hardness is 289 HV or less. [372] The method according to [370] wherein low hardness is 189 HV or less. [373] The method according to [370] wherein low hardness is 148 HV or less. [374] The method according to [370] wherein low hardness is 119 HV or less. [375] The method according to [370] wherein low hardness is 89 HV or less. [376] The method according to [370] wherein low hardness is 49 HV or less. [377] The method according to [370] wherein a relevant powder is a powder that is a 1.6% by weight or more of the powder mixture. [378] The method according to [370] wherein a relevant powder is a powder that is a 2.6% by weight or more of the powder mixture. [379] The method according to [370] wherein a relevant powder is a powder that is a 5.6% by weight or more of the powder mixture. [380] The method according to [370] wherein a relevant powder is a powder that is a 8.6% by weight or more of the powder mixture. [381] The method according to [370] wherein a relevant powder is a powder that is a 12% by weight or more of the powder mixture. [382] The method according to [370] wherein a relevant powder is a powder that is a 16% by weight or more of the powder mixture. [383] The method according to [370] wherein a relevant powder is a powder that is a 21% by weight or more of the powder mixture. [384] The method according to any of [220] to [383] wherein there is a considerable difference between the sphericity of at least two of the powders in the mixture. [385] The method according to [384] wherein a considerable difference is a 5% or more. [386] The method according to [384] wherein a considerable difference is a 12% or more. [387] The method according to any of [384] to [386] wherein at least one of the powders in the mixture has a sphericity above 90%. [388] The method according to any of [384] to [387] wherein at least one of the powders in the mixture has a sphericity below 89%. [389] The method according to any of [384] to [388] wherein the sphericity of the particles is determined by dynamic image analysis. [390] The method according to any of [384] to [389] wherein the sphericity of the particles is determined by light scattering diffraction. [391] An iron based alloy with the following composition, all percentages being indicated in weight percent:% Cr: 10-14; % Ni: 5.6-12.5; % Ti: 0.4-2.8; % Mo: 0-4.4; % B: 0-4; % Co: 0-12; % Mn: 0-2; % Cu: 0-2; % Al: 0-1; % Nb: 0-0.5; % Ce: 0-0.3; % Si: 0-2; % C, % N, % P, % S, % O each 0.09% max; % C+% N+% P+% S+% O: 0-0.3; % La+% Cs+% Nd+% Gd+% Pr+% Ac+% Th+% Tb+% Dy+% Ho+% Er+% Tm+% Yb+% Y+% Lu+% Sc+% Zr+% Hf: 0-0.4; % V+% Ta+% W: 0-0.8; the rest being iron and trace elements. [392] The iron based alloy according to [481] wherein trace elements comprise at least one element from: H, He, Xe, F, Ne, Na, Cl, Ar, K, Br, Kr, Sr, Tc, Ru, Rh, Pd, Ag, I, Ba, Re, Os, Ir, Pt, Au, Hg, Tl, Po, At, Rn, Fr, Ra, Ac, Pa, U, Np, Pu, Am, Cm, Bk, Cf, Es, Fm, Md, No, Lr, Rf, db, Sg, Bh, Hs, Li, Be, Mg, Ca, Rb, Zn, Cd, Ga, In, Ge, Sn, Pb, Bi, Sb, As, Se, Te, Th, Ds, Rg, Cn, Nh, Fl, Mc, Lv, Ts, Og, Co, Ta, Sm, Pm, Ho, Eu and Mt. [393] The iron base alloy according to any of [391] to [392] wherein the sum of all trace elements is less than 1.9% by weight. [394] The iron base alloy according to any of [391] to [392] wherein the sum of all trace elements is less than 0.9% by weight. [395] The iron base alloy according to any of [391] to [392] wherein each trace element individually is less than a 1.9% by weight. [396] The iron base alloy according to any of [391] to [392] wherein each trace element individually is less than a 0.9% by weight. [397] The iron base alloy according to any of [391] to [396] wherein the % Cr is 10.6% by weight or higher. [398] The iron base alloy according to any of [391] to [397] wherein the % Cr is 13.4% by weight or lower.

[399] The iron base alloy according to any of [391] to [398] any of [391] to [396] wherein the % B is 35 ppm by weight or higher. [400] The iron base alloy according to any of [391] to [399] wherein the % B is 1.9% by weight or lower. [401] The iron base alloy according to any of [391] to [400] wherein the % Ti is 0.7% by weight or higher. [402] The iron base alloy according to any of [391] to [401] wherein the % Ti is 2.4% by weight or lower. [403] The iron base alloy according to any of [391] to [402] wherein the % Ni is 6.1% by weight or higher. [404] The iron base alloy according to any of [391] to [403] wherein the % Ni is 11.9% by weight or lower. [405] The iron base alloy according to any of [391] to [404] wherein the % Mo is 0.26% by weight or higher. [406] The iron base alloy according to any of [391] to [405] wherein the % Mo is 3.9% by weight or lower. [407] The iron base alloy according to any of [391] to [406] wherein the % Co is 0.6% by weight or higher. [408] The iron base alloy according to any of [391] to [407] wherein the % Mn is 0.12% by weight or higher. [409] The iron base alloy according to any of [391] to [408] wherein the % Mn is 1.4% by weight or lower. [410] The iron base alloy according to any of [391] to [409] wherein the % Cu is 0.12% by weight or higher. [411] The iron base alloy according to any of [391] to [410] wherein the % Cu is 1.4% by weight or lower. [412] The iron base alloy according to any of [391] to [411] wherein the % Si is 0.12% by weight or higher. [413] The iron base alloy according to any of [391] to [412] wherein the % Si is 1.4% by weight or lower. [414] The iron base alloy according to any of [391] to [413] wherein the % Al is 0.01% by weight or higher. [415] The iron base alloy according to any of [391] to [414] wherein the % Al is 0.4% by weight or lower. [416] The iron base alloy according to any of [391] to [415] wherein % Nb is 0.01% by weight or higher. [417] The iron base alloy according to any of [391] to [415] wherein the % Nb is 0.29% by weight or lower. [418] The iron base alloy according to any of [391] to [417] wherein the % Ce is 0.01% by weight or higher. [419] The iron base alloy according to any of [391] to [418] wherein the % Ce is 0.09% by weight or lower. [420] The iron base alloy according to any of [391] to [419] wherein at least one of % C, % N, % P, % S, % O is 0.04% by weight or lower. [421] The iron base alloy according to any of [391] to [420] wherein % C+% N+% P+% S+% O is 0.01% by weight or higher. [422] The iron base alloy according to any of [391] to [421] wherein % C+% N+% P+% S+% O is 0.09% by weight or lower. [423] The iron base alloy according to any of [391] to [422] wherein % V+% Ta+% W is 0.06% by weight or higher. [424] The iron base alloy according to any of [391] to [423] wherein % V+% Ta+% W is 0.49% by weight or lower. [425] The method according to any of [1] to [390] wherein the filled mould in step b) comprises a powder with the composition of the iron based alloy of [391] to [424]. [426] A material comprising the iron based alloy according to any of [391] to [424] wherein the material is annealed by heating to a temperature of 980° C.±TOL, hold at this temperature for enough time and then quenched.

A material manufactured using the iron based alloy according to any of [391] to [424] wherein the material is annealed by heating to a temperature of 980° C.±TOL, hold at this temperature for enough time and then quenched. [428] A manufactured component with a composition according to any of [391] to [424] wherein the manufactured component is annealed by heating to a temperature of 980° C.±TOL, hold at this temperature for enough time and then quenched. [429] The material according to any of [426] to [428] wherein TOL is 5° C. [430] The material according to any of [426] to [428] wherein TOL is 10° C. [431] The material according to any of [426] to [428] wherein TOL is 15° C. [432] The material according to any of [426] to [428] wherein TOL is 25° C. [433] The material according to any of [426] to [428] wherein TOL is 35° C. [434] The material according to any of [426] to [428] wherein enough time is 10 minutes or more. [435] The material according to any of [426] to [428] wherein enough time is half an hour or more. [436] The material according to any of [426] to [428] wherein enough time is four hours or more. [437] The material according to any of [426] to [428] wherein enough time is 47 hours or less. [438] The material according to any of [426] to [428] wherein enough time is 23 hours or less. [439] A powder with the composition of the iron based alloy according to any of [391] to [424]. [440] A powder mixture comprising a powder according to [439]. [441] A material comprising the iron based alloy according to any of [391] to [424] wherein the material is subzero treated after quenching at a low enough temperature for long enough time. [442]A material consisting of the iron based alloy according to any of [481] to [515] wherein the material is subzero treated after quenching at a low enough temperature for long enough time. [443] The material according to any of [441] to [442] wherein a low enough temperature is −25° C. or less. [444] The material according to any of [441] to [442] wherein a low enough temperature is −50° C. or less. [445] The material according to any of [441] to [442] wherein a low enough temperature is −75° C. or less. [446] The material according to any of [441] to [442] wherein a low enough temperature is −100° C. or less. [447] The material according to any of [441] to [442] wherein a long enough time is 10 minutes or more. [448] The material according to any of [441] to [442] wherein a long enough time is one hour or more. [449] The material according to any of [441] to [442] wherein a long enough time is 4 hours or more. [450] The material according to any of [441] to [442] wherein a long enough time is 47 hours or less. [451] The material according to any of [441] to [442] wherein a long enough time is 23 hours or less. [452] A pre-alloyed powder (single powder P1) with a D50 between 1.2 microns and 69 microns, comprising % Y+% Sc between 0.012% and 1.4% by weight and % O between 22 ppm and 1900 ppm by weight. [453] A pre-alloyed powder with a D50 between 1.2 microns and 69 microns, comprising % Y+% Sc+% REE between 0.012% and 1.4% by weight and % O between 22 ppm and 1900 ppm by weight. [454] A pre-alloyed powder with a D50 between 1.2 microns and 69 microns, comprising % Y between 0.012% and 1.4% by weight and % O between 22 ppm and 1900 ppm by weight. [455] A powder mixture comprising % Y+% Sc between 0.012% and 1.4% by weight and % O between 22 ppm and 1900 ppm by weight and a powder P2 comprising % Fe: 86%-99.99995% by weight, wherein P2 has a D50 between 1.2 and 90 microns. [456] A powder mixture comprising % Y+% Sc+% REE between 0.012% and 1.4% by weight and % O between 22 ppm and 1900 ppm by weight and a powder P2 comprising % Fe: 86%-99.99995% by weight, wherein P2 has a D50 between 1.2 and 90 microns. [457] A powder mixture comprising % Y+% Sc between 0.012% and 1.4% by weight, % O between 22 ppm and 1900 ppm by weight, % P between 0.001% and 0.2% by weight and % S between 0.0001% and 0.05 by weight and a powder P2 comprising % Fe: 86%-99.99995% by weight, wherein P2 has a D50 between 1.2 and 90 microns. [458] A powder mixture comprising % Y+% Sc+% REE between 0.012% and 1.4% by weight, % O between 22 ppm and 1900 ppm by weight, % P between 0.001% and 0.2% and % S between 0.0001% and 0.05 by weight and a powder P2 comprising % Fe: 86%-99.99995% by weight, wherein P2 has a D50 between 1.2 and 90 microns. [459] A powder mixture comprising % Y+% Sc between 0.012% and 1.4% by weight, % O between 22 ppm and 1900 ppm by weight, % P between 0.001% and 0.2% by weight, % S between 0.0001% and 0.05% by weight and % Cu+% Ni between 0.01% and 0.7% by weight and a powder P2 comprising % Fe: 86%-99.99995% by weight, wherein P2 has a D50 between 1.2 and 90 microns. [460] A powder mixture comprising % Y+% Sc+% REE between 0.012% and 1.4% by weight, % O between 22 ppm and 1900 ppm by weight, % P between 0.001% and 0.2% by weight and % S between 0.0001% and 0.05% by weight and % Cu+% Ni between 0.01% and 0.7% by weight and a powder P2 comprising % Fe: 86%-99.99995% by weight, wherein P2 has a D50 between 1.2 and 90 microns. [461] A powder mixture comprising % Y+% Sc between 0.012% and 1.4% by weight and % O between 22 ppm and 1900 ppm and a powder P2 comprising % Ti above 92% by weight, wherein P2 has a D50 between 1.2 and 90 microns. [462] A powder mixture comprising % Y+% Sc between 0.012% and 1.4% by weight and % O between 22 ppm and 1900 ppm and a powder P2 comprising % Ni above 92% by weight, wherein P2 has a D50 between 1.2 and 90 microns. [463] A powder mixture comprising % Y+% Sc between 0.012% and 1.4% by weight and % O between 22 ppm and 1900 ppm and a powder P2 comprising % Cu above 92% by weight, wherein P2 has a D50 between 1.2 and 90 microns. [464]A powder mixture comprising % Y+% Sc between 0.012% and 1.4% by weight and % O between 22 ppm and 1900 ppm and a powder P2 comprising % Al above 92% by weight, wherein P2 has a D50 between 1.2 and 90 microns. [465] A powder mixture comprising % Y+% Sc+% REE between 0.012% and 1.4% by weight and % O between 22 ppm and 1900 ppm and a powder P2 comprising % Ti above 92% by weight, wherein P2 has a D50 between 1.2 and 90 microns. [466] A powder mixture comprising % Y+% Sc+% REE between 0.012% and 1.4% by weight and % O between 22 ppm and 1900 ppm and a powder P2 comprising % Ni above 92% by weight, wherein P2 has a D50 between 1.2 and 90 microns. [467] A powder mixture comprising % Y+% Sc+% REE between 0.012% and 1.4% by weight and % O between 22 ppm and 1900 ppm and a powder P2 comprising % Cu above 92% by weight, wherein P2 has a D50 between 1.2 and 90 microns. [468] A powder mixture comprising % Y+% Sc+% REE between 0.012% and 1.4% by weight and % O between 22 ppm and 1900 ppm and a powder P2 comprising % Al above 92% by weight, wherein P2 has a D50 between 1.2 and 90 microns. [469] A powder mixture according to any of [455] to [468] to be use in metal additive manufacturing. [470] A powder mixture according to any of [455] to [468] to be use in a metal additive manufacturing technology where the temperatures involved in the binding of the powder are below 0.49*Tm, being Tm the melting temperature of the powder. [471] A powder mixture according to any of [455] to [468] to be use in a metal additive manufacturing technology where the temperatures involved in the binding of the powder are below 0.49*Tm, being Tm the melting temperature of the powder component with the lowest melting point. [472] A powder mixture according to any of [455] to [468] to be used in the method according to any of [1] to [390]. [473] The method according to any of [1] to [390] wherein the filled mould in step b) comprises a pre-alloyed powder according to any of [452] to [454]. [474] The method according to any of [1] to [390] wherein the filled mould in step b) comprises a powder mixture according to any of [455] to [471]. [475] A powder mixture comprising at least two different powders, a powder P1 and a powder P2. [476] The powder mixture according to [475] wherein the powder P1 is obtained by water atomization. [477] The powder mixture according to [475] wherein the powder P1 is obtained by gas atomization. [478] The powder mixture according to any of [475] to [477] wherein the powder P2 and/or P3 is obtained by water atomization. [479] The powder mixture according to any of [475] to [477] wherein the powder P2 and/or P3 is obtained by gas atomization. [480] The powder mixture according to any of [475] to [477] wherein the powder P2 and/or P3 is obtained by mechanical attrition. [481] The powder mixture according to any of [475] to [477] wherein the powder P2 and/or P3 is obtained by carbonyl decomposition. [482] The powder mixture according to any of [475] to [477] wherein the powder P2 and/or P3 is obtained by oxide-reduction. [483] A powder mixture comprising at least two different powders, a powder P1 and a powder P2, wherein P1 and P2 are obtained by a different technology. [484] A powder mixture comprising at least two different powders, a powder P1 and a powder P2, wherein P1 and P2 are obtained by a different technology, wherein both technologies are selected from water atomization, gas atomization, carbonyl decomposition, mechanical attrition and oxide-reduction. [485] A powder mixture comprising at least three different powders, a powder P1, a powder P2 and a powder P3, wherein P1, P2 and P3 are obtained by a different technology, wherein all three technologies are selected from water atomization, gas atomization, carbonyl decomposition, mechanical attrition and oxide-reduction. [486] The powder mixture according to any of [475] to [485] comprising a powder P1, with the following composition, all percentages being indicated in weight percent: % Fe: 32-89; % Cr: 8.6-24.9; % Ni: 2.2-19.8; % Mo: 0-6.9; % Ti: 0-3.4; % Co: 0-18; % Cu: 0-6.9; % Mn: 0-1.9; % Si: 0-1.9; % Al: 0-0.8; % S<0.1; % P<0.1; % Nb: 0-0.98; % Ta: 0-0.98; % W: 0-0.9; % V 0-0.8; % B: 0-2.9; % O<0.4; % N<0.24; % C<0.29. [487] The powder mixture according to any of [475] to [486] comprising a powder P1, with the following composition, all percentages being indicated in weight percent: % Fe: 51-84; % Cr: 9.6-19.8; % Ni: 2.6-14.8; % Mo: 0-3.9; % Ti: 0-2.4; % Co: 0-11.8; % Cu: 0-4.9; % Mn: 0-0.9; % Si: 0-0.9; % Al: 0-0.49; % S<0.04; % P<0.04; % Nb: 0-0.48; % Ta: 0-0.48; % W: 0-0.4; % V: 0-0.09; % B: 0-0.9; % O<0.29; % N<0.09; % C<0.14. [488] The powder mixture according to any of [475] to [487] comprising a powder P2, with the following composition, all percentages being indicated in weight percent: % Fe: 86-99.9999; % Cu: <9; % C: <1.4; % Mn: <2.9; % Mo: <2.9; % Ni<9; % O: <0.4; % S: <0.1; % P: <0.1. [489] The powder according to any of [486] to [488] further comprising trace elements. [490] The powder according to [489] wherein the sum of all trace elements is less than a 1.9% by weight. [491] The powder according to [489] wherein the sum of all trace elements is less than a 0.9% by weight. [492] The powder according to [489] wherein each trace element individually is less than a 1.9% by weight. [493] The powder according to [489] wherein each trace element individually is less than a 0.9% by weight. [494] The powder mixture according to any of [475] to [583] wherein the powder P1 is considerably bigger in size than powder P2. [495] The powder mixture according to any of [475] to [494] wherein the powder P1 is considerably bigger in size than powders P3, P4 and P5. [496] The powder mixture according to any of [494] to [495] wherein a powder considerably bigger in size is a powder with a D50 at least 52% bigger. [497] The powder mixture according to any of [475] to [496] wherein at least one of the powders of the mixture comprises % Y, % Sc, and/or % REE. [498] The powder mixture according to any of [475] to [496] wherein at least one of the powders of the mixture comprises % Y. [499] The powder mixture according to [498] wherein the % Y is above 0.012% by weight. [500] The powder mixture according to [498] wherein the % Y is above 0.52% by weight. [501] The powder mixture according to [498] wherein the % Y is below 1.4% by weight. [502] The powder mixture according to [498] wherein the % Y is below 0.96% by weight. [503] The powder mixture according to any of [475] to [502] wherein at least one of the powders of the mixture comprises % Sc. [504] The powder mixture according to [503] wherein the % Sc is above 0.012% by weight. [505] The powder mixture according to [503] wherein the % Sc is above 0.052% by weight. [506] The powder mixture according to [503] wherein the % Sc is below 1.4% by weight. [507] The powder mixture according to [503] wherein the % Sc is below 0.96% by weight. [508] The powder mixture according to any of [475] to [507] wherein at least one of the powders of the mixture comprises % Sc+% Y+% REE. [509] The powder mixture according to [508] wherein % Sc+% Y+% REE is above 0.012% by weight. [510] The powder mixture according to [508] wherein % Sc+% Y+% REE is above 0.052 by weight. [511] The powder mixture according to [508] wherein the % Sc+% Y+% REE is below 1.4 by weight. [512] The powder mixture according to [508] wherein the % Sc+% Y+% REE is below 0.96. by weight. [513] The powder mixture according to any of [475] to [512] wherein the powder mixture comprises % Y. [514] The powder mixture according to [513] wherein the % Y is above 0.012% by weight. [515] The powder mixture according to [513] wherein the % Y is above 0.52% by weight. [516] The powder mixture according to [513] wherein the % Y is below 1.4% by weight. [517] The powder mixture according to [513] wherein the % Y is below 0.96% by weight. [518] The powder mixture according to any of [475] to [517] wherein the powder mixture comprises % Sc. [519] The powder mixture according to [518] wherein the % Sc is above 0.012% by weight. [520] The powder mixture according to [518] wherein the % Sc is above 0.052% by weight. [521] The powder mixture according to [518] wherein the % Sc is below 1.4% by weight. [522] The powder mixture according to [518] wherein the % Sc is below 0.96% by weight. [523] The powder mixture according to any of [475] to [522] wherein the powder mixture mixture comprises % Sc+% Y+% REE. [524] The powder mixture according to [523] wherein % Sc+% Y+% REE is above 0.012% by weight. [525] The powder mixture according to [523] wherein % Sc+% Y+% REE is above 0.052 by weight. [526] The powder mixture according to [523] wherein the % Sc+% Y+% REE is below 1.4 by weight. [527] The powder mixture according to [523] wherein the % Sc+% Y+% REE is below 0.96 by weight. [528] The powder mixture according to any of [475] to [527] wherein the powder mixture comprises % O. [529] The powder mixture according to [528] wherein the % O is above 8 ppm by weight. [530] The powder mixture according to [528] wherein the % O is above 22 ppm by weight. [531] The powder mixture according to [528] wherein the % O is below 2900 ppm by weight. [532] The powder mixture according to [528] wherein the % O is below 1900 ppm by weight. [533] The powder mixture according to any of [475] to [532] wherein the powder mixture comprises % P. [534] The powder mixture according to [533] wherein the % P is 0.01% by weight or higher. [535] The powder mixture according to [533] the % P is 0.2% by weight or lower. [536] The powder mixture according to any of [475] to [535] wherein the powder mixture comprises % S. [537] The powder mixture according to [536] wherein the % S is 0.01% by weight or higher. [538] The powder mixture according to [536] the % S is 0.05% by weight or lower. [539] The powder mixture according to any of [475] to [538] wherein the powder mixture comprises % Cu+% Ni. [540] The powder mixture according to [539] wherein the % Cu+% Ni is 0.01% by weight or higher. [541] The powder mixture according to [539] the % Cu+% Ni is 0.7% by weight or lower. [542] The powder mixture according to any of [475] to [541] wherein the theorical composition of the powder mixture (the sum of the compositions of all the powders contained in the powder mixture) has the following elements and limitations, all percentages being indicated in weight percent: C: 0.25-0.8; Mn: 0-1.15; Si: 0-0.35; Cr: 0.1 max; Mo: 1.5-6.5; V: 0-0.6; W: 0-4; Ni: 0-4; Co: 0-3; balance Fe and trace elements. [543] The powder mixture according to any of [475] to [541] wherein the theorical composition of the powder mixture (the sum of the compositions of all the powders contained in the powder mixture) has the following elements and limitations, all percentages being indicated in weight percent: % C: 0.25-0.55; % Mn: 0.10-1.2; % Si: 0.10-1.20; % Cr: 2.5-5.50; % Mo: 1.00-3.30; % V: 0.30-1.20; balance Fe and trace elements. [544] The powder mixture according to any of [475] to [541] wherein the theorical composition of the powder mixture (the sum of the compositions of all the powders contained in the powder mixture) has the following elements and limitations, all percentages being indicated in weight percent: % C: 0.15-2.35; % Mn: 0.10-2.5; % Si: 0.10-1.0; % Cr: 0.2-17.50; % Mo: 0-1.4; % V: 0-1; % W: 0-2.2; % Ni: 0-4.3; balance Fe and trace elements. [545] The powder mixture according to any of [475] to [541] wherein the theorical composition of the powder mixture (the sum of the compositions of all the powders contained in the powder mixture) has the following elements and limitations, all percentages being indicated in weight percent: % C: 0-0.4; % Mn: 0.1-1; % Si: 0-0.8; % Cr: 0-5.25; % Mo: 0-1.0; % V: 0-0.25; % Ni: 0-4.25; % Al: 0-1.25; balance Fe and trace elements. [546] The powder mixture according to any of [475] to [541] wherein he theorical composition of the powder mixture (the sum of the compositions of all the powders contained in the powder mixture) has the following elements and limitations, all percentages being indicated in weight percent: % C: 0.77-1.40; % Si: 0-0.70; % Cr: 3.5-4.5; % Mo: 3.2-10; % V: 0.9-3.60; % W: 0-18.70; % Co: 0-10.50; balance Fe and trace elements. [547] The powder mixture according to any of [475] to [541] wherein the theorical composition of the powder mixture (the sum of the compositions of all the powders contained in the powder mixture) has the following elements and limitations, all percentages being indicated in weight percent: % C: 0.03 max; % Mn: 0.1 max; % Si: 0.1 max; % Mo: 3.0-5.2; % Ni: 18-19; % Co: 0-12.5; % Ti: 0-2; balance Fe and trace elements. [548] The powder mixture according to any of [475] to [541] ] wherein the theorical composition of the powder mixture (the sum of the compositions of all the powders contained in the powder mixture) has the following elements and limitations, all percentages being indicated in weight percent: % C: 1.5-1.85; % Mn: 0.15-0.5; % Si: 0.15-0.45; % Cr: 3.5-5.0; % Mo: 0-6.75; % V:4.5-5.25; % W: 11.5-13.00; % Co: 0-5.25; balance Fe and trace elements. [549] The powder mixture according to any of [475] to [541] wherein the theorical composition of the powder mixture (the sum of the compositions of all the powders contained in the powder mixture) has the following elements and limitations, all percentages being indicated in weight percent: % C: 0-0.6; % Mn: 0-1.5; % Si: 0-1; % Cr: 11.5-17.5; % Mo: 0-1.5; % V:0-0.2; % Ni: 0-6.0; balance Fe and trace elements. [550] The powder mixture according to any of [475] to [541] wherein the theorical composition of the powder mixture (the sum of the compositions of all the powders contained in the powder mixture) has the following elements and limitations, all percentages being indicated in weight percent: C: 0.015 max; Mn: 0.5-1.25; Si: 0.2-1; Cr: 11-18; Mo: 0-3.25; Ni: 3.0-9.5; Ti: 0-1.40; Al: 0-1.5; Cu: 0-5; balance Fe and trace elements. [551] The powder mixture according to any of [475] to [541] wherein the theorical composition of the powder mixture (the sum of the compositions of all the powders contained in the powder mixture) has the following elements and limitations, all percentages being indicated in weight percent: % Mg: 0.006-10.6; % Si: 0.006-23; % Ti: 0.002-0.35; % Cr: 0.01-0.40; % Mn-0.002-1.8; % Fe: 0.006-1.5; % Ni: 0-3.0; % Cu: 0.006-10.7; % Zn: 0.006-7.8; % Sn: 0-7; % Zr: 0-0.5; balance aluminium (% Al) and trace elements. [552] The powder mixture according to any of [475] to [541] wherein the theorical composition of the powder mixture (the sum of the compositions of all the powders contained in the powder mixture) has the following elements and limitations, all percentages being indicated in weight percent: Zn: 0-40; Ni: 0-31; Al: 0-13; Sn: 0-10; Fe: 0-5.5; Si: 0-4; Pb: 0-4; Mn: 0-3; Co: 0-2.7; Be: 0-2.75; Cr: 0-1; balance copper (% Cu) and trace elements. [553] The powder mixture according to any of [475] to [541] wherein the theorical composition of the powder mixture (the sum of the compositions of all the powders contained in the powder mixture) has the following elements and limitations, all percentages being indicated in weight percent: % Be: 0.15-3.0; % Co: 0-3; % Ni: 0-2.2; % Pb: 0-0.6; % Fe: 0-0.25; % Si: 0-0.35; % Sn: 0-0.25, % Zr 0-0.5; balance copper (% Cu) and trace elements. [554] The powder mixture according to any of [475] to [541] wherein the theorical composition of the powder mixture (the sum of the compositions of all the powders contained in the powder mixture) has the following elements and limitations, all percentages being indicated in weight percent: % Cr: 9-33; % W 0-26; % Mo: 0-29; % C: 0-3.5; % Fe: 0-9; % Ni: 0-35; % Si: 0-3.9; Mn: 0-2.5; % B: 0-1; % V: 0-4.2; % Nb/% Ta 0-5.5, balance cobalt (% Co) and trace elements. [555] The powder mixture according to any of [475] to [541] wherein the theorical composition of the powder mixture (the sum of the compositions of all the powders contained in the powder mixture) has the following elements and limitations, all percentages being indicated in weight percent: % Fe: 0-42; % Cu: 0-34; % Cr: 0-31; % Mo: 0-24; % Co: 0-18; % W: 0-14; % Nb: 0-5.5; % Mn: 0-5.25; % Al: 0-5; Ti: 0-3; % Zn: 0-1; % Si: 0-1; % C:0-0.3; % S:0.01 max; balance nickel (% Ni) and trace elements. [556] The powder mixture according to any of [475] to [541] wherein the theorical composition of the powder mixture (the sum of the compositions of all the powders contained in the powder mixture) has the following elements and limitations, all percentages being indicated in weight percent: % V:0-14.5; % Mo: 0-13; % Cr: 0-12; % Sn: 0-11.5; % Al: 0-8; % Mn: 0-8; % Zr: 0-7.5; % Cu: 0-3; % Nb: 0-2.5; % Fe: 0-2.5; % Ta: 0-1.5; % Si: 0-0.5; % C:0.1 max; % N:0.05 max; % O: 0.2 max; H:0.03 max; balance titanium (% Ti) and trace elements. [557] The powder mixture according to any of [475] to [541] wherein the theorical composition of the powder mixture (the sum of the compositions of all the powders contained in the powder mixture) has the following elements and limitations, all percentages being indicated in weight percent: % Al: 0-10, % Zn: 0-6; % Y:0-5.2; % Cu: 0-3; % Ag: 0-2.5, % Th: 0-3.3; Si: 0-1.1; % Mn: 0-0.75; balance magnesium (% Mg) and trace elements. [558] The powder according to any of [542] to [557] wherein the sum of all trace elements is less than a 1.9% by weight. [559] The powder according to any of [542] to [557] wherein the sum of all trace elements is less than a 0.9% by weight. [560] The powder according to any of [542] to [557] wherein each trace element individually is less than a 1.9% by weight. [561] The powder according to any of [542] to [557] wherein each trace element individually is less than a 0.9% by weight. [562] The powder mixture according to any of [475] to [561] wherein the powder P1 has a compensated size, which is a D50 of 16 microns or bigger. [563] The powder mixture according to any of [475] to [561] wherein the powder P1 has a compensated size, which is a D50 of 990 microns or smaller. [564] The powder mixture according to any of [475] to [561] wherein the powder P2 has a compensated size which is a D50 of 1.6 microns or bigger.

The powder mixture according to any of [475] to [561] wherein the powder P2 has a compensated size which is a D50 of 290 microns or smaller. [566] The powder mixture according to any of [475] to [561] wherein the powder P3 has a compensated size which is a D50 of 1.6 microns or bigger. [567] The powder mixture according to any of [475] to [561] wherein the powder P3 has a compensated size which is a D50 of 290 microns or smaller. [568] The powder mixture according to any of [475] to [567] wherein the powder mixture comprises abrasion resistant particles. [569] The powder mixture according to any of [475] to [567] wherein the powder mixture comprises a moderate amount of fine abrasion resistant particles. [570] The powder mixture according to [569] wherein a moderate amount is 0.012% by volume or more. [571] The powder mixture according to any of [569] to [571] wherein a moderate amount is 19% by volume or less. [572] The powder mixture according to any of [568] to [571] wherein the fine abrasion resistant particles have a D50 of 49 microns or less. [573] The method according to any of [1] to [390] wherein the filled mould in step b) comprises a powder mixture according to any of [118] to [138]. [574] The method according to any of [1] to [390] wherein the mould is sealed in step c) in a vacuum tight way. [575] The method according to any of [1] to [390] wherein the mould is sealed with a low leak rate. [576] The method according to [575] wherein a low leak rate is 0.9 mbar·l/s or less. [577] The method according to any of [575] to [576] wherein a low leak rate is 0.08 mbar·l/s or less. [578] The method according to any of [575] to [576] wherein a low leak rate is 0.008 mbar·l/s or less. [579] The method according to any of [575] to [576] wherein a low leak rate is 0.0008 mbar·l/s or less. [580] The method according to any of [575] to [576] wherein a low leak rate is 0.00009 mbar·l/s or less. [581] The method according to any of [575] to [576] wherein a low leak rate is 0.000009 mbar·l/s or less. [583] The method according to any of [575] to [576] wherein a low leak rate is $1.2\cdot10^{-9}$ mbar·l/s or more. [584] The method according to any of [575] to [576] wherein a low leak rate is $1.2\cdot10^{-7}$ mbar·l/s or more. [585] The method according to any of [575] to [576] wherein a low leak rate is $1.2\cdot10^{-6}$ mbar·l/s or more. [586] The method according to any of [575] to [576] wherein a low leak rate is $1.2\cdot10^{-5}$ mbar·l/s or more. [587] The method according to any of [575] to [576] wherein a low leak rate is $1.2\cdot10^{-4}$ mbar·l/s or more. [588] The method according to any of [575] to [587] wherein leak rate is measured according to DIN-EN 1330-8. [589] The method according to any of [575] to [587] wherein leak rate is measured according to DIN-EN 13185:2001. [590] The method according to any of [575] to [587] wherein leak rate are measured according to DIN-EN 1779:2011. [591] The method according to any of [1] to [390] wherein a coating is applied to at least part of the filled mould in step c). [592] The method according to any of [1] to [390] wherein a coating is applied to the filled mould in step c). [593] The method according to any of [1] to [390] wherein an organic coating is applied to at least part of the filled mould in step c). [594] The method according to any of [1] to [390] wherein an organic coating is applied to the filled mould in step c). [595] The method according to any of [593] to [594] wherein the coating comprises a polymer. [596] The method according to any of [593] to [594] wherein the coating comprises an elastomer. [597] The method according to any of [593] to [594] wherein the coating comprises a rubbery material. [598] The method according to any of [593] to [594] wherein the coating comprises latex. [599] The method according to any of [593] to [594] wherein the coating comprises a silicone. [600] The method according to any of [591] to [594] wherein the coating has a high enough maximum working temperature which is 52° C. or more. [601] The method according to any of [591] to [594] wherein a high enough maximum working temperature is 82° C. or more. [602] The method according to any of [591] to [594] wherein a high enough maximum working temperature is 102° C. or more. [603] The method according to any of [591] to [594] wherein a high enough maximum working temperature is 152° C. or more. [604] The method according to any of [591] to [594] wherein a high enough maximum working temperature is 202° C. or more. [605] The method according to any of [591] to [594] wherein a high enough maximum working temperature is 252° C. or more. [606] The method according to any of [591] to [594] wherein a high enough maximum working temperature is 302° C. or more. [607] The method according to any of [591] to [594] wherein a high enough maximum working temperature is 490° C. or less. [608] The method according to any of [591] to [594] wherein a high enough maximum working temperature is 390° C. or less. [609] The method according to any of [591] to [594] wherein a high enough maximum working temperature is 340° C. or less. [610] The method according to any of [591] to [594] wherein the coating comprises continuous layers. [611] The method according to [600] wherein the maximum working temperature of the coating is the temperature where the material has lost a 0.05% of weight. [612] The method according to any of [591] to [611] wherein the coating comprises continuous layers. [613] The method according to any of [591] to [611] wherein the coating comprises several layers. [614] The method according to any of [591] to [611] wherein the coating is a vacuum bag that is placed over the filled mould. [615] The method according to any of [591] to [611] wherein, the coating is used as a vacuum container to retain the vacuum in the mould. [616] The method according to [615] wherein the coating is used as a vacuum container and the vacuum made is 790 mbars or higher. [617] The method according to [615] wherein the coating is used as a vacuum container and the vacuum made is 490 mbars or higher. [618] The method according to [615] wherein the coating is used as a vacuum container and the vacuum made is 90, mbars or higher. [619] The method according to [615] wherein the coating is used as a vacuum container and the vacuum made is 40 mbars or higher. [620] The method according to [615] wherein the coating is used as a vacuum container and the vacuum made is 9 mbars or higher. [621] The method according to any of [1] to [390] wherein the mould is sealed in step c) in a vacuum tight way to a vacuum of 490 mbars or less. [622] The method according to any of [591] to [621] wherein a controlled high vacuum is applied to the filled mould in step b) using the coating as a vacuum tight container. [623] The method according to [622] wherein a controlled high vacuum is 0.9 mbars or less. [624] The method according to [622] wherein a controlled high vacuum is 0.09 mbars or less. [625] The method according to [622] wherein a controlled high vacuum is 0.04 mbars or less. [626] The method according to [622] wherein a controlled high vacuum is 0.009 mbars or less. [627] The method according to [622] wherein a controlled high vacuum is 0.0009 mbars or less. [628] The method according to [622] wherein a controlled high vacuum is 0.00009 mbars or less. [629] The method according to any of [622] to [628] wherein a controlled high vacuum is $10^{-10}$ mbars or more. [630] The method according to any of [622] to [628] wherein a controlled high vacuum is $10^{-8}$ mbars or more. [631] The method according to any of [622] to [628] wherein a controlled high vacuum is $10^{-6}$ mbars or more. [632] The method according to any of [622] to [628] wherein a controlled high vacuum is $10^{-4}$ mbars or more. [633] The method according to any of [591] to [632] wherein the coating is sealed with a polymeric fastener. [634] The method according to any of [1] to [390] wherein the filled mould in step b) is sealed with a polymeric material film. [635] The method according to any of [1] to [390] wherein the filled mould in step b) is coated and the coating is sealed with a polymeric material film. [636] The method according to any of [1] to [390] wherein the filled mould in step b) is coated and the coating is sealed with a polymeric material film after vacuum has been performed. [637] The method according to any of [2351] to [2353] wherein the polymeric material film has a low permeability to gases and vapours, wherein a low permeability to gases and vapours is 190000 ml/($m^2$·24 h·MPa) or less. [638] The method according to any of [2351] to [2363] wherein the polymeric material film has a permeability to gases and vapours of 0.012 ml/($m^2$·24 h·MPa) or more. [639] The method according to any of [2351] to [2375] wherein permeability to gases is at 75° F. and is measured according to ASTM D-1434 (1988). [640] The method according to any of [2351] to [2375] wherein permeability to gases is at 75° F. and is measured according to ASTM E96/E96M-16. [641] The method according to any of [634] to [640] wherein the film comprises a polyester. [642] The method according to any of [634] to [640] wherein the film comprises MYLAR. [643] The method according to any of [634] to [640] wherein the film comprises a polyimide. [644] The method according to any of [634] to [640] wherein the film comprises KAPTON. [645] The method according to any of [634] to [640] wherein the film comprises a polyvinyl fluoride. [646] The method according to any of [634] to [640] wherein the film comprises TEDLAR. [647] The method according to any of [634] to [640] wherein the film comprises a polyethylene. [648] The method according to any of [634] to [640] wherein the film comprises a high density polyethylene. [649] The method according to any of [634] to [640] wherein the film has the right thickness. [650] The method according to [649] wherein the right thickness is 2 microns or more. [651] The method according to any of [649] to [650] wherein the right thickness is 9 mm or less. [652] The method according to any of [643] to [651] wherein the film has an ultimate tensile strength of 6 MPa or more. [653] The method according to any of [643] to [651] wherein the film has an ultimate tensile strength of 26 MPa or more. [654] The method according to any of [643] to [651] wherein the film has an ultimate tensile strength of 940 MPa or less. [655] The method according to any of [652] to [654] wherein the ultimate tensile strength of the film is measured at 75° F. according to ASTM D-882-18. [656] The method according to any of [643] to [655] wherein the film has a strength at 5% elongation of 1900 MPa or less. [657] The method according to [656] wherein strength at 5% elongation of the film is measured at 75° F. according to ASTM D-882-18. [658] The method according to any of [140] to [163] wherein at least some of the applied vacuum in the filled mould is kept when step d) is applied. [659] The method according to [658] wherein some of the applied vacuum is 190 mbars or higher vacuum. [660] The method according to [658] wherein some of the applied vacuum is 9 mbars or higher vacuum. [661] The method according to [658] wherein some of the applied vacuum is 0.9 mbars or higher vacuum. [662] The method according to [658] wherein some of the applied vacuum is 0.09 mbars or higher vacuum. [663] The method according to [658] wherein some of the applied vacuum is 0.009 mbars or higher vacuum. [664] The method according to [658] wherein some of the applied vacuum is 0.009 mbars or higher vacuum. [665] The method according to any of [574] to [664] wherein the vacuum is retained in the mould only in the areas filled with powder. [666] The method according to any of [574] to [665] wherein the vacuum is retained in the mould only in the areas connected to the areas filled with powder. [667] The method according to any of [1] to [390] wherein in step d) pressure is applied to the mould through a pressurized fluid. [668] The method according to any of [1] to [390] wherein in step d) a right amount of maximum pressure is applied. [669] The method according to any of [1] to [84] wherein in step d) a maximum pressure of 12 MPa or more is applied. [670] The method according to any of [1] to [390] wherein in step d) a maximum pressure of 1900 MPa or less is applied. [671] The method according to any of [1] to [390] wherein in step d) a maximum pressure of 900 MPa or less is applied. [672] The method according to any of [667] to [671] wherein in step d) the maximum pressure is applied for a relevant time which is at least 1 second. [673] The method according to any of [667] to [671] wherein in step d) the maximum pressure is applied for a relevant time which is less than 10 hours. [674] The method according to any of [1] to [390] wherein in step d) the pressure is applied in a stepwise manner. [675] The method according to [674] wherein the first step is done within the first 20% of the right amount of maximum pressure. [676] The method according to any of [674] to [675] wherein in step d) the first step is hold at least 2 seconds. [677] The method according to any of [674] to [675] wherein in step d) there are at least 2 steps. [678] The method according to any of [1] to [390] wherein in step d) the pressure is applied at a low enough rate at least within the initial stretch. [679] The method according to any of [1] to [390] wherein in step d) the pressure is applied at a low enough rate. [680] The method according to any of [678] to [679] wherein a low enough rate is 980 MPa/s or less. [681] The method according to any of [678] to [679] wherein a low enough rate is higher than 0.9 MPa/h. [682] The method according to any of [674] to [681] wherein the initial stretch is the first 5% of the right amount of maximum pressure. [683] The method according to any of [674] to [682] wherein the initial stretch is the first 5 MPa. [684] The method according to any of [674] to [683] wherein the pressure is applied at a high enough rate at least within the initial stretch. [685] The method according to any of [1] to [390] wherein in step d) the pressure is applied at a high enough rate. [686] The method according to any of [684] to [685] wherein a high enough rate is 0.09 MPa/s or more. [687] The method according to any of [1] to [390] wherein in step e) the temperature of the mould is raised while keeping the right pressure level of 0.5 MPa or more. [688] The method according to any of [1] to [390] wherein in step e) the temperature of the mould is raised while keeping the right pressure level of 1300 MPa or less. [689] The method according to any of [1] to [390] wherein in step e) the temperature of the mould is raised while keeping the pressure between 10.5 MPa and 860 MPa. [690] The method according to any of [1] to [390] wherein in step e) the temperature of the mould is raised to 320 K or more. [691] The method according to any of [1] to [390] wherein the temperature of the mould in step e) is kept below 690 K. [692] The method according to any of [1] to [390] wherein the temperature of the mould in step e) is kept below 440 K. [693] The method according to any of [1] to [390] wherein in step e) the temperature of the mould is raised to a temperature of 0.6*HDT of the mould material measured with a load of 1.82 MPa, or more. [694] The method according to [693] wherein for mould materials with more than one phase with different HDT, the HDT used is the mean HDT of all the parts constituting the majority of the polymeric phase of the mould with lowest HDT. [695] The method according to [693] wherein for mould materials with more than one phase with different HDT, the HDT used is the mean HDT of all the parts constituting the majority of the polymeric phase of the mould with highest HDT. [696] The method according to any of [693] to [695] wherein for crystalline and/or semi-crystalline polymers, HDT is replaced with the melting temperature. [697] The method according to any of [1] to [390] wherein in step e) the temperature of the mould is kept below 0.73*Tm of the relevant powder with the lowest melting point. [698] The method according to any of [1] to [390] wherein in step e) the temperature of the mould is kept below 0.68*Tm of the relevant powder with the highest melting point. [699] The method according to any of [697] to [698] wherein a relevant powder is a powder that is a 2.6% by weight or more of the powder mixture. [700] The method according to any of [697] to [698] wherein a relevant powder is a powder that is a 5.6% by weight or more of the powder mixture. [701] The method according to any of [697] to [698] wherein a relevant powder is a powder that is a 8.6% by weight or more of the powder mixture. [702] The method according to any of [697] to [698] wherein a relevant powder is a powder that is a 12% by weight or more of the powder mixture. [703] The method according to any of [697] to [698] wherein a relevant powder is a powder that is a 16% by weight or more of the powder mixture. [704] The method according to any of [697] to [698] wherein a relevant powder is a powder that is a 21% by weight or more of the powder mixture. [705] The method according to any of [1] to [390] wherein the pressure and temperature are applied following the steps: Step Al: raising the pressure at a high enough level while keeping the temperature low enough. Step B1: raising the temperature to a certain level and keeping it in that level for a given time. Step C1: raising the pressure to a certain level and keeping it at that level for a given time. Step D1 (optional): repeat step B1, C1 or both one or more times at different levels of pressure and temperature. Step E1 (optional): make sure pressure and temperature are at the level defined for general method step d) before proceeding with general method step e). [706] The method according to [703] wherein the pressure and temperature are the pressure and temperature applied in steps d) and e). [707] The method according to [703] wherein the high enough pressure level in step A1 is 55 bar or more. [708] The method according to [703] wherein the high enough pressure level in step A1 is 105 bar or more. [709] The method according to [703] wherein the high enough pressure level in step A1 is 6400 bar or less. [710] The method according to [703] wherein the high enough pressure level in step A1 is 990 bar or less. [711] The method according to any of [703] to [710] wherein the low enough temperature level in step A1 is the critical temperature of the polymer of the mould or less. [712] The method according to any of [703] to [710] wherein the low enough temperature level in step A1 is an 84% of the critical temperature of the polymer of the mould or less. [713] The method according to any of [703] to [710] wherein the critical temperature of the polymer refers to the 1.82 MPa Heat Deflection Temperature (HDT). [714] The method according to any of [703] to [710] wherein the critical temperature of the polymer refers to the 0.455 MPa Heat Deflection Temperature (HDT). [715] The method according to any of [703] to [714] wherein the upper level for the temperature in step B1 is 2.4 times the critical temperature. [716] The method according to any of [703] to [714] wherein the upper level for the temperature in step B1 is 1.4 times the critical temperature. [717] The method according to any of [703] to [714] wherein the lower level for the temperature in step B1 is 0.2 times the critical temperature. [718] The method according to any of [703] to [714] wherein the lower level for the temperature in step B1 is 0.8 times the critical temperature. [719] The method according to any of [703] to [718] wherein the time for which the temperature is kept at the desired level in step B1 is 3 minutes or more. [720] The method according to any of [703] to [718] wherein the time for which the temperature is kept at the desired level in step B1 is lower than 9 hours. [721] The method according to any of [703] to [720] wherein the upper level of pressure for step C1 is 6400 bar. [722] The method according to any of [703] to [720] wherein the lower level of pressure for step C1 is 310 bar or more. [723] The method according to any of [703] to [722] wherein the time for which the pressure is kept at the desired level in step B1 is 3 minutes or more. [724] The method according to any of [703] to [722] wherein the time for which the pressure is kept at the desired level in step B1 is 26 hours or less. [725] The method according to any of [703] to [724] wherein the high enough pressure level in step A1 is 6400 bar or less. [726] The method according to any of [703] to [724] wherein the high enough pressure level in step A1 is 1600 bar or less. [727] The method according to any of [703] to [726] wherein the low enough temperature level in step A1 is 190° C. or less. [728] The method according to any of [703] to [727] wherein the upper level for the temperature in step B1 is 190° C. [729] The method according to any of [703] to [727] wherein the lower level for the temperature in step B1 is 35° C. [730] The method according to any of [1] to [390] wherein in step f) at least a 5% of the to the mould applied pressure is released. [731] The method according to any of [1] to [390] wherein in step f) at least a 5% of the to the mould applied pressure is released with respect to the highest value achieved in step d). [732] The method according to any of [1] to [390] wherein in step f) pressure is released at a low enough rate. [733] The method according to any of [1] to [390] wherein pressure is released at a low enough rate at least within the final stretch. [734] The method according to any of [732] to [733] wherein a low enough rate is 980 MPa/s or less. [735] The method according to any of [732] to [733] wherein a low enough rate is higher than 0.9 MPa/h. [736] The method according to any of [1] to [84] and [140] to [202] wherein in step f) pressure is released to a value below 90 MPa. [737] The method according to any of [1] to [390] wherein the pressure applied to the mould is completely released in step f). [738] The method according to any of [1] to [390] wherein after step f) the pressure applied to the mould is completely released. [739] The method according to any of [1] to [390] wherein after step f) the temperature of the mould is dropped to ambient values. [740] The method according to any of [1] to [390] wherein in step f) the temperature of the mould is dropped to below 98° C. [741] The method according to any of [1] to [390] wherein after step f) the temperature of the mould is dropped to below 98° C. [742] The method according to any of [1] to [390] wherein the total time of steps d)-f) is higher than 22 minutes. [743] The method according to any of [1] to [390] wherein the total time of steps d)-f) is higher than 190 minutes. [744] The method according to any of [1] to [390] wherein for steps d)-f) the pressurized fluid maximum temperature gradient within the process is 25° C. or more. [745] The method according to any of [1] to [390] wherein for steps d)-f) the pressurized fluid maximum temperature gradient within the process is 245° C. or less. [746] The method according to any of [1] to [390] wherein steps e) and f) are not performed, and at least one of the following steps is performed: I. the mould provided in step a) has a low tensile strength; II. the mould provided in step a) has a high elastic modulus; III. the mould provided in step a) has a significant drop in tensile strength when the strain rate is lowered; IV. the filling in step b) is made with a high filling density; V. the void internal features of the mould have the applied pressure to the mould; VI. the mixture in step b) has a large content of a powder P2; VII. pressure is released as in step f). [747] The method according to [746] wherein step II is replaced by: II. the mould provided in step a) has a low elastic modulus. [748] The method according to [746] wherein only steps I, II, III, V and VII are performed. [749] The method according to [746] wherein only steps I, III, IV and V are performed. [750] The method according to any of [1] to [390] wherein the method comprises an additional step: g) removing at least part of the sealing. [751] The method according to any of [1] to [390] wherein the method comprises an additional step: h) removing at least part of the mould. [752] The method according to any of [1] to [390] wherein the method comprises an additional step: i) applying some incomplete consolidation. [753] The method according to any of [1] to [390] wherein the method comprises an additional step: j) joint different parts to make a bigger component. [754] The method according to any of [1] to [390] wherein at least two parts comprising a metal are joined to manufacture a larger component. [755] The method according to [754] wherein the joining of the parts is made through welding. [756] The method according to [754] wherein the joining of the parts comprises plasma-arc heating. [757] The method according to [754] wherein the joining of the parts comprises electric-arc heating. [758] The method according to [754] wherein the joining of the parts is performed with a high temperature glue. [759] The method according to [754] wherein the parts to be joined together have a guiding mechanism to position with the right reference against each other. [760] The method according to [754] wherein the required diagonal for the final component with all the joined parts is 520 mm or more. [761] The method according to [754] wherein the weld joins the faces of the parts strongly enough. [762] The method according to [754] wherein strongly enough is with a nominal compressive strength of 0.01 MPa or more. [763] The method according to [762] wherein nominal compressive strength is measured according to ASTM E9-09-2018. [764] The method according to [754] wherein an oxygen free environment is an environment having 9% by volume or less oxygen. [765] The method according to [754] wherein at least in some areas, the critical depth of weld is small enough. [766] The method according to any of [765]

wherein at least in some areas is at least in the 6% of the welding line in the periphery of two faces coming together. [767] The method according to [765] wherein the critical depth of the weld is the mean value of depth of the weld. [768] The method according to any of [765] wherein the critical depth of weld is the extension in depth of the heat affected zone (HAZ) of the weld. [769] The method according to any of [1] to [390] wherein the method comprises an additional step: k) applying a high temperature and a high pressure treatment. [770] The method according to any of [1] to [390] wherein the method comprises the additional step of sintering the manufactured component through a process comprising the following steps: Step 1i: Raising the temperature while keeping a low pressure. Step 2i: Keeping the temperature at a high level while keeping the pressure at a low level for a long enough time period. Step 3i: Raising the pressure to a high level. Step 4i: Keeping a high pressure and high temperature for a long enough time period. [771] The method according to [770] wherein all steps are done in the same furnace/pressure vessel. [772] The method according to [770] wherein all steps are done in a HIP. [773] A method for producing metal-comprising components comprising the steeps of: Step 1ii: Providing a powder comprising a carbonyl metal powder. Step 2ii: Manufacturing an object through the additive manufacturing of metal powder wherein the temperatures employed are below 0.49*Tm of the metal powder. Step 3ii: proceeding with at least the 4 steps of the method described in [770]. [774] The method according to [758] wherein the powder used is according to any of [391] to [572]. [775] The method according to any of [1] to [390] wherein the method comprises an additional step: I) heat treating the manufactured component. [776] The method according to any of [1] to [390] wherein the method comprises an additional step: m) performing some kind of subtractive machining in the manufactured component. [777] The method according to any of [1] to [390] wherein the method comprises an additional step: n) performing a surface conditioning of the manufactured component. [778] The method according to [777] wherein the surface conditioning of step n) comprises a change in the composition of at least part of the surface of the manufactured component. [779] The method according to any of [1] to [390] wherein the manufactured component is at least partially coated. [780] The method according to [764] wherein the coating is an oxide. [781] The method according to any of [763] to [764] wherein the coating is based on titanates. [782] The method according to any of [1] to [781] wherein a relevant part is 16% by volume or more. [783] The method according to any of [1] to [781] wherein a relevant part is 36% by volume or more. [784] The method according to any of [1] to [781] wherein a relevant part is 56% by volume or more. [785] The method according to any of [1] to [781] wherein a relevant part is 66% by volume or more. [786] The method according to any of [1] to [781] wherein a relevant part is 76% by volume or more. [787] The method according to any of [1] to [781] wherein a relevant part is 86% by volume or more. [788] The method according to any of [1] to [781] wherein a relevant part is 96% by volume or more. [789] The method according to any of [1] to [781] wherein HDT is measured according to ISO 75-1:2013 standard. [790] The method according to any of [1] to [781] wherein HDT is measured according to ASTM D648-07 standard. [791] The method according to any of [1] to [781] wherein HDT is measured with a heating rate of 50° C./h. [792] The method according to any of [1] to [781] wherein the HDT is the HDT reported for the closest material in the UL IDES Prospector Plastic Database at Jan. 29, 2018. [793] The method according to any of [1] to [781] wherein the proper strain rate is 2500 $s^{-1}$. [794] The method according to any of [1] to [781] wherein the proper strain rate is 500 $s^{-1}$. [795] The method according to any of [1] to [781] wherein the proper strain rate is 50 $s^{-1}$. [796] The method according to any of [1] to [781] wherein the proper strain rate is 1.0 $s^{-1}$. [797] The method according to any of [1] to [781] wherein the proper strain rate is $1 \cdot 10^{-2}$ $s^{-1}$. [798] The method according to any of [1] to [781] wherein the proper strain rate is $1 \cdot 10^{-3}$ $s^{-1}$. [799] The method according to any of [1] to [781] wherein the tensile strength is measured at room temperature according to ASTM D638-14. [800] The method according to any of [1] to [781] wherein the tensile strength is measured at room temperature according to ASTM D3039/D3039M-17. [801] The method according to any of [1] to [781] wherein the tensile modulus is measured at room temperature according to ASTM D638-14. [802] The method according to any of [1] to [781] wherein the tensile modulus is measured at room temperature according to ASTM D3039/D3039M-17. [803] The method according to any of [1] to [781] wherein the flexural modulus is measured at room temperature according to ASTM D790-17. [804] The method according to any of [1] to [781] wherein D50 grain size is the particle size at which 50% of the sample's volume is comprised of smaller particles in the cumulative distribution of particle size. [805] The method according to any of [1] to [781] wherein D50 grain size is the particle size at which 50% of the sample's mass is comprised of smaller particles in the cumulative distribution of particle size. [806] The method according to any of [1] to [781] wherein the cumulative distribution of particle size is measured by laser diffraction according to ISO 13320-2009. [807] The method according to any of [1] to [781] wherein hardness is at room temperature. [808] The method according to any of [1] to [781] wherein hardness is HV10. [809] The method according to [808] wherein hardness HV10 is measured according to ISO 6507-1. [810] The method according to [1603] wherein hardness HV10 is measured according to ASTM E384-17. [811] The method according to any of [1] to [781] wherein hardness is HV5. [812] The method according to [1606] wherein hardness HV5 is measured according to ISO 6507-1. [813] The method according to [1606] wherein hardness HV5 is measured according to ASTM E384-17. [814] The method according to any of [1] to [813] wherein room temperature is 23° C. [815] The use of the method according to any of [773] to 778] with a powder mixture according to any of [455] to [468].

One of the most significant novel contributions derived from the extended research on surface modifications for this invention relate to the hot stamping technology. One problem to be solved in this technology is: the manufacturing of high damage tolerance and low processing cost hot stamped components. Amongst the most influential variables on the cost of hot stamped components belong: cost of the processed material, amortization and maintenance costs of the hot stamping installation and yield of such installation. For that reason many efforts have been placed in the past years to increase troughoutput of hot stamping lines and reduce their investment and maintenance cost. Some of the efforts have been placed on the side of the shaping dies, trying to simultaneously increasing their capacity to remove heat and their durability, sometimes even trying to reduce their manufacturing costs. Often the strategies employed to increase one of the aspects (troughoutput of the line and durability) affects the other negatively. On the other hand, damage tolerance is one of the most relevant service properties of hot stamped components, and thus efforts have been invested also into trying to optimize this aspect also. An example of such efforts are the so called soft zones, where areas of the component are left with higher elongation and lower yield strength values to have a deterministic pattern of deformation with a better balance of desirable indeformability and energy absorption. Unfortunately, probably all described solutions bring along an increase in the amortization/maintenance costs and/or significant drop of the troughoutput of the installation (more expensive heating up systems, additional in-furnace systems, more complex dies that wear out much faster due to the need of working at higher temperatures, less productivity of the die due to an increase in the furnace time or even more often in the die cooling or even cooling/heating in some cases times). Another example of such efforts, are the optimization of process parameters to increase at least the mean values of the relevant properties of the manufactured components, but this comes at the cost of narrower process windows which in turn bring along lower troughoutput. These strategies are mostly based on a thorough examination of the transformation diagrams of the materials processed (CCT and TTT) to identify the most desirable microstructures, and try to obtain them consistently. Some even try to have a significant effect on the diagrams as for example those based in the further alloying of the material being processed to increase its hardenability and thus being able to shorten the die time since a hardening step is no longer required. Unfortunately such strategies often come along with an extremely heavy luggage, namely the cost increase of the material being processed. On top they often come along with very small process windows which do not affect the theoretical yield but tremendously affect the real yield when trying to consistently run a plant day after day. To make matters worse they come along with severely increased investment costs on the production line. The inventor has found a novel way to solve the aforementioned problem, based on a very unexpected observation: Most hot stamping materials undergo transformations that affect their damage tolerance capabilities but do not have a significant enough associated volume change and are at least almost imperceptible when doing microstructural analysis and therefore do not appear in the CCT and/or TTT diagrams. In an embodiment, a transformation with no microstructural effects under optical microscopy and with an associated volume change which is not discernible from the background noise of a dilatometer with a change of length resolution of 1.25 nm when performing tests according to ASTM E228-17. One such transformation occurs in most hot stamping employed materials including 22MnB5 at rather high temperatures and only for rather high cooling rates. In an embodiment, a hot stamping of sheet is performed with a very fast cooling rate at high temperatures. In an embodiment, the sheet is cooled at a very fast cooling rate. In an embodiment, the very fast cooling takes place until the temperatures are no longer high. In an embodiment, the very fast cooling takes place right after forming until the temperatures are no longer high. In an embodiment, the sheet is cooled at a very fast cooling rate until the temperatures are no longer high. In an embodiment, the very fast cooling takes place while forming and right after until the temperatures are no longer high. In an embodiment, high temperatures are any temperature above 110° C. In another embodiment, high temperatures are any temperature above 210° C. In another embodiment, high temperatures are any temperature above 310° C. In another embodiment, high temperatures are any temperature above 450° C. In another embodiment, high temperatures are any temperature above 550° C. In another embodiment, high temperatures are any temperature above 650° C. In another embodiment, high temperatures are any temperature above 750° C. In an embodiment, a very fast cooling rate is 27K/s or more. In another embodiment, a very fast cooling rate is 57K/s or more. In another embodiment, a very fast cooling rate is 84K/s or more. In another embodiment, a very fast cooling rate is 107K/s or more. In another embodiment, a very fast cooling rate is 207K/s or more. In another embodiment, a very fast cooling rate is 507K/s or more. In another embodiment, a very fast cooling rate is 807K/s or more. In another embodiment, a very fast cooling rate is 1007K/s or more. In another embodiment, a very fast cooling rate is 2600K/s or more. In another embodiment, a very fast cooling rate is 4200K/s or more. In an embodiment, the temperature of the sheet is measured at the center of the sheet with a thermocouple. In some applications, the temperature can alternatively be measured with a radiation thermometer. In an alternative embodiment, the temperature of the sheet refers to the mean temperature of the sheet. It has been found, that very surprisingly when these cooling rates at high temperatures are attained capitalizing the latent heat of a phase change of a cooling media noticeably higher elongation values are attained for the same or even higher yield strength values. In an embodiment, the very fast cooling rate is achieved through a phase change of a cooling media. In an embodiment, the phase change is sublimation. In another embodiment, the phase change is fusion. In another embodiment, the phase change is vaporization. In another embodiment, the phase change is evaporation. In an embodiment, the very fast cooling is achieved through the latent heat of evaporation of the cooling media. Although in many applications the cooling media used may be water, an aqueous solution, an aqueous suspension or any other fluid can also be used in some embodiments. In an embodiment, the cooling media is a fluid. In another embodiment, the cooling media is a liquid. In another embodiment, the cooling media is in solid state. In another embodiment, the cooling media is frozen. In another embodiment, the cooling media is water. In another embodiment, the cooling media is an aqueous solution. In another embodiment, the cooling media is an aqueous suspension. In another embodiment, the cooling media is any liquid different from water. In an embodiment, the cooling media comprises a fluid. In an embodiment, the cooling media comprises a liquid. In an embodiment, the cooling media comprises water. In an embodiment, the cooling media comprises an aqueous solution. In an embodiment, the cooling media comprises an aqueous suspension. In an embodiment, the cooling media comprises a liquid different from water. In another embodiment, the cooling media comprises an agent (as described later in the document). In an embodiment, the phase change is vaporization, thus the initial contact takes place between liquid droplets and a very hot sheet but Leidenfrost effect is mitigated. In an embodiment, the mitigation of Leidenfrost comprises the application of pressure. In an embodiment, a pressure of 0.2 MPa or more are applied at least between portions of the sheet surface and the tool surface in an area comprising a liquid cooling media. In another embodiment, the pressure is 1.2 MPa or more. In another embodiment, the pressure is 6.2 MPa or more. In another embodiment, the pressure is 12 MPa or more. In another embodiment, the pressure is 16 MPa or more. In another embodiment, the pressure is 26 MPa or more. In some embodiments, the aforementioned for the tool can be extended to other components, such as dies, moulds, dies used in the manufacture of tubular components or structures, hot stamping dies or moulds and forming dies among others. In an embodiment, the surface of the tool refers to the surface of a die. In another embodiment, the surface of the tool refers to the surface of a mould. In another embodiment, the surface of the tool refers to the surface of a die used in the manufacture of tubular components or structures. In another embodiment, the surface of the tool refers to the surface of a hot stamping die or mould. In another embodiment, the surface of the tool refers to the surface of a forming die. In an embodiment, the Leidenfrost effect comprises a state in which the coolant droplets are not allowed to displace in the plane of the sheet surface. In an embodiment, the Leidenfrost effect comprises a state in which the coolant droplets are not allowed to wet the die surface. In an embodiment, the Leidenfrost effect comprises a state in which the coolant droplets are not allowed to displace in the plane of the sheet surface and they are not allowed to wet the die surface. In an embodiment, hot stamping of sheet is performed with a very fast cooling rate at high temperatures and low cooling rate at low temperatures (very fast cooling rate and high temperatures as described above). In an embodiment, low temperatures are 590° C. or less. In another embodiment, low temperatures are 440° C. or less. In another embodiment, low temperatures are 590° C. or less. In another embodiment, low temperatures are 390° C. or less. In another embodiment, low temperatures are 290° C. or less. In another embodiment, low temperatures are 240° C. or less. In another embodiment, low temperatures are 190° C. or less. In an embodiment, low temperatures are 140° C. or less. In another embodiment, low temperatures are 90° C. or less. In another embodiment, low temperatures are 49° C. or less. In an embodiment, a low cooling rate are 24K/s or less. In another embodiment, a low cooling rate are 14K/s or less. In another embodiment, a low cooling rate are 9K/s or less. In another embodiment, a low cooling rate are 4K/s or less. In another embodiment, a low cooling rate are 0.9K/s or less. In another embodiment, a low cooling rate are 0.09K/s or less. In another embodiment, a low cooling rate are 0.009K/s or less. In an embodiment, low cooling rate means a holding for a certain time in the neighbourhood of a set low temperature. In an embodiment, the low cooling rate is held for a certain time at low temperature. In an embodiment, the holding time is 3 seconds or more. In another embodiment, the holding time is 11 seconds or more. In another embodiment, the holding time is 16 seconds or more. In another embodiment, the holding time is 22 seconds or more. In another embodiment, the holding time is 32 seconds or more. An embodiment is directed to a method of cooling a sheet which is formed in a hot stamping die or mould, the method comprising the steps of: a) providing a hot stamping die or mould; b) placing the sheet, which has been heated, in the hot stamping die or mould; c) forming the sheet; and d) cooling the sheet after forming at a very fast cooling rate until the temperatures are no longer high and with a low cooling rate at low temperatures, wherein the very fast cooling comprises the cooling of the sheet using the latent heat of evaporation of the liquid. Different strategies are optimal for different sheet material and sheet coating combinations. For example a Zn based coating might be more sensitive to cracking and micro-cracking than an AlSi based one and therefore need a change in the cooling rate at higher temperatures, or even a holding step to allow for the coating to exchange atoms through diffusion with the underlying sheet or within layers of the coating to attain the desired final microstructure for the coating and/or sheet. Also, the critical rate for the formation of bainite often will affect the cooling speed desired after the fast cooling and/or the temperature at which a longer holding is possible (higher alloyed steel sheets tend to have higher bainitic hardenability leading to the possibility to have longer dwells at a given temperature or slower cooling rates, even air cooling out of the die, without the massive formation of bainite which could be detrimental for the mechanical properties. One of the big surprises has been to see, that sheet steels alloyed with more % B, % Cr, % Mo, % Ni, % Si and/or % Mn than 22MnB5 which possess a clearly higher ferritic hardenability (ferrite/perlite transformation nose in the CCT and/or TTT diagrams further displaced to higher transformation times), and/or a higher temper resistance, tendentially show an increase in some toughness and/or elongation properties when applying the present invention and often even in a larger extend than 22MnB5. In an embodiment, the sheet is a steel sheet. As an example for 22MnB5 7%-8% $A_{50}$ elongation values are typical, for extended hardenability (% Si and/or % Mn modified 22MNB5) allowing air cooling sheets normally 6%-8% $A_{50}$ elongation values are typical when employing the conventional manufacturing methods not taking into account the present invention, whereas when the present invention is employed often values surpassing 10% $A_{50}$ elongation are attained. In an embodiment, the finished sheet is the finished sheet component. In an embodiment, when using the present aspect of the invention an $A_{50}$ elongation value for the finished sheet component of 7.2% or more is attained. In another embodiment, when using the present aspect of the invention an $A_{50}$ elongation value for the finished sheet component of 8.2% or more is attained. In another embodiment, when using the present aspect of the invention an $A_{50}$ elongation value for the finished sheet component of 9.2% or more is attained. In another embodiment, when using the present aspect of the invention an $A_{50}$ elongation value for the finished sheet component of 10.2% or more is attained. In another embodiment, when using the present aspect of the invention an $A_{50}$ elongation value for the finished sheet component of 11.2% or more is attained. In an embodiment, the $A_{50}$ elongation value for the finished sheet component refers to the mean $A_{50}$ elongation value in the component. In an alternative embodiment, the $A_{50}$ elongation value for the finished sheet component refers to the minimum $A_{50}$ elongation value in the component. Also surprising has been, that the present invention does not deteriorate the coating properties, on the contrary in many instances there is an improvement in the properties of the coating as well, often both morphologically (lack of micro-cracks, desired roughness for paint sticking, corrosion protection effectiveness, . . . ) and chemically (higher amount of desirable phases) and surprisingly in AlSi based and Zn based (with or without % Ni) coatings, even when the way the coating was applied was a different one (galvanized-GI-Zn based coating for indirect hot stamping, galvannealed-GA-Zn often also with % Fe for both direct and indirect and even sol-gel coatings based on % Zn also often alloyed with % Fe). The present aspect of the invention, and in fact the whole invention, is also applicable to the indirect hot stamping. In an embodiment, a neighbourhood of a set temperature is the given temperature±25° C. In another embodiment, a neighbourhood of a set temperature is the given temperature±19° C. In another embodiment, a neighbourhood of a set temperature is the given temperature±14° C. In another embodiment, a neighbourhood of a set temperature is the given temperature±9° C. In another embodiment, a neighbourhood of a set temperature is the given temperature±4° C. The present aspect of invention, allows for a very fast production of hot stamped components. In an implementation, 11 spm (strokes per minute) or more are achieved. In another implementation, 16 spm or more are achieved. In another implementation, 21 spm or more are achieved. In another implementation, 26 spm or more are achieved. In an embodiment, the press in the production line is a mechanical press. In an embodiment, the production line is a transfer press line. In an embodiment, the production line is a progressive line. In an embodiment, the production line has some additional steps, for the trimming or piercing of the blank in hot state. In an embodiment, the production line has some additional steps, for the trimming or piercing of the blank in warm state. In an embodiment, the production line has some additional steps, for the trimming or piercing of the blank in cold state. In an embodiment, hot state of the blank means a mean temperature along the cutting or trimming line of 420° C. or more. In another embodiment, hot state of the blank means a mean temperature along the cutting or trimming line of 520° C. or more. In another embodiment, hot state of the blank means a mean temperature along the cutting or trimming line of 620° C. or more. In another embodiment, hot state of the blank means a mean temperature along the cutting or trimming line of 720° C. or more. In an embodiment, warm state of the blank means a mean temperature along the cutting or trimming line between 150° C. and 400° C. In another embodiment, warm state of the blank means a mean temperature along the cutting or trimming line between 210° C. and 340° C. In another embodiment, warm state of the blank means a mean temperature along the cutting or trimming line between 260° C. and 390° C. In an embodiment, cold state of the blank means a mean temperature along the cutting or trimming line of 290° C. or less. In another embodiment, cold state of the blank means a mean temperature along the cutting or trimming line of 240° C. or less. In another embodiment, cold state of the blank means a mean temperature along the cutting or trimming line of 190° C. or less. In an embodiment, the hot stamping forming die has areas which are not cooled with a distributed-liquid leading to soft zones with higher elongation. Although in many applications the liquid used may be water, an aqueous solution, an aqueous suspension or any other fluid can also be used in some embodiments. In an embodiment, the term "liquid" can be replaced by the term "fluid". In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described later in the document). In an embodiment, the hot stamping forming die has areas which are heated leading to soft zones with higher elongation. In an embodiment, the heating is to a mean die surface temperature of 210° C. or more. In another embodiment, the heating is to a mean die surface temperature of 260° C. or more. In another embodiment, the heating is to a mean die surface temperature of 310° C. or more. In another embodiment, the heating is to a mean die surface temperature of 410° C. or more. In some applications excessive heating leads to undesirable tooling performance. In an embodiment, the heating is to a mean die surface temperature of 690° C. or less. In another embodiment, the heating is to a mean die surface temperature of 590° C. or less. In another embodiment, the heating is to a mean die surface temperature of 540° C. or less. In another embodiment, the heating is to a mean die surface temperature of 490° C. or less. In an embodiment, the mean surface temperature applies only to the areas in contact with the sheet which remain in the final component as soft zones. In an embodiment, a soft zone is any area with a yield strength below 1190 MPa as a finalized component. In another embodiment, a soft zone is any area with a yield strength below 1090 MPa as a finalized component. In another embodiment, a soft zone is any area with a yield strength below 990 MPa as a finalized component. In another embodiment, a soft zone is any area with a yield strength below 890 MPa as a finalized component. In another embodiment, a soft zone is any area with a yield strength below 690 MPa as a finalized component. In an embodiment, the above disclosed values of yield strength are at room temperature (23° C.). In an embodiment, the above disclosed values of yield strength are measured according to ASTM E8/E8M-16a. One particular interesting application case of the present invention, that might constitute a stand-alone patent, is the application to the manufacture of tubular components. In some embodiments, the aforementioned for a sheet can be extended to other components such as a tubular component or structure. In an embodiment, the term "sheet" can be replaced by "tubular component or structure" and similar terms. Tubular and tubular components are often used in the manufacture of automotive components. One way to manufacture tubular components or structures is the manufacture through diverse methods which have two things in common: 1) the tube, or tubular component is heated up and 2) a high pressure fluid is used in the interior of the tubular form to deform against a form or die which constrains the tubular form from the outside. An embodiment is directed to a method of manufacturing tubes or tubular components in a die, the method comprising the steps of: a) providing a die; b) placing a tube or tubular component in the die; c) forming the tube or tubular component using a fluid in the interior of the tubular form to deform against a die which constrains the tubular form from the outside; and d) cooling the tube or tubular component. In an embodiment, the fluid used is a high pressure fluid. In an embodiment, a high pressure fluid is a fluid with a pressure above 110 bar. In another embodiment, a high pressure fluid is a fluid with a pressure above 510 bar. In another embodiment, a high pressure fluid is a fluid with a pressure above 660 bar. In another embodiment, a high pressure fluid is a fluid with a pressure above 820 bar. In another embodiment, a high pressure fluid is a fluid with a pressure above 910 bar. In another embodiment, a high pressure fluid is a fluid with a pressure above 1010 bar. In some applications the pressure of the fluid should not be too high. In an embodiment, a high pressure fluid is a fluid with a pressure below 8900 bar. In another embodiment, a high pressure fluid is a fluid with a pressure below 3900 bar. In another embodiment, a high pressure fluid is a fluid with a pressure below 1900. In another embodiment, a high pressure fluid is a fluid with a pressure below 1400 bar. In another embodiment, a high pressure fluid is a fluid with a pressure below 900 bar, below 340 bar. In another embodiment, a high pressure fluid is a fluid with a pressure below 290 bar. In an embodiment, the tube or tubular component is formed using a fluid in the interior of the tubular form to deform against a die which constrains the tubular form from the outside. Sometimes, materials with a limited hardenability are used and thus if high mechanical properties are desirable, speed of cooling becomes an issue. Sometimes, also tailored properties are desirable and thus controlled cooling is desirable. Often, only one side is available to exert the cooling and thus the peculiarities described in this paragraph can be of further help. The fact that often cooling can only be applied from the die side which is normally the outer side, poses a limitation to the plausible speed of cooling with the conventional die cooling methods, and the cost of the manufacturing is adversely affected. On the other hand, excessively fast cooling can lead to very poor elongation values as is also the case for the sheet components exposed in other paragraphs. Since the tubes or tubular components are often of limited thickness, they can be considered a closed sheet and most of the indications disclosed in this document apply. On the other hand, the fact of having hot air forming the component does impose some specific challenges. As previously disclosed, during the manufacturing process the tubes or tubular components should be heated. The tubes or tubular components can be heated before forming and/or while forming. In an embodiment, the tubes or tubular components are heated to a temperature above $AC_3$. In another embodiment, the tubes or tubular components are heated to a temperature above $AC_1$. In another embodiment, the tubes or tubular components are heated to a temperature above $AC_1$+100° C. In another embodiment, the tubes or tubular components are heated to a temperature above 802° C. In another embodiment, the tubes or tubular components are heated to a temperature above 852° C. In another embodiment, the tubes or tubular components are heated to a temperature above 902° C. In another embodiment, the tubes or tubular components are heated to a temperature above 922° C. In another embodiment, the tubes or tubular components are heated to a temperature above 952° C. In some applications an excessive heating may be undesirable. In an embodiment, the tubes or tubular components are heated to a temperature below 1190° C. In another embodiment, the tubes or tubular components are heated to a temperature below 1090° C. In another embodiment, the tubes or tubular components are heated to a temperature below 990° C. In another embodiment, the tubes or tubular components are heated to a temperature below 949° C. In some applications, the tubes or tubular components are heated before forming. This heating can be made by different mechanisms, such as thermal convection, thermal radiation, Joule effect (thermal conduction), and thermal induction among others. In some embodiments, the tubes or tubular components are heated before forming (using any of the heat transfer mechanisms disclosed above). An embodiment is directed to a method of manufacturing tubes or tubular components in a die, the method comprising the steps of: a) providing a die; b) placing a tube or tubular component, which has been heated, in the die; c) forming the tube or tubular component using a fluid in the interior of the tubular form to deform against the die which constrains the tubular form from the outside; and d) cooling the tube or tubular component. In other embodiments, the tubes or tubular components are heated while forming. In some applications, the heating while forming can be made through the fluid used to form the tubes or tubular components. In some embodiments, the tubes or tubular components can be heated before forming (using any of the heat transfer mechanisms disclosed above) and while forming (through the contact with the fluid used to form the tubes or tubular components). Although in many applications the fluid used is a gas, any other fluid can also be used in some embodiments. In an embodiment, the fluid is a gas (different types of gases can be used such as inert gases, air, etc). In an embodiment, the fluid comprises a gas. As previously disclosed, to achieve tailored properties, the tubes or tubular components should be cooled with a controlled speed. In this regard, the cooling methods disclosed in this document are specially suitable to allow a controlled cooling. In an embodiment, the tube or tubular component is cooled after forming at a very fast cooling rate until the temperatures are no longer (as previously disclosed). In an embodiment, the cooling is performed with a very fast cooling rate at high temperatures. In an embodiment, the very fast cooling takes place until the temperatures are no longer high (very fast cooling rate and high temperatures as described above). In an embodiment, the very fast cooling takes place right after forming until the temperatures are no longer high (very fast cooling rate and high temperatures as described above). In an embodiment, the very fast cooling takes place while forming and right after until the temperatures are no longer high (very fast cooling rate and high temperatures as described above). In an embodiment, hot stamping of tubes or tubular components is performed with a very fast cooling rate at high temperatures and low cooling rate at low temperatures (very fast cooling rate and high temperatures as described above). In some applications it is particularly interesting the use of a die comprising channels which are located inside the die. In an embodiment, the die comprises channels which are connected to the surface of the die, to carry a liquid to the surface of the die (through a hole in the surface of the die). In an embodiment, the die comprises tempering channels (which are not connected to the surface of the die). In another embodiment, the die comprises channels which are connected to the surface of the die, to carry a liquid to the surface of the die (through a hole in the surface of the die) and tempering channels (which are not connected to the surface of the die). In some applications, it is convenient to use any of the cooling methods disclosed in this document (all the embodiments disclosed in this document can be combined with the present embodiment in any combination, provided that they are not mutually exclusive). In some applications it is particularly interesting the use of the heat of vaporization of a cooling media to cool the tubes or tubular components (using any of the methods disclosed later in this document, with a distributed-liquid in the surface of a component). In some embodiments the channels may be main channels and/or secondary channels and/or fine channels (as disclosed later in this document). The inventor has found that in some applications, it is advantageous the use of an additive manufacturing technology (AM) to manufacture the channels and/or to manufacture the die. The use of an AM technology to manufacture at least part of the channels and/or the die may help to minimize the manufacturing steps, in addition the use of AM technologies increase the freedom of design and can help to save cost, particularly in complex designs. In an embodiment, the channels are manufactured using an AM technology. In another embodiment, at least part of the channels are manufactured using an AM technology. In some applications, it may be also advantageous to manufacture the die using an AM technology. In an embodiment, at least part of the die is manufactured using an AM technology. In some applications, the AM technology used is chosen amongst direct energy deposition (DED) an AM technology based on material extrusion (FDM), fused filament fabrication (FFF), binder jetting (BJ), multi jet fusion (MJF), direct metal printing (DMP), electron beam melting (EBM), selective laser melting (SLM), direct metal laser sintering (DMLS) and selective laser sintering (SLS) or similar concept technologies. The inventor has also found that an advantageous way to perform the holes in the surface of the die is through a laser cutting method and any other method like electro discharge machining (EDM). In an embodiment, the holes are made using a laser. In an embodiment, the holes are made by laser drilling. In an embodiment, the laser drilling technique is single pulse drilling. In another embodiment, the laser drilling technique is percussion drilling. In another embodiment, the laser drilling technique is trepanning. In another embodiment, the laser drilling technique is helical drilling. In another embodiment, the holes are made by electro discharge machining (EDM). The inventor has found that in order to achieve the controlled cooling effectively, the distance of the channels that carry the liquid to the surface of the die should not be too high. In an embodiment, the distance of the channels that carry the liquid to the surface of the die is less than 19 mm. In another embodiment, the distance of the channels that carry the liquid to the surface of the die is less than 14 mm. In another embodiment, the distance of the channels that carry the liquid to the surface of the die is less than 9 mm. In another embodiment, the distance of the channels that carry the liquid to the surface of the die is less than 4 mm. In another embodiment, the distance of the channels that carry the liquid to the surface of the die is less than 2 mm. In another embodiment, the distance of the channels that carry the liquid to the surface of the die is less than 1.5 mm. In another embodiment, the distance of the channels that carry the liquid to the surface of the die is less than 1 mm. In another embodiment, the distance of the channels that carry the liquid to the surface of the die is less than 0.9 mm. In some applications the distance should not be too low. In an embodiment, the distance of the channels that carry the liquid to the surface of the die is 0.6 mm or more. In another embodiment, the distance of the channels that carry the liquid to the surface of the die is 0.9 mm or more. In another embodiment, the distance of the channels that carry the liquid to the surface of the die is 1.6 mm or more. In another embodiment, the distance of the channels that carry the liquid to the surface of the die is 2.6 mm or more. In another embodiment, the distance of the channels that carry the liquid to the surface of the die is 4.6 mm or more. In another embodiment, the distance of the channels that carry the liquid to the surface of the die is 6.1 mm or more. In another embodiment, the distance of the channels that carry the liquid to the surface of the die is 10.2 mm or more. In an embodiment, the diameter of the holes in the surface of the die is less than 1 mm. In another embodiment, the diameter of the holes in the surface of the die is less than 490 microns. In another embodiment, the diameter of the holes in the surface of the die is less than 290 microns. In another embodiment, the diameter of the holes in the surface of the die is less than 190 microns. In another embodiment, the diameter of the holes in the surface of the die is less than 90 microns. In some applications the diameter should not be too low. In an embodiment, the diameter of the holes in the surface of the die is 2 microns or more. In another embodiment, the diameter of the holes in the surface of the die is 12 microns or more. In another embodiment, the diameter of the holes in the surface of the die is 52 microns or more. In another embodiment, the diameter of the holes in the surface of the die is 102 microns or more. In another embodiment, the diameter of the holes in the surface of the die is 202 microns or more. In an embodiment, the holes are made with laser. In an alternative embodiment, the holes are made by electro discharge machining (EDM). In an embodiment, the length of the holes is less than 19 mm. In another embodiment, the length of the holes is less than 9 mm. In another embodiment, the length of the holes is less than 4 mm. In some applications the length should not be too low. In an embodiment, the length of the holes in the surface of the die is 0.1 mm or more. In another embodiment, the length of the holes in the surface of the die is 0.6 mm or more. In another embodiment, the length of the holes in the surface of the die is 1.1 mm or more. In another embodiment, the length of the holes in the surface of the die is 1.6 mm or more. In another embodiment, the length of the holes in the surface of the die is 2.1 mm or more. In another embodiment, the length of the holes in the surface of the die is 4.1 mm or more. In an embodiment, the diameter of the channels that carry the liquid to the surface of the die is less than 19 mm. In another embodiment, the diameter of the channels that carry the liquid to the surface of the die is less than 9 mm. In another embodiment, the diameter of the channels that carry the liquid to the surface of the die is less than 4 mm. In some applications the diameter should not be too low. In an embodiment, the diameter of the channels that carry the liquid to the surface of the die is 0.6 mm or more. In another embodiment, the diameter of the channels that carry the liquid to the surface of the die is 1.1 mm or more. In another embodiment, the diameter of the channels that carry the liquid to the surface of the die is 2.1 mm or more. In another embodiment, the diameter of the channels that carry the liquid to the surface of the die is 4.1 mm or more. In another embodiment, the diameter of the channels that carry the liquid to the surface of the die is 6.2 mm or more. The inventor has found that in order to achieve the controlled cooling effectively, the distance of the tempering channels to the surface of the die should not be too high. In an embodiment, the distance of the tempering channels to the surface of the die is less than 32 mm. In another embodiment, the distance of the tempering channels to the surface of the die is less than 19 mm. In another embodiment, the distance of the tempering channels to the surface of the die is less than 9 mm. In another embodiment, the distance of the tempering channels to the surface of the die is less than 4 mm. In another embodiment, the distance of the tempering channels to the surface of the die is less than 2 mm. In another embodiment, the distance of the tempering channels to the surface of the die is less than 1.5 mm. In another embodiment, the distance of the tempering channels to the surface of the die is less than 1 mm. In another embodiment, the distance of the tempering channels to the surface of the die is less than 0.9 mm. In some applications the distance should not be too low. In an embodiment, the distance of the tempering channels is 0.6 mm or more. In another embodiment, the distance of the tempering channels is 2.6 mm or more. In another embodiment, the distance of the tempering channels is 4.6 mm or more. In another embodiment, the distance of the tempering channels is 6.1 mm or more. In another embodiment, the distance of the tempering channels is 10.2 mm or more. In another embodiment, the distance of the tempering channels is 15.2 mm or more. In another embodiment, the distance of the tempering channels is 20.2 mm or more. In some applications, the diameter should not be too high. In an embodiment, the diameter of the tempering channels is 49 mm or less. In another embodiment, the diameter of the tempering channels is 29 mm or less. In another embodiment, the diameter of the tempering channels is 19 mm or less. In another embodiment, the diameter of the tempering channels is 9 mm or less. In another embodiment, the diameter of the tempering channels is less than 4 mm. In some applications the diameter should not be too low. In an embodiment, the diameter of the tempering channels is 1.1 mm or more. In another embodiment, the diameter of the tempering channels is 2.1 mm or more. In another embodiment, the diameter of the tempering channels is 4.1 mm or more. In another embodiment, the diameter of the tempering channels is 6.2 mm or more. In another embodiment, the diameter of the tempering channels is 10.1 mm or more. In another embodiment, the diameter of the tempering channels is 16 mm or more. In another embodiment, the diameter of the tempering channels is 22 mm or more. In an embodiment, the pressure of the liquid in the channels which are connected to the surface should be smaller than the pressure in the tempering channels. In an embodiment, the pressure difference is 0.5 bar or more. In another embodiment, the pressure difference is 1.2 bar or more. In another embodiment, the pressure difference is 4.1 bar or more. In another embodiment, the pressure difference is 6.1 bar or more. In another embodiment, the pressure difference is 10.1 bar or more. In some application the pressure difference should not be too low. In an embodiment, the pressure difference is 24 bar or less. In another embodiment, the pressure difference is 14 bar or less. In another embodiment, the pressure difference is 7.8 bar or less. In another embodiment, the pressure difference is 3.9 bar or less. In another embodiment, the pressure difference is 1.9 bar or less. In another embodiment, the pressure difference is 0.9 bar or less. An embodiment is directed to an automotive component obtained using any of the methods disclosed above. In an embodiment, the automotive component manufactured is a chasis. In another embodiment, the automotive component manufactured is a BIW (body in white). In another embodiment, the automotive component manufactured is a pillar. In another embodiment, the automotive component manufactured is a Pillar A. In another embodiment, the automotive component manufactured is a Pillar B. In another embodiment, the automotive component manufactured is a Pillar C. This method can also be used to manufacture several components at the same time (frames). In an embodiment, the manufactured component is a frame. All the embodiments disclosed in this document may be combined in any combination provided they are not mutually exclusive. In some embodiments, the aforementioned for the die and the hot stamping forming die can be extended to other components such as moulds, forming dies, dies used in the manufacture of tubular components or structures, hot stamping forming dies, hot stamping dies or moulds among others. In an embodiment, the term "hot stamping forming die" and the term "die" can be replaced by the term "component". In another embodiment, the term "hot stamping forming die" and the term "die" can be replaced by the term "mould". In another embodiment, the term "hot stamping forming die" and the term "die" can be replaced by the term "hot stamping die or mould". In another embodiment, the term "hot stamping forming die" and the term "die" can be replaced by the term "die used in the manufacture of tubular components or structures". In another embodiment, the term "die" can be replaced by the term "forming die". As has been mentioned, for some applications, a cooling at high temperatures capitalizing the heat of vaporization of a liquid can lead to improved mechanical properties. In many applications where that is the case, care has to be placed to have the proper amount of liquid. An embodiment is directed to a method of cooling a sheet which is formed in a hot stamping die or mould, the method comprising the steps of: a) providing a hot stamping die or mould comprising a liquid on its surface; b) placing the sheet, which has been heated, in the hot stamping die or mould, in direct contact with the liquid; c) forming the sheet; and d) cooling the sheet after forming at a very fast cooling rate until the temperatures are no longer high and with a low cooling rate at low temperatures; wherein the very fast cooling comprises the cooling of the sheet using the latent heat of evaporation of the liquid. In an embodiment, there are areas on the component surface with an amount of distributed-liquid between UADL*ST and LADL*ST for every 10 $dm^2$, wherein UADL and LADL are parameters and ST is the sheet thickness being processed (formed and/or cooled) by the area of the surface of the component being analysed. In an embodiment, ST is in millimeters (mm). In an embodiment, the surface of the component has an amount of liquid between UADL*ST and LADL*ST for every 10 $dm^2$. In an embodiment, the relevant surface of the component has an amount of distributed-liquid between UADL*ST and LADL*ST for every 10 $dm^2$. In an embodiment, the relevant surface are all the areas on the component surface in contact during production service of the component with the areas of the processed sheet with a same thickness. In an embodiment, the relevant surface are all the areas on the component surface in contact during production service of the component with a functional area of the processed sheet (area of the sheet which is relevant to the crash-worthiness of the component, i.e. is not trimmed away). In another embodiment, the relevant surface are all the areas on the component surface in contact during production service of the component with the processed sheet. In another embodiment, the relevant surface are all the areas on the component surface in contact during production service of the component with an area of the processed sheet which remains in the final sheet piece. In an embodiment, in the last three embodiments, the sheet thickness is calculated as the surface area weighted mean for sheets with different sheet thicknesses. In an embodiment, in the preceding embodiment, the amount of distributed-liquid on the surface of the component is also a weighted mean using the same weights as the preceding embodiment. In an embodiment, in this aspect of the invention the amount of distributed-liquid is measured in grams. In an alternative embodiment, (UADL*ST and LADL*ST) is replaced by (UADL*ST/10 and LADL*ST/10) and then the amounts are expressed in $gr/dm^2$ (grams of distributed-liquid per square decimeter of component surface) in all the preceding embodiments. In an embodiment, there are areas on the component surface with an amount of distributed-liquid between UADL*ST/10 and LADL*ST/10, measured in $g/dm^2$ (grams of liquid per square decimeter of component surface). In another embodiment, the surface of the component has an amount of liquid between UADL*ST/10 and LADL*ST/10, measured in $g/dm^2$ (grams of liquid per square decimeter of component surface). In another embodiment, the relevant surface of the component has an amount of distributed-liquid between UADL*ST/10 and LADL*ST/10, measured in $g/dm^2$ (grams of liquid per square decimeter of component surface). In an embodiment, UADL is 98 or less. In another embodiment, UADL is 48 or less. In another embodiment, UADL is 28 or less. In another embodiment, UADL is 24 or less. In another embodiment, UADL is 19 or less. In another embodiment, UADL is 14 or less. In an embodiment, LADL is 0.2 or more. In another embodiment, LADL is 1.2 or more. In another embodiment, LADL is 6 or more. In another embodiment, LADL is 9 or more. In another embodiment, LADL is 10.2 or more. In another embodiment, LADL is 12 or more. In another embodiment, LADL is 16 or more. The above disclosed values of UADL and LADL may be combined in any combination provided they are not mutually exclusive, for example UADL is 19 or less and LADL is 6 or more. In some applications, it is important how this distributed-liquid is dispersed on the surface, even when the quantity per unit area is the same it might make a difference how is happening at a smaller scale. In an embodiment, the distributed-liquid is the liquid on the surface of the component. In some applications, the droplet size is important. In an embodiment, the droplet of the distributed-liquid in the surface has an average size which is appropriate. In an embodiment, the majority of the distributed-liquid is present in the surface of the component in the form of droplets. In an embodiment, the majority of the distributed-liquid is present in the surface of the component in the form of droplets with a size which is appropriate. In an embodiment, the droplet of the distributed-liquid in the relevant surface has an average size which is appropriate. In an embodiment, the majority of the distributed-liquid is present in the relevant surface of the component in the form of droplets. In an embodiment, the majority of the distributed-liquid is present in the relevant surface of the component in the form of droplets with a size which is appropriate. In an embodiment, the majority of the distributed-liquid means a 51% or more. In another embodiment, the majority of the distributed-liquid means a 61% or more. In another embodiment, the majority of the distributed-liquid means a 76% or more. In another embodiment, the majority of the distributed-liquid means an 82% or more. In another embodiment, the majority of the distributed-liquid means a 92% or more. In another embodiment, the majority of the distributed-liquid means a 96% or more. In an embodiment, the above disclosed percentages are by volume. In an alternative embodiment, the above disclosed percentages are by weight. In an embodiment, an appropriate size for the droplets of the distributed-liquid means 1.5 milligrams or more. In another embodiment, an appropriate size means 12 milligrams or more. In another embodiment, an appropriate size means 16 milligrams or more. In another embodiment, an appropriate size means 22 milligrams or more. In another embodiment, an appropriate size means 36 milligrams or more. In another embodiment, an appropriate size means 52 milligrams or more. In an embodiment, an appropriate size means 290 milligrams or less. In another embodiment, an appropriate size means 190 milligrams or less. In another embodiment, an appropriate size means 140 milligrams or less. In another embodiment, an appropriate size means 90 milligrams or less. In another embodiment, an appropriate size means 69 milligrams or less. In another embodiment, an appropriate size means 49 milligrams or less. All the above disclosed embodiments may be combined in any combination provided they are not mutually exclusive, for example a 51% by volume or more of the liquid on the surface of the component is in the form of droplets with an appropriate size of 12 milligrams or more and 190 milligrams or less. In some applications, it makes more sense to characterize the droplet by the equivalent radius than the weight. In an embodiment, the equivalent radius is the apparent radius. In an alternative embodiment, the equivalent radius is the measured radius. In another alternative embodiment, the equivalent radius is the radius of a perfect sphere of pure water with the same volume. In an embodiment, an appropriate size for the droplets of the distributed-liquid means 0.02 mm or more. In another embodiment, an appropriate size means 0.12 mm or more. In another embodiment, an appropriate size means 0.22 mm or more. In another embodiment, an appropriate size means 0.32 mm or more. In another embodiment, an appropriate size means 0.52 mm or more. In another embodiment, an appropriate size means 0.82 mm or more. In another embodiment, an appropriate size means 1.6 mm or more. In an embodiment, an appropriate size means 19 mm or less. In another embodiment, an appropriate size means 14 mm or less. In another embodiment, an appropriate size means 9 mm or less. In another embodiment, an appropriate size means 4 mm or less. In another embodiment, an appropriate size means 1.9 mm or less. In another embodiment, an appropriate size means 0.9 mm or less. All the embodiments may be combined in any combination provided they are not mutually exclusive, for example a 51% by volume or more of the liquid on the surface of the component is in the form of droplets with an appropriate size of 0.12 mm or more and 19 mm or less. For some applications it has been found to be advantageous to let the droplets form a film on at least part of the active surface. In that case also other means of supplying the fluid can be considered. Although it may be advantageous for some applications to have a continuous film, having a partially continuous films is also acceptable. In an embodiment, the fluid droplets are allowed to collapse and form an at least partially continuous film on the active surface. In some applications when the sheet contacts the liquid droplets which are on the surface of the component, at least part of the droplets are evaporated. In an embodiment, a relevant part of the droplets is evaporated when the sheet contacts the liquid droplets which are on the surface of the component. In an embodiment, a relevant part of the droplets is evaporated when the sheet contacts the liquid droplets which are on the relevant surface of the component. In an embodiment, a relevant part of the droplets means a 51% or more. In another embodiment, a relevant part of the droplets means a 61% or more. In another embodiment, a relevant part of the droplets means a 76% or more. In another embodiment, a relevant part of the droplets means an 82% or more. In another embodiment, a relevant part of the droplets means a 92% or more. In another embodiment, a relevant part of the droplets means a 96% or more. In some applications, it is preferred below a certain value. In an embodiment, a relevant part of the droplets means a 98% or less. In another embodiment, a relevant part of the droplets means an 89% or less. In another embodiment, a relevant part of the droplets means a 84% or less. In another embodiment, a relevant part of the droplets means a 79% or less. In another embodiment, a relevant part of the droplets means a 72% or less. In another embodiment, a relevant part of the droplets means a 69% or less. All the upper and lower limits disclosed in the different embodiments may be combined in any combination provided they are not mutually exclusive, for example a 51% or more and a 96% or less of the droplets are evaporated when the sheet contacts the liquid droplets which are on the surface of the component. In an embodiment, the surface of the component refers to the surface of a die. In another embodiment, the surface of the component refers to the surface of a mould. In another embodiment, the surface of the component refers to the surface of a die used in the manufacture of tubular components or structures. In another embodiment, the surface of the component refers to the surface of a hot stamping die or mould. In another embodiment, the surface of the component refers to the surface of a forming die. In another embodiment, the surface of the component refers to the surface of a hot stamping forming die. With great surprise it has been found that the system of the present invention also works in some instances when the liquid to be evaporated droplets are present only on one side of the forming die and not in the counterpart. This can be capitalized in some applications like for example when some difficulties arise to keep the liquid to be evaporated droplets on one of the sides or even more in applications, often with very complex shapes, where a preforming of the blank is recommendable before the final in-die forming (in such case a quite long contact time between one side of the die, often the punch, and the sheet takes place which could lead to excessive cooling). For instances where this strategy does not work, one can also leave the area with prolonged contact with less liquid to be vaporized or even with none at all. In an embodiment, only one side of the forming die is provided with liquid to be evaporated. In an embodiment, only the punch side of the forming die is provided with liquid to be evaporated. In another embodiment, only the lower side of the forming die is provided with liquid to be evaporated. In another embodiment, only the cavity side of the forming die is provided with liquid to be evaporated. In another embodiment, only the upper side of the forming die is provided with liquid to be evaporated. In an embodiment, one side of the die (upper or lower) is provided with a significant amount more liquid to be evaporated than the other side. In an embodiment, the lower side of the die is provided with a significant amount more liquid to be evaporated than the upper side (upper and lower die sides, when not otherwise indicated, refer to the die half standing on top and the die half standing below from a gravitational perspective). In another embodiment, the cavity side of the die is provided with a significant amount more liquid to be evaporated than the punch side. In another embodiment, the upper side of the die is provided with a significant amount more liquid to be evaporated than the lower side. In an embodiment, the punch side of the die is provided with a significant amount more liquid to be evaporated than the cavity side. In an embodiment, the significant amount of liquid to be evaporated is the total amount on the die-half measured. In an embodiment, the significant amount of liquid to be evaporated is the mean amount on the die-half measured evaluated per unit surface. In an embodiment, the significant amount of liquid to be evaporated is the mean per square meter amount on the die-half measured. In an embodiment, a significant amount of liquid to be evaporated is a 6% or more. In another embodiment, a significant amount of liquid to be evaporated is a 12% or more. In another alternative embodiment, a significant amount of liquid to be evaporated is a 56% or more. In another embodiment, a significant amount of liquid to be evaporated is a 200% or more. In another embodiment, a significant amount of liquid to be evaporated is a 1000% or more. In an embodiment, the above disclosed percentages are by volume. In an alternative embodiment, the above disclosed percentages are by weight. In an embodiment, a significant amount of liquid to be evaporated cannot be determined because one of the die-halves has very little liquid to be evaporated or not at all, in such case it can be described by a value of 10000% or more. With much more surprise it has been found that in some instances, lowering the amount of the liquid to be vaporized on one side of the die does not only work but it actually works better. Sometimes even the amount of liquid to be vaporized to be employed is considerably less. The reason for this is unclear, but might be related to the temperature gradient generated in the cross section of the sheet leading to more effective employment of the heat of vaporization for the purpose of cooling the sheet. This has been also tried with quite thick sheets surpassing 2 mm thickness and also surpassing 3 mm thickness with surprisingly positive results (also with higher thicknesses like even more than 5 mm and 10 mm but on those instances the handling of the sheet was done different and also the extraction temperature of the sheet was higher with the same holding time than for the cases below 4 mm sheet thickness). In an embodiment, the reduction of liquid to be vaporized on one die-halve is applied to the shaping of components with a mean thickness of 0.6 mm or more. In an embodiment, the reduction of liquid to be vaporized on one die-halve is applied to the shaping of components with a mean thickness of 1.2 mm or more. In another embodiment, the reduction of liquid to be vaporized on one die-halve is applied to the shaping of components with a mean thickness of 1.6 mm or more. In another embodiment, the reduction of liquid to be vaporized on one die-halve is applied to the shaping of components with a mean thickness of 2.1 mm or more. In another embodiment, the reduction of liquid to be vaporized on one die-halve is applied to the shaping of components with a mean thickness of 3.1 mm or more. In an embodiment, the reduction of liquid to be vaporized on one die-halve is applied to the shaping of components with a mean thickness of 19 mm or less. In another embodiment, the reduction of liquid to be vaporized on one die-halve is applied to the shaping of components with a mean thickness of 9 mm or less. In another embodiment, the reduction of liquid to be vaporized on one die-halve is applied to the shaping of components with a mean thickness of 4.9 mm or less. In another embodiment, the reduction of liquid to be vaporized on one die-halve is applied to the shaping of components with a mean thickness of 3.4 mm or less. Although in many applications the liquid to be evaporated or vaporized may be water, an aqueous solution, an aqueous suspension or any other liquid can also be used in some embodiments. In an embodiment, the liquid to be evaporated or vaporized is water. In another embodiment, the liquid to be evaporated or vaporized is an aqueous solution. In another embodiment, the liquid to be evaporated or vaporized is an aqueous suspension. In another embodiment, the liquid to be evaporated or vaporized is any liquid different from water. In an embodiment, the liquid to be evaporated or vaporized comprises water. In an embodiment, the liquid comprises an aqueous solution. In an embodiment, the liquid to be evaporated or vaporized comprises an aqueous suspension. In an embodiment, the liquid to be evaporated or vaporized comprises a liquid different from water. In another embodiment, the liquid to be evaporated or vaporized comprises an agent (as described later in the document). In some embodiments, the aforementioned for the die and the forming die can be extended to other components, such as tools, moulds, dies used in the manufacture of tubular components or structures, hot stamping dies or moulds or forming dies among others. In an embodiment, the term "die" can be replaced by the term "component". In another embodiment, the term "die" can be replaced by the term "mould". In another embodiment, the term "die" can be replaced by the term "die used in the manufacture of tubular components or structures". In another embodiment, the term "die" can be replaced by the term "hot stamping die or mould". In another embodiment, the term "die" can be replaced by the term "forming die". As previously disclosed, in some embodiments, the aforementioned for a sheet can also be extended to other components such as a tubular component or structure. In an embodiment, the term "sheet" can be replaced by the term "tubular component or structure".

An embodiment is directed to a method of cooling a sheet which is formed in a hot stamping die or mould, the method comprising the steps of: a) providing a hot stamping die or mould comprising a liquid on its surface, wherein at least a 51% by volume of the liquid is distributed on the surface of the hot stamping die or mould in the form of droplets with a weight between 1.5 and 190 micrograms; b) placing the sheet, which has been heated, in the hot stamping die or mould, in direct contact with the liquid; c) forming the sheet; and d) cooling the sheet after forming at a very fast cooling rate of 107K/s or more up to a temperature of 550° C. and with a low cooling rate of 14K/s or less from 190° C. downwards, wherein the very fast cooling comprises the cooling of the sheet using the latent heat of evaporation of the liquid. Another embodiment is directed to a method of cooling a sheet which is formed in a hot stamping die or mould, the method comprising the steps of: a) providing a hot stamping die or mould comprising an amount of liquid on its surface between 0.6*ST and 9.8*ST in gr/dm$^2$ (grams of liquid per square decimeter of component surface), being ST the thickness of the sheet in mm, wherein at least part of the liquid is in the form of droplets; b) placing the sheet, which has been heated, in the hot stamping die or mould, in direct contact with the liquid; c) forming the sheet; and d) cooling the sheet after forming at a very fast cooling rate of 107K/s or more up to a temperature of 550° C. and with a low cooling rate of 14K/s or less from 190° C. downwards, wherein the very fast cooling comprises the cooling of the sheet using the latent heat of evaporation of the liquid. An embodiment is directed to a device for hot stamping of sheet, comprising a hot stamping die or mould. Another embodiment is directed to a device for hot stamping of sheet, comprising a hot stamping die or mould, wherein the sheet is formed in the hot stamping die or mould which comprises a liquid on its surface in an amount between 0.12*ST and 4.8*ST in gr/dm$^2$, being ST the thickness of the sheet in mm, wherein at least part of the liquid is in the form of droplets, and at least a 51% of the droplets are evaporated when the sheet is placed in contact with the liquid. As previously disclosed, in some embodiments, the aforementioned for a sheet can also be extended to other components such as a tubular component or structure. In an embodiment, the term “sheet” can be replaced by the term “tubular component or structure”.

For some applications, it has been found that the Leidenfrost effect poses a great challenge to the effective cooling of the processed material and the anchoring of the water droplets to the tool surface in an effective way requires extra adhesion. The inventor has found that this can be solved by electrically charging the water droplets. It has been found that this way of proceeding also contributes in a positive way to the even distribution of water droplets in the tool surface throughout the process. In an embodiment, at least some of the water droplets projected to the die are electrically charged. In an embodiment, at least some of the water droplets are electrically charged. In an embodiment, at least some of the water droplets are electrostatically charged. In an embodiment, at least some of the water droplets projected to the die are electrostatically charged. In an embodiment, at least some of the water droplets projected to the die are electrostatically charged and at least a portion of the die is actively kept at another potential at least through some portions of the manufacturing cycle. In an embodiment, at least a portion of the die is kept at another potential at least through some portions of the manufacturing cycle. In an embodiment, at least some of the water droplets projected to the die are electrostatically charged with the Corona method. In an embodiment, at least some of the water droplets projected to the die are electrostatically charged with the Corona method and at least a portion of the die is kept at a different potential. In an embodiment, at least some of the water droplets projected to the die are electrostatically charged with the Corona method, and at least a portion of the die is kept at a different potential by grounding it. In an embodiment, all what has been aforementioned for the Corona method can be extended to a capacitive type of electrostatic nozzle. In an embodiment, all what has been aforementioned for the Corona method can be extended to a two-fluid electrostatic nozzle. In an embodiment, all what has been aforementioned for the Corona method can be extended to an electrostatic induction nozzle. In an embodiment, all what has been aforementioned for the Corona method can be extended to an electrostatic nozzle where the ionizing is performed with an electrode, regardless of the shape of the electrode and whether the electrode also performs other functionalities within the nozzle. In an embodiment, all what has been aforementioned for the Corona method can be extended to an electrostatic nozzle where the ionizing is performed with any turning element, regardless of the shape of the turning element and whether the electrode also performs other functionalities within the nozzle. In an embodiment, all what has been aforementioned for the Corona method can be extended to an electrostatic nozzle regardless of how the ionizing is performed and whether the ionizing elements also perform other functionalities within the nozzle. For some applications, it is important the potential difference between the electrode or other element charging the droplets and the die. In an embodiment, the potential difference is 600 V or more. In another embodiment, the potential difference is 2 kV or more. In another embodiment, the potential difference is 12 kV or more. In another embodiment, the potential difference is 22 kV or more. In another embodiment, the potential difference is 32 kV or more. In another embodiment, the potential difference is 52 kV or more. In another embodiment, the potential difference is 102 kV or more. In some applications, it has been found that an excessive potential difference is not desirable. In an embodiment, the potential difference is 390 kV or less. In another embodiment, the potential difference is 190 kV or less. In another embodiment, the potential difference is 90 kV or less. In another embodiment, the potential difference is 49 kV or less. In an embodiment, the potential difference refers to the nominal output of the generator used. In an embodiment, the generator is a DC generator. For some applications, it has been found that it is important for the potential differential to be applied with very low associated currents. In an embodiment, the current should be 90 mA or less. In another embodiment, the current should be 9 mA or less. In another embodiment, the current should be 900 microA or less. In some applications, it has been found that the associated currents should not be excessively small. In an embodiment, the current should be 1.5 microA or more. In another embodiment, the current should be 15 microA or more. In another embodiment, the current should be 105 microA or more. In another embodiment, the current should be 555 microA or more. It has been found that in some applications, it is advantageous to constrain the water distribution within the die or at least avoid the projection of water in certain areas of the die or even more often of the surroundings of the die. In an embodiment, a directional nozzle is used. In an embodiment, at least some of the water droplets projected to the die are electrically charged, and at least a portion of the die or the surroundings of the die is actively kept at potential of the same sign as the charged water droplets to cause repulsion. In an embodiment, at least some of the water droplets projected to the die are electrostatically charged, and at least a portion of the die or the surroundings of the die is actively kept at a potential of the same sign as the charged droplets to cause repulsion. In an embodiment, at least a portion of the die is kept at a potential of the same sign as the charged droplets to cause repulsion. In an embodiment, at least some of the water droplets projected to the die are electrically charged, and at least a portion of the die or the surroundings of the die is actively kept at potential of opposite sign as the charged water droplets to cause attraction. In an embodiment, at least some of the water droplets projected to the die are electrostatically charged, and at least a portion of the die or the surroundings of the die is actively kept at a potential of opposite sign as the charged droplets to cause attraction. In an embodiment, at least a portion of the die is kept at a potential of opposite sign as the charged droplets to cause attraction. In an embodiment, an agent to enhance polarization is added to the water sprayed onto the die surface. In an embodiment, the water projected on the die surface comprises an agent. In an embodiment, the water projected on the die surface comprises at least two agents. In an embodiment, an agent to enhance polarization is added to the water sprayed onto the die surface together with other agents pursuing other functionalities (like for example corrosion protection, lubrication, altering the friction behavior, . . . ). In an embodiment, the surface refers to at least part of the die surface. In an embodiment, the surface refers to the relevant surface (as described in the preceding paragraphs). As previously disclosed, although in many applications the liquid used may be water, an aqueous solution, an aqueous suspension or any other fluid can also be used in some embodiments. In an embodiment, the term "water" can be replaced by the term "liquid". In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent. In an embodiment, the agent is an active agent. Another important aspect when using electrostatic charging of the liquid to be vaporized droplets is the usage of agents to enhance the positive effect of the electrostatic charging. In some instances, those agents have a strong contribution to enhance the even distribution of the liquid on the die areas of interest. In some instances, the liquid wasted because of ending up in areas of not interest is strongly reduced. In some instances, the regularity of the size of the droplets formed can be much better controlled, those are some good examples, an exhaustive list of instances would be too long. In some cases, though the employed agents can have detrimental secondary effects. Some of those potential detrimental effects are for example the altering of the contact angle to undesirable values, the same for the contact angle hysteresis, enhancement of the droplet washout effect, etc. In an embodiment, surfactants are employed as agents to enhance the positive effect of the electrostatic charging. In an embodiment, the agent is a surfactant. In an embodiment, the surfactant is an anionic surfactant. In another embodiment, the surfactant is a sulfate. In another embodiment, the surfactant is a sulfonate. In another embodiment, the surfactant is a gluconate. In another embodiment, the surfactant is a phosphate ester. In another embodiment, the surfactant is a carboxylate. In another embodiment, the surfactant is a phosphoric acid ester. In another embodiment, the surfactant is a carboxylic acid salt. In another embodiment, the surfactant is a silicone. In another embodiment, the surfactant is a fatty alcohol sulfate. In another embodiment, the surfactant is a naphthenate. In another embodiment, the surfactant is a salt of fluorinated fatty acids. In another embodiment, the surfactant is a non-ionic surfactant. In another embodiment, the surfactant is an ethoxylate. In another embodiment, the surfactant is a fatty alcohol ethoxylate. In another embodiment, the surfactant is an alkylphenol ethoxylate. In another embodiment, the surfactant is an alkoxylate. In another embodiment, the surfactant is an olefin sulfonate. In another embodiment, the surfactant is a fatty acid ester of polyhydroxy compound. In another embodiment, the surfactant is a fatty acid ester of sorbitol. In another embodiment, the surfactant is an amine oxide. In another embodiment, the surfactant is a fatty acid ethoxylate. In another embodiment, the surfactant is a cationic surfactant. In another embodiment, the surfactant is an alkyl ammonium chloride. In another embodiment, the surfactant is an amphoteric surfactant. In some instances, it becomes very tricky with surfactants to keep the right values for the contact angle, contact angle hysteresis and also their variation on a wet surface. In an embodiment, dispersants are employed as agents to enhance the positive effect of the electrostatic charging. In another embodiment, cationic dispersants are employed as agents to enhance the positive effect of the electrostatic charging. In another embodiment, quaternary ammonia salts are employed as cationic dispersants agents to enhance the positive effect of the electrostatic charging. In another embodiment, alkyl-polyamines are employed as cationic dispersants agents to enhance the positive effect of the electrostatic charging. In another embodiment, anionic dispersants are employed as agents to enhance the positive effect of the electrostatic charging. In another embodiment, a weak acid is employed as anionic dispersants agents to enhance the positive effect of the electrostatic charging. In another embodiment, polycarboxylic acid is employed as anionic dispersants agents to enhance the positive effect of the electrostatic charging. In another embodiment, sulfonated organic substances are employed as anionic dispersants agents to enhance the positive effect of the electrostatic charging. In another embodiment, an agent which can provide electrically chargeable entities into the liquid to be evaporated is employed to enhance the positive effect of the electrostatic charging. In another embodiment, an agent which can provide ions into the liquid to be evaporated is employed to enhance the positive effect of the electrostatic charging. In another embodiment, an inorganic salt is employed as agent which can provide ions into the liquid to be evaporated to enhance the positive effect of the electrostatic charging. In another embodiment, an organic agent which can provide electrically chargeable organic groups into the liquid to be evaporated is employed to enhance the positive effect of the electrostatic charging. In an embodiment, the liquid is projected on the surface of the die before the commencement of each hot stamping cycle. In an embodiment, the liquid is projected on the surface of the die in each hot stamping cycle. In an embodiment, the liquid is projected on the surface of the die between each hot stamping cycle. All the embodiments disclosed above may be combined in any combination provided they are not mutually exclusive. As previously disclosed, in some embodiments, the aforementioned for the die can be extended to other components, such as tools, moulds, dies used in the manufacture of tubular components or structures, hot stamping dies or moulds or forming dies among others.

One particular implementation for the above mentioned solution, leads itself to a novel stand-alone invention, since it can cover also a broader range of applications. As has been found, a controlled cooling through contact with a liquid that vaporizes through the contact capitalizing its latent heat of vaporization is very advantageous, but simultaneously it is desirable to cool down at a much lower cooling rate once the temperature of the sheet reaches a certain level and it cannot be forgotten that the processed sheets are rather thin and with moderate thermal conductivity so that heat transference within the sheet to compensate more intense cooled areas from more poorly cooled ones cannot be counted on. To make matters worse, the sheets are metallic with a high temperature and high propensity to Leidenfrost phenomenon. Therefore, there is a need for a controlled exact amount distribution of a fluid on a metallic surface (problem to be solved). A solution to such problem has applicability beyond hot stamping. For example in forging applications and die casting applications, where often a tailored distribution of release agent is also very convenient. This can surprisingly be achieved with the proper texturizing of the component surface. In an embodiment, the surface of the component is modified. In some applications, it is enough to control the contact angle of the distributed-liquid (cooling liquid, water, release agent, . . . the fluid that needs to be exactly distributed on the metallic surface of the manufactured component) on the metallic surface. As previously disclosed, although in many applications the liquid used may be water, an aqueous solution, an aqueous suspension or any other fluid can also be used in some embodiments. In an embodiment, the fluid is a liquid. In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described in the preceding paragraphs). In an embodiment, the surface conditioning leads to superhydrophilicity. In an embodiment, the surface conditioning leads to super-wetting. In an embodiment, the contact angle is measured using a DSA 100M from Kruss with software and hardware update at 1 Feb. 2018. In an embodiment, the contact angle is measured using the sessile drop method. In an embodiment, the contact angle is measured using the captive bubble method. In an embodiment, the contact angle is measured using the Wilhelmy method. In an embodiment, the surface conditioning leads to a contact angle between the distributed-liquid and the modified surface which is smaller than 89°. In another embodiment, the surface conditioning leads to a contact angle between the distributed-liquid and the modified surface which is smaller than 64°. In another embodiment, the surface conditioning leads to a contact angle between the distributed-liquid and the modified surface which is smaller than 38°. In another embodiment, the surface conditioning leads to a contact angle between the distributed-liquid and the modified surface which is smaller than 22°. In another embodiment, the surface conditioning leads to a contact angle between the distributed-liquid and the modified surface which is smaller than 9°. In another embodiment, the surface conditioning leads to a contact angle between the distributed-liquid and the modified surface which is smaller than 4°. In some applications, it is convenient to have a large contact angle, some of them will be studied in detail in the upcoming paragraphs. In an embodiment, the surface conditioning leads to hydrophobicity. In an embodiment, the surface conditioning leads to super-hydrophobicity. In an embodiment, the surface conditioning leads to a contact angle between the distributed-liquid and the modified surface which is greater than 65°. In another embodiment, the surface conditioning leads to a contact angle between the distributed-liquid and the modified surface which is greater than 95°. In another embodiment, the surface conditioning leads to a contact angle between the distributed-liquid and the modified surface which is greater than 105°. In another embodiment, the surface conditioning leads to a contact angle between the distributed-liquid and the modified surface which is greater than 145°. In another embodiment, the surface conditioning leads to a contact angle between the distributed-liquid and the modified surface which is greater than 155°. In another embodiment, the surface conditioning leads to a contact angle between the distributed-liquid and the modified surface which is greater than 165°. For some applications, even when a large contact angle is desirable it should not be too large. In an embodiment, the surface conditioning leads to a contact angle between the distributed-liquid and the modified surface which is smaller than 174°. In another embodiment, the surface conditioning leads to a contact angle between the distributed-liquid and the modified surface which is smaller than 169°. In another embodiment, the surface conditioning leads to a contact angle between the distributed-liquid and the modified surface which is smaller than 164°. In an embodiment, the values of contact angle disclosed in this document are measured according to ISO 19403-2:2017: Paints and varnishes-Wettability-Part 2: Determination of the surface free energy of solid surfaces by measuring the contact angle. In different embodiments, the values of contact angle disclosed in this document can alternatively be obtained either by a DSA 100M from Kruss with software and hardware update at 1 Feb. 2018 or by the sessile drop method or by the captive bubble method or even by the Wilhelmy method. In an embodiment, the contact angle is measured at the three-phase boundary where the liquid, the gas and the surface intersect. In an embodiment, the contact angle is measured at room temperature (23° C.). In an alternative embodiment, the contact angle is measured at the temperature of the component. In an embodiment, the temperature of the component refers to the temperature of the component when the first liquid droplet contacts its surface. In an alternative embodiment, the temperature of the component refers to the temperature of the component when the sheet contacts the liquid on the surface of the component. All the upper and lower limits disclosed in the different embodiments may be combined in any combination provided they are not mutually exclusive, In some applications, it has been seen that the contact angle hysteresis (difference between the advancing and recessing contact angles). In an embodiment, the contact angle hysteresis is measured using a DSA 100M from Krüss with software and hardware update at 1 Feb. 2018. In an embodiment, the contact angle hysteresis is measured using the sessile drop method. In an embodiment, the contact angle hysteresis is measured using the captive bubble method. In an embodiment, the contact angle hysteresis is measured using the Wilhelmy method. In an embodiment, the surface conditioning leads to a contact angle hysteresis between the distributed-liquid and the modified surface which is larger than 2°. In another embodiment, the surface conditioning leads to a contact angle hysteresis between the distributed-liquid and the modified surface which is larger than 6°. In another embodiment, the surface conditioning leads to a contact angle hysteresis between the distributed-liquid and the modified surface which is larger than 22°. In another embodiment, the surface conditioning leads to a contact angle hysteresis between the distributed-liquid and the modified surface which is larger than 52°. In another embodiment, the surface conditioning leads to a contact angle hysteresis between the distributed-liquid and the modified surface which is larger than 102°. In some applications, the contact angle hysteresis should be large but not excessively. In an embodiment, the surface conditioning leads to a contact angle hysteresis between the distributed-liquid and the modified surface which is smaller than 174°. In another embodiment, the surface conditioning leads to a contact angle hysteresis between the distributed-liquid and the modified surface which is smaller than 168°. In another embodiment, the surface conditioning leads to a contact angle hysteresis between the distributed-liquid and the modified surface which is smaller than 163°. In some applications it has been seen convenient the combination of large contact angles with small contact angle hysteresis. In an embodiment, the surface conditioning leads to a contact angle hysteresis between the distributed-liquid and the modified surface which is smaller than 59°. In another embodiment, the surface conditioning leads to a contact angle hysteresis between the distributed-liquid and the modified surface which is smaller than 19°. In another embodiment, the surface conditioning leads to a contact angle hysteresis between the distributed-liquid and the modified surface which is smaller than 9°. In another embodiment, the surface conditioning leads to a contact angle hysteresis between the distributed-liquid and the modified surface which is smaller than 4°. In another embodiment, the surface conditioning leads to a contact angle hysteresis between the distributed-liquid and the modified surface which is smaller than 1.9°. In another embodiment, the surface conditioning leads to a contact angle hysteresis between the distributed-liquid and the modified surface which is smaller than 0.9°. In an embodiment, the distributed-liquid has a size which is appropriate (definition as per preceding paragraphs). In an embodiment, the values of contact angle hysteresis disclosed in this document are measured according to ISO 19403-2:2017: Paints and varnishes—Wettability—Part 2: Determination of the surface free energy of solid surfaces by measuring the contact angle. In an embodiment, the contact angle hysteresis is measured at the three-phase boundary where the liquid, the gas and the surface intersect. In an embodiment, the contact angle hysteresis values disclosed in this document are at room temperature (23° C.). In an alternative embodiment, the contact angle hysteresis is measured at the temperature of the component. In an embodiment, the temperature of the component refers to the temperature of the component when the first liquid droplet contacts its surface. In an alternative embodiment, the temperature of the component refers to the temperature of the component when the sheet contacts the liquid on the surface of the component. All the upper and lower limits disclosed in the different embodiments may be combined in any combination provided they are not mutually exclusive, for example a contact angle hysteresis between the distributed-liquid and the modified surface which is larger than 2° and smaller than 174°, wherein the contact angle is measured at room temperature (23° C.) according to ISO 19403-2:2017. In an embodiment, the distributed-liquid has a size which is appropriate (definition as per preceding paragraphs). In an embodiment, the distributed-liquid in the surface of the component has a size which is appropriate. In an embodiment, the distributed-liquid in the relevant surface of the component has a size which is appropriate. In an embodiment, the concept of relevant surface of the component of the preceding paragraphs is used. In an embodiment, the relevant surface of the component is all the surface of the component that needs to be cooled. In an embodiment, the relevant surface of the component is all the surface of the component in contact with the manufactured piece when the component is a tool (die, mould, . . . ). In an embodiment, the relevant surface of the component is all the surface of the component in contact with the critical areas of the manufactured piece when the component is a tool (die, mould, . . . ). In an embodiment, the relevant surface of the component is all the surface of the component in contact with the areas of the manufactured piece that remain after the whole manufacturing process (are not trimmed away or otherwise removed), when the component is a tool (die, mould, . . . ). In an embodiment, the component is a die. In another embodiment, the component is a mould. In another embodiment, the component is a die used in the manufacture of tubular components or structures. In another embodiment, the component is a hot stamping die or mould. In another embodiment, the component is a forming die. In another embodiment, the component is a hot stamping forming die. In an embodiment, the surface of the component refers to the surface of a die. In another embodiment, the surface of the component refers to the surface of a mould. In another embodiment, the surface of the component refers to the surface of a die used in the manufacture of tubular components or structures, In another embodiment, the surface of the component refers to the surface of a hot stamping die or mould. In another embodiment, the surface of the component refers to the surface of a forming die. In another embodiment, the surface of the component refers to the surface of a hot stamping forming die. In different embodiments, the contact angle between the liquid and the surface of the hot stamping die or mould is smaller than 89°, smaller than 64°, smaller than 38, smaller than 22°, smaller than 9° and even smaller than 4°. In some applications, it is convenient to have a large contact angle. In different embodiments, the contact angle between the liquid and the surface of the hot stamping die or mould is greater than 65°, greater than 95°, greater than 105°, greater than 145°, greater than 155° and even greater than 165°. For some applications, even when a large contact angle is desirable it should not be too large. In different embodiments, the contact angle between the liquid and the surface of the hot stamping die or mould is smaller than 174°, smaller than 169° and even smaller than 164°. All the upper and lower limits disclosed in the different embodiments may be combined in any combination provided they are not mutually exclusive, for example a contact angle hysteresis between the liquid and the hot stamping die or mould which is larger than 65° and smaller than 164°, wherein the contact angle hysteresis is measured at room temperature (23° C.) according to ISO 19403-2:2017. In some applications, the contact angle hysteresis is also relevant. In different embodiments, the contact angle hysteresis between the liquid and the surface of the hot stamping die or mould is larger than 2°, larger than 6°, larger than 22°, larger than 52° and even larger than 102°. In some applications, the contact angle hysteresis should be large but not excessively. In different embodiments, the contact angle hysteresis between the liquid and the surface of the hot stamping die or mould is smaller than 174°, smaller than 168° and even smaller than 163°. In some applications, it has been found convenient the combination of large contact angles with small contact angle hysteresis. In different embodiments, the contact angle hysteresis between the liquid and the surface of the hot stamping die or mould is smaller than 59°, smaller than 19°, smaller than 9°, smaller than 4°, smaller than 1.9° and even smaller than 0.9°. All the upper and lower limits disclosed in the different embodiments may be combined in any combination provided they are not mutually exclusive, for example a contact angle hysteresis between the liquid and the hot stamping die or mould which is larger than 2° and smaller than 174°, wherein the contact angle is measured at room temperature (23° C.) according to ISO 19403-2:2017. In an embodiment, the contact angle and/or contact angle hysteresis is measured at room temperature (23° C.). In an alternative embodiment, the contact angle and/or contact angle hysteresis is measured at the temperature of the hot stamping die or mould. In an embodiment, the temperature of the hot stamping die or mould refers to the temperature of the hot stamping die or mould when the first liquid droplet contacts its surface. In an alternative embodiment, the temperature of the hot stamping die or mould refers to the temperature of the hot stamping die or mould when the sheet contacts the liquid on the surface of the hot stamping die or mould. As previously disclosed, in some embodiments, the aforementioned for a sheet can also be extended to other components such as a tubular component or structure. In an embodiment, the term “sheet” can be replaced by the term “tubular component or structure”. In some applications, it is convenient to maintain the surface of the component at a controlled temperature. In some applications, where the component is a tool (die or mould) it is sometimes important to have an efficient temperature control of the surface. In some instances, that means the capacity to evacuate the heat from the component very fast. In some instances, it means being able to deliver a high thermal power to the component. In those applications, the proper thermoregulation is advisable. In some applications, a component comprising channels inside is preferred. In an embodiment, the component is a die. In another embodiment, the component is a mould. In another embodiment, the component is a die used in the manufacture of tubular components or structures. In another embodiment, the component is a hot stamping die or mould. In another embodiment, the component is a forming die. In another embodiment, the component is a hot stamping forming die. In an embodiment, the channels are cooling channels. When the distance between the cooling channels and the surface of the component to be thermoregulated is high, the thermoregulation which may be achieved is not very effective. In some applications, when the cross-section of the cooling channels is big and the cooling channels are located close to the surface of the component to be thermoregulated, the possibilities of mechanical failure are largely increased. To solve this issue, the present invention proposes a combined system which replicates the blood transport in human body (which also has a thermoregulatory purpose). There are main arteries in the human body which carry oxygenated blood to secondary arteries, until the blood reaches fine capillaries. Then, the capillaries carry the less oxygenated blood to secondary veins and from there, the blood is carried to main veins. In the same way, in the proposed system, the thermoregulation fluid (cold or hot depending on the thermoregulatory function) enters the component through the main channels (primary channels or inlet channels) and is carried from the main channels to secondary channels (there may be different levels of secondary channels, this means, tertiary channels, quaternary channels, etc.), until the thermoregulation fluid reaches fine and not very long channels (also referred in some embodiments as fine channels, capillary channels or capillaries) which are located very close to the surface to be thermoregulated. Although in many applications the thermoregulation fluid used may be water, an aqueous solution, an aqueous suspension or any other fluid can also be used in some embodiments. In an embodiment, the fluid is a liquid. In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described in the preceding paragraphs). In some embodiments, the fine channels should be located close to the surface to be thermoregulated. This system is advantageous for some applications, while for other applications, the use of more traditional thermoregulation systems is more appropriate. In some applications, the part of the channels with a small cross section is very short and thus the pressure drop effect becomes manageable. For a given application, finite elements simulation can be used to obtain the most advantageous configuration of the channels. In an embodiment, the system is optimized using finite elements simulation. In an embodiment, the design of the thermoregulation system comprises the use of finite elements simulation (select the cross section of the channels, the length, the position, the flow, the fluid, the pressure, etc.). As compared with traditional systems, a peculiarity of the proposed system is that the entrance and the exit of the thermoregulation fluid into the component is made through different channels which are mainly connected with channels of rather smaller individual cross-sections. In an embodiment, the entrance and the exit of the fluid is made through different channels which are located inside the component. In some applications, the thermoregulation fluid enters the component through a main channel (or several main channels), then the thermoregulation fluid is divided into secondary channels which in turn are connected to fine channels. In an embodiment, the main channel is the inlet channel. In some applications, the number of main channels may be important. In some applications, the component comprises more than one main channel. In different embodiments, the component comprises at least 2 main channels, at least 4 main channels, at least 5 main channels, at least 8 main channels, at least 11 main channels and even at least 16 main channels. In some applications, the number of main channels should be not too high. In different embodiments, the component comprises less than 39 main channels, less than 29 main channels, less than 24 main channels, less than 19, main channels and even less than 9 main channels. In an embodiment, the main channels (or main inlet channels) comprise several branches. In some applications, the number of branches may be important. In some applications, the main channels (or main inlet channels) comprise several branches. In different embodiments, the main channels comprise 2 or more branches, 3 or more branches, 4 or more branches, 6 or more branches, 12 or more branches, 22 or more branches and even 110 or more branches. In contrast, in some applications, an excessive division is rather detrimental. In different embodiments, the main channels comprise 18 or less branches, 8 or less branches, 4 or less branches, and even 3 or less branches In an embodiment, the branches are located at the outlet of the main channels. In some applications, the cross-section of the main channels may be important. In an embodiment, the cross-section of the inlet channel (or inlet channels) is at least 3 times higher than the cross-section of the smallest channel among all the contributing channels in the component area where the thermoregulation is desired. In another embodiment, the cross-section of the inlet channel (or inlet channels) is more than 6 times higher than the cross-section of the smallest channel among all the contributing channels in the component area where the thermoregulation is desired. In another embodiment, the cross-section of the inlet channel (or inlet channels) is more than 11 times higher than the cross-section of the smallest channel among all the channels in the component area where the thermoregulation is desired. In another embodiment, the cross-section of the inlet channel (or inlet channels) is more than 110 times higher than the cross-section of the smallest channel among all the channels in the component area where the thermoregulation is desired. In an embodiment, the cross-section refers to the cross sectional area. In an embodiment, the channels contribute to the thermoregulation. In an embodiment, the smallest channel among all the fine channels is the fine channel with the lowest cross-sectional area. In an embodiment, there is only one inlet channel. In some embodiments, there may be more than one inlet channel. In an embodiment, when there is more than one main channel, the cross sectional area of the inlet channel is the sum of all the cross-sectional areas of the inlet channels. In some applications, the diameter of the main channels may be important. For some applications, the diameter of the main channels (or main channel) should not be too low. In different embodiments, the diameter of the main channels is greater than 11 mm, greater than 21 mm, greater than 57 mm and even greater than 111 mm. In some applications, it is preferred below a certain value. In different embodiments, the diameter of the main channels is below 348 mm, below 294 mm, below 244 mm, below 194 mm and even below 144 mm. For some applications, the mean diameter of the main channels (or main channel) should not be too low. In different embodiments, the mean diameter of the main channels is greater than 12 mm, greater than 22 mm, greater than 56 mm and even greater than 108 mm. The inventor has found that for some applications, the mean equivalent diameter of the main channels (or main channel) should not be too low. In different embodiments, the mean equivalent diameter of the main channels is greater than 12 mm, greater than 22 mm, greater than 56 mm and even greater than 108 mm. In an embodiment, the equivalent diameter is the diameter of a circle of equivalent area. In an alternative embodiment, the equivalent diameter is the diameter of a sphere of equivalent volume. In another alternative embodiment, the equivalent diameter is the diameter of a cylinder of equivalent volume. In some applications, the cross-sectional area of the main channels may be important. In an embodiment, the cross-sectional area of the main channels is at least 3 times higher than the cross-sectional area of the smallest channel among all the fine channels. In another embodiment, the cross-sectional area of the main channels is at least 6 times higher than the cross-sectional area of the smallest channel among all the fine channels. In another embodiment, the cross-sectional area of the main channels is at least 11 times higher than the cross-sectional area of the smallest channel among all the fine channels. In another embodiment, the cross-sectional area of the main channels is at least 110 times higher than the cross-sectional area of the smallest channel among all the fine channels. For some applications, it is desirable to have main channels with a small cross section to minimize the pressure drop. In some applications, it is preferred below a certain value. In different embodiments, the cross-sectional area of the main channels is less than 2041.8 mm$^2$; less than 1661.1 mm$^2$; less than 1194 mm$^2$; less than 572.3 mm$^2$; less than 283.4 mm$^2$ and even less than 213.0 mm$^2$. For some application even lower values are preferred. In different embodiments, the cross-sectional area of the main channels is less than 149 mm$^2$; less than 108 mm$^2$; less than 42 mm$^2$; less than 37 mm$^2$ less than 31 mm$^2$; less than 28 mm$^2$; less than 21 mm$^2$ and even less than 14 mm$^2$. For some applications, the cross-sectional area of the main channels (or main channel) should not be too low. In different embodiments, the cross-sectional area of the main channels is 9 mm$^2$ or more, 14 mm$^2$ or more, 21 mm$^2$ or more and even 38 mm$^2$ or more. In some applications, even higher values are preferred. In different embodiments, the cross-sectional area of the main channels is 126 mm$^2$ or more, 206 mm$^2$ or more, 306 mm$^2$ or more and even 406 mm$^2$ or more. In an embodiment, the cross-sectional area of the main channels is between 56 mm$^2$ and 21 mm$^2$. In another embodiment, the cross-sectional area of the main channels of the component is between 56 mm$^2$ and 14 mm$^2$. In an embodiment, the cross-section of the main channels is circular. In alternative embodiments, the cross-section of the main channels is selected from squared, rectangular, oval and/or semicircular. In an embodiment, the cross-section of the main channels is constant. In an embodiment, the cross-sectional area of the main channels is constant. In an alternative embodiment, the main channels do not have a constant cross-section. In an alternative embodiment, the shape of the cross-section is not constant. In an embodiment, the main channels do not have a constant cross-sectional area. In an embodiment, the main channels have a minimum cross-sectional area and a maximum cross-sectional area. In an embodiment, when the cross-sectional area of the main channels is not constant, the above disclosed values refer to the minimum cross-sectional area of the main channels. In an alternative embodiment, when the cross-sectional area of the main channels is not constant, the above disclosed values refer to the mean cross-sectional area of the main channels. In another alternative embodiment, when the cross-section area of the main channels is not constant, the above disclosed values refer to the maximum cross-sectional area of the main channels. In an embodiment, the cross-section of the main channels is not circular, square, rectangular, oval or semicircular among other shapes. In an embodiment, the cross section of the main channels is not circular. In an embodiment, the main channels are the inlet channels (or main inlet channels). In another embodiment, the main channels are the outlet channels. In some applications, the main channels are connected to more than one secondary channel. In some applications, the main channels are connected to several secondary channels. In an embodiment, the main channels are connected to 2 or more secondary channels. In another embodiment, the main channels are connected to 3 or more secondary channels. In another embodiment, the main channels are connected to 4 or more secondary channels. In another embodiment, the main channels are connected to 6 or more secondary channels. In another embodiment, the main channels are connected to 12 or more secondary channels. In another embodiment, the main channels are connected to 22 or more secondary channels. In another embodiment, the main channels are connected to 110 or more secondary channels. The inventor has found that in some applications an excessive number of secondary channels connected to main channels may be detrimental. In an embodiment, the main channels are connected to 18 or less secondary channels. In another embodiment, the main inlet channels are connected to 8 or less secondary channels. In another embodiment, the main channels are connected to 4 or less secondary channels. In another embodiment, the main channels are connected to 3 or less secondary channels. In an embodiment, the component comprises a main channel which is connected to 3 or more secondary channels. In another embodiment, the component comprises a main channel which is connected to 4 or more secondary channels. In another embodiment, the component comprises a main channel which is connected to 6 or more secondary channels. In another embodiment, the component comprises a main channel which is connected to 12 or more secondary channels. In another embodiment, the component comprises a main channel which is connected to 22 or more secondary channels. In another embodiment, the component comprises a main channel which is connected to 110 or more secondary channels. In some applications, an excessive number of secondary channels connected to a main channel may be detrimental. In an embodiment, the component comprises a main channel which is connected to 18 or less secondary channels. In an embodiment, the component comprises a main channel which is connected to 8 or less secondary channels. In another embodiment, the component comprises a main channel which is connected to 4 or less secondary channels. In another embodiment, the component comprises a main channel which is connected to 3 or less secondary channels. In an embodiment, the main channels are the main inlet channels. In some applications, the cross-sectional area of the secondary channels may be important. In some applications, the cross-sectional area of the secondary channels should not be too high. In different embodiments, the cross-sectional area of the secondary channels is less than 122.3 $mm^2$; less than 82.1 $mm^2$; less than 68.4 $mm^2$; less than 43.1 $mm^2$; less than 26.4 $mm^2$; less than 23.2 $mm^2$ and even less than 18.3 $mm^2$. In some application, even lower values are preferred. In different embodiments, the cross-sectional area of the secondary channels is less than 14.1 $mm^2$; less than 11.2 $mm^2$; less than 9.3 $mm^2$; less than 7.8 $mm^2$; less than 7.2 $mm^2$; less than 6.4 $mm^2$; less than 5.8 $mm^2$; less than 5.2 $mm^2$; less than 4.8 $mm^2$; less than 4.2 $mm^2$ and even less than 3.8 $mm^2$. In some applications, the cross-sectional area of the secondary channels should not be too low. In different embodiments, the cross-sectional area of the secondary channels is 0.18 $mm^2$ or more, 3.8 $mm^2$ or more, 5.3 $mm^2$ or more and even 6.6 $mm^2$ or more. In some applications, even higher values are preferred. In different embodiments, the cross-sectional area of the secondary channels is 18.4 $mm^2$ or more, 26 $mm^2$ or more, 42 $mm^2$ or more and even 66 $mm^2$ or more. In an embodiment, the cross-sectional area of the secondary channels is between 7.8 $mm^2$ and 3.8 $mm^2$. In another embodiment, the cross-sectional area of the secondary channels is between 5.2 $mm^2$ and 3.8 $mm^2$. In an embodiment, the cross-section of the secondary channels is circular. In alternative embodiments, the cross-section of the secondary channels is selected from squared, rectangular, oval and/or semicircular. In an embodiment, the cross-section of the secondary channels is constant. In an embodiment, the shape of the cross-section is not constant. In an embodiment, the cross-sectional area of the secondary channels is constant. In an alternative embodiment, the secondary channels do not have a constant cross-section. In an alternative embodiment, the secondary channels do not have a constant cross-sectional area. In an embodiment, the secondary channels have a minimum cross-sectional area and a maximum cross-sectional area. In an embodiment, when the cross-section of the secondary channels is not constant, the above disclosed values refer to the minimum cross-sectional area of the secondary channels. In an alternative embodiment, when the cross-sectional area of the secondary channels is not constant, the above disclosed values refer to the mean cross-sectional area of the secondary channels. In another alternative embodiment, when the cross-sectional area of the secondary channels is not constant, the above disclosed values refer to the maximum cross-sectional area of the secondary channels. In an embodiment, the cross-section of the secondary channels is not circular, squared, rectangular, oval or semicircular among other shapes. In an embodiment, the cross section of the secondary channels is not circular. In an embodiment, the cross-sectional area of the secondary channels is less than 1.4 times the equivalent diameter. In another embodiment, the cross-sectional area of the secondary channels is less than 0.9 times the equivalent diameter. In another embodiment, the cross-sectional area of the secondary channels is less than 0.7 times the equivalent diameter. In another embodiment, the cross-sectional area of the secondary channels is less than 0.5 times the equivalent diameter. In another embodiment, the cross-sectional area of the secondary channels is less than 0.18 times the equivalent diameter. As previously disclosed, the secondary channels may have several division (tertiary channels, quaternary channels, . . . ). For some applications, it is desirable to have several divisions in the outlet of the secondary channels. In different embodiments, the secondary channels have 2 or more divisions, 3 or more divisions, 4 or more divisions, 6 or more divisions, 12 or more divisions, 22 or more divisions and even 110 or more divisions. In an embodiment, the secondary channels are connected to fine channels. In some applications, the secondary channels are connected to several fine channels. In different embodiments, the secondary channels are connected to 2 or more fine channels, 3 or more fine channels, 4 or more fine channels, 6 or more fine channels, 12 or more fine channels, 22 or more fine channels and even 110 or more fine channels. In contrast, for other applications, an excessive division of the secondary channels may be detrimental. In different embodiments, the secondary channels are connected to 2 or less fine channels, 3 or less fine channels, 680 or less fine channels, 390 or less fine channels, 140 or less fine channels, 90 or less fine channels and even 68 or less fine channels. In an embodiment, the fine channels have a minimum cross-sectional area and a maximum cross-sectional area. In an embodiment, the sum of the minimum cross-sectional areas of all the fine channels connected to a secondary channel should be equal to the cross-sectional area of the secondary channel to which are connected. In an alternative embodiment, the sum of the maximum cross-sectional areas of all the fine channels connected to a secondary channel should be equal to the cross-sectional area of the secondary channel to which are connected. In some applications, the cross-sectional area of the fine channels may be important. In another embodiment, the sum of the minimum cross-sectional areas of all the fine channels connected to a secondary channel is at least 1.2 times bigger than the cross-sectional area of the secondary channel to which are connected. In an embodiment, the sum of the maximum cross-sectional areas of all the fine channels connected to a secondary channel is bigger than the cross-sectional area of the secondary channel to which are connected. In another embodiment, the sum of the maximum cross-sectional areas of all the fine channels connected to a secondary channel is at least 1.2 times bigger than the cross-sectional area of the secondary channel to which are connected. In an embodiment, there are no secondary channels. In an embodiment, there are no secondary channels and the main channels are directly connected to the fine channels. In an embodiment, the main channels are directly connected to the fine channels. In an alternative embodiment, there are no main channels. In another alternative embodiment, the component comprises only fine channels. As previously disclosed, in some applications, it is desirable to have fine channels close to the thermoregulation surface and close among them to achieve the desired homogeneous heat exchange. In an embodiment, the fine channels are the channels which are located in the areas of the component where the thermoregulation is desired. In applications with high mechanical solicitations, fine channels with a small cross section are preferred. In some applications, the length of the fine channels may be important. The pressure drop increases when the channels have a small cross section, therefore, in some applications not too long channels are preferred. In some applications, an excessive mean length of the fine channels which are under the active surface is not desirable. In different embodiments, the mean length of the fine channels is less than 1.8 m, less than 450 mm, less than 180 mm and even less than 98 mm. In some applications, even lower mean lengths are preferred. In different embodiments, the mean length of the fine channels is less than 18 mm, less than 8 mm, less than 4.8 mm, less than 1.8 mm and even less than 0.8 mm. In some applications, the mean length of the fine channels should not be too low. In different embodiments, the mean length of the fine channels is greater than 0.6 mm, greater than 1.2 mm, greater than 6 mm, 12 mm or more, greater than 16 mm, greater than 32 mm, greater than 52 mm and even greater than 110 mm. In different embodiments, the total length of the fine channels is less than 98 mm, less than 84 mm, less than 70 mm and even less than 39 mm. In some applications, the total length of the fine channels should not be too low. In different embodiments, the total length of the fine channels is more than 6 mm, more than 21 mm, more than 41 mm and even more than 61 mm. In some applications, it is desirable to have channels with a small mean effective length to minimize the pressure drop. In different embodiments, the mean effective length of the fine channels is less than 240 mm, less than 74 mm, less than 48 mm and even less than 18 mm. In some applications, the end of the fine channels acts as a discontinuity and therefore, fine channels with a minimum mean effective length are preferred. In different embodiments, the minimum mean effective length of the fine channels is 12 mm or more, greater than 32 mm, greater than 52 mm and even greater than 110 mm. In an embodiment, the active surface refers to the surface of the component where the thermoregulation is desired (the heat exchange area). In an embodiment, the mean effective length is the mean length of the fine channels under the active surface (each fine channel may have a different length, therefore, in some applications, it is advantageous to use the mean length of the fine channels). In an alternative embodiment, the effective length refers to the length of the section under the active surface where an efficient thermoregulation is desired, not accounting the section of the channels that carries the thermoregulation fluid from the secondary channels, eventually also from the main channels, to the section wherein the heat exchange with the active surface is efficient. In an embodiment, the fine channels are the channels under the active surface with an effective contribution to the thermoregulation. In some applications, it is important to have a high density of fine channels under the active surface. In an embodiment, the surface density of fine channels is evaluated in the surface area to be thermoregulated. In an embodiment, the surface density of fine channels refers to the percentage of the surface to be termoregulated which contains fine channels. In an embodiment, the surface density of fine channels is calculated using the maximum value of the cross-sectional area of each fine channel. In different embodiments, the surface density of fine channels is greater than 12%, greater than 27%, greater than 42%, and even greater than 52%. Other applications require a more intense and homogeneous heat exchange. In different embodiments, a surface density of fine channels of 62% or more, greater than 72%, greater than 77% and even greater than 86% is preferred. In some applications, an excessive surface density of fine channels can lead to mechanical failure of the component among other problems. In different embodiments, the surface density of fine channels is 57% or less, 47% or less, 23% or less and even 14% or less. The inventor has found that in some applications, the important thing is to control the ratio H, where H=the total length of the fine channels (the sum of the lengths of all the fine channels)/the mean length of the fine channels. In an embodiment, the length of the fine channels is the effective length of the fine channels. In an embodiment, the effective length is the length of the fine channels which are under the active surface. In different embodiments, the preferred H ratio is greater than 12, greater than 110, greater than 1100 and even greater than 11000. In some applications, an excessive H ratio may be detrimental. In different embodiments, the H ratio is less than 900, less than 230, less than 90 and even less than 45. In some applications, the number of fine channels per square meter should not be too low. In different embodiments, the preferred number of fine channels is 21 fine channels per square meter or more, 46 fine channels per square meter or more, 61 fine channels per square meter or more and even 86 fine channels per square meter or more. In some applications, higher values are preferred. In different embodiments, the number of fine channels is 110 fine channels per square meter or more, 1100 fine channels per square meter or more, 11000 fine channels per square meter or more and even 52000 fine channels per square meter or more. In some applications, the number of fine channels by surface area should not be too high. In different embodiments, the number of fine channels is 14000 fine channels per square meter or less, 9000 fine channels per square meter or less, 4000 fine channels per square meter or less and even 1600 fine channels per square meter or less. In some applications, even lower values are preferred. In different embodiments, the number of fine channels is 1200 fine channels per square meter or less, 900 fine channels per square meter or less, 400 fine channels per square meter or less and even 94 fine channels per square meter or less. In an embodiment, the reference area is the surface area of the component. In an embodiment, the surface of the component refers to the active surface. In an embodiment, the surface of the component refers to the working surface. In an embodiment, the surface of the component refers to the relevant surface (as described in the preceding paragraphs). When it comes to the thermoregulation systems, specially when the thermoregulation is performed with fluid assistance, an important advantage of the thermoregulation systems proposed is the homogeneous distribution of the thermoregulatory fluid very close to the surface of the component to be thermoregulated. In an embodiment, the fine channels are very well distributed. In some applications, the distance of the fine channels to the surface of the component may be important. In different embodiments, the mean distance of the fine channels to the surface is less than 18 mm, less than 8 mm, less than 4.8 mm, less than 1.8 mm and even less than 0.8 mm. In some applications, a too small distance may be counterproductive. In different embodiments, the mean distance of the fine channels to the surface is greater than 0.6 mm, greater than 1.2 mm, greater than 6 mm and even greater than 16 mm. In an embodiment, the distance of a fine channel to the surface is the minimum distance between any point of the fine channel and the surface. In an embodiment, the mean distance refers to the mean value of the distance between the different sections of the envelope of the fine channel and the surface of the component. In this context the minimum mean distance refers to the minimum mean distance between the envelope of the fine channel and the surface of the component. In some applications, fine channels close to each other are preferred, therefore the mean distance between the fine channels should not be excessive. In different embodiments, the fine channels are separated from each other a mean distance of 18 mm or less, 9 mm or less, 4.5 mm or less and ever less than 1.8 mm. In some applications, the distance between the fine channels should not be too low. In different embodiments, the fine channels are separated from each other a mean distance of 0.2 mm or more, 0.9 mm or more, 1.2 mm or more, 2.6 mm or more and even 12 mm or more. In some applications, the diameter of the fine channels may be important. In some applications, the diameter of the fine channels should not be too high. In different embodiments, the diameter of the fine channels is less than 38 mm, less than 18 mm, less than 8 mm, less than 2.8 mm, less than 0.8 and even less than 0.09 mm. In some applications, the diameter of the fine channels should not be too low. In different embodiments, the diameter of the fine channels is 1.2 mm or more, 6 mm or more, 12 mm or more and even 22 mm or more. In some applications, the mean diameter of the fine channels should not be too high. In different embodiments, the mean diameter of the fine channels is less than 38 mm, less than 18 mm, less than 8 mm, less than 2.8 mm and even less than 0.8 mm. In some applications, the mean diameter of the fine channels should not be too low. In different embodiments, the mean diameter of the fine channels is 1.2 mm or more, 6 mm or more, 12 mm or more and even 22 mm or more. In some applications, the equivalent diameter of the fine channels should not be too high. In different embodiments, the equivalent diameter of the fine channels is less than 38 mm, less than 18 mm, less than 8 mm, less than 2.8 mm and even less than 0.8 mm. In some applications, the equivalent diameter of the fine channels should not be too low. In different embodiments, the equivalent diameter of the fine channels is greater than 1.2 mm, greater than 6 mm, greater than 12 mm and even greater than 22 mm. In some applications, the minimum equivalent diameter of the fine channels should not be too high. In different embodiments, the minimum equivalent diameter of the fine channels is less than 18 mm, less than 12 mm, less than 9 mm, less than 8 mm, less than 4 mm, less than 2.8, less than 1.8 and even less than 0.8 mm. The inventor has found that in some applications, the minimum equivalent diameter should not be too low. In different embodiments, the mean equivalent diameter of the fine channels is greater than 1.2 mm, greater than 6 mm, greater than 12 mm and even greater than 22 mm. In some applications, even higher values are preferred. In different embodiments, the mean equivalent diameter of the fine channels is greater than 56 mm, and even greater than 108 mm. In some applications, it is preferred below a certain value. In different embodiments, the mean equivalent diameter of the fine channels is less than 38 mm, less than 18 mm, less than 8 mm, less than 2.8 mm and even less than 0.8 mm. In some applications, the minimum mean equivalent diameter of the fine channels should not be too high. In different embodiments, the minimum mean equivalent diameter of the fine channels is less than 18 mm, less than 8 mm, less than 2.8 and even less than 0.8 mm. The inventor has found that in some applications, the minimum mean equivalent diameter should not be too low. In different embodiments, the minimum mean equivalent diameter of the fine channels is 0.2 mm or more, 0.8 mm or more, 1.2 mm or more and even 1.6 mm or more. In an embodiment, the equivalent diameter is the diameter of a circle of equivalent area. In an alternative embodiment, the equivalent diameter is the diameter of a sphere of equivalent volume. In another alternative embodiment, the equivalent diameter is the diameter of a cylinder of equivalent volume. In some applications, the cross-sectional area of the fine channels may be important. In some applications, the cross-sectional area of the fine channels should not be too high. In different embodiments, the cross-sectional area of the fine channels is less than 1.6 mm$^2$; less than 1.2 mm$^2$; less than 0.8 mm$^2$; less than 0.45 mm$^2$ and even less than 0.18 mm$^2$. In some applications, the cross-sectional area of the fine channels should not be too low. In different embodiments, the cross-sectional area of the fine channels is greater than 0.08 mm$^2$; greater than 0.18 mm$^2$; greater than 0.26 mm$^2$; greater than 0.36 mm$^2$ and even greater than 0.45 mm$^2$. In an embodiment, the cross-sectional area of the fine channels is between 1.6 mm$^2$ and 0.18 mm$^2$. In another embodiment, the cross-sectional area of the fine channels is between 1.6 mm$^2$ and 0.45 mm$^2$. In another embodiment, the cross-sectional area of the fine channels is between 1.2 mm$^2$ and 0.45 mm$^2$. In different embodiments, the cross-section of the fine channels is selected from circular, squared, rectangular, oval and/or half circle. In an embodiment, the cross-section of the fine channels is constant. In an embodiment, the shape of the cross-section is not constant. In an embodiment, the cross-sectional area of the fine channels is constant. In an alternative embodiment, the fine channels do not have a constant cross-section. In an alternative embodiment, the fine channels do not have a constant cross-sectional area. In an embodiment, the fine channels have a minimum cross-sectional area and a maximum cross-sectional area. In an embodiment, when the cross-sectional area of the fine channels is not constant, the above disclosed values refer to the minimum cross-sectional area of the fine channels. In an alternative embodiment, when the cross-sectional area of the fine channels is not constant, the above disclosed values refer to the mean cross-sectional area of the fine channels. In another alternative embodiment, when the cross-sectional area of the fine channels is not constant, the above disclosed values refer to the maximum cross-sectional area of the fine channels. In an alternative embodiment, the cross-section of the fine channels is not circular, squared, rectangular, oval or semicircular among other shapes. In another alternative embodiment, the cross section of the fine channels is not circular. In thermoregulation systems where the components are subjected to important mechanical solicitations, there is always a dilemma between the proximity and the cross section of the channels. If the cross section of the channels is small, then the pressure drop increases and the heat exchange capacity is reduced. In some applications, the total pressure drop may be important. It has been found that in some applications, the total pressure drop in the thermoregulation system should not be too high. In different embodiments, the total pressure drop in the thermoregulation system is less than 7.9 bar, less than 3.8 bar, less than 2.4 bar, less than 1.8 bar, less than 0.8 bar and even less than 0.3 bar. In some applications, the total pressure drop in the thermoregulation system should not be too low. In different embodiments, the total pressure drop in the thermoregulation system is greater than 0.01 bar, greater than 0.1 bar, greater than 0.6 bar, greater than 1.6 bar, greater than 2.1 bar and even greater than 3.1 bar. In some applications, the pressure drop in the fine channels may be important. In some applications, the pressure drop in the fine channels should not be too high. In different embodiments, the pressure drop in the fine channels is less than 5.9 bar, less than 2.8 bar, less than 1.4 bar, less than 0.8 bar, less than 0.5 bar and even less than 0.1 bar. In some applications, the total pressure drop in the fine channels should not be too low. In different embodiments, the total pressure drop in the fine channels is greater than 0.01 bar, greater than 0.09 bar, greater than 0.2 bar, greater than 0.6 bar, greater than 1.1 bar and even greater than 2.1 bar. In an embodiment, the pressure drop is at room temperature (23° C.). In some applications, the rugosity (Ra) within the channels is very important and may be used to describe the flow. In some applications, the Ra should not be too high. In different embodiments, the Ra is less than 49.6 microns, less than 18.7 microns, less than 9.7 microns, less than 4.6 microns and even less than 1.3 microns. In different embodiments, the Ra is greater than 0.2 microns, greater than 0.9 microns, greater than 1.6 microns, greater than 2.1 microns and even greater than 10.2 microns. In some of those applications, it is interesting to have the so-called Slippery effect on the cooling channels. In an embodiment, the rugosity of the cooling channels is intentionally increased and then the cooling channels are impregnated with an oil. In an embodiment, the oil employed for impregnation is a fluorated oil. In an embodiment, the rugosity in the cooling channels is increased by circulating an aggressive fluid through them. In an embodiment, the aggressive fluid comprises an acid. In some applications, where the component is a die, mould or tool that has to cool the sheet which is being conformed, it is interesting to have a high cooling rate of the sheet. In some applications, this can be done using conformal cooling, with the channels located very close to the surface and also with any of the other systems disclosed in the preceding paragraphs. Some embodiments of the present invention allow the use of the latent heat of vaporization of a fluid to achieve a very fast cooling (as disclosed in the preceding paragraphs). In an embodiment, the thermoregulation system mimics the sweating system of humans. By analogy it is referred as sweeting component (when the component is a die, mould or tool in general, it can be referred as sweeting die, sweeting mould, sweating tool . . . ). The sweating die or mould consists of a die or mould with small holes in the surface. The holes carry small quantities of fluid to the active evaporation surface of the component. In an embodiment, the component is a die. In another embodiment, the component is a mould. In another embodiment, the component is a die used in the manufacture of tubular components or structures. In another embodiment, the component is a hot stamping die or mould. In another embodiment, the component is a forming die. In another embodiment, the component is a hot stamping forming die. In an embodiment, the surface of the component refers to the surface of a die. In another embodiment, the surface of the component refers to the surface of a mould. In another embodiment, the surface of the component refers to the surface of a die used in the manufacture of tubular components or structures, In another embodiment, the surface of the component refers to the surface of a hot stamping die or mould. In another embodiment, the surface of the component refers to the surface of a forming die. In another embodiment, the surface of the component refers to the surface of a hot stamping forming die. As previously disclosed, in some embodiments, the aforementioned for a sheet can also be extended to other components such as a tubular component or structure. In an embodiment, the term "sheet" can be replaced by the term "tubular component or structure". In an embodiment, the active evaporation surface is at least part of the surface of the component. In an embodiment, the active evaporation surface refers to the relevant surface (as defined in the preceding paragraphs). In an embodiment, the active evaporation surface refers to the working surface. In some applications, it it is desirable a controlled drip scenario. In contrast for other applications, it a jet or massive fluid supply is preferred. In some applications, it is interesting to have an incomplete droplet formation scenario in the active evaporation surface, this means a droplet that does not break off from the evaporation surface unless it transforms into steam. To determine the scenario that takes place, the fluid pressure, the surface tension, the configuration of the channels, and the outlet of the channels in the active evaporation surface (holes), among others, must be controlled. It is often more convenient to implement a controlled pressure drop system to get a better pressure balance in the holes. As previously disclosed, although in many applications the fluid used may be water, an aqueous solution, an aqueous suspension or any other fluid can also be used in some applications. In an embodiment, the term "fluid" can be replaced by the term "liquid". In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described in the preceding paragraphs). The inlet of the fluid inside the component is often made through a network of channels which are located inside the component. In an embodiment, the channels reach the surface of the component. In an embodiment, there are some holes in the surface of the component. In an embodiment, the holes in the surface of the component are the end of a channel. In some applications, the diameter of the channels that carry the fluid to the active evaporation surface may be important. In some applications, channels with a small diameter are preferred. In different embodiments, the diameter of the channels is less than 1.4 mm, less than 0.9 mm, less than 0.45 mm and even less than 0.18 mm. In some applications, the diameter should not be too small. In different embodiments, the diameter of the channels is greater than 0.08 mm, greater than 0.6, greater than 1.2 mm and even greater than 2.2 mm. In some applications, the pressure difference in the channels may be important. In some applications, the pressure applied to the fluid in the channels that carry the fluid to the active surface should be not too small. In different embodiments, the pressure difference in the channels is 0.8 bar or less, 0.4 bar or less, 0.08 bar or less, and even 0.008 bar or less. In some applications, it is interesting to regulate the average number of droplets of fluid which emerge from the holes. In some applications, the average number of droplets which emerge from the holes should not be too high. In different embodiments, the number of droplets per minute is less than 80, less than 18, less than 4 and even less than 0.8. As previously disclosed, there are applications where it is undesirable that the droplets break off themselves from the holes. In some applications, it has been found that the average number of droplets which emerge from the holes of the channels that carry the fluid to the active evaporation surface should be not too low. In different embodiments, the number of droplets per minute is more than 80, more than 18, more than 4 and even more than 0.8. It has been found that in some applications, it is very important to control the number of holes in the active evaporation surface. In this sense, for some applications, it is more convenient to have a minimum number of holes in the active surface. In different embodiments, the number of holes in the active surface is more than 0.5 holes per $cm^2$, more than 1.2 holes per $cm^2$, more than 6 holes per $cm^2$ and even more than 27 holes per $cm^2$. In some applications, the important thing is the percentage of the active evaporation surface which is holes. In this sense, in an embodiment, at least a 1.2% of the active evaporation surface is holes. In another embodiment, more than a 28% of the evaporation surface is holes. In another embodiment, more than a 62% of the active evaporation surface is holes. In an embodiment, the channels that carry the fluid to the active evaporation surface are fine channels. In an alternative embodiment, the channels that carry the fluid to the active evaporation surface are secondary channels. In another alternative embodiment, the channels that carry the fluid to the active evaporation surface are main channels. In some applications, the distance between the centres of the holes and the active evaporation surface may be important. It has been found that for some applications, the mean distance between the centres of the holes and the active evaporation surface should not be too high. In an embodiment, the mean distance between the centres of the holes and the active evaporation surface is less than 12 times the diameter of the hole. In another embodiment, the mean distance between the centres of the holes and the active evaporation surface is less than 8 times the diameter of the hole. In another embodiment, the mean distance between the centres of the holes and the active evaporation surface is less than 4 times the diameter of the hole. In another embodiment, the mean distance between the centres of the holes and the active evaporation surface is less than 1.4 times the diameter of the hole. In some applications, the surface tension of the liquid which is evaporated on the surface of the component may be important. In different embodiments, the surface tension of the liquid is greater than 22 mM/m, greater than 52 mM/m, greater than 70 mM/m, and even greater than 82 mM/m. In some applications, the surface tension of the fluid being evaporated should not be excessive. In different embodiments, the surface tension is less than 75 mM/m, less than 69 mM/m, less than 38 mM/m, and even less than 18 mM/m. In an embodiment, the surface tension is at room temperature (23° C.). In an embodiment, the surface tension is measured according to ISO 19403-2: 2017. In some embodiments the channels may have different geometries and accumulation zones. In some applications, the network of channels should provide the desired flow to each channel. In addition, in some applications, the network of channels should provide a homogeneous pressure in the outlet of at least part of the channels (the holes). In some applications, the techniques developed for drip irrigation systems, may be replicated for this purpose (sometimes with some adaptation due to the downsize). The inventor has found that for some applications, it is desirable to have a certain pressure difference in a representative group of channels. In different embodiments, the pressure difference in a representative group of channels is less than 8 bar, less than 4 bar, less than 1.8 bar and even less than 0.8 bar. It has been found that some applications do not require a high pressure difference, this is often the case of applications where the diameter of the holes is not too thin. In different embodiments, the pressure difference in a representative group of channels is less than 400 mbar, less than 90 mbar, less than 8 mbar and even less than 0.8 mbar. In some applications, a certain pressure difference in a representative group of channels is preferred. In different embodiments, the pressure difference in a representative group of channels is greater than 0.1 mbar, greater than 0.3 mbar, greater than 1.1 bar and even greater than 1.6 bar. In different embodiments, a representative group of channels is a group of channels in the same evaporation area of the surface, where the evaporation intensity of 35% or more of such channels is required, 55% or more, 85% or more and even 95% or more. In different embodiments, a representative group of channels is 3 or more channels, 4 or more channels, 6 or more channels, 11 or more channels and even 16 or more channels. In some applications, it is preferred below a certain value. In different embodiments, a representative group of channels is 49 or less channels, 29 or less channels, 19 or less channels, 14 or less channels and even 9 or less channels. In some applications, especially when different evaporation intensities in different areas are required, it is desirable to have a certain pressure difference between the hole with the highest pressure and the hole with the lowest pressure. In different embodiments, the pressure difference is greater than 0.012 bar, greater than 0.12 bar, greater than 1.2 bar and even greater than 6 bar. In some applications, the pressure difference between the hole with the highest pressure and the hole with the lowest pressure should be not too high. In different embodiments, the pressure difference is less than 9.4 bar, less than 7.4 bar, less than 3.9 bar, less than 1.9 bar and even less than 0.4 bar. Although in many applications the holes and the cross-section of the channels are circular, the holes and/or the cross section of the channels can have any other geometry and also a variable geometry. This applies to the entire document unless otherwise indicated. An interesting application of the sweeting die and/or of the other thermoregulation systems disclosed in this document is hot stamping. The combination of sweeting components, such as sweating dies, with any of the other thermoregulation systems disclosed throughout this document may be also interesting for other applications besides hot stamping. The aforementioned for hot stamping, or at least part of it, can be extended to other applications, especially to those applications where at least part of the component that needs to be cooled can have a direct contact with water or steam. For applications where the contact with water is detrimental, the channels that go to the active surface can be infiltrated with a metal or a high thermal conductivity metal and/or alloy, such as Ag, Cu, Al . . . , so that the channels would have a better contribution to the total heat removal capacity on the active surface of the component. In fact, in this way, the thermoregulation capacity is improved both in the sense of cooling and in the sense of heating. For some applications, it is not convenient that the metal or high thermal conductivity alloy protrudes over the active surface before infiltration, at least in some areas, in those cases the channels may lack holes and finish below the active surface, so that the metal or the high thermal conductivity alloy does not reach the surface of the component. In an embodiment, the design of the cooling channels can be done using any available simulation software. The design of the cooling channels includes: determination of the type of channels, size, length, distance to the working surface and flow rate of the coolant (cooling media) among others. In an embodiment, the distance between the working surface of the component and a channel is the minimum distance between any point of the envelope of the channel and the working surface of the component. In an embodiment, the channels are located close to the working surface of the component. In different embodiments, the cross-section of the fine channels is selected from circular, squared, rectangular, oval and/or semicircular. In some applications, the distance between the envelope of the channel and the working surface may be important. In some applications, the distance between the envelope of the channel and the working surface should not be too high. In different embodiments, the distance between any point of the envelope of the channel and the working surface of the component is less than 75 mm, less than 51 mm, less than 46 mm, less than 39 mm, less than 27 mm, less than 19 mm, less than 12 mm, less than 10 mm and even less than 8 mm. For some applications, even lower distances are preferred. In different embodiments, the distance between any point of the envelope of the channel and the working surface is less than 7.8 mm, less than 7.4 mm, less than 6.9 mm, less than 6.4 mm, less than 5.8 mm, less than 5.4 mm, less than 4.9 mm, less than 4.4 mm, less than 3.9 mm, and even less than 3.4 mm. In an embodiment, the channels are tempering channels. In an embodiment, the channels are cooling channels. In an embodiment, the cooling channels are tempering channels. In an embodiment, the channels are main channels and/or secondary channels and/or fine channels. In another embodiment, the channels are main channels. In another embodiment, the channels are main channels and secondary channels. In another embodiment, the channels are main channels, secondary channels and fine channels. In another embodiment, the channels are main channels and fine channels. In another embodiment, the channels are secondary channels and fine channels. In another embodiment, the channels are secondary channels. In another embodiment, the channels are fine channels. In an embodiment, the component comprises at least three different types of cooling channels which are located inside the component. In an embodiment, the at least three types of cooling channels are main channels, secondary channels and fine channels. In another embodiment, the component comprises at least one type of cooling channels (which are located inside the component). In an embodiment, the cooling channels are selected from main channels, secondary channels and/or fine channels (capillaries). Another possible implementation of the thermoregulation systems disclosed in this document is in applications where the component comprises neighboring areas with different temperature settings (or different thermoregulation requirements), i.e. the component has neighboring areas which are cooled or heated with different intensity or the component has some areas which are heated while others are cooled. In some applications, the methods disclosed in this document allow the thermoregulation of neighboring areas. In some applications, the thermoregulation (cooling and/or heating) can be carried out by means of the heat exchange with a fluid flowing through certain channels (in different ways). In some applications, the Reynolds number (describes the degree of laminar or turbulent flow) may be important. In different embodiments, the fluid flows in the channels in such a way that the Reynolds number is greater than 2800, greater than 4200, greater than 12000, and even greater than 22000. In some applications, lower values are preferred. In different embodiments, the Reynolds number is less than 26000, less than 14000, less than 4900, less than 3900 and even less than 3400. In some applications, the speed of the fluid in the channels may be important. For some applications, a high speed can help thermoregulation. In different embodiments, the mean speed of the fluid is greater than 0.7 m/s, greater than 1.6 m/s, greater than 2.2 m/s, greater than 3.5 m/s and even greater than 5.6 m/s. For some applications, a very high speed may be detrimental. In different embodiments, the mean speed of the fluid is less than 14 m/s, less than 9 m/s, less than 4.9 m/s, and even less than 3.9 m/s. In some applications, heating is carried out by conduction (or using any other method based on the Joule effect), by induction with inserted or embedded coils (or by any system based on eddy currents), or by radiation, among others. In some applications, the methods disclosed in this document allow the thermoregulation by means of the heat&cool technology (as defined elsewhere in this document). The fact of having heating and cooling areas which are very close together (sometimes referred as heat&cool in this document) can be capitalized for many applications like for example when the surface of the component should be cooled and heated at different time intervals. In this case, it is convenient to have the cooling channels close to the heating channels in order to activate alternately cooling and heating. For some applications, and specially for manufacturing applications where heat must be removed from the manufactured component (like is the case for example in die casting and plastic injection applications), the methods disclosed in this document allow the manufacture of components that can actively help to fill complex geometries without seriously compromising productivity through the use of systems where water can accelerate very fast. The water is left motionless or with a laminar flow during filling, and then the flow is changed very fast to a very turbulent regime—or at least turbulent enough—to remove heat very fast. As previously disclosed, although in many applications the fluid used may be water, an aqueous solution, an aqueous suspension or any other fluid can also be used in some applications. In an embodiment, the term "fluid" can be replaced by the term "liquid". In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described in the preceding paragraphs). The transition moment is regulated in different areas of the component to have a controlled filling and solidification path. In an embodiment, the component is manufactured with a material having at least a part with high enough thermal conductivity at room temperature (23° C.). In an embodiment, the component is manufactured with a material having at least an area of the surface with high enough density of cooling channels close enough to the surface. In an embodiment, there is a sufficient difference in the Reynolds number at two different moments in the working cycle. In an embodiment, the component is manufactured with a material having at least a part with high enough thermal conductivity at room temperature (23° C.), at least an area of the surface with high enough density of cooling channels close enough to the surface, and a sufficient difference in the Reynolds number at two different moments in the working cycle. In an embodiment, the component is manufactured with a material having at least a part with high enough thermal conductivity at room temperature (23° C.), at least two areas of the surface with high enough density of cooling channels close enough to the surface and a sufficient difference in the Reynolds number at two different moments in the working cycle. In an embodiment, the component is a die. In another embodiment, the component is a mould. In another embodiment, the component is a die used in the manufacture of tubular components or structures. In another embodiment, the component is a hot stamping die or mould. In another embodiment, the component is a forming die. In another embodiment, the component is a hot stamping forming die. In an embodiment, the component is a plastic forming tool or die. In another embodiment, the component is a plastic injection tool or die. In another embodiment, the component is a die casting die. In some applications, the area of the surface with high enough density of cooling channels close enough to the surface may be important. In different embodiments, the area with high enough density of cooling channels close enough to the surface is at least 0.001% of the surface, at least 0.1% of the surface, at least 2% of the surface, at least 11% of the surface, at least 51% of the surface, and even at least 91% of the surface. In different embodiments, close enough to the surface means that the distance of the cooling channels to the surface is 14 mm or less, 8 mm or less, 6 mm or less, 4 mm or less, 2 mm or less, and even 1 mm or less. In an embodiment, a high enough density of cooling channels means that at least a 3% of the area below the surface is a coolant path (an area with high enough density of cooling channels close enough to the surface). In another embodiment, a high enough density of cooling channels means that at least a 6% of the area below the surface is a coolant path. In another embodiment, a high enough density of cooling channels means that at least an 11% of the area below the surface is a coolant path. In another embodiment, a high enough density of cooling channels means that at least a 21% of the area below the surface is a coolant path. In another embodiment, a high enough density of cooling channels means that at least a 51% of the area below the surface is a coolant path. In another embodiment, a high enough density of cooling channels means that at least a 61% of the area below the surface is a coolant path. In another embodiment, a high enough density of cooling channels means that at least an 81% of the area below the surface is a coolant path. In an embodiment, the surface refers to the working surface. In different embodiments, a high enough thermal conductivity means 12 W/mK or more, 24 W/mK or more, 36 W/mK or more, 42 W/mK or more, 46 W/mK or more, and even 52 W/mK or more. The above disclosed values of thermal conductivity are at room temperature (23° C.). In an embodiment, thermal conductivity is measured according to ASTM E1461-13. In different embodiments, a sufficient difference in Reynolds number means at least 600, at least 1200, at least 2400, at least 5500, at least 11000, at least 26000, and even at least 60000. For non-circular cooling channels, the hydraulic diameter is used to calculate the Reynolds number (ReD). In some embodiments, rather than the difference in Reynolds number, what is more relevant is the maximum (should be high enough) and minimum (should be low enough) Reynolds number. In different embodiments, the maximum Reynolds number is greater than 1100, greater than 2200, greater than 6000, greater than 11000, greater than 32000 and even greater than 110000. In different embodiments, the minimum Reynolds number is below 9000, below 1900, below 900, below 400, and even below 90. In an alternative embodiment, the Reynolds number should be replaced by the Nusselt number. The Nusset number is calculated by dividing the Reynolds number by 12. When it comes to the original problem of pursuing a controlled exact amount distribution of a fluid on a metallic surface, one very surprising observation the inventor has found, is that for several applications, the problem can be solved with the conditioning of the surface with at least two different materials and/or patterns leading to different contact angle hysteresis. In some applications, even when sprayed with a nozzle that evenly sprays on the surface the distributed-liquid, in a matter of seconds or even fractions of second, the droplets position themselves on the areas of the surface with high hysteresis, and the amount of distributed-liquid remaining can very surprisingly be controlled in a reproducible way. In an embodiment, at least two different areas exist in the components surface with different contact angle hysteresis with the distributed-liquid. In an embodiment, at least two different areas exist in the components surface one of them presenting a Wenzel wetting mode and the other a Cassie wetting mode. In an embodiment, the amount and shape of the high hysteresis zones is selected to capture the proper amount of distributed-liquid (as described in the preceding paragraphs). In an embodiment, the amount and shape of the high hysteresis zones is selected so that the majority of the distributed-liquid is present in the relevant surface of the component in the form of droplets with a size which is appropriate (as described in the preceding paragraphs). In an embodiment, distributed-liquid is projected to at least some of the components surface and it rearranges in a reproducible manner (in terms of total amount of distributed liquid, distributed-liquid shape and/or distributed-liquid placement). In an embodiment, the projection of distributed liquid is done with nozzles. In an embodiment, the projection of distributed-liquid is done with aerosols. In an embodiment, the projection of distributed liquid is done with sprays. In an embodiment, the projection of distributed liquid is done with pulverizers. In an embodiment, the projection of distributed liquid is done with a system that employs accelerated liquid. In an embodiment, the projection of distributed liquid is done with a system that employs pressurized liquid. In an embodiment, the projection of distributed liquid is done with a system that employs pressurized liquid flowing through constrained orifices. In an embodiment, the projection of distributed liquid is done with a system that employs curtain type nozzles. In an embodiment, the projection of distributed liquid is done with a system that employs spreading type nozzles. In an embodiment, the projection of distributed-liquid is done with a system that employs homogeneous distribution type nozzles. As previously disclosed, although in many applications the liquid used may be water, an aqueous solution, an aqueous suspension or any other fluid can also be used in some applications. In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described in the preceding paragraphs). In an embodiment, the projected distributed-liquid exits the low hysteresis areas of the surface and gets retained in the high hysteresis areas. In some applications, the difference of contact angle hysteresis with the distributed-liquid, between the areas with the highest values and those with the lowest can be quite important. In an embodiment, the difference of contact angle hysteresis with the distributed-liquid, between the areas with the highest values and those with the lowest is 2° or more. In another embodiment, the difference in the hysteresis values is 5.2° or more. In another embodiment, the difference in the hysteresis values is 12° or more. In another embodiment, the difference in the hysteresis values is 32° or more. In another embodiment, the difference in the hysteresis values is 52° or more. In another embodiment, the difference in the hysteresis values is 102° or more. In another embodiment, the difference in the hysteresis values is 152° or more. In some applications, the contact angle hysteresis difference should not be excessive. In an embodiment, the difference in the hysteresis values is 174° or less. In another embodiment, the difference in the hysteresis values is 168° or less. In another embodiment, the difference in the hysteresis values is 164° or less. In another embodiment, the difference in the hysteresis values is 149° or less. In some applications, it is critical that at least some areas present a low enough contact angle hysteresis. In an embodiment, at least one area of the component surface presents a contact angle hysteresis with the distributed-liquid which is 19° or lower. In another embodiment, at least one area of the component surface presents a contact angle hysteresis with the distributed-liquid which is 9° or lower. In another embodiment, at least one area of the component surface presents a contact angle hysteresis with the distributed-liquid which is 4° or lower. In another embodiment, at least one area of the component surface presents a contact angle hysteresis with the distributed-liquid which is 1.9° or lower. In another embodiment, at least one area of the component surface presents a contact angle hysteresis with the distributed-liquid which is 0.9° or lower. In an embodiment, the difference in hysteresis is attained through the surface conditioning. In another embodiment, the difference in hysteresis is attained through the surface conditioning with at least two different patterns. In another embodiment, the difference in hysteresis is attained through the surface conditioning with the application of a hydrophobic coating to at least part of the surface of the component and the overcoating in some areas of this mentioned coating with another hydrophilic coating. In another embodiment, the difference in hysteresis is attained through the surface conditioning with the application of a hydrophilic coating to at least part of the surface of the component and the overcoating in some areas of this mentioned coating with another hydrophilic coating. In another embodiment, the difference in hysteresis is attained through the surface conditioning with the application of a hydrophobic coating to at least part of the surface of the component and the texturizing in some areas of this mentioned coating with a hydrophilic pattern. In another embodiment, the difference in hysteresis is attained through the surface conditioning with the application of a hydrophilic coating to at least part of the surface of the component and the overcoating in some areas of this mentioned coating with another hydrophobic coating. In an embodiment, the difference in hysteresis is attained through the surface conditioning with the application of a hydrophilic coating to at least part of the surface of the component and the texturizing in some areas of this mentioned coating with a hydrophobic pattern. In an embodiment, to reinforce the hydrophobic behavior in any embodiment in this document, a hydrophobic pattern is applied on a hydrophobic coating. In an embodiment, to reinforce the hydrophilic behavior in any embodiment in this document, a hydrophilic pattern is applied on a hydrophilic coating. In some applications, it is interesting the amount of overall component surface than remains with a hydrophilic coating and/or patter. In an embodiment, in the outermost surface of the component in the areas where the surface has been conditioned, a sufficient amount remains with a high enough contact hysteresis angle with the distributed-liquid. In an embodiment, a sufficient amount is a 2% or more. In another embodiment, a sufficient amount is a 6% or more. In another embodiment, a sufficient amount is a 12% or more. In another embodiment, a sufficient amount is a 22% or more. In another embodiment, a sufficient amount is a 52% or more. In another embodiment, a sufficient amount is an 82% or more. In some applications the surface area that remains somewhat hydrophilic should not be excessive. In an embodiment, a sufficient amount is a 94% or less. In another embodiment, a sufficient amount is an 89% or less. In another embodiment, a sufficient amount is a 78% or less. In another embodiment, a sufficient amount is a 49% or less. In another embodiment, a sufficient amount is a 29% or less. In an embodiment, a high enough contact angle hysteresis is 2° or more. In another embodiment, a high enough contact angle hysteresis is 6° or more. In another embodiment, a high enough contact angle hysteresis is 12° or more. In another embodiment, a high enough contact angle hysteresis is 52° or more. In another embodiment, a high enough contact angle hysteresis is 102° or more. In an embodiment, in the outermost surface of the component in the areas where the surface has been conditioned, a sufficient amount remains with a low enough contact angle hysteresis with the distributed-liquid. In an embodiment, a sufficient amount is a 2% or more. In another embodiment, a sufficient amount is a 6% or more. In another embodiment, a sufficient amount is a 12% or more. In another embodiment, a sufficient amount is a 22% or more. In another embodiment, a sufficient amount is a 52% or more. In another embodiment, a sufficient amount is a 66% or more. In another embodiment, a sufficient amount is an 82% or more. In some applications the surface area that remains somewhat hydrophobic should not be excessive. In an embodiment, a sufficient amount is a 94% or less. In another embodiment, a sufficient amount is a 79% or less. In another embodiment, a sufficient amount is a 49% or less. In another embodiment, a sufficient amount is a 29% or less. In another embodiment, a sufficient amount is a 19% or less. In an embodiment, a low enough contact angle hysteresis is 49° or less. In an embodiment, a low enough contact angle hysteresis is 19° or less. In another embodiment, a low enough contact angle hysteresis is 9° or less. In another embodiment, a low enough contact angle hysteresis is 4.9° or less. In another embodiment, a low enough contact angle hysteresis is 1.9° or less. In another embodiment, a low enough contact angle hysteresis is 0.9° or less. In an embodiment, the contact angle hysteresis difference is reinforced through the introduction of chemical heterogeneities. In an embodiment, the heterogeneities are introduced through ion implantation. In an embodiment, the heterogeneities are deposited on the sites of interest on the surface. In an embodiment, higher surface energy components are employed as heterogeneities to pin the preceding line. In an embodiment, higher surface energy means 0.2 dyn/cm more surface energy with the distributed-liquid than the surface material before any heterogeneities have been introduced. In another embodiment, higher surface energy means 1.2 dyn/cm more surface energy. In another embodiment, higher surface energy means 12 dyn/cm more surface energy. In another embodiment, higher surface energy means 22 dyn/cm more surface energy. In an embodiment, lower surface energy components are employed as heterogeneities to pin the advancing line. In an embodiment, lower surface energy means 0.2 dyn/cm less surface energy with the distributed-liquid than the surface material before any heterogeneities have been introduced. In an embodiment, lower surface energy means 1.2 dyn/cm less surface energy. In another embodiment, lower surface energy means 5.2 dyn/cm less surface energy. In another embodiment, lower surface energy means 12 dyn/cm less surface energy. In an embodiment, the contact angle hysteresis difference is reinforced through the introduction of topological heterogeneities. In an embodiment, the contact angle hysteresis difference is reinforced through the introduction of topological heterogeneities through surface patterning. In an embodiment, the contact angle hysteresis difference is reinforced through the introduction of topological heterogeneities through surface texturing. In an embodiment, the introduction of topological heterogeneities is done through laser texturing. In another embodiment, the introduction of topological heterogeneities is done through electron-beam texturing. In another embodiment, the introduction of topological heterogeneities is done through any surface conditioning means described elsewhere in the document. In some instances of this document, including the present aspect, where contact angle and contact angle hysteresis are important, it has been found that for some of those applications, the pitch of the texture pattern is important. The pitch is the critical distance of the pattern. In an embodiment, the critical distance of the pattern is the minimum distance between two adjacent topological relative extremes of the same sign (two maximums or two minimums). In an alternative embodiment, the critical distance of the pattern is the minimum distance between two adjacent topological relative extremes of opposite sign (a maximum—hill— and a minimum—valley—). In another alternative embodiment, the critical distance of a regular pattern is the minimum distance between two identical points in the pattern. In an embodiment, the pitch should be 9 mm or less. In another embodiment, the pitch should be 4 mm or less. In another embodiment, the pitch should be 0.9 mm or less. In another embodiment, the pitch should be 740 microns or less. In another embodiment, the pitch should be 450 microns or less. For some applications very small pitch values have proven to be very effective. In an embodiment, the pitch should be 190 microns or less. In another embodiment, the pitch should be 90 microns or less. In another embodiment, the pitch should be 40 microns or less. In another embodiment, the pitch should be 19 microns or less. In another embodiment, the pitch should be 9 microns or less. In another embodiment, the pitch should be 4 microns or less. And even submicrometric pitches can be interesting. In another embodiment, the pitch should be 900 nanometers or less. In another embodiment, the pitch should be 690 nanometers or less. In another embodiment, the pitch should be 390 nanometers or less. In another embodiment, the pitch should be 90 nanometers or less. In an embodiment, the conditioned surface refers to at least part of the surface of the component. All the different embodiments disclosed above may be combined in any combination provided they are not mutually exclusive.

In some applications, the use of a component wherein at least part of the surface has been coated can be quite important. In an embodiment, the component is a die. In another embodiment, the component is a mould. In another embodiment, the component is a die used in the manufacture of tubular components or structures. In another embodiment, the component is a hot stamping die or mould. In another embodiment, the component is a forming die. In another embodiment, the component is a hot stamping forming die. In an embodiment, the component is a plastic forming tool or die. In another embodiment, the component is a plastic injection tool or die. In another embodiment, the component is a die casting die. It has been found for some applications, that it is especially advantageous to use a nanostructured coating to provide simultaneously wear resistance, a proper contact angle and a proper contact angle hysteresis. The values for the proper contact angle and the values for the proper contact angle hysteresis have been provided elsewhere. In an embodiment, the coating is a DLC type coating (diamond like carbon). In an embodiment, the coating is a DLC with inorganic nanoparticles embedded in the coating. In an embodiment, the coating is a DLC with metal nanoparticles embedded in the coating. In an embodiment, the coating is a DLC-M with metal nanoparticles embedded in the coating, where M is the metal nanoparticles. In an embodiment, M comprises a metal. In an embodiment, M is a metal. In an embodiment, M comprises a transition metal. In an embodiment, more than one type of nanoparticles are embedded into the coating. In an embodiment, the nanoparticles are composed of several elements. In an embodiment, the nanoparticles are composed of metals, intermetallics and/or ceramics. It has been observed with great surprise, that in some applications, a strange phenomenon might take place, which we have named FDE—"fallen droplet effect" for shortness. What happens with some coatings, including some DLC coatings, is that the right contact angle and hysteresis angle can be attained for a certain droplet size, but when this size is surpassed the droplet is no longer hold in place and falls, which could be expected but then when trying to re-grow a new droplet in the place where the fallen droplet was held until it slipped, the new droplet fails to attain the desirable contact angle hysteresis value. This effect can be very negative for some applications. The FDE effect seems to disappear in some cases once the rests of the fallen droplet have been evaporated and the surface is dry. This adds an extra unexpected complication in the selection of the surface morphology through texturing or the selection of the outmost coating of the die or piece. In some embodiments, this effect is minimized when enough electrostatic charging on the droplets is employed. In some embodiments, it is preferably to work with less optimal contact angle hysteresis values but minimizing or avoiding the FDE effect. For some applications, it is sufficient to measure the hysteresis of the contact angle on a droplet grown on a fallen droplet and assure the right angle for this secondary hysteresis contact angle is achieved. In an embodiment, a droplet is grown on a vertical surface until it is too large to be sustained and a second droplet is grown right after the falling of the first droplet and before the remainders of the fallen droplet evaporate. In an embodiment, the second droplet should be grown within the first 190 seconds after the fall of the first droplet. In another embodiment, the second droplet should be grown within the first 140 seconds after the fall of the first droplet. In another embodiment, the second droplet should be grown within the first 90 seconds after the fall of the first droplet. In another embodiment, the second droplet should be grown within the first 40 seconds after the fall of the first droplet. In another embodiment, the second droplet should be grown within the first 9 seconds after the fall of the first droplet. In an embodiment, the same values are employed for the secondary hysteresis contact angle as for the hysteresis contact angle. In an embodiment, the secondary hysteresis contact angle is 2° or more. In another embodiment, the secondary hysteresis contact angle is 6° or more. In another embodiment, the secondary hysteresis contact angle is 11° or more. In another embodiment, the secondary hysteresis contact angle is 14° or more. In another embodiment, the secondary hysteresis contact angle is 22° or more. In another embodiment, the secondary hysteresis contact angle is 52° or more. In another embodiment, the secondary hysteresis contact angle is 112° or more. In an embodiment, the secondary hysteresis contact angle is 178° or less. In another embodiment, the secondary hysteresis contact angle is 148° or less. In another embodiment, the secondary hysteresis contact angle is 98° or less. In another embodiment, the secondary hysteresis contact angle is 78° or less. In another embodiment, the secondary hysteresis contact angle is 48° or less. All the secondary hysteresis contact angle values disclosed above may be combined in any combination provided they are not mutually exclusive, for example: a secondary hysteresis contact angle which is 2° or more and 178° or less, wherein the hysteresis contact angle is measured at room temperature (23° C.) according to ISO 19403-2:2017. In an embodiment, the coating comprises a nitriding with a superficial oxidation (like the commercial coating ionite-OX). In an embodiment, the coating comprises a thick PVD coating that has been etched to attain the desirable contact angle hysteresis and secondary contact angle hysteresis. In some applications, it has been found, that it is advantageous to attain the selected contact angle hysteresis and secondary contact angle hysteresis, to select a tool steel with large primary carbides, mechanically polish the material in a way that the primary carbides stick out of the surface and then coat such surface which is somewhat structured by the protuberances of the primary carbides. In an embodiment, the material of the component is a tool material. In an embodiment, the material of the component comprises a tool material. In an embodiment, at least part of the material of the component is a tool material. In an embodiment, a tool material is chosen which comprises primary carbides. In an embodiment, a tool material is chosen which comprises a volume fraction of 0.1% or more of primary carbides. In another embodiment, a tool material is chosen which comprises a volume fraction of 1.2% or more of primary carbides. In another embodiment, a tool material is chosen which comprises a volume fraction of 4.2% or more of primary carbides. In another embodiment, a tool material is chosen which comprises a volume fraction of 6.1% or more of primary carbides. In another embodiment, a tool material is chosen which comprises a volume fraction of 11% or more of primary carbides. In another embodiment, a tool material is chosen which comprises a volume fraction of 33% or more of primary carbides. Excessive primary carbides are detrimental for several applications due to the lack of stress corrosion cracking resistance and for other applications due to the surface patterning. In an embodiment, a tool material is chosen which comprises a volume fraction of 89% or less of primary carbides. In another embodiment, a tool material is chosen which comprises a volume fraction of 49% or less of primary carbides. In another embodiment, a tool material is chosen which comprises a volume fraction of 19% or less of primary carbides. In another embodiment, a tool material is chosen which comprises a volume fraction of 9% or less of primary carbides. All the embodiments disclosed above may be combined in any combination provided they are not mutually exclusive, for example a tool material comprising a volume fraction of 0.1% or more and 89% or less of primary carbides. In an embodiment, the tool steel selected comprising primary carbides is a stainless steel. In an embodiment, a tool steel is selected which comprises primary carbides and which is superficially abraded by some mechanical means. In an embodiment, a tool steel is selected which comprises primary carbides and which is superficially abraded by some chemical means. In an embodiment, a tool steel is selected which comprises primary carbides and which is superficially polished. In an embodiment, a tool steel is selected which comprises primary carbides and which is coated. In an embodiment, a tool steel is selected which comprises primary carbides and which is superficially coated with a PVD coating at least partially. In an embodiment, a tool steel is selected which comprises primary carbides and which is superficially coated with a CVD coating at least partially. In an embodiment, the coating employed comprises nitrides. In an embodiment, the coating comprises aluminum titanium nitride (AlTiN). In an embodiment, the coating employed comprises chromium. In an embodiment, the coating employed comprises aluminum. In an embodiment, the coating employed comprises aluminium and chromium nitrides. Needless to say for some applications, coatings of particular thicknesses as described elsewhere and etchings or patterning on the coatings can be advantageous in an additive way. In an embodiment, a stainless tool steel is selected for the tooling material which is at least partially coated with an AlCrN comprising coating. All the different embodiments disclosed above may be combined in any combination provided they are not mutually exclusive.

For some applications, it is interesting to select as tooling material a tool steel with high thermal conductivity. In some of those applications, it is interesting to have the so-called Slippery effect on the cooling channels. In an embodiment, the rugosity of the cooling channels is intentionally increased and then the cooling channels are impregnated with an oil. In an embodiment, the oil employed for impregnation is a fluorated oil. In an embodiment, the rugosity in the cooling channels is increased by circulating an aggressive fluid through them. In an embodiment, the aggressive fluid comprises an acid.

For some sheets it has been found that it can be interesting to maintain the sheet at high temperature or even re-heat prior to executing the fast cooling indicated in the present invention (the very fast cooling as disclosed in the preceding paragraphs). Specially for Zn coatings and other coatings with high cracking propensity, some different heat treatments of the sheet might be recommendable to optimize the absence of cracks in the coating. In an embodiment, the sheet is maintained at a temperature above 510° C. for at long enough time prior to letting the sheet come in contact with the water droplets. In another embodiment, the sheet is maintained at a temperature above 610° C. for at long enough time prior to letting the sheet come in contact with the water droplets. In another embodiment, the sheet is maintained at a temperature above 710° C. for at long enough time prior to letting the sheet come in contact with the water droplets. In an embodiment, the sheet is pre-formed. In an embodiment, the sheet is maintained at a temperature above 510° C. for at long enough time prior to letting the sheet or pre-formed component come in contact with the water droplets. In another embodiment, the sheet is maintained at a temperature above 610° C. for at long enough time prior to letting the sheet or pre-formed component come in contact with the water droplets. In another embodiment, the sheet is maintained at a temperature above 710° C. for at long enough time prior to letting the sheet or pre-formed component come in contact with the water droplets. In an embodiment, the sheet is re-heated increasing its temperature in at least 10° C. in the time between its first austenitization treatment and the first contact with the water droplets in the way described in this invention. In another embodiment, the sheet is re-heated increasing its temperature in at least 52° C. in the time between its first austenitization treatment and the first contact with the water droplets in the way described in this invention. In another embodiment, the sheet is re-heated increasing its temperature in at least 102° C. in the time between its first austenitization treatment and the first contact with the water droplets in the way described in this invention. In another embodiment, the sheet is re-heated increasing its temperature in at least 210° C. in the time between its first austenitization treatment and the first contact with the water droplets in the way described in this invention. In an embodiment, a fast cooling is employed between the first austenitization and the reheating. In an embodiment, a fast cooling comprising sublimation or evaporation is employed between the first austenitization and the reheating. In an embodiment, a long enough time is 2 seconds or more. In another embodiment, a long enough time is 5 seconds or more. In another embodiment, a long enough time is 12 seconds or more. In another embodiment, a long enough time is 22 seconds or more. In an embodiment, a long enough time is 14 minutes or less. In another embodiment, a long enough time is 4 minutes or less. In another embodiment, a long enough time is 50 seconds or less. In another embodiment, a long enough time is 24 seconds or less. As previously disclosed, although in some applications the liquid used may be water, an aqueous solution, an aqueous suspension or any other fluid can also be used in some embodiments. In some embodiments, the term "water" can be replaced by the term "liquid". In an embodiment, the cooling media is a fluid. In another embodiment, the cooling media is a liquid. In another embodiment, the liquid is water. In another embodiment, the liquid is an aqueous solution. In another embodiment, the liquid is an aqueous suspension. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described in the preceding paragraphs). As previously disclosed, in some embodiments, the aforementioned for a sheet can also be extended to other components such as a tubular component or structure. In an embodiment, the term "sheet" can be replaced by the term "tubular component or structure". All the different embodiments disclosed above may be combined in any combination provided they are not mutually exclusive.

Another problem to be solved that serves as an implementation here for the hot stamping problem presented above, and that in the previous case is novel and with applicability beyond hot stamping and thus can constitute a stand-alone invention is the following: homogeneously cooling a hot material taking advantage of the heat of vaporization of a liquid despite the propensity to Leidenfrost phenomenon. This is often the case in the hot stamping application mentioned before, but also in many other applications. In fact, the technology described in this aspect of the invention can also work for applications where the Leidenfrost effect is not as problematic. Some hot metallic surfaces are extremely difficult to wet, due to the formation of a vapour layer between the liquid droplet and the hot surface strongly deteriorating the heat transference as well. The problem can be solved by forcing the tooling surface against the hot metal in an scenario where the tooling surface is very impenetrable by the distributed-liquid. In an embodiment, at least part of the surface of the component is conditioned with a high contact angle with the distributed-liquid and simultaneously a high contact angle hysteresis. In an embodiment, a high contact angle is 62° or more. In another embodiment, a high contact angle is 92° or more. In another embodiment, a high contact angle is 102° or more. In another embodiment, a high contact angle is 126° or more. In another embodiment, a high contact angle is 152° or more. In another embodiment, a high contact angle is 172° or more. In an embodiment, a high contact angle hysteresis is 2° or more. In another embodiment, a high contact angle hysteresis is 6° or more. In another embodiment, a high contact angle hysteresis is 12° or more. In another embodiment, a high contact angle hysteresis is 52° or more. In another embodiment, a high contact angle hysteresis is 72° or more. In another embodiment, a high contact angle hysteresis is 102° or more. In another embodiment, a high contact angle hysteresis is 142° or more. In some applications, the contact angle should not be excessively high. In some applications, the high contact angle should not exceed a certain value. In an embodiment, a high contact angle should not exceed 178°. In another embodiment, a high contact angle should not exceed 174°. In another embodiment, a high contact angle should not exceed 169°. In another embodiment, a high contact angle should not exceed 169°. In another embodiment, a high contact angle should not exceed 159°. In some applications the contact angle hysteresis should not be excessively high. In an embodiment, a high contact angle hysteresis should not exceed 174°. In another embodiment, a high contact angle hysteresis should not exceed 169°. In another embodiment, a high contact angle hysteresis should not exceed 164°. In another embodiment, a high contact angle hysteresis should not exceed 159°. In some applications, what should be observed is the relation between the contact angle and the contact angle hysteresis. In an embodiment, contact angle hysteresis has to be equal or greater than LCACAH*contact angle (Δθ≥LCACAH*θ), where LCACAH is a parameter. In an embodiment, LCACAH is 0.1. In another embodiment, LCACAH is 0.2. In another embodiment, LCACAH is 0.5. In another embodiment, LCACAH is 0.6. In another embodiment, LCACAH is 0.85. In an embodiment, the contact angle hysteresis has to be equal or smaller than HCACAH*contact angle (Δθ≤HCACAH*θ), where HCACAH is a parameter. In an embodiment, HCACAH is 0.98. In another embodiment, HCACAH is 0.95. In another embodiment, HCACAH is 0.88. In another embodiment, HCACAH is 0.85. In another embodiment, HCACAH is 0.68. In some embodiments, the lower limit for the contact angle hysteresis in relation to the contact angle has to be expressed in a somewhat more complex way. In an embodiment:

$$\text{If } \theta \le (140 - FRL*RDL) \text{ then: } \Delta\theta \ge TRL*RDL;$$

$$\text{If } \theta > (140 - FRL*RDL) \text{ then: } \Delta\theta \ge TRL*RDL*\sqrt{(\theta - 140 + FRL*RDL)}$$

When a value for Δθ≥HCACAH*θ is obtained then it is substituted by HCACAH*θ.

Where θ is the contact angle between the distributed liquid and the conditioned surface being analysed in degrees (°). Δθ is the contact angle hysteresis between the distributed liquid and the conditioned surface being analysed in degrees (°). RDL is the radius of the average size of the droplet of the distributed-liquid in the relevant surface (as described in the preceding paragraphs) in millimeters (mm). FRL and TRL are parameters. In an embodiment, FRL is 6. In another embodiment, FRL is 8. In another embodiment, FRL is 10. In another embodiment, FRL is 12. In another embodiment, FRL is 16. In another embodiment, FRL is 20. In an embodiment, TRL is 7. In another embodiment, TRL is 12. In another embodiment, TRL is 14. In another embodiment, TRL is 16. In another embodiment, TRL is 21. Few applications are better off with rather higher hysteresis for high contact angles. In an embodiment:

$$\text{If } \theta \le (140 - FRL*RDL) \text{ then: } \Delta\theta \ge TRL*RDL;$$

$$\text{If } \theta > (140 - FRL*RDL) \text{ then: } \Delta\theta \ge TRL*RDL*(\theta - 140 + FRL*RDL)^{2/3}$$

When a value for Δθ≥HCACAH*θ is obtained then it is substituted by HCACAH*θ.

In an embodiment:

$$\text{If } \theta \le (140 - FRL*RDL) \text{ then: } \Delta\theta \ge TRL*RDL;$$

$$\text{If } \theta > (140 - FRL*RDL) \text{ then: } \Delta\theta \ge TRL*RDL*(\theta - 140 + FRL*RDL)$$

When a value for Δθ≥HCACAH*θ is obtained then it is substituted by HCACAH*θ.

And even in an embodiment:

$$\text{If } \theta \ f \text{ even } FRL*RDL) \text{ then: } \Delta\theta \geq TRL*RDL;$$

$$\text{If } \theta > (140 - FRL*RDL) \text{ then: } \Delta\theta \geq TRL*RDL*(\theta - 140 + FRL*RDL)^2$$

When a value for Δθ≥HCACAH*θ is obtained then it is substituted by HCACAH*θ.

In an embodiment, the previous formulas are used with given values of θ and Δθ and the allowable values of RDL are determined.

In the hot stamping problem discussed here, as was mentioned, the durability of the tooling is also very important since it leads to reduced maintenance. In this case the problem to be solved reads: Reducing the thermal load and/or wear on a tool shaping a hot material comprising a metal, without dramatically lowering the heat transference capability. Again, the solution provided to this problem is novel and with applicability beyond hot stamping and thus can constitute an invention on its own. In fact its applicability to die casting is so interesting that it will be treated with quite some detail in this document. In some applications, the wetting behavior of the molten metal in the case of casting applications or the sheet surface in the case of sheet metal forming applications is important to the wear behavior and thermal load. In an embodiment, in the case of hot stamping, the surface conditioning is chosen with the wetting behavior characteristics of the coating of the sheet in a molten state on the modified surface. In an embodiment, for the case of sheet forming, a material with the mean composition of the outmost layer of the sheet or sheet coating to be processed at the moment where the first contact between the sheet (sheet coating) and the modified surface takes place is molten 100° C. above its melting point to determine contact and contact hysteresis angles and fit in the definitions where "the molten metal" is employed to refer to the processed material although in the real application the processed material is shaped in solid form. As previously disclosed, in some embodiments, the aforementioned for a sheet can also be extended to other components such as a tubular component or structure. In an embodiment, the term "sheet" can be replaced by the term "tubular component or structure". In an embodiment, the surface conditioning is made with care to provide for the correct contact angle between the molten metal and the modified surface. In an embodiment, all surface conditioning methods described in the preceding paragraphs for ways to execute the surface conditioning in the case of the distributed-liquid, apply here too. In an embodiment, the surface conditioning leads to hydrophobicity. In an embodiment, the surface conditioning leads to super-hydrophobicity. In an embodiment, the surface conditioning leads to a contact angle between the molten metal and the modified surface which is greater than 65°. In an embodiment, the surface conditioning leads to a contact angle between the molten metal and the modified surface which is greater than 95°. In another embodiment, the surface conditioning leads to a contact angle between the molten metal and the modified surface which is greater than 105°. In another embodiment, the surface conditioning leads to a contact angle between the molten metal and the modified surface which is greater than 145°. In another embodiment, the surface conditioning leads to a contact angle between the molten metal and the modified surface which is greater than 155°. In another embodiment, the surface conditioning leads to a contact angle between the molten metal and the modified surface which is greater than 165°. In another embodiment, the surface conditioning leads to a contact angle between the molten metal and the modified surface which is greater than 175°. In some applications, the contact angle should be large enough but not too large. In another embodiment, the surface conditioning leads to a contact angle between the molten metal and the modified surface which is smaller than 178°. In some applications, the contact angle should be large enough but not too large. In an embodiment, the surface conditioning leads to a contact angle between the molten metal and the modified surface which is smaller than 174°. In some applications, the contact angle should be large enough but not too large. In an embodiment, the surface conditioning leads to a contact angle between the molten metal and the modified surface which is smaller than 169°. In another embodiment, the surface conditioning is made with care to provide for the correct contact angle hysteresis between the molten metal and the modified surface. In another embodiment, the surface conditioning leads to a contact angle hysteresis between the molten metal and the modified surface which is smaller than 25°. In another embodiment, the surface conditioning leads to a contact angle hysteresis between the molten metal and the modified surface which is smaller than 15°. In another embodiment, the surface conditioning leads to a contact angle hysteresis between the molten metal and the modified surface which is smaller than 9°. In another embodiment, the surface conditioning leads to a contact angle hysteresis between the molten metal and the modified surface which is smaller than 4°. In another embodiment, the surface conditioning leads to a contact angle hysteresis between the molten metal and the modified surface which is smaller than 0.9°. In some applications, the contact angle hysteresis should be small but not too small. In another embodiment, the surface conditioning leads to a contact angle hysteresis between the molten metal and the modified surface which is larger than 0.4°. In an embodiment, the surface conditioning leads to a contact angle hysteresis between the molten metal and the modified surface which is larger than 1.2°. In an embodiment, the surface conditioning leads to a contact angle hysteresis between the molten metal and the modified surface which is larger than 2.6°. A very interesting and surprising observation was made by the inventor: in some applications, specially when high contact angles are employed, the contact angle hysteresis has an influence on the mechanical properties of the manufactured pieces, in the case of castings affecting also interdendritic arm spacing and the related fatigue resistance properties. In some applications it is the contact angle hysteresis that has the bigger influence. In an embodiment, the surface conditioning leads to hydrophilicity. In an embodiment, the surface conditioning leads to a contact angle hysteresis between the molten metal and the modified surface which is greater than 2°. In another embodiment, the surface conditioning leads to a contact angle hysteresis between the molten metal and the modified surface which is greater than 6°. In another embodiment, the surface conditioning leads to a contact angle hysteresis between the molten metal and the modified surface which is greater than 12°. In another embodiment, the surface conditioning leads to a contact angle hysteresis between the molten metal and the modified surface which is greater than 22°. In another embodiment, the surface conditioning leads to a contact angle hysteresis between the molten metal and the modified surface which is greater than 52°. In another embodiment, the surface conditioning leads to a contact angle hysteresis between the molten metal and the modified surface which is greater than 82°. In some applications, the contact angle hysteresis provides benefit to the final mechanical properties at even greater values. another embodiment, the surface conditioning leads to a contact angle hysteresis between the molten metal and the modified surface which is greater than 102°. In another embodiment, the surface conditioning leads to a contact angle hysteresis between the molten metal and the modified surface which is greater than 122°. In an embodiment, the surface conditioning leads to a contact angle hysteresis between the molten metal and the modified surface which is greater than 152°. In an embodiment, the surface conditioning leads to a contact angle hysteresis between the molten metal and the modified surface which is greater than 162°. In some applications, despite the contact angle hysteresis desired at large values those should not be too large. In an embodiment, the surface conditioning leads to a contact angle hysteresis between the molten metal and the modified surface which is smaller than 178°. In another embodiment, the surface conditioning leads to a contact angle hysteresis between the molten metal and the modified surface which is smaller than 174°. In another embodiment, the surface conditioning leads to a contact angle hysteresis between the molten metal and the modified surface which is smaller than 168°. For some applications the combination of a large contact angle and contact angle hysteresis gives the best combination of durability and good mechanical properties of the fabricated pieces. In some applications it is the contact angle that has the largest influence on the properties of the fabricated pieces. In an embodiment, the surface conditioning leads to a contact angle between the molten metal and the modified surface which is smaller than 89°. In another embodiment, the surface conditioning leads to a contact angle between the molten metal and the modified surface which is smaller than 64°. In another embodiment, the surface conditioning leads to a contact angle between the molten metal and the modified surface which is smaller than 38°. In another embodiment, the surface conditioning leads to a contact angle between the molten metal and the modified surface which is smaller than 22°. In another embodiment, the surface conditioning leads to a contact angle between the molten metal and the modified surface which is smaller than 9°. In another embodiment, the surface conditioning leads to a contact angle between the molten metal and the modified surface which is smaller than 4°. In some applications, despite a small contact angle being desirable it should not be too small. In an embodiment, the surface conditioning leads to a contact angle between the molten metal and the modified surface which is larger than 0.6°. In another embodiment, the surface conditioning leads to a contact angle between the molten metal and the modified surface which is larger than 1.2°. In another embodiment, the surface conditioning leads to a contact angle between the molten metal and the modified surface which is larger than 2.6°. As mentioned, for the casting process all surface conditioning methods described in the preceding paragraphs can be used each for a different applications. In the particular case of "cold casting" or casting on an intensively cooled die, some surface conditioning might be even somewhat more preferable for some applications. In an embodiment, the surface refers to at least part of the surface In an embodiment, dense coatings are preferred, when coatings are employed. In an embodiment, high power impulse magnetron sputtering (HIPIMS) is preferred. In an embodiment, High energy arc plasma acceleration deposition is preferred. In an embodiment, thick coatings are preferred, when coatings are employed. In an embodiment, CVD (chemical vapour deposition) coatings are preferred. In an embodiment, thermal spray coatings are preferred. In an embodiment, cold spray coatings are preferred. In an embodiment, at least two different coatings are preferred. In an embodiment, oxide coatings are employed, like aluminum, zirconium, lanthanum, calcium, and other white oxides. In an embodiment, dark oxides are employed, like for example titanium. Very surprising it has been to see that some non-oxide coatings work excellently well. In an embodiment, nitride and even boride coatings are employed. In an embodiment, the coating comprises aluminum titanium nitride (AlTiN). In an embodiment, a coating comprising nitrogen and at least one of the following elements: % Cr, % Al, % Si, % Ti, % V is employed. In an embodiment, a coating comprising nitrogen and at least two of the following elements: % Cr, % Al, % Si, % Ti, % V is employed. In an embodiment, a coating comprising carbon and at least one of the following elements: % Cr, % Al, % Si, % Ti, % V is employed. In an embodiment, a coating comprising carbon and at least two of the following elements: % Cr, % Al, % Si, % Ti, % V is employed. In an embodiment, a coating comprising boron and at least one of the following elements: % Cr, % Al, % Si, % Ti, % V is employed. In an embodiment, a coating comprising boron and at least two of the following elements: % Cr, % Al, % Si, % Ti, % V is employed. In an embodiment, the coating is based on titanates such as barium or strontium titanates are employed. In an embodiment, at least a part of the working surface of the casting die should be coated with barium titanate. In an embodiment, at least a part of the working surface of the casting die should be coated with strontium titanate. In an embodiment, at least a part of the working surface of the casting die should be coated with a barium-strontium titanate (a mixture of Ba and strontium stoichiometric or quasi-stoichiometric titanate). In an embodiment, the working surface is at least part of the surface. Any morphologically similar coating should also work as well. Any functionally similar coating material should work as well. In an embodiment, a functionally similar material is one where at least two of the following properties of the coating: the elastic modulus, the fracture toughness, the wettability angle of the cast alloy on the coating applied to the chosen tool material where the tool material is kept at 150° C. and the casted alloy 50° C. above its melting temperature, the contact angle hysteresis of the cast alloy on the coating applied to the chosen tool material where the tool material is kept at 150° C. and the casted alloy 50° C. above its melting temperature and electrical resistivity. In different embodiments, are kept within a range of +/−45% of the values obtained for barium titanate, within a range of +/−28%, within a range of +/−18%, within a range of +/−8%, and even within a range of +/−4%. In an alternative embodiment, it is at least three of the properties. In an alternative embodiment, it is all four properties. In an alternative embodiment, properties are kept similar to strontium titanate instead of barium titanate. In an embodiment, the above disclosed properties are at room temperature (23° C.). All the different embodiments disclosed above may be combined in any combination provided they are not mutually exclusive.

In some applications it has been found that the temperature of the manufactured component tends to raise after the extraction from the die. This tendency, when present, seems to be stronger for thicker components. While this is just an irrelevant observation for most applications for some applications it is not preferable. The inventor has found that several approaches can be followed depending on the application and specially on the reason why such temperature raise, when given, is annoying. For the instances where, amongst others, the temperature rise is undesirable due to the increased challenge to achieve tight dimensional tolerances, the inventor has found that a setup with two die set steps can be employed. In an embodiment, the cooling of the manufactured component is realized in at least two consecutive die sets. The inventor has found that in some applications when using two die set steps better tolerances in the manufactured component can be achieved. In an embodiment, more than two die sets are employed. In some instances, the inventor has found that one can capitalize such phenomena, for instance to extend the longevity of some cutting elements and avoid delayed fracture. In an embodiment, more than two die sets are employed and there is at least one die set between the first and last cooling die sets in which a cutting operation is realized. In an embodiment, the second cooling die set acts as a calibration step. In an embodiment, when two or more die sets are employed, some areas to be cut are cut in one of the die sets, making sure the cut area has a temperature higher than the mean temperature of the manufactured component. In an embodiment, at least some of them areas with higher temperature and which are cut are also cooled in the last cooling die set. In an embodiment, higher temperature than the mean temperature of the component at the moment of the cut means 26° C. or more. In another embodiment, it means 56° C. or more. In another embodiment, it means 106° C. or more. In another embodiment, it means 156° C. or more. In another embodiment, it means 256° C. or more. In some applications it has been found that what is important is the mean temperature of the zones to be cut with respect to the mean temperature of the component. In an embodiment, the mean temperature of the zones to be cut is above Ms−100° C. when the component leaves the first cooling die set. In another embodiment, it is above Ms. In another embodiment, it is above Ms+55° C. In another embodiment, it is above Ms+102° C. In an embodiment, the mean temperature of the component is below Ms+100° C. when the component leaves the first cooling die set. In another embodiment, it is below Ms. In another embodiment, it is below Ms−10° C. In another embodiment, it is below Ms−55° C. In another embodiment, it is below Ms−110° C. In an embodiment, the mean temperature of the zones that have been in-die cut is below Ms+100° C. when the component leaves the last cooling die set. In another embodiment, it is below Ms. In another embodiment, it is below Ms−10° C. In another embodiment, it is below Ms−55° C. In another embodiment, it is below Ms−110° C. For the instances where, amongst others, the temperature rise is undesirable due to the increased challenge to achieve very high yield strengths, the inventor has made a couple very surprising observations leading to a special implementation of the present invention. The first surprising observation is that when special precautions are taken the present invention can work even when the droplets are frozen. In such an instance, since the contact fluid—component to be manufactured is no longer a liquid-solid interface but a solid-solid interface one would expect problems resulting from the lack of uniform contact, but as mentioned it can work very well if the instructions of the present invention are followed accurately. In an embodiment, at least a part of the active surface of the die is kept at a temperature below the melting temperature of the fluid. In an embodiment, at least a part of the active surface of the die is kept at a temperature below the solidification temperature of the fluid. In an embodiment, at least part of the active surface of the die is kept at a temperature below 0° C. In another embodiment, at least part of the active surface of the die is kept at a temperature below −2° C. In another embodiment, at least part of the active surface of the die is kept at a temperature below −6° C. In another embodiment, at least part of the active surface of the die is kept at a temperature below −11° C. In another embodiment, at least part of the active surface of the die is kept at a temperature below −22° C. In another embodiment, at least part of the active surface of the die is kept at a temperature below −84° C. For some applications, when the die surface temperature is kept at an excessively low value, the effect on some mechanical properties can be undesirable. In an embodiment, the active surface of the die mean temperature is kept above −196° C. In another embodiment, the active surface of the die mean temperature is kept above −146° C. In another embodiment, the active surface of the die mean temperature is kept above −96° C. In another embodiment, the active surface of the die mean temperature is kept above −36° C. In another embodiment, the active surface of the die mean temperature is kept below 16° C. In another embodiment, the active surface of the die mean temperature is kept below 2° C. In another embodiment, the active surface of the die mean temperature is kept below −6° C. In another embodiment, the active surface of the die mean temperature is kept below −21° C. In an embodiment, the low temperature at which at least part of the active surface of the die is kept, refers at least to the moment where the fluid is projected onto the die surface. In an embodiment, the "at least part of the active surface of the die" in the present paragraph can be substituted by "the mean temperature of the active surface of the die". For some applications it has been found to be advantageous to let the droplets form a film on at least part of the active surface. In that case also other means of supplying the fluid can be considered. Although it may be advantageous for some applications to have a continuous film, having a partially continuous films is also acceptable. In an embodiment, the fluid droplets are allowed to collapse and form an at least partially continuous film on the active surface. In an embodiment, a film of frozen fluid is formed on at least part of the active surface of the die. In an embodiment, at least a 51% of the active surface is covered by a frozen film of fluid. In another embodiment, at least a 66% of the active surface is covered by a frozen film of fluid. In another embodiment, at least an 81% of the active surface is covered by a frozen film of fluid. In another embodiment, at least a 92% of the active surface is covered by a frozen film of fluid. When proceeding in this way it has been observed that the yield strengths can be considerably higher, while this could be somewhat expected, measured increases of up to 400 MPa in some instances came with a surprise. In some applications it has been found that very unexpectedly the elongations attained are not particularly lower, when proceeding with frozen fluid. For a subgroup of such applications it has been observed that it is beneficiary for some mechanical properties, like in some instances elongation, in some instances area reduction, in some instances toughness when the temperature of the areas of the surface of the die that were kept at very low temperatures are increased in temperature during the shaping of the component. In an embodiment, a mean temperature increase of the active surface of the die during the component forming of 3° C. or more is applied. In another embodiment, it is 6° C. or more. In another embodiment, it is 11° C. or more. In another embodiment, it is 21° C. or more. In an embodiment, a mean temperature increase of the active surface of the die during the component forming of 110° C. or less is applied. In another embodiment, it is 89° C. or less. In another embodiment, it is 59° C. or less. In another embodiment, it is 39°

C. or less. In an embodiment, the tempering of the die surface is made by circulating an undercooled fluid through the cooling channels. In an embodiment, the fluid circulated through the cooling channels is at a temperature of 1° C. or lower. In another embodiment, it is −2° C. or lower. In another embodiment, it-is 8° C. or lower. In another embodiment, it is −16° C. or lower. In another embodiment, it is −24° C. or lower. In another embodiment, it is −86° C. or lower. In an embodiment, the fluid circulated through the cooling channels comprises glycol. In an embodiment, the glycol concentration is 11% by volume or more. In an embodiment, the undercooled fluid circulated through the cooling channels is cooled with an apparatus refrigeration cycle. In an embodiment, the undercooled fluid circulated through the cooling channels is cooled with an apparatus comprising a compressor. In an embodiment, the undercooled fluid circulated through the cooling channels is cooled with an apparatus based on the Rankine cycle. In an embodiment, the undercooled fluid circulated through the cooling channels is cooled with an apparatus based on the Stirling cycle. In an embodiment, the undercooled fluid circulated through the cooling channels is cooled with a Stirling engine. In an embodiment, the freezing of the liquid is done with aid of an expanding gas in contact with the fluid. In an embodiment, the freezing of the liquid is done with aid of an expanding gas in contact with the active die surface. As previously disclosed, although in many applications the fluid used may be water, an aqueous solution, an aqueous suspension or any other fluid can also be used in some applications. In an embodiment, the fluid is the fluid to be evaporated. In an embodiment, the fluid is a frozen fluid. In an embodiment, the term “fluid” can be replaced by the term “liquid”. In an embodiment, the liquid is the liquid to be evaporated. In an embodiment, the liquid is water. In another embodiment, the liquid is an aqueous solution. In another embodiment, the liquid is an aqueous suspension. In another embodiment, the liquid is any liquid different from water. In an embodiment, the liquid comprises water. In an embodiment, the liquid comprises an aqueous solution. In an embodiment, the liquid comprises an aqueous suspension. In an embodiment, the liquid comprises a liquid different from water. In another embodiment, the liquid comprises an agent (as described in the preceding paragraphs). In an embodiment, everything that has been said in the rest of this document referring to the fluid is extended to the instances where this fluid is in solid state. In an embodiment, everything that has been said in the rest of this document referring to the fluid is extended to the instances where this fluid is frozen. In an embodiment, everything related to the distribution of the fluid on the die that has been said in the rest of this document referring to the fluid is extended to the instances where this fluid is in solid state. Another surprising observation made, has been the effect of the thermal conductivity of the tool material employed in the die. Given the extreme short closed die times employed in many instances of the present invention, and the comparable longer times between components and specially given that most heat is evacuated capitalizing the phase change of the fluid instead of trough conduction trough the die and convection with the fluid circulated within the cooling channels, one would expect the thermal conductivity of tool material of the die to have extremely little or no effect. It has been observed that when the thermal conductivity of the tool material is the appropriate one, very high elongation values can be obtained combined with very high yield strengths. In an embodiment, the die material is chosen with a thermal conductivity high enough but not too high. In an embodiment, the thermal conductivity of the die material refers to the mean thermal conductivity of the material of the active surface of the die with a thickness of 10 mm. In another embodiment, the thermal conductivity of the die material refers to the mean thermal conductivity of material of the active surface of the die with a thickness of 4 mm. In an embodiment, the thermal conductivity of the die material refers to the maximum thermal conductivity of the material underlying the active surface of the die. In an embodiment, the thermal conductivity of the die material refers to the maximum thermal conductivity of the material underlying the active surface of the die, where only materials representing more than a 10% of the active surface are taken into consideration. In an embodiment, a high enough thermal conductivity is 15 W/mK or more. In another embodiment, it is 21 W/mK or more. In another embodiment, it is 32 W/mK or more. In another embodiment, it is 46 W/mK or more. In another embodiment, it is 102 W/mK or more. In another embodiment, it is 151 W/mK or more. In an embodiment, a not too high thermal conductivity is 389 W/mK or less. In another embodiment, it is 219 W/mK or less. In another embodiment, it is 98 W/mK or less. In another embodiment, it is 68 W/mK or less. In an embodiment, the values of thermal conductivity disclosed above are at room temperature (23° C.). Some applications where the temperature raise of the manufactured component is not observed can also capitalize from the embodiments presented in this paragraph for example when very high yield strengths or very high mechanical resistances amongst others are desirable. In some embodiments, the aforementioned for the die can be extended to other components such as moulds, forming dies, dies used in the manufacture of tubular components or structures, hot stamping forming dies, hot stamping dies or moulds among others. In an embodiment, the manufactured component is the hot stamped sheet. In another embodiment, the manufactured component is the hot stamped tubular component or structure.

In some instances, a temperature holding or even increase is desirable. One instance where such increase or temperature hold can be desirable is for example to prevent the formation of microcracks in the base material for components with Zn comprising coatings. In an embodiment, the cooling rate above the threshold temperature is significantly smaller than below the threshold temperature. In an embodiment, the temperature of the component is kept constant at a temperature above the threshold temperature for a prolonged time. In an embodiment, keeping the temperature constant, means the variation is less than 68° C. In another embodiment, keeping the temperature constant, means the variation is less than 48° C. In another embodiment, keeping the temperature constant, means the variation is less than 18° C. In another embodiment, keeping the temperature constant, means the variation is less than 8° C. In an embodiment, a prolonged time is 3 seconds or more. In another embodiment, a prolonged time is 6 seconds or more. In another embodiment, a prolonged time is 11 seconds or more. In another embodiment, a prolonged time is 25 seconds or more. In another embodiment, a prolonged time is 3 minutes or more. In an embodiment, a prolonged time is 2 hours or less. In another embodiment, a prolonged time is 40 minutes or less. In another embodiment, a prolonged time is 12 minutes or less. In another embodiment, a prolonged time is 4 minutes or less. In another embodiment, a prolonged time is 2 minutes or less. In an embodiment, the difference in the cooling rates above and below de threshold temperature is a 60% or more. In another embodiment, it is a 110% or more. In another embodiment, it is a 160% or more. In an embodiment, it is a 210% or more. In another embodiment, it is a 310% or more. In an embodiment, the difference in the cooling rates above and below de threshold temperature is 6K/s or more. In another embodiment, it is 25K/s or more. In another embodiment, it is 77K/s or more. In another embodiment, it is 155K/s or more. In another embodiment, it is 227K/s or more. In an embodiment, the threshold temperature is above 480° C. In another embodiment, the threshold temperature is above 560° C. In another embodiment, the threshold temperature is above 610° C. In another embodiment, the threshold temperature is above 660° C. In an embodiment, the threshold temperature is below 880° C. In another embodiment, the threshold temperature is below 840° C. In another embodiment, the threshold temperature is below 780° C. In another embodiment, the threshold temperature is below 740° C. In another embodiment, the threshold temperature is below 680° C.

Any embodiment disclosed in this document may be combined with any other embodiment in any combination, provided that they are not mutually exclusive. Some embodiment combinations are as follows:

A method for hot stamping of sheet. [901] The method for hot stamping of sheet according to [900] comprising cooling the sheet that is being formed. [902]. The method for hot stamping of sheet according to [900] comprising cooling the sheet after forming. [903] The method according to any of [900] to [902] wherein the sheet is formed with a mould or die. [904] The method according to any of [900] to [903] wherein the sheet is formed with a hot stamping mould or die. [905] The method according to any of [900] to [903] wherein the sheet is formed with a hot stamping mould. [906] The method according to any of [900] to [903] wherein the sheet is formed with a hot stamping die. [907] The method for hot stamping of sheet according to any of [900] to [906] wherein there is a liquid distributed on the surface of the mould or die. [908] The method for hot stamping of sheet according to [907] wherein the liquid is a coolant. [909] The method for hot stamping of sheet, wherein the sheet is cooled from high temperature at a very fast cooling rate. [910] The method according to any of [900] to [909] wherein the sheet is cooled after forming from high temperature at a very fast cooling rate. [911] The method according to any of [900] to [910] wherein the very fast cooling is made after forming the sheet until the temperatures are no longer high. [912] The method according to any of [900] to [910] wherein the very fast cooling is made while forming and after forming the sheet until the temperatures are no longer high. [913] The method according to any of [909] to [912] wherein high temperature is a temperature above 110° C. [914] The method according to any of [909] to [912] wherein high temperature is a temperature above 210° C. [915] The method according to any of [909] to [912] wherein high temperature is a temperature above 310° C. [916] The method according to any of [909] to [912] wherein high temperature is a temperature above 450° C. [917] The method according to any of [909] to [912] wherein high temperature is a temperature above 550° C. [918] The method according to any of [909] to [912] wherein high temperature is a temperature above 650° C. [919] The method according to any of [909] to [912] wherein high temperature is a temperature above 750° C. [920] The method according to any of [900] to [919] wherein the sheet is cooled at a very fast cooling rate of 27K/s or more up to a temperature of 550° C. [921] The method according to any of [900] to [920] wherein the sheet is cooled after forming at a very fast cooling rate of 27K/s or more up to a temperature of 550° C. [922] The method according to any of [909] to [912] wherein a very fast cooling rate is 27 K/s or more. [923] The method according to any of [909] to [922] wherein a very fast cooling rate is 57 K/s or more. [924] The method according to any of [909] to [922] wherein a very fast cooling rate is 84 K/s or more. [925] The method according to any of [909] to [922] wherein a very fast cooling rate is 107 K/s or more. [926] The method according to any of [909] to [922] wherein a very fast cooling rate is 507 K/s or more. [927] The method according to any of [909] to [922] wherein a very fast cooling rate is 807 K/s or more. [928] The method according to any of [909] to [922] wherein a very fast cooling rate is 1007 K/s or more. [929] The method according to any of [909] to [922] wherein a very fast cooling rate is 2600 K/s or more. [930] The method according to any of [909] to [922] wherein a very fast cooling rate is 4200 K/s or more. [931] The method according to any of [909] to [930] wherein the very fast cooling rate is achieved through a phase change of a cooling media. [932] The method according to [931] wherein the phase change is sublimation. [933] The method according to [931] wherein the phase change is fusion. [934] The method according to [931] wherein the phase change is vaporization. [935] The method according to any of [900] to [934] wherein a pressure of 0.2 MPa or more is applied at least between portions of the sheet surface and the mould or die surface in an area comprising a liquid cooling media. [936] The method according to any of [900] to [935] wherein hot stamping of sheet is performed with a very fast cooling rate at high temperature and a low cooling rate at low temperature. [937] The method according to any of [900] to [936] wherein hot stamping of sheet is performed with a low cooling rate. [938] The method according to any of [936] to [937] wherein low temperature is 590° C. or less. [939] The method according to any of [936] to [937] wherein low temperature is 440° C. or less. [940] The method according to any of [936] to [937] wherein low temperature is 590° C. or less. [941] The method according to any of [936] to [937] wherein low temperature is 390° C. or less. [942] The method according to any of [936] to [937] wherein low temperature is 290° C. or less. [943] The method according to any of [936] to [937] wherein low temperature is 240° C. or less. [944] The method according to any of [936] to [937] wherein low temperature is 190° C. or less. [945] The method according to any of [936] to [937] wherein low temperature is 140° C. or less. [946] The method according to any of [936] to [937] wherein low temperature is 90° C. or less. [947] The method according to any of [936] to [937] wherein low temperature is 49° C. or less. [948] The method according to any of [936] to [937] wherein low cooling rate is 24 K/s or less. [949] The method according to any of [936] to [937] wherein low cooling rate is 14 K/s or less. [950] The method according to any of [936] to [937] wherein low cooling rate is 4 K/s or less. [951] The method according to any of [936] to [937] wherein low cooling rate is 0.9 K/s or less. [952] The method according to any of [936] to [937] wherein low cooling rate is 0.09 K/s or less. [953] The method according to any of [936] to [937] wherein low cooling rate is 0.009 K/s or less. [954] The method according to any of [936] to [937] wherein low cooling rate is 9 K/s or less. [955] The method according to any of [936] to [937] wherein low cooling rate is 0.009 K/s or less. [956] The method according to any of [936] to [955] wherein the low cooling rate is held for a certain time in the neighbourhood of a set low temperature. [957] The method according to [956] wherein a certain time is 3 seconds or more. [958] The method according to any of [900] to [957] wherein the sheet is at least partially coated with a Zn based coating. [959] The method according to any of [900] to [958] wherein the sheet is a steel sheet. [960] The method according to any of [900] to [959] wherein the sheet is alloyed with more % B, % Cr, % Mo, % Ni, % Si and/or % Mn than 22MnB5. [961] The method according to any of [900] to [960] wherein the finished sheet has an $A_{50}$ elongation value of 7.2% or more. [962] The method according to any of [900] to [960] wherein a neighbourhood of a set temperature is the set temperature±4° C. [963] The method according to any of [900] to [960] wherein the speed of the hot stamping is 11 strokes per minute or more. [964] The method according to any of [900] to [960] wherein the mould or die has areas that are heated. [965] The method according to any of [900] to [960] wherein the mould or die is heated to a mean surface temperature of 210° C. or more. [966] The method according to any of [900] to [960] wherein the mould or die is heated to a mean surface temperature of 690° C. or less. [967] The method according to any of [900] to [960] wherein the finished sheet comprises soft zones. [968] The method according to [967] wherein a soft zone is any area in the finished sheet with a yield strength at room temperature below 1190 MPa. [969] The method according to [968] wherein yield strength is measured according to ASTM E8/E8M-16a. [970] The method according to any of [900] to [969] wherein a liquid is distributed on the surface of the mould or die. [971] The method according to any of [900] and [969] wherein the amount of liquid distributed in the surface of the mould or die is between UADL*ST and LADL*ST for every 10 $dm^2$ wherein UADL and LADL are parameters. [972] The method according to any of [900] to [969] wherein UADL*ST and LADL*ST are replaced by UADL*ST/10 and LADL*ST/10 and the amounts are expressed in grams of distributed-liquid per square decimeter of the surface of the mould or die. [973] The method according to any of [971] and [972] wherein ST is the thickness of the sheet being processed by the area of the relevant surface of the mould or die. [974] The method according to any of [971] to [972] wherein the relevant surface is all the areas on the surface of the mould or die in contact, during production service of the mould or die, with the processed sheet. [975] The method according to any of [971] to [972] wherein the relevant surface is all the areas on the surface of the mould or die in contact, during production service of the mould or die, with an area of the processed sheet that remains in the finished sheet. [976] The method according to any of [971] to [975] wherein UADL is 98 or less. [977] The method according to any of [971] to [975] wherein UADL is 48 or less. [978] The method according to any of [971] to [975] wherein UADL is 28 or less. [979] The method according to any of [971] to [975] wherein UADL is 24 or less. [980] The method according to any of [971] to [975] wherein UADL is 19 or less. [981] The method according to any of [971] to [975] wherein UADL is 14 or less. [982] The method according to any of [971] to [975] wherein LADL is 0.2 or more. [983] The method according to any of [971] to [975] wherein LADL is 1.2 or more. [984] The method according to any of [971] to [975] wherein LADL is 6 or more. [985] The method according to any of [971] to [975] wherein LADL is 10.2 or more. [986] The method according to any of [971] to [975] wherein LADL is 12 or more. [987] The method according to any of [971] to [975] wherein LADL is 16 or more. [988] The method according to any of [971] to [987] wherein the majority of the liquid distributed in the surface of the mould or die is in the form of droplets. [989] The method according to [988] wherein the majority of the liquid is a 51% by volume or more. [990] The method according to [988] wherein the majority of the distributed-liquid is a 61% by volume or more. [991] The method according to [988] wherein the majority of the distributed-liquid is a 76% by volume or more. [992] The method according to [988] wherein the majority of the distributed-liquid is a 82% by volume or more. [993] The method according to [988] wherein the majority of the distributed-liquid is a 92% by volume or more. [994] The method according to [988] wherein the majority of the distributed-liquid is a 96% by volume or more. [995] The method according to any of [988] to [994] wherein the weight of the droplets is 1.5 milligrams or more. [996] The method according to any of [988] to [994] wherein the weight of the droplets is 22 milligrams or more. [997] The method according to any of [988] to [994] wherein the weight of the droplets is 36 milligrams or more. [998] The method according to any of [988] to [994] wherein the weight of the droplets is 52 milligrams or more. [999] The method according to any of [988] to [994] wherein the weight of the droplets is 290 milligrams or less. [1000] The method according to any of [988] to [994] wherein the weight of the droplets is 140 milligrams or less. [1001] The method according to any of [988] to [994] wherein the weight of the droplets is 69 milligrams or less. [1002] The method according to any of [988] to [994] wherein the weight of the droplets is 49 milligrams or less. [1003] The method according to any of [988] to [994] wherein the droplets have an equivalent radius of 0.02 mm or more. [1004] The method according to any of [988] to [994] wherein the droplets have an equivalent radius of 19 mm or less. [1005] The method according to any of [988] to [1004] wherein the fluid droplets are allowed to collapse and form an at least partially continuous film on the active surface. [1006] The method according to any of [988] to [1004] wherein a film of frozen fluid is formed on at least part of the surface of the die. [1007] The method according to any of [988] to [1004] wherein at least a 51% of the active surface is covered by a frozen film of fluid. [1009] The method according to any of [907] to [1008] wherein the liquid is a coolant. [1010] The method according to any of [907] to [1008] wherein the fluid is water. [1011] The method according to any of [907] to [1008] wherein the liquid is water. [1012] The method according to any of [907] to [1008] wherein the liquid is an aqueous solution. [1013] The method according to any of [907] to [1008] wherein the liquid is projected to the surface of the mould or die. [1014] The method according to any of [907] to [1012] wherein the liquid is projected on the surface of the mould or die before the commencement of each hot stamping cycle. [1015] The method according to any of [907] to [1012] wherein the liquid is projected in the form of droplets on the surface of the mould or die. [1016] The method according to any of [907] to [1012] wherein the liquid distributed in the surface of the mould or die is in form of droplets. [1017] The method according to any of [900] to [1012] wherein the sheet is cooled by projecting droplets of liquid to the surface of the mould or die. [1018] The method according to any of [907] to [1012] wherein at least some of the droplets of the liquid projected are electrically charged. [1019] The method according to any of [907] to [1018] wherein at least some of the droplets of the liquid are electrostatically charged. [1020] The method according to any of [900] to [1019] wherein at least part of the mould or die is kept at another potential at least at some point of the manufacturing cycle. [1021] The method according to any of [900] to [1020] wherein at least part of the mould or die is kept at a different potential. [1022] The method according to [1021] wherein the potential difference between the electrode and the mould or die is 600 V or more. [1023] The method according to [1021] wherein the potential difference between the electrode and the mould or die is 2 kV or more. [1024] The method according to [1021] wherein the potential difference between the electrode and the mould or die is 390 kV or less. [1025] The method according to [1021] wherein the potential difference between the element charging the droplets and the mould or die is 600 V or more. [1026] The method according to [1021] wherein the potential difference between the element charging the droplets and the mould or die is 390 kV or less. [1027] The method according to [1021] wherein the potential differential is applied with an associated current. [1028] The method according to any of [1020] to [1027] wherein the current is 90 mA or less. [1029] The method according to any of [1020] to [1027] wherein the current is 1.5 microA or more. [1030] The method according to any of [907] to [1029] wherein the liquid is not projected in all the area of the mould or die. [1031] The method according to any of [907] to [1030] wherein the projection of liquid in the surroundings of the mould or die is avoided. [1032] The method according to any of [907] to [1031] wherein at least part of the mould or die is kept at a potential of the same sign as the charged droplets. [1033] The method according to any of [907] to [1032] wherein at least part of the mould or die is kept at a potential of opposite sign as the charged droplets. [1034] The method according to any of [907] to [1033] wherein the liquid comprise an active agent to enhance polarization. [1035] The method according to any of [907] to [1034] wherein the liquid comprises water and an active agent to enhance polarization. [1036] The method according to any of [900] to [1035] wherein the surface of the mould or die is modified. [1037] The method according to any of [900] to [1036] wherein the contact angle between the droplets and the surface of the mould or die is smaller than 169°. [1038] The method according to any of [900] to [1036] wherein the contact angle between the droplets and the surface of the mould or die is greater than 65°. [1039] The method according to any of [900] to [1036] wherein the contact angle hysteresis between the droplets and the surface of the mould or die is smaller than 163°. [1040] The method according to any of [900] to [1036] wherein the contact angle hysteresis between the droplets and the surface of the mould or die is greater than 2°. [1041] The method according to any of [1037] to [1038] wherein the contact angle is measured at room temperature (23° C.) according to ISO 19403-2:2017. [1042] The method according to any of [1037] to [1038] wherein the contact angle is measured at room temperature (23° C.) using a DSA 100M from Krüss with software and hardware update at 1 Feb. 2018. [1043] The method according to any of [1037] to [1038] wherein the contact angle is measured at room temperature (23° C.) using the sessile drop method. [1044] The method according to any of [1037] to [1038] wherein the contact angle is measured at room temperature (23° C.) using the captive bubble method. [1045] The method according to any of [1037] to [1038] wherein the contact angle is measured at room temperature (23° C.) using the Wilhelmy method. [1046] The method according to any of [1039] to [1040] wherein the contact angle hysteresis is measured at room temperature (23° C.) according to ISO 19403-2:2017. [1047] The method according to any of [1039] to [1040] wherein the contact angle hysteresis is measured at room temperature (23° C.) using a DSA 100M from Krüss with software and hardware update at 1 Feb. 2018. [1048] The method according to any of [1039] to [1047] wherein the contact angle hysteresis is measured at room temperature (23° C.) using the sessile drop method. [1049] The method according to any of [1039] to [1047] wherein the contact angle hysteresis is measured at room temperature (23° C.) using the captive bubble method. [1050] The method according to any of [1039] to [1047] wherein the contact angle hysteresis is measured at room temperature (23° C.) using the Wilhelmy method. [1051] The method according to any of [900] to [1050] wherein the surface of the mould or die is maintained at a controlled temperature. [1052] The method according to any of [900] to [1051] wherein the mould or die is thermoregulated. [1053] The method according to any of [900] to [1052] wherein the mould or die comprises main channels. [1054] The method according to any of [900] to [1053] wherein the main channels are the inlet channels. [1055] The method according to any of [900] to [1054] wherein the mould or die comprises secondary channels. [1056] The method according to any of [900] to [1055] wherein the mould or die comprises fine channels (capillaries). [1057] The method according to [1051] wherein the cross-sectional area of the inlet channel is preferred at least 3 times higher than the cross-sectional area of the smallest channel among all the channels in the mould or die area where heat exchange is made. [1058] The method according to [1051] wherein the sum of the cross-sectional areas of all the inlet channels is preferred at least 3 times higher than the cross-sectional area of the smallest channel among all the channels in the mould or die area where heat exchange is made. [1059] The method according to any of [1053] to [1058] wherein the thermoregulation fluid enters into the mould or die through a main channel. [1060] The method according to any of [1051] to [1059] wherein the main channels have 3 divisions or more. [1061] The method according to any of [1051] to [1060] wherein the mean length of the fine channels is 12 mm or more. [1062] The method according to any of [1051] to [1061] wherein the surface density of fine channels is higher than 12%. [1063] The method according to any of [1051] to [1062] wherein the ratio H=total length of fine channels effective part in the mould or die/mean length of fine channels effective part, is higher than 12. [1064] The method according to any of [1051] to [1063] wherein the ratio H=total length of fine channels effective part in the mould or die/mean length of fine channels effective part, is lower than 900. [1065] The method according to any of [1051] to [1064] wherein there are 110 or more fine channels per square meter of the active surface of the mo1056uld or die. [1066] The method according to any of [1051] to [1065] wherein the mean distance of the fine channels to the surface of the mould or die is lower than 18 mm. [1067] The method according to any of [1051] to [1066] wherein the mean distance of the fine channels to the surface of the mould or die is above 0.6 mm. [1068] The method according to any of [1051] to [1067] wherein the mean distance between the fine channels is 18 mm or less. [1069] The method according to any of [1051] to [1068] wherein the mean diameter of fine channels is lower than 38 mm. [1070] The method according to any of [1051] to [1069] wherein the mean diameter of the main channels is above 12 mm. [1071] The method according to any of [1051] to [1070] wherein the main channels are directly connected to fine channels. [1072] The method according to any of [1051] to [1071] wherein the total pressure drop in the thermoregulatory system is lower than 7.9 bar. [1073] The method according to any of [1051] to [1072] wherein the pressure drop in the fine channels is lower than 5.9 bar. [1074] The method according to any of [1051] to [1073] wherein the rugosity within the channels is lower than 49.6 microns. [1075] The method according to any of [1051] to [1074] wherein the average number of droplets emerging from the holes in the fine channels on the active evaporation surface is lower than 80 droplets per minute. [1076] The method according to any of [1051] to [1075] wherein the average number of droplets emerging from the holes in the fine channels on the active evaporation surface is greater than 0.8 droplets per minute. [1077] The method according to any of [1051] to [1076] wherein there are more than 0.5 tubes per $cm^2$ of the active surface. [1078] The method according to any of [1051] to [1077] wherein at least the 1.2% of the active evaporation surface are holes. [1079] The method according to any of [1051] to [1078] wherein the average distance between the centres of the holes and the active evaporation surface is less than 12 times the diameter of the hole. [1080] The method according to any of [1051] to [1079] wherein the surface tension of the fluid being evaporated is greater than 22 mM/m. [1081] The method according to any of [1051] to [1080] wherein the surface tension of the fluid being evaporated is lower than 75 mm/m. [1082] The method according to any of [1051] to [1081] wherein the pressure drop in the capillary channels is lower than 5.9 bar. [1083] The method according to any of [1051] to [1082] wherein the cross-sectional area of the main channels is less than 2041.8 $mm^2$. [1084] The method according to any of [1051] to [1083] wherein the cross-sectional area of the main channels is between 56 $mm^2$ and 21 $mm^2$. [1085] The method according to any of [1051] to [1084] wherein the cross-sectional area of the secondary channels is less than 122.3 $mm^2$. [1086] The method according to any of [1051] to [1085] wherein the cross-sectional area of the secondary channels is between 7.8 $mm^2$ and 3.8 $mm^2$. [1087] The method according to any of [1051] to [1086] wherein cross-sectional area of the capillary channels is less than 1.6 $mm^2$. [1088] The method according to any of [1051] to [1087] wherein the cross-sectional area of the secondary channels is between 1.6 $mm^2$ and 0.45 $mm^2$. [1089] The method according to any of [1051] to [1088] wherein the cross-sectional area of the secondary channels is less than 1.4 times the equivalent diameter. [1090] The method according to any of [1051] to [1089] wherein the sum of the minimum cross-sectional area of all the capillary channels connected to a secondary channel is at least 1.2 times bigger than the cross-sectional area of the secondary channel to which are connected. [1091] The method according to any of [1051] to [1089] wherein the sum of the maximum cross-sectional areas of all the capillary channels connected to a secondary channel are bigger than the cross-sectional area of the secondary channel to which are connected. [1092] The method according to any of [1051] to [1089] wherein the sum of the maximum cross-sectional areas of all the capillary channels connected to a secondary channel is at least 1.2 times bigger than the cross-sectional area of the secondary channel to which are connected. [1093] The method according to any of [1051] to [1092] wherein the mould or die has areas that are cooled or heated with different intensity or some areas that are heated while others are cooled. [1094] The method according to any of [1051] to [1093] wherein the Reynolds number of the fluid in the channels is above 2800. [1095] The method according to any of [1051] to [1094] wherein the mean speed of the fluid in the channels is higher than 0.7 m/s. [1096] The method according to any of [1051] to [1095] wherein the mean speed of the fluid in the channels is lower than 14 m/s. [1097] The method according to any of [900] to [1096] wherein the mould or die is heated by conduction. [1098] The method according to any of [900] to [1096] wherein the mould or die is heated by induction. [1099] The method according to any of [900] to [1096] wherein the mould or die is heated with inserted or embedded coils. [1100] The method according to any of [900] to [1096] wherein the mould or die is heated by radiation. [1101] The method according to any of [900] to [1100] wherein at least part of the surface of the mould or die is cooled and heated at different time intervals. [1102] The method according to any of [900] to [1101] wherein the water is left motionless or with a laminar flow during the filling of the channels. [1103] The method according to any of [900] to [1102] wherein the mould or die is manufactured at least with a part having a high enough thermal conductivity material and at least an area of the working surface with high enough density of cooling channels close enough to the surface and with a sufficiently difference in the Reynolds number of the cooling channels in two different moments in the working cycle. [1104] The method according to [1103] wherein an area with a high enough density of cooling channels is an area of at least 0.001% of the working surface area. [1105] The method according to [1103] wherein close enough to the surface is 14 mm or less. [1106] The method according to [1103] wherein a high enough thermal conductivity is 12 W/mK or more. [1107] The method according to [1106] wherein thermal conductivity is at room temperature (23° C.) and measured according to ASTM E1461-13. [1108] The method according to [1103] wherein a sufficient difference in Reynolds number is at least 600. [1109] The method according to [1108] wherein the sufficient difference in Reynolds number is substituted by the maximum Reynolds number, and wherein the maximum Reynolds number is above 1100. [1110] The method according to [1108] wherein the Reynolds number is replaced by the Nusselt number, and wherein the Nusset number is calculated from the values provided for Reynolds number divided by 12. [1111] The method according to any of [900] to [1110] wherein the liquid is projected to at least part of the surface of the mould or die. [1112] The method according to any of [907] to [1111] wherein, the difference of contact angle hysteresis of the distributed-liquid between the areas with the highest values and those with the lowest is 2° or more. [1113] The method according to any of [907] to [1112] wherein, the difference of contact angle hysteresis of the distributed-liquid between the areas with the highest values and those with the lowest is 174° or less. [1114] The method according to any of [900] to [1113] wherein a sufficient amount of the surface remains with a hydrophilic coating and/or patter. [1115] The method according to [1114] wherein a sufficient amount is a 2% or more. [1116] The method according to [1114] wherein a sufficient amount is a 94% or less. [1117] The method according to any of [900] to [1116] wherein a sufficient amount of the surface remains with a low enough contact angle hysteresis with the distributed-liquid. [1118] The method according to [1117] wherein a low enough contact angle hysteresis is 49° or less. [1119] The method according to any of [900] to [1118] wherein the mould or die comprises chemical heterogeneities. [1120] The method according to any of [900] to [1119] wherein at least part of the surface of the mould or die is conditioned and has a high contact angle with the distributed-liquid and a high contact angle hysteresis. [1121] The method according to [1120] wherein a high contact angle is 62° or more. [1122] The method according to [1120] wherein, a high contact angle hysteresis is 2° or more. [1123] The method according to [1120] wherein a high contact angle is 178° or less. [1124] The method according to any of [900] to [1123] wherein at least part of the surface of the mould or die is conditioned and the contact angle hysteresis is equal or smaller than HCACAH*contact angle ($\Delta\theta \leq HCACAH^*\theta$). [1125] The method according to [1124] wherein LCACAH is 0.1. [1126] The method according to [1124] wherein LCACAH is 0.2. [1127] The method according to [1124] wherein LCACAH is 0.5. [1128] The method according to [1124] wherein LCACAH is 0.6. [1129] The method according to [1124] wherein LCACAH is 0.85. [1130] The method according to [1124] wherein HCACAH is 0.98. [1131] The method according to [1124] wherein HCACAH is 0.95. [1132] The method according to [1124] wherein HCACAH is 0.88. [1133] The method according to [1124] wherein HCACAH is 0.85. [1134] The method according to [1124] wherein HCACAH is 0.68. [1135] The method according to any of [900] to [1134] wherein at least part of the surface of the mould or die is conditioned and If θ≤(140−FRL*RDL) then: Δθ≥TRL*RDL. [1136] The method according to any of [900] to [1134] wherein at least part of the surface of the mould or die is conditioned and If θ>(140−FRL*RDL) then: Δθ≥TRL*RDL*√(θ−140+FRL*RDL). [1137] The method according to any of [900] to [1134] wherein at least part of the surface of the mould or die is conditioned and If θ>(140−FRL*RDL) then: Δθ≥TRL*RDL*√(θ−140+FRL*RDL). [1138] The method according to any of [1135] to [1137] wherein Δθ≥HCACAH*θ is substituted by HCACAH*θ. [1139] The method according to any of [1135] to [1137] wherein θ is the contact angle between the distributed-liquid and the conditioned surface in degrees (°). [1140] The method according to any of [1135] to [1137] wherein Δθ is the contact angle hysteresis between the distributed-liquid and the conditioned surface in degrees (°). [1141] The method according to any of [1135] to [1137] wherein RDL is the radius of the average size of the droplet of the distributed-liquid in the relevant surface. [1142] The method according to any of [1135] to [1137] wherein FRL is 6. [1143] The method according to any of [1135] to [1137] wherein FRL is 8. [1144] The method according to any of [1135] to [1137] wherein FRL is 10. [1145] The method according to any of [1135] to [1137] wherein FRL is 12. [1146] The method according to any of [1135] to [1137] wherein FRL is 16. [1147] The method according to any of [1135] to [1137] wherein FRL is 20. [1148] The method according to any of [1135] to [1137] wherein TRL is 7. [1149] The method according to any of [1135] to [1137] wherein TRL is 12. [1150] The method according to any of [1135] to [1137] wherein TRL is 14. [1151] The method according to any of [1135] to [1137] wherein TRL is 16. [1152] The method according to any of [1135] to [1137] wherein TRL is 21. [1153] The method according to any of [1135] to [1137] wherein If θ≤(140−FRL*RDL) then: Δθ≥TRL*RDL. [1154] The method according to any of [1135] to [1137] wherein If θ>(140−FRL*RDL) then: Δθ≥TRL*RDL*$(θ−140+FRL*RDL)^{2/3}$. [1155] The method according to any of [1135] to [1137] wherein when Δθ≥HCACAH*θ, then Δθ is substituted by HCACAH*θ. [1156] The method according to any of [1135] to [1137] wherein If θ≤(140−FRL*RDL) then: Δθ≥TRL*RDL. [1157] The method according to any of [1135] to [1137] wherein If θ≥(140−FRL*RDL) then: Δθ≥TRL*RDL*(θ−140+FRL*RDL). [1158] The method according to any of [1135] to [1137] wherein when Δθ≥HCACAH*θ, then Δθ is substituted by HCACAH*θ. [1159] The method according to any of [1135] to [1137] wherein If θ≤(140−FRL*RDL) then: Δθ≥TRL*RDL. [1160] The method according to any of [1135] to [1137] wherein If θ>(140−FRL*RDL) then: Δθ≥TRL*RDL*$(θ−140+FRL*RDL)^2$. [1161] The method according to any of [1135] to [1137] wherein when Δθ≥HCACAH*θ, then Δθ is substituted by HCACAH*θ. [1162] The method according to any of [900] to [1161] wherein when the first contact between the coating of the sheet and the modified surface takes place, the coating is 100° C. above its melting point to determine contact and contact hysteresis angles. [1163] The method according to any of [900] to [1162] wherein the contact angle between the molten metal and the surface of the mould or die is greater than 65°. [1164] The method according to any of [900] to [1162] wherein the contact angle between the molten metal and the surface of the mould or die is smaller than 178°. [1165] The method according to any of [900] to [1162] wherein the contact angle hysteresis between the molten metal and the surface of the mould or die is larger than 1.2°. [1166] The method according to any of [900] to [1162] wherein the contact angle hysteresis between the molten metal and the surface of the mould or die is smaller than 178°. [1167] The method according to any of [900] to [1166] wherein at least part of the surface of the mould or die is made by CVD. [1168] The method according to any of [900] to [1167] wherein at least part of the surface of the mould or die is made with an oxide. [1169] The method according to [1168] wherein at least part of the surface of the mould or die is coated with barium titanate. [1170] The method according to [1168] wherein at least part of the surface of the mould or die is coated with strontium titanate. [1171] The method according to [1168] wherein at least part of the working surface of the mould or die is coated with barium-strontium titanate. [1172] The method according to any of [900] to [1171] wherein the mould or die has a nanostructured coating. [1173] The method according to any of [900] to [1172] wherein the mould or die has a Diamond Like Carbon coating. [1174] The method according to any of [900] to [1173] wherein the mould or die is made of a tool steel with large primary carbides. [1175] The method according to any of [900] to [1174] wherein the material of the mould or die comprises a volume fraction of 0.1% or more of primary carbides. [1176] The method according to any of [900] to [1175] wherein the material of the mould or die comprises a volume fraction of 89% or less of primary carbides. [1177] The method according to any of [900] to [1176] wherein the sheet is maintained at a temperature above 510° C. for at long enough time prior to letting the sheet or pre-formed mould or die come in contact with the droplets. [1178] The method according to [1177] wherein a long enough time is 2 seconds or more. [1179] The method according to [1177] wherein a long enough time is 14 minutes or less. [1180] The method according to any of [900] to [1179] wherein two die set steps are employed. [1181] The method according to any of [900] to [1179] wherein the cooling of the manufactured component is realized in at least two consecutive die sets. [1182] The method according to any of [900] to [1181] wherein at least some of them areas with higher temperature and which are cut are also cooled in the last cooling die set. [1183] The method according to [1182] wherein higher temperature is 26° C. or more. [1184] The method according to any of [900] to [1183] wherein the mean temperature of the component is below Ms+100° C. when the component leaves the first cooling die set. [1185] The method according to any of [900] to [1184] wherein at least a part of the surface of th mould or die is kept at a temperature below the solidification temperature of the fluid. [1186] The method according to any of [900] to [1185] wherein at least part of the surface of the mould or die is kept at a temperature below 0° C. [1187] The method according to any of [900] to [1186] wherein the surface of the mould or die mean temperature is kept above −196° C. [1188] The method according to any of [988] to [1187] wherein the droplets are at least partially frozen. [1189] The method according to any of [988] to

[1187] wherein the droplets are frozen. [1190] The method according to any of [988] to [1189] wherein the fluid droplets are allowed to collapse and form an at least partially continuous film on the surface. [1191] The method according to any of [900] to [1190] wherein a film of frozen fluid is formed on at least part of the surface of the die. [1192] The method according to any of [900] to [1190] wherein at least a 51% of the surface is covered by a frozen film of fluid. [1193] The method according to any of [900] to [1192] wherein at least some areas of the surface of the mould or die that were kept at very low temperatures are increased in temperature during the shaping of the component. [1194] The method according to any of [900] to [1192] wherein the mean temperature increase of the surface of the mould or die during the component forming is 3° C. or more in at least some areas of the surface of the die are during the shaping of the component. [1195] The method according to any of [900] to [1192] wherein the mean temperature increase of the surface of the mould or die during the component forming is 110° C. or less in at least some areas of the surface of the die are during the shaping of the component. [1196] The method according to any of [900] to [1192] wherein the tempering of the mould or die surface is made by circulating an undercooled fluid trough the cooling channels. [1197] The method according to [1196] wherein the fluid circulated through the cooling channels at a temperature of 1° C. or lower. [1198] The method according to any of [900] to [1197] wherein the fluid circulated through the cooling channels comprises glycol. [1199] The method according to [900] wherein the glycol concentration is 11% by volume or more. [1200] The method according to any of [900] to [1199] wherein the mould or die material is chosen with a thermal conductivity at room temperature of 15 W/mK or more. [1201] The method according to any of [900] to [1200] wherein the mould or die material is chosen with a thermal conductivity at room temperature of 389 W/mK or less. [1202] The method according to any of [900] to [1201] wherein the temperature of the component is kept constant, with a variation of less than 68° C., at a temperature above 480° C. for 3 seconds or more. [1203] The method according to any of [900] to [1202] wherein the temperature of the component is kept constant, with a variation of less than 68° C., at a temperature above 480° C. for 2 hours or less. [1204] The method according to any of [900] to [1203] the difference in the cooling rates above and below 480° C. is a 60% or more. [1205] The method according to any of [900] to [1204] the difference in the cooling rates above and below 480° C. is 6K/s or more. [1206] A method for hot stamping of tubular components or structures. [1207] The method for hot stamping of sheet according to [1206] comprising cooling the tubular components or structures that is being formed. [1208]. The method for hot stamping of sheet according to [1206] comprising cooling the tubular components or structures after forming. [1209] The method according to any of [1206] to [907] wherein the tubular components or structures is formed with a mould or die. [1210] The method according to any of [1206] to [910] wherein the tubular components or structures is formed with a hot stamping mould or die. [1211] The method according to any of [1206] to [910] wherein the tubular components or structures is formed with a hot stamping mould. [1212] The method according to any of [1206] to [910] wherein the tubular components or structures is formed with a hot stamping die. [1213] The method for hot stamping of sheet, wherein the tubular components or structures is cooled from high temperature at a very fast cooling rate according to any of [922] to [934]. [1214] The method according to any of [1206] to [1213] wherein the tubular components or structures are cooled after forming from high temperature at a very fast cooling rate according to any of [922] to [934]. [1215] The method according to any of [1206] to [1214] wherein the very fast cooling is made after forming the tubular components or structures until the temperatures are no longer high, wherein the very fast cooling is made according to any of [922] to [934] and high temperatures are according to [914] to [919]. [1216] The method according to any of [1206] to [1215] wherein the very fast cooling is made while forming and after forming the tubular components or structures until the temperatures are no longer high, wherein the very fast cooling is made according to any of [922] to [934] and high temperatures are according to [914] to [919]. [1217] The method according to any of [1206] to [1216] wherein a pressure of 0.2 MPa or more is applied at least between portions of the surface of the tubular components or structures and the surface of the mould or die in an area comprising a liquid cooling media. [1218] The method according to any of [1206] to [1217] wherein hot stamping of tubular components or structures is performed with a very fast cooling rate at high temperature and a low cooling rate at low temperature wherein the very fast cooling is made according to any of [922] to [934] and high temperatures are according to [914] to [919], wherein the low cooling rate is according to any of [948] to [957] and low temperature is according to any of [938] to [947]. [1219] The method according to any of [1206] to [1218] wherein hot stamping of tubular components or structures is performed with a low cooling rate wherein the low cooling rate is according to any of [948] to [957]. [1220] The method according to any of [1206] to [1219] wherein the finished tubular components or structures comprises soft zones. [1221] The method according to any of [1206] to [1220] wherein a soft zone is any area in the finished tubular components or structures with a yield strength at room temperature below 1190 MPa. [1222] The method according to [1221] wherein yield strength is measured according to ASTM E8/E8M-16a. [1223] The method according to any of [900] to [1222] wherein a the mould or die is a hot stamping mould or die. [1224] The method according to any of [900] to [1222] wherein a the mould or die is a hot stamping mould. [1225] The method according to any of [900] to [1222] wherein a the mould or die is a hot stamping die. [1226] The method according to any of [900] to [1222] wherein a the mould or die is a mould. [1227] The method according to any of [900] to [1222] wherein a the mould or die is a die. [4196] The method according to any of [900] to [1222] wherein the component is the sheet which is being formed. [1228] The method according to any of [900] to [1222] wherein the component is the tubular component or structure which is being formed. [1229] The method according to any of [900] to [1222] wherein the surface is the working surface. [1230] The method according to any of [900] to [1222] ] wherein the surface is the active surface. [1231] The method according to any of [900] to [1222] wherein the surface is the relevant surface. [1232] The method according to any of [900] to [1222] wherein ST is the thickness of the tubular components or structures being processed by the area of the relevant surface of the mould or die. [1233] The method according to any of [900] to [1222] wherein the relevant surface is all the areas on the surface of the mould or die in contact, during production service of the mould or die, with the processed tubular components or structures. [1234] The method according to any of [900] to [1222] wherein the relevant surface is all the areas on the surface of the mould or die in contact, during production service of the mould or die, with an area of the processed tubular components or structures that remains in the finished tubular components or structures. [1235] The method according to any of [900] to [1222] wherein the tubular components or structures is cooled by projecting droplets of liquid to the surface of the mould or die. [1236] The method according to any of [900] to [1222] wherein when the first contact between the coating of the tubular components or structures and the modified surface takes place, the coating is 100° C. above its melting point to determine contact and contact hysteresis angles. [1237] The method according to any of [900] to [1222] wherein the tubular components or structures is maintained at a temperature above 510° C. for at long enough time prior to letting the tubular components or structures or pre-formed mould or die come in contact with the droplets. [1238] A hot stamping method, characterized in that at least part of the surface of the mould or die is kept at a temperature below 0° C. and above −36° C., comprising an amount of frozen liquid on its surface between 0.12*ST and 4.8*ST in gr/dm$^2$.

[1239] A method of cooling a sheet which is formed in a hot stamping die or mould, the method comprising the steps of: a) providing a hot stamping die or mould comprising a liquid on its surface, wherein at least a 51% by volume of the liquid is distributed on the surface of the hot stamping die or mould in the form of droplets with a weight between 1.5 and 190 milligrams; b) placing the sheet, which has been heated, in the hot stamping die or mould, in direct contact with the liquid; c) forming the sheet; and d) cooling the sheet after forming at a very fast cooling rate of 107K/s or more up to a temperature of 550° C. and with a low cooling rate of 14K/s or less from 190° C. downwards, wherein the very fast cooling comprises the cooling of the sheet using the latent heat of evaporation of the liquid. [1240] The method according to [1239], wherein the step a) is substituted by: a) providing a hot stamping die or mould comprising an amount of liquid on its surface between 0.12*ST and 4.8*ST in gr/dm$^2$, being ST the thickness of the sheet in mm, wherein at least part of the liquid is in the form of droplets. [1241] The method according to any of [1239] to [1240], wherein the liquid is projected on the surface of the hot stamping die or mould before the commencement of each hot stamping cycle. [1242] The method according to any of [1239] to [1241] wherein at least some of the droplets of the liquid are electrostatically charged. [1243] The method according to [1242] wherein at least part of the hot stamping die or mould is kept at a potential of opposite sign as the charged droplets. [1244] The method according to any of claims 4 to 5, wherein the liquid is electrostatically charged with an apparatus having a potential difference with the hot stamping die or mould of 600 V or more. [1245] The method according to any of [1239] to [1244] wherein the liquid comprises water and an agent to enhance polarization. [1246] The method according to any of [1239] to [1245] wherein the sheet is a steel sheet and at least part of the surface of the hot stamping die or mould is coated with a PVD coating. [1247] The method according to any of [1239] to [1246] wherein the contact angle between the droplets and the surface of the hot stamping die or mould is greater than 65° and smaller than 169°, measured according to ISO 19403-2:2017 at room temperature. [1248] The method according to any of [1239] to [1247] wherein the contact angle hysteresis between the droplets and the surface of the hot stamping die or mould is greater than 2° and smaller than 163°, measured according to ISO 19403-2:2017 at room temperature. [1249] The method according to any of [1239] to [1248] wherein the surface of the hot stamping die or mould comprises topological heterogeneities done through laser texturing. [1250] The method according to any of [1239] to [1249] wherein the hot stamping die or mould comprises 0.1% by volume or more and 19% by volume or less of primary carbides. [1251] The method according to any of [1239] to [1250] wherein the sheet is maintained at a temperature above 510° C. for at least 2 seconds prior to let the sheet come in contact with the droplets of the liquid. [1252] The method according to any of [1239] to [1251] wherein the hot stamping die or mould comprises cooling channels inside. [1253]A device for hot stamping of sheet, comprising a hot stamping die or mould, wherein the sheet is formed in the hot stamping die or mould which comprises a liquid on its surface in an amount between 0.12*ST and 4.8*ST in gr/dm$^2$, being ST the thickness of the sheet in mm, wherein at least part of the liquid is in the form of droplets, and at least a 51% of these droplets are evaporated when the sheet is placed in contact with the liquid. [1254] A method of cooling a tube or tubular component which is formed in a die, the method comprising the steps of a) providing a die comprising a liquid on its surface, wherein at least a 51% by volume of the liquid is distributed on the surface of the die in the form of droplets with a weight between 1.5 and 190 micrograms; b) placing the tube or tubular component, which has been heated, in the die, in direct contact with the liquid; c) forming the tube or tubular component; and d) cooling the tube or tubular component after forming at a very fast cooling rate of 107 k/s or more up to a temperature of 550° C. and with a low cooling rate of 14 k/s or less from 190° C. downwards, wherein the very fast cooling comprises the cooling of the tube or tubular component using the latent heat of evaporation of the liquid. [1255] The method according to [1239] wherein the sheet is a tube or tubular component which is formed in a die.

Any embodiment disclosed in this document may be combined with any other embodiment in any combination, provided that they are not mutually exclusive.

Some test conditions are as follows:

The HDT test conditions to determine deflection temperature in some embodiments measured according to ASTM D648-07 standard test method with a load of 0.455 MPa [66 psi] or 1.82 MPa [264 psi] are disclosed below.

Heat deflection temperature is measured in an automated apparatus, with silicon oil as liquid heat-transfer medium up to 250° C., for higher temperatures graphite powder is employed as heat-transfer medium (and a thermocouple calibrated according to ASTM E2846-14 instead a thermometer for temperature measurement) 3 specimens are used of 3 mm width according to ASTM D648-07 Method A, with loads of 0.455 MPa [0.66 psi] or 1.82 MPa [264 psi], the load used is indicated for each measure. Prior to the analysis test specimens and bath are equilibrated at 30° C., heating rate is 2° C./min. Test specimens are obtained according to moulding methods A to C disclosed below. When a specimen can be obtained by more than one moulding method (A to C), the specimen obtained by each method is tested and the highest value obtained is the value selected of heat deflection temperature.

Preparation of test specimens: the mould used to obtain the test specimen for heat deflection temperature is 127 mm in length, 13 mm when HDT is measured according to ISO 75-1:2013 Method B test with a load of 0.455 MPa or 1.82 MPa (the load used is indicated for each measure).

Glass transition temperature (Tg) is measured by differential scanning calorimetry (DSC) according to ASTM D3418-12. Weight of the sample 10 mg. In a ceramic container. Purge gas used argon (99.9%) at flow rate 25 ml/min. Heating/cooling rates 10° C./min. For liquid polymers or resins, after pulverization the sample is polymerized according to moulding methods A to C disclosed below to obtain a test specimen, and then the sample is pulverized. When a specimen can be obtained by more than one moulding method (A to C), the specimen obtained by each method is tested and the highest value obtained is the value selected of Tg.

Moulding Methods:

Moulding method A. Photopolymerization is carried using a photo-initiator. Photo-initiator (type, percentage) is selected in accordance with the recommendations of the supplier. If not provided, the photo-initiator used is Benzoyl peroxide, 2% by weight. A mould with the required dimensions in function the specimen required is filled with a homogeneous mixture between the resin and the photo-initiator. The mixture is polymerized according with the cured conditions provided by the supplier (wavelength, and time of exposure), if not provided the material is cured under UV lamp (365 nm, 6 W) for 2 h. After this time the specimen is removed from the mould and the bottom part is also cured in the same conditions as upper part. The cure is carried out in a closed light insulating box, where only the radiation of the lamp incident in the specimen, which is 10 cm away from the light source.

Moulding method B. Thermoforming is carried in a conventional thermoforming machine, the required amount of material to obtain a 3 mm in thickness is clamped in the frame of the mould. Once the material sheet is secured in the heating area, it is heated to forming temperature, which is selected in accordance with the supplier recommendations, if not provided, temperature selected is 20° C. below the glass transition temperature (Tg). Once specimen is in the mould, is cooled to 25° C. The excess material to obtain the required specimen is removed.

Moulding method C. Injection moulding is carried in a conventional injection moulding machine. Plastics pellets are selected as raw material when available, if not the different chemical components are injected into the barrel. The material is heated up the temperature and during the time recommended by the supplier, if not provided, the material is heated to a temperature 10° C. above their melting temperature and maintained for 5 minutes (when the degradation point of the material is more than 50° C. higher than the melting temperature) or 20° C. above the glass transition temperature (Tg) of the material (if the degradation point is less than 50° C. higher than the melting temperature).

Any embodiment disclosed in this document can be combined with any other embodiment in any combination provided they are not mutually exclusive.

Example 1. The relevant properties of some polymeric materials used to manufacture different types or molds (some of them with complex geometries and internal features) through different technologies, including AM (FDM, SLS, MJF, BJ SLA, DLP, CDLP) were tested as shown in Table 1.

| Polymer | Tg (° C.) | Tm (° C.) | HDT at 0.455 MPa (° C.) | HDT at 1.82 MPa (° C.) | Vicat (° C.) | Tensile strength (MPa) | Tensile modulus (MPa) | Elastic modulus (GPa) |
|---|---|---|---|---|---|---|---|---|
| Resin 1 | 62 | | | | | 8 | 3500 | <3.5 |
| Resin 2 | 62 | | | | | | | <2.14 |
| PP | 0 | | 62 | | 107 | | | |
| PP *** | 0 | 139 ± 2 | | 56 ± 5 | | 29 ± 1 | 1400 ± 100 | 1.15 ± 0.025 |
| PP **** | 0 | 139 | 71 | 56 | | 25 | 1400 | 1.15 |
| PEBA | | 150 | | | | 8 | 80 | |
| PA121 | 50 | 187 | 175 | 95 | | 48 | 1700 | |
| PA122 | 50 | 176 | | | 163 | 52 | 1800 | 1.5 |
| PS | 105 | | | | | 5.5 | 1600 | |
| PCL* | −59 | 79 | 57 | | | 45 | 350 | |
| PCL** | −59 | 58-60 | | | | 17.5 | 470 | 0.41 |
| PLA1 | 57 | 150 | | 65 | 85 | 110 | 3309 | |
| PLA2 | 54-64 | 145-160 | | 56 | | 108 | 3600 | |
| HIPS | 100 | | | 79 | 100 | 38 | 1750 | |
| LDPE | −125 | 112 | | | 95 | 13.5 | 115 | |
| HDPE | −125 | 132 | | | 79 | 27 | 1100 | |
| PMMA | 90 | 155 | | | 77 | 51 | | 2.3 |
| ABS | 108 | 240 | 96 | 82 | | 31 | 2200 | 2.1 |
| PC | 150 | 225 | 148 | 133 | 145 | 76.4 | 2310 | 2.13 |

*The molecular weight was 75000.
**The molecular weight was 47500-130000
*** Cristallinity >20%
**** Cristalinity >30%.

All melting temperatures (Tm) were measured following test conditions of ISO11357-1/-3:2016. Moreover, the HDT at 1.82 MPa and glass transition temperature (Tg) were determined following test conditions of ASTM D648-07 and ASTM D3418-12 respectively. HDT at 0.455 MPa was determined following test conditions of ISO 75-1:2013. In all the cases measurements were run in triplicate to ensure the reproducibility of the assay and using a test specimen manufactured using molding method A.

Example 2. Some molds were manufactured using different AM technologies, as shown in Table 2 below.

| AM technology | Polymers |
|---|---|
| SLA | Resin 1, Resin 2, Epoxy resin, UF, MF |
| DLP | Resin 1, Resin 2, PF, UF, MF |
| CDLP | Resin 1, Resin 2, Epoxy resin, UF, MF |
| SLS | PP***, PP****, PEBA, PA122, PS, PCL2, PVC, Kollidon VA64, Kollidon 12FP, Epoxi resin, PA6, PE, PA11, PHA, PHB |

-continued

| AM technology | Polymers |
|---|---|
| MJF | PA121, PPO, PA6, PA122, PA11 |
| FDM | PP (homopolymer), PCL1, PLA1, PLA2, HIPS, LDPE, HDPE, PMMA, ABS, SAN, PPO, PVC, PVA, PC, POM, PE, PET, PBT, UP, PHA, PHB |
| BJ | PVA, PMMA, PA12, PA6 |
| DOD | Resin 1, Resin 2, Epoxy resin, PF |
| PIM | PET, PP, PA6, HDPE |

*Cristallinity >20% **Cristalinity >30%.

Several of the resulting metallic components had complex geometry and internal features The manufactured molds were filled with different metal powder mixtures and used to manufacture different types of metallic components according with the methods disclosed in this document. The obtained metallic components shown a high performance and good dimensional accuracy. Different methods provided different dimensional accuracies.

For most demanding accuracy and complex geometry SLS was employed. Also BJ and MJF were tested successfully for complex geometries and high accuracy.

Example 3: Metal parts for the automotive sector were manufactured using a complex biocompatible plastic mold including an internal solid part manufactured with a fused deposition material (FDM) technology and filled with 5 different powder mixtures. The same was replicated using PP, PS and PA powders manufacturing the polymeric molds with three different technologies: SLS, MJF and BJ. The metal powder mixtures were made blending a P1 powder and a P2 powder with the following compositions (all percentages being indicated in weight percent). P1 powder: % Fe: 32-56; % Cr: 8.6-12; % Ni: 2.2-5; % Mo: 0-3.1; % Ti: 1.5-3.4; % Co: 12-18; % Cu: 0-1.2; % Mn: 1.1-1.9; % Si: 0-1.9; % Al: 0-0.8; % S<0.1; % P<0.1; % Nb: 0-0.98; % Ta: 0-0.98; % W: 0-0.9; % V 0-0.8; % O<0.4; % N<0.24; % C<0.29 with a D50 between 2 and 60 microns and P2 powder: % Fe: 95-99.9999; % Cu: <0.5; % C: <1; % Mn: <0.75; % Mo: <2.9; % O: <0.8; % S: <0.1; % Cr: <0.1 (Table 3 below shows the different powder mixtures used in the test) with a D50 between 8 and 150 microns. In all tests P1 type powders were a 16-42% in volume of the mixture, while P2 type powders varied from 52-84% in volume of the mixture, except for a few test where the same proportions were used but as weight percent instead of volume percentage.

| | Powder mixture 1 |
|---|---|
| P1 | % Fe: 32-56; % Cr: 8.6-12; % Ni: 2.2-5; % Mo: 0-3.1; % Ti: 1.5-3.4; % Co: 12-18; % Cu: 0-1.2; % Mn: 1.1-1.9; % Si: 0-1.9; % Al: 0-0.8; % S <0.1; % P <0.1; % Nb: 0-0.98; % Ta: 0-0.98; % W: 0-0.9; % V 0-0.8; % O <0.4; % N <0.24; % C <0.29 |
| P2 | % Fe: 95-99.9999; % Cu: <0.5; % C: <1; % Mn: <0.75; % Mo: <2.9; % O: <0.8; % S: <0.1; % Cr: <0.1 |
| | Powder mixture 2 |
| P1 | % Fe: 40-46; % Cr: 5.4-8.1; % Ni: 0.8-2.4; % Mo: 1.1-1.6; % Ti: 2.4-3.2; % Co: 13-15; % Cu: 0.8-1.2; % Mn: 1.3-1.5; % Si: 1.4-1.7; % Al: 0.3-0.6; % S <0.1; % P <0.1; % Nb: 0-0.98; % Ta: 0-0.98; % W: 0-0.9; % V 0-0.8; % O <0.4; % N <0.24; % C <0.29 |
| P2 | % Fe: 95-99.9999; % Cu: <0.5; % C: <1; % Mn: <0.75; % Mo: <2.9; % O: <0.8; % S: <0.1; % Cr: <0.1 |
| | Powder mixture 3 |
| P1 | % Fe: 35-41; % Cr: 9.3-12; % Ni: 4-4.9; % Mo: 2.3-2.8; % Ti: 0.4-1.8 % Co: 8-14; % Cu: 0-1.2; % Mn: 1.1-1.9; % Si: 0-1.9; % S <0.1; % P <0.1; % Nb: 0-0.98; % Ta: 0-0.98; % V 0-0.8; % O <0.4; % N <0.24; % C <0.29 |
| P2 | % Fe: 98-99.9999; % Cu: <0.5; % C: <1; % Mn: <0.75; % O: <0.1; % S: <0.1; % Cr: <0.1 |
| | Powder mixture 4 |
| P1 | % Fe: 50-54.3; % Cr: 7.3-9.1; % Ni: 2.4-3.3; % Mo: 0.2-0.8; % Ti: 1.7-2.5; % Co: 17-22; % Cu: 0.8-1.2; % Mn: 1.5-1.9; % Si: 08-1.9; % Al: 0-0.8; % S <0.1; % P <0.1; % Nb: 0-0.98; % Ta: 0.4-0.98; % W: 0.6-0.9; % V 0-0.8; % O <0.4; % N <0.24; % C <0.29 |
| P2 | % Fe: 93.1-97.9; % Cu: <0.5; % C: <1; % Mn: <1.3; % Mo: <3.1; % O: <0.5; % S: <0.1; % Cr: <0.1 |
| | Powder mixture 5 |
| P1 | % Fe: 32-39; % Cr: 10.1-11.4; % Ni: 3.8-4.8; % Mo: 2.4-2.7; % Ti: 2.8-3.2; % Co: 13.4-14.3; % Cu: 0-1.2; % Mn: 1.1-1.9; % Si: 0-1.9; % Al: 0-0.8; % S <0.1; % P <0.1; % Nb: 0-0.98; % Ta: 0-0.98; % W: 0-0.9; % V 0-0.8; % O <0.4; % N <0.24; % C <0.29 |
| P2 | % Fe: 98-99.9999; % Cu: <0.05; % C: <0.1; % Mn: <0.45; % Mo: <1.9; % O: <0.01; % S: <0.1; % Cr: <0.1 |

The powder mixtures were blended for 60-90 minutes and the molds were filled up with a filling apparent density of 62%-80% (measured following test conditions of ASTM B329-06). Then, the lids were sealed and in some tests the molds were externally coated by dipping it in a rubber based liquid elastomer and dried for 2 h under forced ventilation before repeating the procedure to a total amount of 4-8 layers. In some tests the filled molds or the filled and coated molds were introduced in a vacuum bag (some bags were manufactured by thermo-sealing polymeric films like PA, Mylar®, Kapton®, Tedlar®, PE, . . . ). After that, the molds were subjected to vacuum conditions. The vacuum tightness was maintained below 0.04 mbar·l/s in all the sealed molds (measured following test conditions of DIN-EN 1779) after stopping the vacuum pump. Some of the molds were undercooled to −22° C. and the others were maintained at room temperature. At this point the sealed mold was introduced in a reactor and the pressure was raised (12-200 MPa) in 2 to 100 minutes, while holding the pressure, the temperature was raised (40-110° C.) and held for 0.25-8 h. Then the pressure was raised slowly again (30-600 MPa) during 15-60 mins. Then, the temperature was raised (70-130° C.) and maintained during 0.25-8 h. In a third step, the pressure was raised (200-1900 MPa) in 15-60 minutes, and the temperature (90-190° C.). These final conditions were held for 0.5-20 hours. Finally, the pressure was released very slowly to 0 MPa and the temperature cooled down.

Example 4: Some components for aeronautical application were obtained using molds manufactured with a thermoplastic polymer and filled with a metal powder. The molds with an oval or rectangular shape and 4 internal features with a thickness below 2 mm were printed using a SLS technique with a range between 9 to 12% isotropic increase (to alloy for size reduction during the pressing and sintering). The molds had an open external wall in one of the front sides to allow the powder filling.

The internal features, where all made solid (like is the case for the capillaries). Several powder compositions with an irregular shape and a D50 in the range of 2 to 225 microns were used within the following overall composition: % Fe: 86-99.9999; % Cu: <9; % C: <1.4; % Mn: <2.9; % Mo: <2.9; % Ni<9; % O: <0.4; % S: <0.1; % P: <0.1; % Si: <0.1; % Cr: <0.1% (all percentages being indicated in weight percent). After being mixed, closed and sealed, several molds were coated through immersion in an EDPM based liquid elastomer. The coated molds were subjected to a second coating made with a liquid silicone trough immersion. Then, all the molds were evacuated to an absolute pressure below 0.1 MPa. The vacuumed molds were then placed in a thermo-sealed vacuum bag which was evacuated with a vacuum pump to an absolute pressure below $1\cdot10^{-3}$ MPa and then thermo-sealed. Then the molds were introduced in a reactor wherein the pressure was applied through a pressurized fluid to 290-680 MPa, while holding the pressure, the temperature was raised up to 260-430K. Then, the pressure was released at a rate between 120 MPa/s and 49 MPa/h and then, the temperature was cooled down. The sealings and the molds were removed. The partially debinded pieces were introduced in a sintering reactor, where the remaining mold was removed through thermal pyrolysis and with slow heating with humidified hydrogen to 930-990K with some dwelling in between when degassing was observed. Then the atmosphere was changed to dry hydrogen and the component brought to 1610-1670K. The component was then introduced into a reactor and processed in similar conditions described in Example 19. The components were then finally machined, coated and texturized. In all cases the components obtained had good mechanical strength and very low porosity level.

Example 5: Metal components for use in industrial applications such as hot work tooling machinery were additive manufactured with a semi-crystalline polymer (crystallinity 12-24% measured by differential DSC) and a powder mixture made with an Fe based powder with 1.3-2.4% by weight of % V+% Cr+% Mo+% W+% Ta+% Zr+% Hf+% Ti and an Fe based powder with 0.2-0.82% by weight of % V+% Cr+% Mo+% W+% Ta+% Zr+% Hf+% Ti. The powders were blended in a double-cone mixer and filled into the mold up to a filling apparent density from 56% to 78% (measured following test conditions of ASTM B329-06). After sealed, the molds were introduced in a reactor and the pressure was raised to 480-820 MPa in 80 minutes. While holding the pressure, the temperature was raised to 280K-380K. Then, the pressure was released very slowly below 0.1 MPa and the temperature was cooled down under forced ventilation to a temperature between 330K and 316K. After that, the sealing and the mold were removed. The obtained components shown a good dimensional accuracy.

Example 6: Metal pieces for the cold work machinery market were obtained using molds manufactured with a thermoplastic and semi-crystalline polymer and filled with a metal powder. Several powder compositions with an irregular shape and a D50 in the range of 2 to 225 microns were used within the following overall composition: % Cr: 10-14; % Ni: 5.6-12.5; % Ti: 0.4-2.8; % Mo: 0-4.4; % B: 0-4; % Co: 0-12; % Mn: 0-2; % Cu: 0-2; % Al: 0-1; % Nb: 0-0.5; % Ce: 0-0.3; % Si: 0-2; % C, % N, % P, % S, % O each 0.09% max. % C+% N+% P+% S+% O: 0-0.3. % La+% Cs+% Nd+% Gd+% Pr+% Ac+% Th+% Tb+% Dy+% Ho+% Er+% Tm+% Yb+% Y+% Lu+% Sc+% Zr+% Hf: 0-0.4; % V+% Ta+% W: 0-0.8; the rest being iron and trace elements wherein all trace elements are less than 0.9%. After closed and sealed, the molds were applied coatings with different materials as shown in table 4.

| Coating | Maximum working temperature (K) |
|---|---|
| Latex | 367 |
| EDPM Rubber 1 | 331 |
| EDPM Rubber 2 | 453 |
| Silicone 1 | 443 |
| Silicone 2 | 473 |
| Silicone 3 | 481 |
| Thermo-sealable bag 1 | 423 |
| Thermo-sealable bag 2 | 433 |
| Thermo-sealable bag 3 | 493 |

The leak rates obtained for the coated piece were between 0.9 mbar·l/seg and $1.12\cdot10^{-7}$ mbar·l/seg. The final pressure after vacuum was between $1\cdot10^{-2}$ mbar and 514 mbar. Then the molds were introduced in a reactor wherein the pressure was applied through a pressurized fluid to 200-315 MPa, while holding the pressure, the temperature was raised up to 367-493K. Then, the pressure was released at a rate between 120 MPa/s and 49 MPa/h and the temperature was cooled down. The sealings and the molds were removed. The totally debinded pieces were subjected to a thermal treatment, and then introduced into a post-treatment reactor to obtain different pieces which were assembled to produce a bigger component with low porosity and high performance.

Example 7: Metal components were additive manufactured with SLS printed molds of different polymers and a powder mixture made with an Fe based powder with –A powder P1 consisting of: % Fe: 32-89; % Cr: 8.6-24.9; % Ni: 2.2-19.8; % Mo: 0-6.9; % Ti: 0-3.4; % Co: 0-18; % Cu: 0-6.9; % Mn: 0-1.9; % Si: 0-1.9; % Al: 0-0.8; % S<0.1; % P<0.1; % Nb: 0-0.98; % Ta: 0-0.98; % W: 0-0.9; % V 0-0.8; % B: 0-2.9; % O<0.4; % N<0.24; % C<0.29 and trace elements wherein all trace elements are less than 0.9%.

–A powder P2 consisting of: % Fe: 86-99.9999; % Cu: <9; % C: <1.4; % Mn: <2.9; % Mo: <2.9; % Ni<9; % O: <0.4; % S: <0.1; % P: <0.1 and trace elements wherein all trace elements are less than 0.9%. the powders mixtures were obtained by mixing two or more powders. More than three powders were used when the alloying powder (% Fe: <90%) was divided in more than one powder. The powders were blended in a vibrating table with a support, then filled into the mold up to a filling apparent density from 70% to 87% (measured following test conditions of ASTM B329-06). After sealed, some of the molds were coated and introduced in a reactor and the procedure conducted was according to the described in Example 3. Then, the pressure was released very slowly below 80 MPa at a rate of $100^{-1}$ MPa/s and temperature was cooled down under forced ventilation to a temperature between 330K and 315K. After that, the sealing and the mold were removed. After that, a thermal treatment was conducted according to method described in Example 18. The properties of the pieces obtained showed high performance and outstanding mechanical properties in terms of wear and temperature resistance.

Example 8: A metal piece for an automotive application was manufactured using a semi-crystalline polymer (Crystallinity of the polymer depended on the plastic provider), concretely PP (Polypropylene) mold. The mold was filled with a metallic mixture as described in previous Example 3. The filled mold was coated with EPDM rubber and vacuumed for 24 h at $1\cdot10^{-3}$ MPa. The mold was undercooled at −8° C. for 24 h prior to its use at the reactor. The mold was subjected to high pressure, 600 MPa for 6 h while the temperature was raised to 400-425K. Then, the pressure was released slowly to 0.1 MPa with a rate of 1 MPa/s. After that, some part of the remaining mold was removed by the debinding process. The metal part was then thermally treated in a reactor at 1650-1700K for 4 h. At the end, the metallic piece shown a high corrosion resistance to heat and chemicals.

Example 9: A metal parts for clinical application was additive manufactured in SLS. The complex molds were printed using PCL pellets previously cryomilled. The molds were filled using at least 2 powders with the following compositions and limitations: a powder P1 consisting of: % Fe: 32-89; % Cr: 8.6-24.9; % Ni: 2.2-19.8; % Mo: 0-6.9; % Ti: 0-3.4; % Co: 0-18; % Cu: 0-6.9; % Mn: 0-1.9; % Si: 0-1.9; % Al: 0-0.8; % S<0.1; % P<0.1; % Nb: 0-0.98; % Ta: 0-0.98; % W: 0-0.9; % V 0-0.8; % B: 0-2.9; % O<0.4; % N<0.24; % C<0.29 and trace elements wherein all trace elements are less than 0.9%. A powder P2 consisting of: % Fe: 86-99.9999; % Cu: <9; % C: <1.4; % Mn: <2.9; % Mo: <2.9; % Ni<9; % O: <0.4; % S: <0.1; % P: <0.1 and trace elements wherein all trace elements are less than 0.9%. The sealed molds were vacuumed and the leak rate of pressure drop measured for all the molds was in the range $1.5\cdot10^{-5}$ and $8.9\cdot10^{-2}$ mbar·l/s. The molds were introduced in a reactor where water was used as a pressure multiplier. All of the molds were subjected to 180-450 MPa of pressure while the temperature was raised to 330-390K. The pressure was then slowly released till 10 MPa. Some of the resulting metal parts were subjected to a post-process according to the method described in Example 18. The applied conditions were: a pressure of 80-100 MPa and a temperature of 1480-1580 K. These conditions were maintained for at least 3-6 h. All the metal parts were assembled to construct a high metal part showing a great accuracy and mechanical properties performance.

Example 10: Metal components for tooling were manufactured by manufacturing a mold of a plastic polymer which was filled by a powder mixture of 2 powders. The first one, with a hardness of 102-112 HV and the second, with a hardness of 120-129 HV both measured according to ISO 6507-1. The powders were blended in a mixer and filled into the mold up to a filling apparent density from 67% to 75% (measured following test conditions of ASTM B329-06). After sealed, the molds were introduced in a reactor and the pressure was raised to 150-650 MPa in 60 minutes. While holding the pressure, the temperature was raised to 300K-390K. Then, the pressure was released very slowly below 0.1 MPa and the temperature was cooled down under forced ventilation to a temperature between 330K and 316K. After that, the sealing and the mold were removed. After that, some part of the remaining mold was removed by the debinding process. The metal part was then thermally treated in a reactor at 1650-1700K. The final components reached the properties desired.

Example 11: A metal matrix for the automotive sector was produced using a non-crystalline polymer PA12 reinforced with fiberglass. The mold was manufactured using the MJF additive manufacturing process. The mixture of powders (more than 3 powders in this case) was blended in a Turbula® for 30-90 min at 45-80 Hz prior to their use. Filled mold achieved a filling apparent density on 72.88% (measured following test conditions of ASTM B329-06). Then, the mold was coated with 4-6 layers of EPDM rubber 2 and 2-4 layers of silicone 3. Coated mold was introduced into polymeric vacuum bag and the O2 was extracted through a vacuum process.

Then, the mold was placed in a reactor and the pressure was raised to 125-350 MPa for 3 h while the temperature was raised to 380-420K. After that, the pressure was slowly released. A part of the mold was removed through the debinding process. The metal matrix was then introduced into a reactor where the pressure was maintained at 100-150 MPa and the temperature at 1520-1600K for 2-4 h. The final metal piece shown a high metal properties performance in terms of corrosion resistance.

Example 12: A metal piece was manufactured, for that, a polymer mold was printed with FDM printing technology but with a simple geometry without any internal feature. Some of the compositions described in Example 3 were tested with this basic mold. In this case, the O2 content in the alloying powder (% Fe:<90%) was reduced to 0-0.5 by using a proper technique of oxygen reduction. Then, the powders were mixed for 50-120 min in a double-cone mixer at 40-90 Hz. The mold was filled up to a filling apparent density of 83.1% and the lid was glued. The mold was coated by using 3 layers of EDPM rubber and 2 layers of silicone. After that, the mold was subjected to vacuum conditions and undercooled to a Tg −50° C. After 24 h at undercooling conditions, the sealed mold was introduced in a reactor and a similar process to the Example 3 was conducted but with a higher temperature of 193° C. The metallic part produced was post-treated according to the methods described in Example 18.

Example 13: A hot stamping mold was fabricated with the method disclosed in this document. The mold was mounted in a try-out pilot line and tested to simulate a 20 spm serial production. The mold had a capillary thermoregulation system, with all the functional surface thermoregulated by capillary conducts with a diameter of 2 mm and separated from the surface 4 mm and separated from each other a mean distance of 6 mm. The capillaries were kept under a length at 4 mm from the surface below 50 mm and total length between connections to larger conducts was less than 70 mm for the capillaries. The diameter of the tubes distributing/collecting from the capillaries or other tubes were chosen according to the equivalent cross-section principle. Each segment ended up with only one main inlet and one main outlet for the thermoregulation fluid. The segment was also sprayed with a system of curtain nozzles that distributed liquid (more than 98% water) on the die surface which was coated with ALTiN by means of a high energy arc plasma acceleration system with a thickness of 6 microns. The coating was texturized with two different patterns with very different contact angle hysteresis to the distributed-liquid. The areas of high hysteresis were dot-shaped with a diameter of 2.5 mm and the centers separated 11.5 mm. The areas inside the dot-shaped figures presented a contact angle hysteresis with the distributed liquid of more than 100° while the areas outside presented and hysteresis of less than 3°. Both presented a contact angle with the distributed liquid of more than 110°. This surface conditioning caused the sprayed liquid to concentrate in the dot-shaped areas leaving droplets with 62 micrograms mean weight. The hot-stamped sheet was 2.5 mm thick Usibor 1500 (22MnB5 with AlSi coating) and was formed at a mean temperature of 720° C. and cooled down to 200° C. in less than half a second, when it was extracted and let cool in air. The so processed sheet had a mean yield strength surpassing 1150 MPa, more than 1560 MPa ultimate strength and over 10.5% $A_{50}$.

The hot stamping die was manufactured according to the methods disclosed in this document. A mold was manufactured of PA12 with a SLS printer. The mold had the complementary figure to the hot-stamping die, so that the cavity of the mold delivered the die geometry with a 12% isotropic increase (to alloy for size reduction during the pressing and sintering). The mold has a missing external wall in one of the front sides to allow for the powder filling, the corresponding lids were manufactured one with a thickness of 3 mm (for final closure) and one with 30 mm which was used to exert pressure while vibrating during the filling. The mean wall thickness of the mold was 6 mm). The stamping die comprised both external features and internal features (mainly the thermoregulation system with the capillaries and thermoregulation fluid distribution circuits and some voids left inside in order to reduce weight and thus cost. The internal features with a diameter or thickness below 10 mm, where all made solid (like is the case for the capillaries) while larger internal features were made void and connected to each other until reaching the surface so that pressure could be applied in the internal features (see schematic representation in FIG.-1). The mold was filled with 75% of a spherical gas atomized powder with D50 of 350 microns and the following composition by weight (12% Cr; 11% Ni; 1.6% Ti; 1% Mo; 60 ppm of boron, the rest being Fe and impurities [trace elements which are below 0.9% by weight in total]); 14% of an irregular water atomized Fe powder (Mn<0.1% by weight; Cr, Cu and Ni<0.05% by weight; O<0.1% by weight) with a D50 of 40 microns; and the rest (about 11%) of a fine gas atomized spherical powder with D90 of 8 microns and the following composition by weight (27.3% Cr; 25% Ni; 3.64% Ti; 2.27% Mo; 0.2% B, the rest being Fe and impurities [trace elements which are below 0.9% by weight in total]). The powders were blended in a double-cone mixer for 30 minutes, and filled into the mold that was vibrated at 35 Hz on a vibration table while a 2.2 MPa were applied through a hydraulic system mounted on the vibration table and with help of the thick lid. The mold was filled up to a filling apparent density of 74.5% and the lid was glued. Then the mold was coated through immersion in an EDPM based liquid elastomer and let dry for 2 h before repeating the operation. Some metallic tubes were glued to the filled mold when coating to leave some sleeves to make vacuum. When the coating was dry, the sleeves were used to evacuate the mold to an absolute pressure below 1 mbar and then the sleeves were clamped tight. The vacuumed coated and filled mold was then placed in a thermo-sealed Tedlar bag which was evacuated with a vacuum pump to an absolute pressure below 1 mbar and then thermo-sealed. At this point the sealed mold was introduced in a reactor and the pressure was raised to 200 MPa, while holding the pressure, the temperature was raised to 175° C. and held for 2 h. Then the pressure was slowly released specially after reaching 20 MPa. Finally the component was cooled, the sealing removed and as much as possible of the mold provided in method step a) also. The component in this state, was introduced in a debinding/sintering reactor, were the remaining mold was removed through thermal pyrolysis and with slow heating with humidified hydrogen to 700° C. with some dwelling in between when degassing was observed. Then the atmosphere was changed to dry hydrogen and the component brought to 1370° C. where it was held for 35 minutes for sintering. The component was then introduced into a reactor and processed at 200 MPa and 1200° C. for 2.5 h. The component was then finally machined, coated and texturized.

Example 14: Tests were made with the method described in Example 13 but with a simplified test geometry with a novel mixture of at least two powders according to the present invention. The mixtures were made with at least one powder (P1) comprising the following elements and limitations (all the percentages by weight): % Fe: 32-95; % Cr: 8.6-24.9; % Ni: 2.2-19.8; % Mo: 0-6.9; % Ti: 0-3.4; % Co: 0-18; % Cu: 0-6.9; % Mn: 0-1.9; % Si: 0-1.9; % Al: 0-0.8; % S<0.1; % P<0.1; % Nb: 0-0.98; % Ta: 0-0.98; % W: 0-0.9; % V 0-0.8; % O<0.4; % N<0.24; % C<0.29 and another powder (P2) comprising the following elements and limitations: % Fe: 86-99.9999; % Cu: <9; % C: <1.4; % Mn: <2.9; % Mo: <2.9; % Ni<9; % O: <0.4; % S: <0.1; % P: <0.1. In all cases P1 had a D50 between 120 and 400 microns, while P2 had a D50 between 12 and 48 microns.

Some tests were made only with powders P1 and P2. In some tests only one powder of the P1 type and one powder of the P2 type were taken. In some tests more than one powder of P1 type were taken. In some tests more than one powder of P2 type were taken. In some tests, P1 was highly spherical powder obtained through gas atomization, high pressure water atomization or centrifugal atomization. In some tests at least part of the P1 type powders were irregular in shape obtained by water atomization. In most tests the majority of P2 powders were rather irregular in shape, obtained by water atomization, reduction (mostly sponge iron) or crushing. In all tests P1 type powders were a 52-84% in volume of the mixture. P2 type powders varied from 16-42% in volume of the mixture.

Tests were made also with more powders. In a set of tryouts at least one more powder P3 was introduced chosen from the following compositional range (all the percentages by weight): % Fe: 32-95; % Cr: 8.6-24.9; % Ni: 2.2-19.8; % Mo: 0-6.9; % Ti: 0-3.4; % Co: 0-18; % Cu: 0-6.9; % Mn: 0-1.9; % Si: 0-1.9; % Al: 0-0.8; % S<0.1; % P<0.1; % Nb: 0-0.98; % Ta: 0-0.98; % W: 0-0.9; % V 0-0.8; % O<0.4; % N<0.24; % C<0.29. In some tests, P3 type powders were highly spherical powder obtained through gas atomization, high pressure water atomization or centrifugal atomization. In some tests at least part of the P3 type powders were irregular in shape obtained by water atomization. P3 type powders had a D50 between 2 and 54 microns. Then the same powder P3 was manufactured again but without one of the alloying elements (% Cr, % Ti, % Ni) which was added separately as a ferro-alloy element (fine powder).

In all cases, very complex geometries were attainable (including hot stamping dies with conformal cooling, a reduced weight main shaft for a windmill, and several complex geometry demonstrators including connected and closed internal features). In all cases the components obtained presented an outstanding stress corrosion cracking, mechanical strength and wear resistance preventing early failure through cracking or wear.

These mixtures should also work for the other methods described in the other examples and within the document. Furthermore, these mixtures could be used in other powder consolidation techniques (like for example: AM, HIP, CIP, thermal spray, cold spray, laser cladding, . . . ) with similar final functionality (taking into account in the design the shortcomings associated to each of the alternative manufacturing techniques).

Example 15: The powders mixtures with the compositions described in Examples 3-13 were tested and the same overall composition was attained with at least 3 powders. In some cases the alloyed powder (one with a % Fe less than 90% Fe) was divided in more than one powder. Increased apparent filling density was observed if the particular powders are obtained by different manufacturing ways. In one case two different atomization methods were used from gas atomization, water atomization, oxide reduction, carbonyl decomposition, mechanical attrition . . . . In another case, three different atomization methods were used. Also, more than three different atomization methods could be used. The apparent filling density was particularly interesting when a mixture of water atomization, gas atomization and carbonyl iron powder was used.

The apparent filling density (measured according ASTM B329-06) was >72% when D50 of gas atomized was 8-30 microns, D50 of water atomized was 30-150 microns and carbonyl iron D50 was 2-25 microns; for all the mixtures processed. Several, 1-4, different gas atomized powders and water atomized powders were used to determine which kind of powder performed better mechanical properties at the end of the tests. In all cases, when three powders were mixed, the composition of each one of the powders was in the range, 15-55% w/v, 15-55% w/v, 20-80% w/v, gas atomized, carbonyl iron and water atomized, respectively. The results were particularly interesting in terms of apparent filling density when the composition in (% w/v) was 20-35% w/v, 20-35% w/v, 40-60% w/v, gas atomized, carbonyl iron and water atomized, respectively. At this points some trials were made with the same philosophy but replacing one of the three powders by a fourth, fifth, sixth . . . . And eventually tenth powders. It was also interesting the apparent filling density achieved when the mixture was made by mixing high iron (% Fe: >90%) water atomization powder with gas atomization. For all these cases, the apparent filling density achieved was >60% when the D50 was in the same range than the described previously. In all cases tested, the composition in (% w/v) was in the range 20-50% w/v and 50-80% w/v, gas atomized and water atomized, respectively. It was also interesting in terms of apparent filling density when the powder mixture had the composition in (% w/v) was in the range 20-35% w/v and 65-80% w/v, gas atomized and water atomized, respectively.

Example 16: Some compositions of powders mixtures described in Example 3-13 were performed by adding one way (% Y+% Sc): 0.01-1.5% or in the other way (% Y+% Sc+% REE): 0.01-1.5% as a supplementary elemental powder. In some cases, the (% Y+% Sc): 0.01-1.5% or (% Y+% Sc+% REE): 0.01-1.5% was added to the gas atomized powder. The mechanical properties of the metal part at the end of the tests were improved interestingly when the concentration in (% v/v) was (% Y+% Sc): 0.05-0.6% or (% Y+% Sc+% REE): 0.05-0.6%. Also, interesting results in terms of improved mechanical properties were observed when the % Fe in the gas atomization powder was less than (% Fe:<88%). In all tested cases, it was ensured that the 02 level in all the powders mixtures was in the range 20-2000 ppm O2. The most interesting mechanical properties improvement was attained when the O2 concentration in the powder mixture was in the range 100-1000 ppm. In other cases (% Y+% Sc): 0.01-1.5% or (% Y+% Sc+% REE): 0.01-1.5% were added to the water atomized powder. An improvement on mechanical properties of the final metal part was detected when the concentration in (% v/v) was in the range (% Y+% Sc): 0.05-0.6% or (% Y+% Sc+% REE): 0.05-0.6%. The best mechanical properties were observed when the concentration of iron % Fe in water atomization powder was more than (% Fe>95). In all tested cases, it was ensured that the 02 level in all the powders mixtures was in the range 20-2000 ppm O2. The most interesting mechanical properties improvement was attained when the O2 concentration in the powder mixture was in the range 100-1000 ppm. Also, improvement on mechanical properties were detected when (% Y+% Sc): 0.01-1.5% or (% Y+% Sc+% REE): 0.01-1.5% was added to the alloying powder. Particularly, in those cases in which the concentration in terms of (% v/v) of (% Y+% Sc): 0.05-0.6% or (% Y+% Sc+% REE): 0.05-0.6%, the highest improvement on mechanical properties was attained. In all tested cases, it was ensured that the O2 level in all the powders mixtures was in the range 20-2000 ppm O2. The most interesting mechanical properties improvement was attained when the O2 concentration in the powder mixture was in the range 100-1000 ppm. Addition of (% Y+% Sc) or (% Y+% Sc+% REE) could be favourable in terms of final mechanical properties if the alloyed powder was divided in more than one powder.

Example 17: Some parts were manufactured according to the methods of Examples 3-13. All mixtures were attained with at least 2, 3, or more than 3 powders. All the mixtures tested had at least one of the powders in a Fe concentration (% Fe) % Fe: 90-99.9999%. The overall compositions of the powders mixtures can be observed in the following table.

| | % C | % Mn | % Si | % Cr | % Mo | % V | % W | % Ni | % Co | % Ti | % Al | % Cu | % Fe |
|---|---|---|---|---|---|---|---|---|---|---|---|---|---|
| Comp 1 | 0.25-0.8 | 0-1.15 | 0-0.35 | <0.1 | 1.5-6.5 | 0-0.6 | 0-4 | 0-4 | 0-3 | | | | Bal |
| Comp 2 | 0.25-0.55 | 0.10-1.2 | 0.10-1.20 | 2.5-5.50 | 1.00-3.30 | 0.30-1.20 | | | | | | | Bal |
| Comp 3 | 0.15-2.35 | 0.10-2.5 | 0.10-1.0 | 0.2-17.50 | 0-1.4 | 0-1 | 0-2.2 | 0-4.3 | | | | | Bal |
| Comp 4 | 0-0.4 | 0.1-1 | 0-0.8 | 0-5.25 | 0-1.0 | 0-0.25 | | 0-4.25 | | | 0-1.25 | | Bal |
| Comp 5 | 0.77-1.40 | | 0-0.70 | 3.5-4.5 | 3.2-10 | 0.9-3.60 | 0-18.70 | | 0-10.50 | | | | Bal |
| Comp 6 | <0.03 | <0.10 | <0.10 | | 3.0-5.2 | | | 18-19 | 0-12.50 | 0-2 | | | Bal |
| Comp 7 | 1.5-1.85 | 0.15-0.50 | 0.15-0.45 | 3.5-5.0 | 0-6.75 | 4.5-5.25 | 11.5-13.0 | | 0-5.25 | | | | Bal |

-continued

| | % C | % Mn | % Si | % Cr | % Mo | % V | % W | % Ni | % Co | % Ti | % Al | % Cu | % Fe |
|---|---|---|---|---|---|---|---|---|---|---|---|---|---|
| Comp 8 | 0-0.6 | 0-1.5 | 0-1 | 11.5-17.5 | 0-1.5 | 0-0.2 | | 0-6.0 | | | | | Bal |
| Comp 9 | <0.015 | 0.5-1.25 | 0.2-1 | 11.0-18.0 | 0-3.25 | | | 3.0-9.5 | | 0-1.40 | 0-1.50 | 0-5.00 | Bal |

was particularly interesting in terms of apparent filling density those molds which were filled with a powders mixtures containing carbonyl iron with a concentration (% w/v) in a range of 6-35%. The highest apparent filling density was attained using a carbonyl iron concentration in a range of 12-27%. All of these compositions were processed in the same way as described in Example 3.

Example 18: Some of the metal parts obtained in the examples 3-13 were subjected to a post-treatment to remove the remaining plastic mold, step h) of the process, and to increase their mechanical properties. In some cases, the debinding process, consisted in introducing some metal parts inside a furnace and keep the temperature in the range 920-1150K for 8 h under vacuum atmosphere. The total plastic mold removal was particularly interesting when the temperature was in the range 950-1050K at vacuum conditions of total absolute pressure of $1\cdot10^{-7}$ MPa. Some other metal parts required an additional step, step l) disclosed in the present document, referred to a heat treatment which reduced the total porosity of some metal parts and improved their mechanic properties. In some cases, the heat treatment process consisted in introducing the metal part in a furnace and increasing the temperature until 1100-1250K using a raising ramp of more than 1 K/min under inert atmosphere. After that, a continuous increasing of temperature to 1350-1650K using a ramp of at least 1K/min. Once arrived to the final temperature, the temperature was maintained at high level for at least 0.5-20 h. After that, a slowly temperature realising to room temperature. In some other cases, the cooling down was forced by using ventilators. In some cases, the inert gas used during the heat treatment was argon. A high porosity reduction was observed particularly when the atmosphere used in the process was dry hydrogen. High porosity reduction could be obtained by using another inert gas during the heat treatment such as nitrogen, helium, mixtures of argon and/or nitrogen with hydrogen. In some cases when the closed porosity was not totally eliminated, it was advantageous to apply an additional step. Step k) in the present document which was used to remove remaining internal porosities. Some metal parts were introduced into a reactor where a ramp of temperature and pressure was applied. In some cases, the temperature was raised alongside with the pressure, reaching a high temperature of 1300-1700K and 70-200 MPa. In a second step, the temperature and pressure were maintained at high level for 0.5-24 hours and finally, in a third step, a cooling ramp was applied for both conditions until reaching room temperature and ambient pressure. It was particularly interesting in terms of porosity removal a cycle with the following conditions: a first step, raising the temperature to 1523-1623 K and at the same time, raising the pressure to 80-100 MPa in less than 5 h. At the second step both conditions were maintained for 0.5-10 h. Finally, temperature and pressure where brought to initial conditions. In some cases, a different process was feasible, normally in those cases in which the concentration of carbonyl iron exceeded 6% by weight. In some cases, some of the metal parts were introduced into a reactor and processed in a first step at 0.009-90 MPa and a temperature between 0.36 and 0.89 times the melting temperature of the lower melting temperature powder. In a second step the temperature was kept at a high level for 6 to 590 minutes. For a third step, the pressure was raised to 21-640 MPa. In a fourth step, the temperature was raised to between 0.76 and 1.08 times the melting temperature of the lower melting temperature powder. In a fifth step, the temperature and the pressure were kept at the same levels for 16 to 590 minutes. It was particularly interesting in terms of porosity removal a cycle with the following conditions: a first step where the pressure was 0-40 MPa and temperature 0.5-0.8 times the melting point. For the second step, the maintained conditions 360-480 minutes. For a third step the pressure was raised to 60-400 MPa. For the fourth step temperature was raised 0.86-1.05 times the melting point of the lowest melting point powder. And for the final step, the pressure and temperature were conserved for 150-250 minutes.

Example 19: Some components from the Example 3 were introduced in a debinding/sintering reactor, where the remaining mold was removed through thermal pyrolysis and with slow heating with humidified hydrogen to 450-800° C. with some dwelling in between when degassing was observed. Then the atmosphere was changed to dry hydrogen and the component brought to 1200-1420° C. where it was held for more than 35 minutes for sintering. Some of the component were processed after heat treatment process. Some other components were then introduced a reactor and processed in a first step at 0.009-90 MPa and a temperature between 0.36 and 0.89 times the melting temperature of the critical component. In a second step the temperature was kept at a high level for 6 to 590 minutes. For a third step, the pressure was raised to 21-640 MPa. In a fourth step, the temperature and the pressure where kept the same for 16 to 590 minutes. Some of the components were then finally machined, coated and or texturized. In all cases the components obtained presented acceptable mechanical strength and wear resistance for the intended application.

Example 20. Some parts were manufactured according to the methods of Examples 3-13. All mixtures were attained with at least 2, 3, or more than 3 powders. The overall compositions of the powders mixtures can be observed in the following table.

| | % Mg | % Si | % Ti | % Cr | % Mn | % Fe | % Ni | % Cu | % Zn | % Sn |
|---|---|---|---|---|---|---|---|---|---|---|
| Comp 10 | 0.006-10.6 | 0.006-23 | 0.002-0.35 | 0.01-0.4 | 0.002-1.8 | 0.006-1.5 | 0-3 | 0.006-10.7 | 0.006-7.8 | 0-7 |
| Comp 11 | | 0-4 | | 0-1 | 0-3 | 0-5.5 | 0-31 | Bal | 0-40 | 0-10 |
| Comp 12 | | 0-0.35 | | | | 0-0.25 | 0-2.2 | Bal | | 0-0.25 |

-continued

| | | | | | | | | | | |
|---|---|---|---|---|---|---|---|---|---|---|
| Comp 13 | | 0-3.9 | | 9-33 | 0-2.5 | 0-9 | 0-35 | | | |
| Comp 14 | | 0-1 | 0-3 | 0-31 | 0-5.25 | 0-42 | Bal | 0-34 | 0-1 | |
| Comp 15 | | 0-0.5 | Bal | 0-12 | 0-8 | 0-2.5 | | 0-3 | | 0-11.5 |
| Comp 16 | Bal | 0-1.1 | | | 0.75 | | | 0-3 | 0-6 | |

| | % Zr | % Al | % Pb | % Co | % Be | % W | % Mo | % C | % B | % V |
|---|---|---|---|---|---|---|---|---|---|---|
| Comp 10 | 0-0.5 | Bal | | | | | | | | |
| Comp 11 | | 0-13 | 0-4 | 0-2.7 | 0-2.75 | | | | | |
| Comp 12 | 0-0.5 | | 0-0.6 | 0-3 | 0.15-3 | | | | | |
| Comp 13 | | | | Bal | | 0-26 | 0-29 | 0-3.5 | 0-1 | 0-4.2 |
| Comp 14 | | 0-5 | | 0-18 | | 0-14 | 0-24 | 0-0.3 | | |
| Comp 15 | 0-7.5 | 0-8 | | | | | 0-13 | <0.1 | | 0-14.5 |
| Comp 16 | | 0-10 | | | | | | | | |

| | % Nb/Ta | % Nb | % S | % Ta | % N | % O | % H | % Y | % Ag | % Th |
|---|---|---|---|---|---|---|---|---|---|---|
| Comp 10 | | | | | | | | | | |
| Comp 11 | | | | | | | | | | |
| Comp 12 | | | | | | | | | | |
| Comp 13 | 0-5.5 | | | | | | | | | |
| Comp 14 | | 0-5.5 | <0.01 | | | | | | | |
| Comp 15 | | 0-2.5 | | 0-1.5 | <0.05 | <0.2 | <0.03 | | | |
| Comp 16 | | | | | | | | 0.-5.2 | 0-2.5 | 0-3.3 |

Some resulting metal parts were thermally treated in order to reduce the porosity and to increase the mechanical properties according to the methods described in Example 18.

Example 21: Components could be manufactured with the powders mixtures described in Examples 3-20 using a low temperature metal additive manufacturing method (Temperature required for the binding of the powder below 0.49 Tm). Additionally, the thermal and mechanical treatments described in Example 18 can also be applied.

Example 22: Several metal pieces for an automotive application was manufactured using an amorphous thermoplastic obtained in SLS additive manufacturing process. The mold was filled with a powder mixture as described in previous Example 3. The filled mold was coated with EPDM rubber and vacuumed for 8-12 h from $1\cdot10^{-3}$ to $5\cdot10^{-3}$ MPa. The mold was subjected to high pressure, 120-350 MPa for 6 h while the temperature was raised to 400-465K. Then, the pressure was released slowly to 0.1 MPa with a rate of 1 MPa/s. After that, some part of the remaining mold was removed by the debinding process. The metal part was then thermally treated in a reactor at 1650-1700K for 8-10 h. At the end, the metallic piece shown a high corrosion resistance to heat and chemicals.

Example 23: Several metal pieces were manufactured with the compositions of example 17 as a single powder. In some of the cases the powder was water atomized. In some of the cases the powder was gas atomized. Some were manufactured as those manufactured in examples 3-13 but using higher pressures (maximum pressures in the range 400-800 MPa). In the cases where Y, Sc and or REE were added in the same proportions as example 16, tendentially higher mechanical properties were attained. The manufacturing method described in example 21 could also be employed.

Example 24. A series of test have been performed where some liquids were deposited on a die surface using different types of projection. For each of these projection systems and liquid, the distribution, droplet size on the surface (in volume/weight) and percentage of the distributed-liquid present in the relevant surface of the die was determined as shown in table 1.

| Projection system | Liquid | Droplets size [mg] | Droplets size [mm] | Liquid distributed on the surface [%] |
|---|---|---|---|---|
| Curtain type nozzles* | Water | 30-117.5 | | 85-90 |
| Cone type nozzles | Water | | 3-6 | 76-80 |
| Double jet flat nozzles* | Water | 27-40 | | 67-73 |
| Aerosol | Water | | 0.16-1 | 54-60 |
| Pulverizer** | Water | 90-135 | | 70-76 |
| Curtain type nozzles* | Aqueous solution*** | | 4-6 | 87-90 |
| Cone type nozzles | Aqueous solution*** | | 3-5 | 74-79 |
| Double jet flat nozzles* | Aqueous solution*** | 25-60 | | 69-75 |
| Aerosol | Aqueous solution*** | 0.001-0.30 | | 62-68 |
| Pulverizer** | Aqueous solution*** | | 2-9 | 71-75 |
| Curtain type nozzles* | Aqueous solution**** | 165-389 | | 95-97 |
| Cone type nozzles | Aqueous solution**** | 7-180 | | 82-85 |
| Double jet flat nozzles* | Aqueous solution**** | | 3-6 | 77-81 |
| Aerosol | Aqueous solution**** | | 0.8-1.8 | 65-68 |
| Pulverizer** | Aqueous solution**** | 92-147 | | 88-92 |

*Done with a system that employs pressurized liquid.
**Done with a system that employs accelerated liquid.
***Aqueous solution with cationic surfactant (CTAB, CPC, BAC . . . )
****Aqueous solution with anionic surfactant (LAS, SDS, STS . . . )

Example 25. Different metal component have been manufactured from sheets whose mean thickness was in the range between 0.9 mm and 14 mm. The sheets used were uncoated and also coated (some examples: AlSi and Zn GA and GI coatings) iron alloy sheets (some examples: 22MnB5, 34MnB5, SQ1800).

The sheet was preheated before being placed in the mold/die and cooled after the forming process. For the forming process an amount of liquid was deposited and distributed on the surface of the mold/die. This distribution is detailed in the next table according to UADL and LADL parameters.

| Sheet thickness [mm] | Droplet size [g] | Liquid amount on surface [g/dm$^2$] |
|---|---|---|
| 0.9* | 0.015 | 6.48 |
| 1.5 | 0.05 | 2.16 |
| 2.1* | 0.081 | 14.92 |
| 3.2* | 0.1 | 11.25 |
| 4.8 | 0.12 | 16.96 |
| 8.7** | 0.27 | 14.58 |
| 14** | 0.38 | 7.97 |

*Values calculated with ST/10.

**Values from 8 to 14 mm are specifically for mining applications.

The sheet was placed on the surface of the mold/die in direct contact with the liquid. Once formed, it is mainly cooled by the latent heat of water vaporization.

Example 26. A sheet forming test was performed providing a hot stamping die comprising a liquid on its surface in form of droplets (7.52 g/dm2) using a projection system (curtain type nozzles). A 22MnB5 coated sheet (both AlSi and Zn GA were tried) of 0.9 mm thickness was pre-heated in a furnace between 800-900° C. and placed in the hot stamping die, in direct contact with the liquid. Forming the sheet and cooling after forming at a very fast cooling rate of 981 k/s using the latent heat of evaporation of the liquid up to a 190° C. Below that temperature the cooling rate became smaller than 10 K/s.

Example 27. A sheet forming test was performed providing a hot stamping die comprising a liquid on its surface in form of droplets (2.37 g/dm2) using a projection system (pulverizer) electrostatically charged with a potential difference of 75 kV between the die and liquid (in positive polarity) with a current of 63 μA. A 22MnB5 coated sheet of 1.65 mm thickness was pre-heated in a furnace between 700-900° C. and placed in the hot stamping die, in direct contact with the liquid. Forming the sheet and cooling after forming at a very fast cooling rate of 927 k/s using the latent heat of evaporation of the liquid up to a 220° C.

Example 28. A sheet forming test was performed providing a hot stamping die comprising a liquid on its surface in form of droplets (18.6 g/dm2) using a projection system (pulverizer) electrostatically charged with a potential difference of 97 kV between the die and liquid (in negative polarity) with a current of 82 μA. A 22MnB5 coated sheet of 2.1 mm thickness was pre-heated in a furnace between 700-800° C. and placed in the hot stamping die, in direct contact with the liquid. Forming the sheet and cooling after forming at a very fast cooling rate of 730 k/s or the latent heat of evaporation of the liquid up to a 180° C. Below that temperature the cooling rate became smaller than 10 K/s.

Example 29. A sheet forming test was performed providing a hot stamping die comprising a liquid on its surface in form of droplets using a projection system (cone type nozzles) and a cooling channel structure within the die with 3 main channels of 18 mm diameter and 5 branches. A SQ1800 coated sheet of 3.1 mm thickness was pre-heated in a furnace and placed in the hot stamping die, in direct contact with the liquid. Forming the sheet and cooling after forming at a very fast cooling rate of 760 k/s using the latent heat of evaporation of the liquid up to a 120° C.

Example 30. A series of sheet forming test were performed providing a hot stamping die comprising a liquid on its surface in form of droplets using a projection system (pulverizer) electrostatically charged with a potential difference between 1 and 350 kV between the die and liquid (in negative polarity) with currents between 10 and 5000 μA. and a cooling channel structure within the die with at least 2 main channels with a diameter of more than 12 mm and at least 3 branches each finalizing with at least 10 sub-superficial fine channels (capillary) with different mean distances to the surface tested (1 to 16 mm) and different mean equivalent diameters tested (1 to 8 mm). Different 22MnB5 coated sheets of 0.9 to 3.1 mm thickness were pre-heated in a furnace and placed in the hot stamping die, in direct contact with the liquid. Forming the sheet and cooling after forming at a very fast cooling rate (always above 200 k/s) using the latent heat of evaporation of the liquid up to a certain temperature (values between 55° C. and 320° C. were tested). Below that temperature the cooling rate was kept slower than 20 K/s. Some tests were also performance in the same conditions but without using the electrostatic charging. Also, different types of projection systems were tested. Some of the tests were replicated with the water only on one side (one of the die halves). Some of the tests were replicated on tubular components or structures.

Example 31. A sheet forming test was performed providing a hot stamping die comprising a liquid on its surface in form of frozen droplets using a projection system and a cooling channel structure with 9 main channels of 10 mm and 24 branches. A 34MnB5 coated sheet of 4.2 mm thickness was pre-heated in a furnace and placed in the hot stamping die, in direct contact with the frozen droplets. Forming the sheet and cooling after forming at a very fast cooling rate of more than 1000 k/s using both the latent heat of fusion and the latent heat of evaporation of the liquid up to 90° C.

Figure 2:
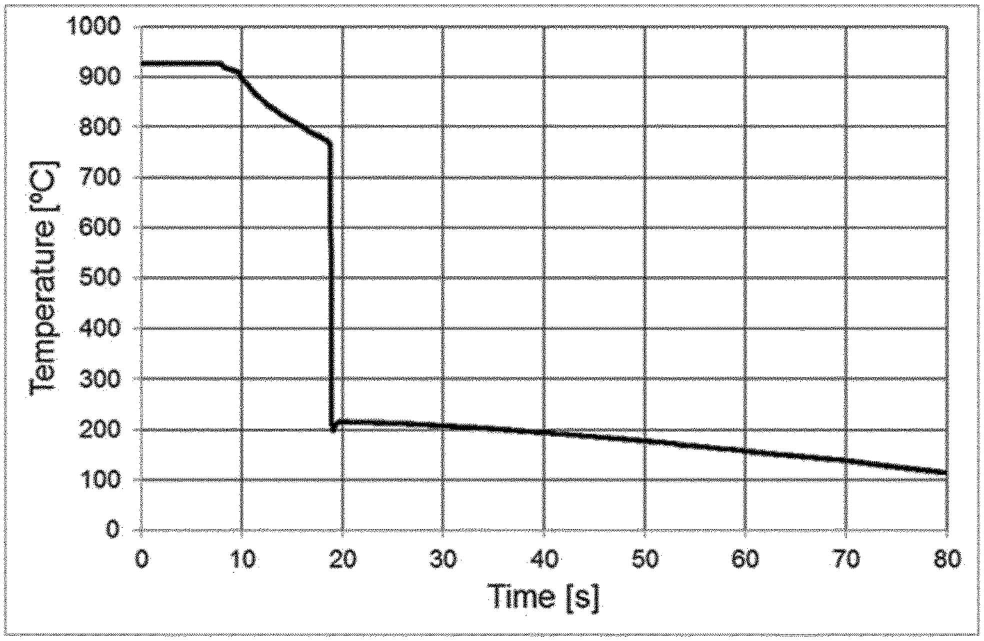
FIG. 2 shows different cooling rates during the hot stamping process using the method disclosed in this document.

Example 32. A series of sheet forming test were performed providing a hot stamping die comprising a frozen liquid on its surface. The die surface was kept at a temperature below −1° C. and the liquid projected onto the surface was tested both in the form of frozen droplets and continuous frozen film (in some instances the film was not completely continuous and some areas of the relevant surface were not covered). The pulverization system, nozzles and electrostatic charges described in examples 1 and 7 were tested. The same dies were tested as in example 7 (influence of internal cooling system). The same sheets as in example 2 were pre-heated in a furnace and placed in the hot stamping die, in direct contact with the frozen liquid. Forming the sheet and cooling after forming at a very fast cooling rate (always above 400 k/s) using the latent heat of fusion and evaporation of the liquid up to a certain temperature (values between 55° C. and 280° C. were tested). Below that temperature the cooling rate was kept slower than 15 K/s. A sample of a T° vs. time profile can be seen in FIG.-2.

Example 33. The tests of example 9 were replicated but keeping the die surface above 0° C. and the liquid projected onto it was kept in liquid form. Droplet sizes between XX and YY were tested. With mean liquid quantities between 0.05 and 9 g/dm2 on the active surface and a 55% to 100% active die surface liquid coverage. Droplet sizes from 10 to 250 mg were tested.

The invention claimed is:

1. A method for producing metal-comprising components comprising the steps of:

a) providing a mould, b) filling the mould with powder, c) sealing the mould, d) subjecting the mould to high pressure, e) while keeping a high pressure level, raising the temperature of the mould, f) while keeping a high enough temperature, of 320 K or more, releasing at least 5% of the pressure applied to the mould, to a value below 90 MPa, wherein the pressure is released at a rate between 980 MPa/s and 0.9 MPa/h.

2. The method according to claim 1, wherein after method step c) and before method step d) the mould is undercooled to a temperature of 9° C. or less.

3. The method according to claim 1, wherein the material used to manufacture the mould provided in step a) comprises polycaprolactone.

4. The method according to claim 1, wherein in step c) the mould is sealed in a vacuum tight way, with a leak rate between 0.9 mbar·l/s, and $1.2 \cdot 10^{-7}$ mbar·l/s using a continuous layer coating comprising an elastomer with a maximum working temperature of 52° C. or more, to a vacuum of 490 mbars or less.

5. The method according to claim 1, wherein the high pressure in step d) is applied through a pressurized fluid with a maximum pressure between 12 and 900 MPa.

6. The method according to claim 1, wherein the high pressure level kept in step e) is a pressure between 10.5 MPa and 860 MPa, and the temperature of the mould is raised to between 320K and 440K.

7. The method according to claim 1, with an additional method step:

j) joining the produced metal-comprising components to different parts to make a bigger component.

8. The method according to claim 1, with an additional method step:

k) applying a high temperature and high pressure treatment to the produced metal-comprising components.

9. The method according to claim 1, wherein the mould provided in step a) is made of a material comprising a polymeric material.

10. The method according to claim 1, wherein the technology used to provide the mould in step a) is selected from polymer injection molding (PIM) and/or an additive manufacturing (AM) technology.

11. The method according to claim 1, wherein the total time of steps d)-f) is higher than 22 minutes.

12. A method for producing metal-comprising components comprising the steps of:

a) providing a mould, b) filling the mould with powder, c) sealing the mould, d) subjecting the mould to high pressure, e) while keeping a high pressure level, raising the temperature of the mould, f) while keeping a high enough temperature of 320 K or more, releasing at least some of the pressure applied to the mould;

wherein at least part of the mould provided in step a) is manufactured through an additive manufacturing technology chosen amongst SLA, DLP, CDLP, MJ, MJF, BJ, DOD and SLS, wherein the material used to manufacture the mould comprises a polyolefin and/or a polyamide with a heat deflection temperature from 32° C. to 380° C. measured according to ASTM D648-07 with a load of 1.82 MPa, reinforcement below 28% or no reinforcement and has a tensile strength between 2 MPa and 188 MPa when characterized with a strain rate of $1 \cdot 10^{-2}\ s^{-1}$.

13. A method for producing metal-comprising components comprising the steps of:

a) providing a mould, b) filling the mould with powder, c) sealing the mould, d) subjecting the mould to high pressure, e) while keeping a high pressure level, raising the temperature of the mould, f) while keeping a high enough temperature of 320 K or more, releasing at least some of the pressure applied to the mould;

wherein the manufactured components are locally segregated.

* * * * *